United States Patent [19]
Sugiyama et al.

[11] Patent Number: 5,996,029
[45] Date of Patent: Nov. 30, 1999

[54] INFORMATION INPUT/OUTPUT CONTROL APPARATUS AND METHOD FOR INDICATING WHICH OF AT LEAST ONE INFORMATION TERMINAL DEVICE IS ABLE TO EXECUTE A FUNCTIONAL OPERATION BASED ON ENVIRONMENTAL INFORMATION

[75] Inventors: Mitsumasa Sugiyama, Kawasaki; Susumu Sugiura, Atsugi; Yoshikazu Yokomizo, Yokohama; Yoshinobu Mita, Kawasaki; Makoto Takaoka, Yokohama; Shigetada Kobayashi, Tokyo; Junichi Shishizuka, Kawasaki; Tsutomu Negishi, Tokyo; Osamu Yamada, Yokohama; Yukari Toda, Yokohama; Kazuhiro Saito, Yokohama; Masanari Toda, Yokohama; Yasuhiko Hashimoto, Tokyo; Yasuo Fukuda, Yokohama, all of Japan

[73] Assignee: Canon Kabushiki Kaisha, Tokyo, Japan

[21] Appl. No.: 08/730,462

[22] Filed: Oct. 15, 1996

Related U.S. Application Data

[63] Continuation of application No. 08/182,600, Jan. 18, 1994, abandoned.

[51] Int. Cl.[6] .................................................. G06F 13/00
[52] U.S. Cl. ........................ 710/15; 709/217; 395/500.45
[58] Field of Search ...................................... 395/159, 180, 395/892, 500.44–500.49; 710/15–19, 62–74; 909/217–318

[56] References Cited

U.S. PATENT DOCUMENTS

| | | | |
|---|---|---|---|
| 4,931,922 | 6/1990 | Baty et al. | 364/200 |
| 4,953,165 | 8/1990 | Jackson | 371/16.1 |
| 5,123,017 | 6/1992 | Simpkims et al. | 371/15.1 |
| 5,187,592 | 2/1993 | Sugiyama et al. | 358/430 |
| 5,241,482 | 8/1993 | Iida et al. | 364/468 |
| 5,251,020 | 10/1993 | Sugiyama | 358/500 |
| 5,353,399 | 10/1994 | Kuwamoto et al. | 395/159 |
| 5,361,265 | 11/1994 | Weinberger et al. | 371/29.1 |

*Primary Examiner*—Christopher B. Shin
*Attorney, Agent, or Firm*—Fitzpatrick, Cella, Harper & Scinto

[57] ABSTRACT

There is disclosed an information input/output control device and a method therefor which displays a list of identification informations indicating an information terminal device with which a functional operation can be executed in response to an acquired environmental information of the information terminal device and in accordance with an input of an indication information which instruct to execute the functional operation.

15 Claims, 72 Drawing Sheets

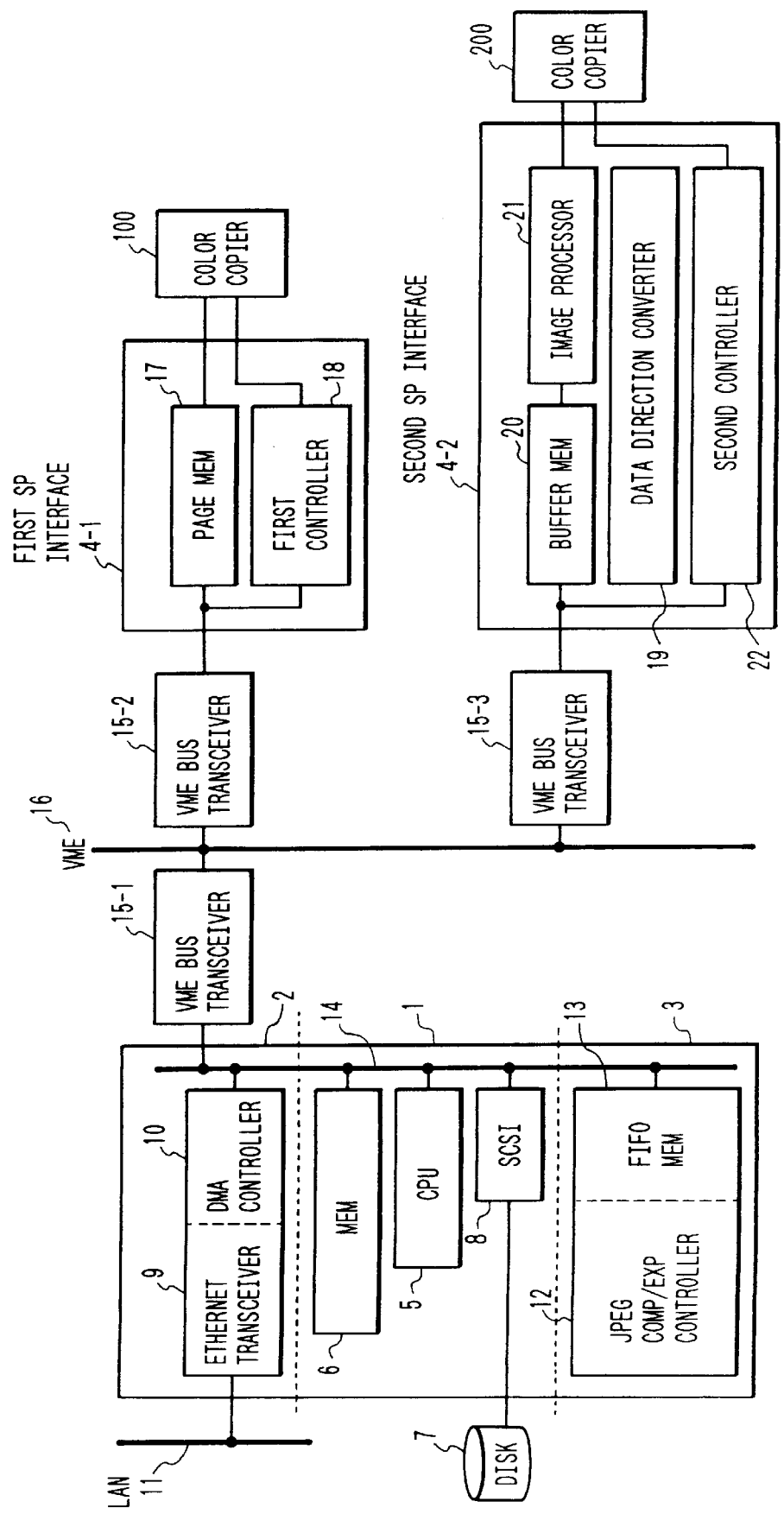

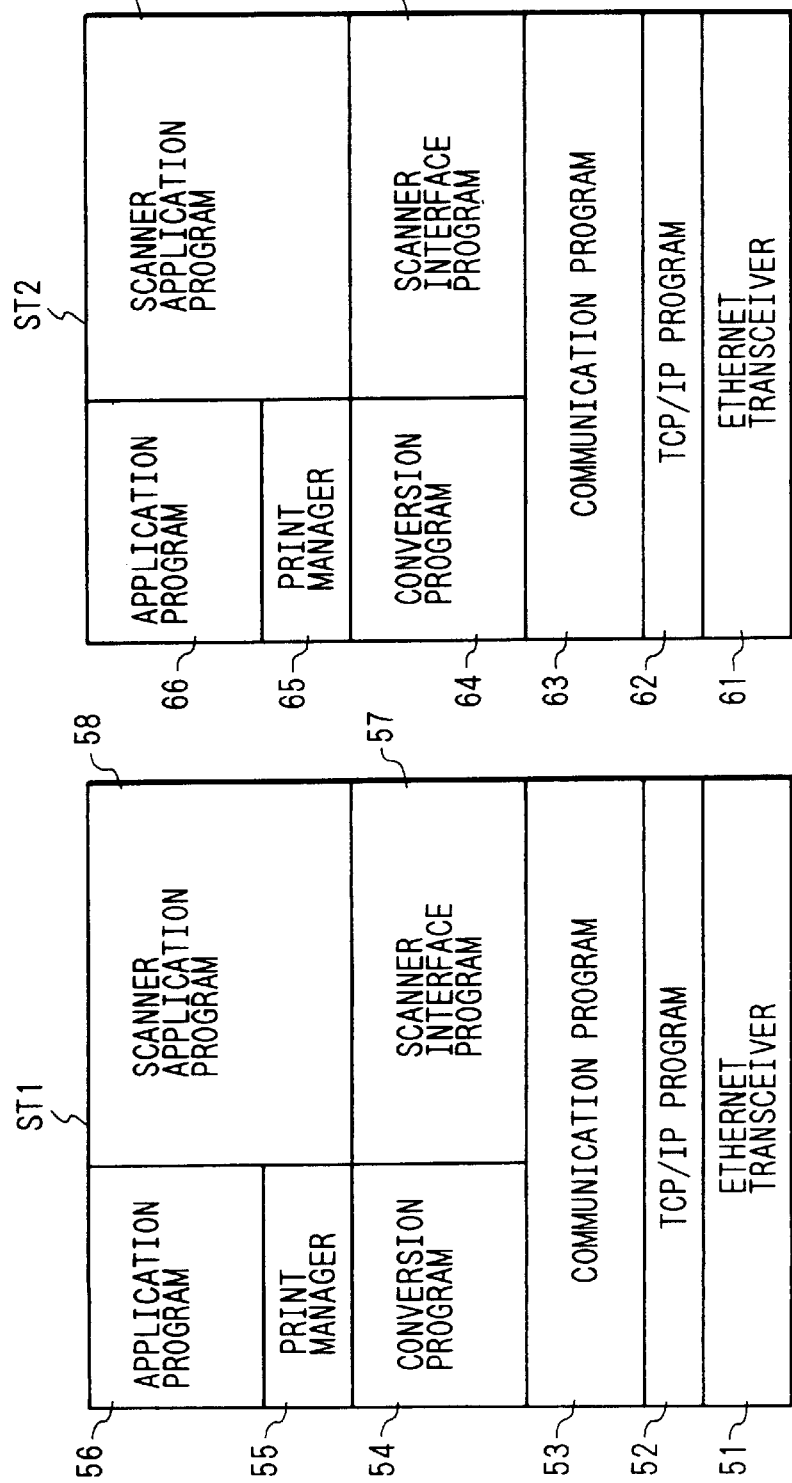

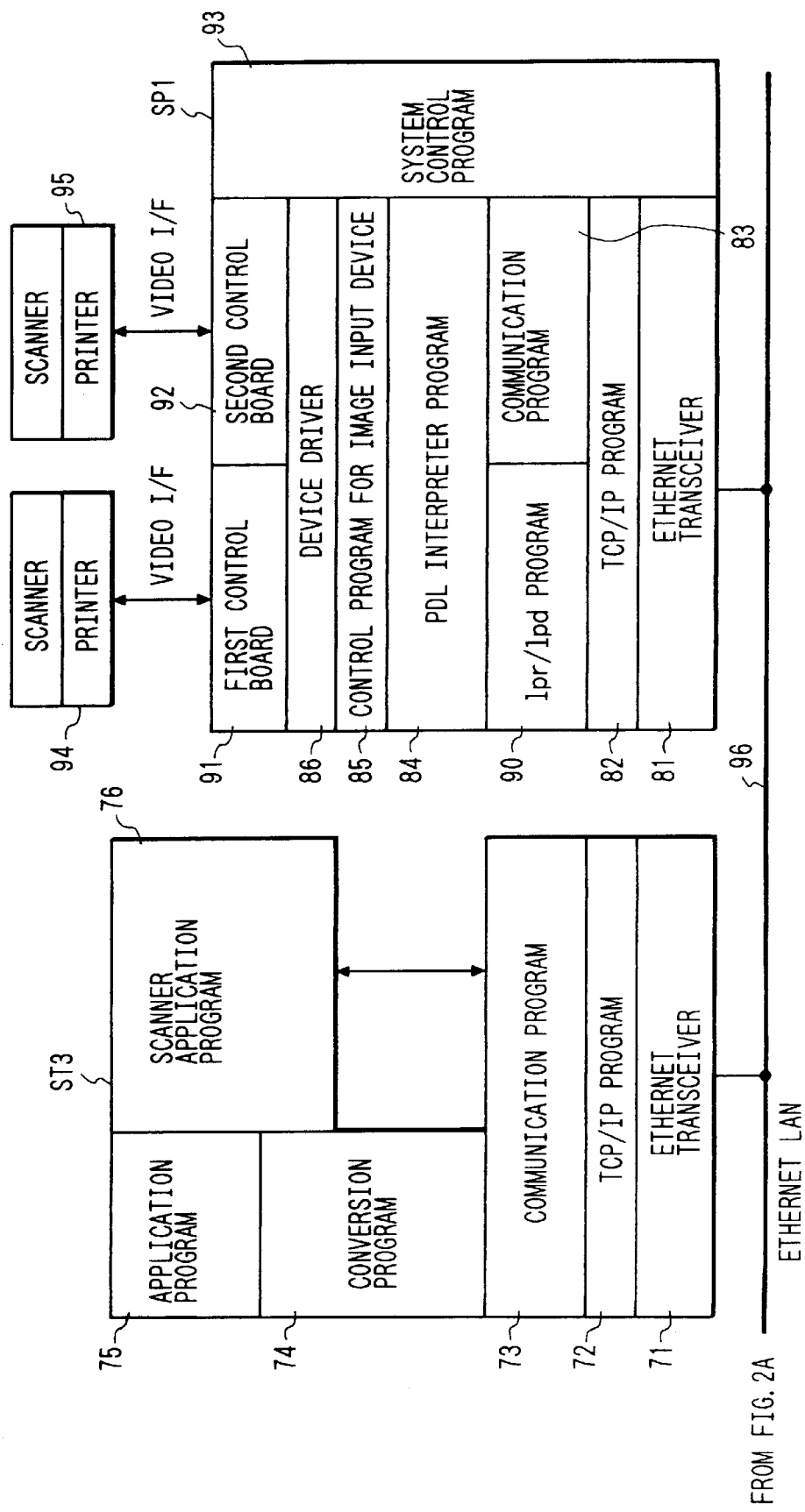

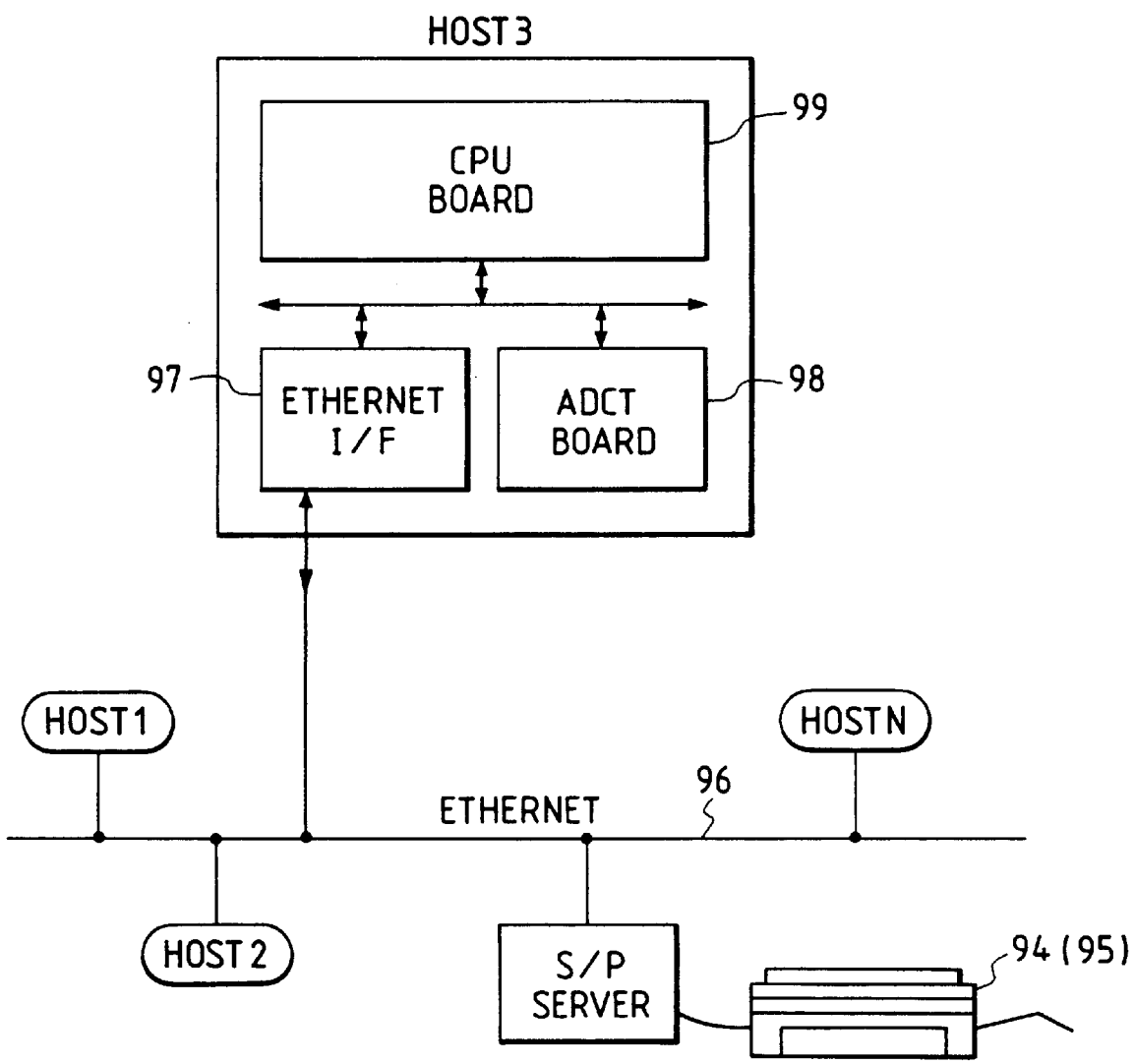

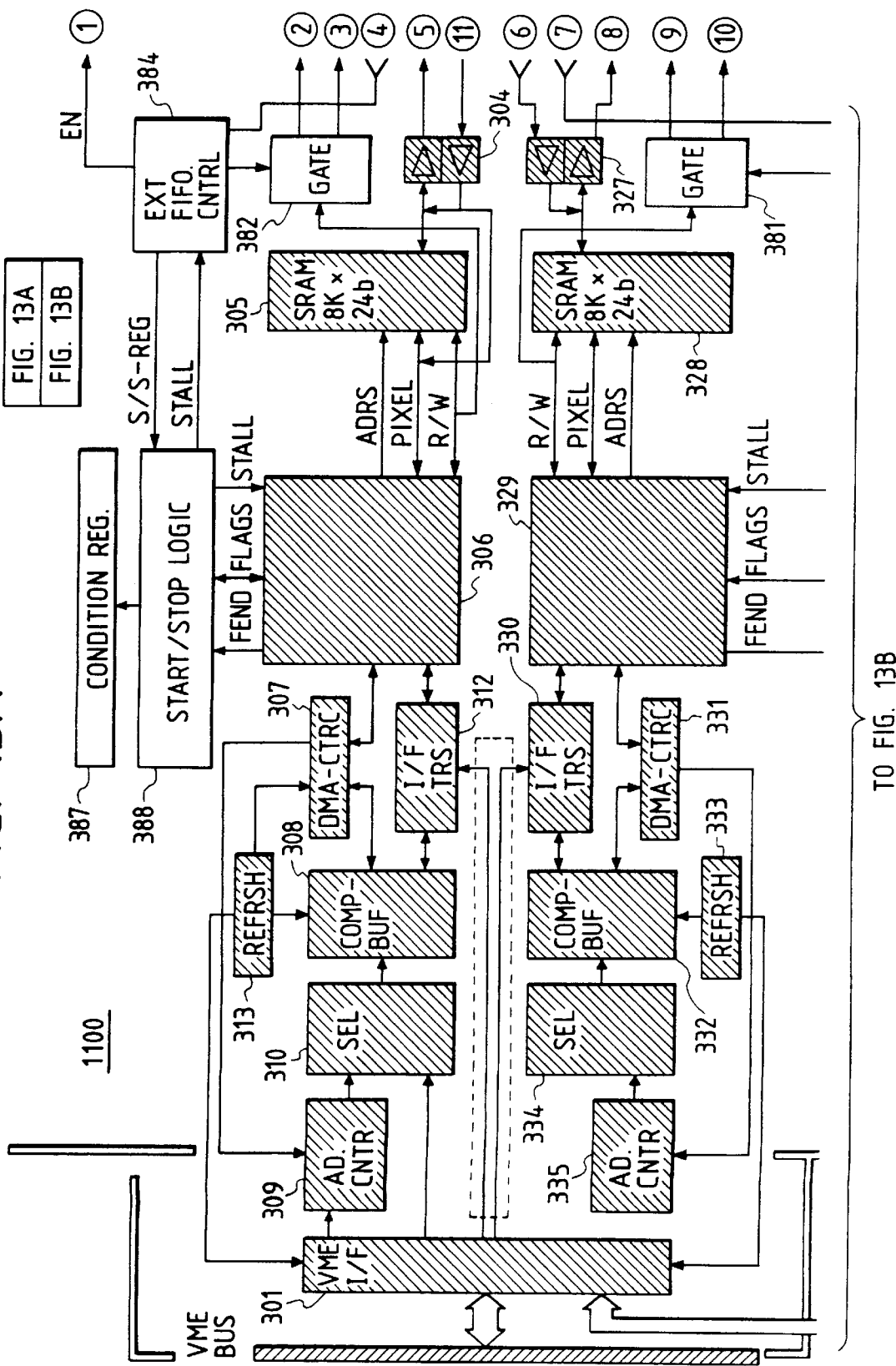

HEAD SCANNING

DATA SCANNING

RASTER SCANNING

| SIGNAL | I/O (PRINTER) | REMARKS |
|---|---|---|
| DATA STB | INPUT | |
| DATA 1 ~ DATA 8 | INPUT | |
| ACK | OUTPUT | |
| BUSY | OUTPUT | |
| PE | OUTPUT | PAPER END |
| SELECT | OUTPUT | PRINTER SELECT |
| SG | | SIGNAL GROUND |
| FG | | FRAME GROUND |
| +5V | | |
| INPUT PRIME | INPUT | INITIALIZE (PRINTER) |
| FAULT | INPUT | ERROR |
| SG | | GROUND |

FIG. 27

```
ESC [? 0 K                      DESIGNATE PROPORTIONAL PITCH
ESC [38m                        DESIGNATE COLOR MODE
ESC [11h                        DESIGNATE UNIT
ESC [7 I                        DESIGNATE DOT
ESC [22m                        MEDIUM
ESC [3m                         ITALIC
ESC [? 0;3;255;0%p              Y=255, M=255, C=0
ESC [2 I                        DESIGNATE 1/720 INCH
ESC [453 C                      45.3 POINT
ESC7 I                          DESIGNATE DOT
ESC [400;300f                   DRAW "CANON
CANON                           AT DOT (400,300)

ESC [? 0;2;0;0;0;255%p          Y=0, M=0, C=0, K=255
ESC [700;500f                   AT DOT (700,500)
ESC [7m                         HILIGHT START
R                               DRAW "R"
ESC27m                          HILIGHT END

ESC [1000;1000f                 AT DOT (1000,1000)
ESC [786432;512;200;0;512;8;12.R   TOTAL NO. OF BYTES;WIDTH;
                                   RESOLUTION;COMPRESSION;
                                   HEIGHT;BIT/PIX
IMAGE DATA, IMAGE DATA ········
```

FIG. 28

| START BAND | END BAND | FIGURE | | |
|---|---|---|---|---|
| 1 | 2 | CIRCLE | 80 | 100 ···· |
| 2 | 4 | RECTANGLE | 120 | 180 ···· |

|    | STATUS | PRIORITY | I/F  | JOB  | FINAL PAGE | INTR JOB ID |
|----|--------|----------|------|------|------------|-------------|
| 25 | ESTOP  | LEVEL 2  | BMEM | CLCP | 1          |             |
| 26 | STOP   | LEVEL 2  | BMEM | BJP  | 2          | 27          |
| 27 | RUN    | LEVEL 2  | BMEM | BJS  | 1          |             |
| 28 | WAIT   | LEVEL 0  | CNTR | PDLP | 0          |             |
|    |        |          |      |      |            |             |

FIG. 48

| ID | STATUS | PRIORITY | I/F | JOB | FINAL PAGE | INTR JOB ID |
|---|---|---|---|---|---|---|
| 25 | WAIT | LEVEL 0 | BMEM | CLCP | 0 | |
| | | | | | | |
| | | | | | | |
| | | | | | | |
| | | | | | | |

FIG. 49

| ID | STATUS | PRIORITY | I/F | JOB | FINAL PAGE | INTR JOB ID |
|---|---|---|---|---|---|---|
| 25 | RUN | LEVEL 0 | BMEM | CLCP | 1 | |
| 26 | WAIT | LEVEL 1 | BMEM | BJP | 0 | |
| | | | | | | |
| | | | | | | |
| | | | | | | |

FIG. 50

| ID | STATUS | PRIORITY | I/F | JOB | FINAL PAGE | INTR JOB ID |
|---|---|---|---|---|---|---|
| 25 | ESTOP | LEVEL 2 | BMEM | CLCP | 1 | |
| 26 | WAIT | LEVEL 1 | BMEM | BJP | 0 | |
| | | | | | | |
| | | | | | | |
| | | | | | | |

FIG. 51

| ID | STATUS | PRIORITY | I/F | JOB | FINAL PAGE | INTR JOB ID |
|---|---|---|---|---|---|---|
| 25 | ESTOP | LEVEL 2 | BMEM | CLCP | 1 | |
| 26 | RUN | LEVEL 1 | BMEM | BJP | 1 | |
| | | | | | | |
| | | | | | | |
| | | | | | | |

FIG. 52

| ID | STATUS | PRIORITY | I/F | JOB | FINAL PAGE | INTR JOB ID |
|---|---|---|---|---|---|---|
| 25 | ESTOP | LEVEL 2 | BMEM | CLCP | 1 | |
| 26 | RUN | LEVEL 1 | BMEM | BJP | 2 | |
| 27 | WAIT | LEVEL 2 | BMEM | BJS | 0 | |
| | | | | | | |
| | | | | | | |

FIG. 53

| ID | STATUS | PRIORITY | I/F | JOB | FINAL PAGE | INTR JOB ID |
|---|---|---|---|---|---|---|
| 25 | ESTOP | LEVEL 2 | BMEM | CLCP | 1 | |
| 26 | STOP | LEVEL 2 | BMEM | BJP | 2 | 27 |
| 27 | RUN | LEVEL 2 | BMEM | BJS | 1 | |
| 28 | WAIT | LEVEL 0 | CNTR | PDLP | 0 | |
| | | | | | | |

FIG. 54

| ID | STATUS | PRIORITY | I/F | JOB | FINAL PAGE | INTR JOB ID |
|----|--------|----------|------|------|------------|-------------|
| 25 | WAIT | LEVEL 2 | BMEM | CLCP | 1 | |
| 26 | WAIT | LEVEL 2 | BMEM | BJP | 2 | |
| 28 | RUN | LEVEL 0 | CNTR | PDLP | 0 | |
| | | | | | | |
| | | | | | | |

FIG. 55

| ID | STATUS | PRIORITY | I/F | JOB | FINAL PAGE | INTR JOB ID |
|----|--------|----------|------|------|------------|-------------|
| 25 | RUN | LEVEL 2 | BMEM | CLCP | 2 | |
| 26 | WAIT | LEVEL 2 | BMEM | BJP | 2 | |
| 28 | RUN | LEVEL 0 | CNTR | PDLP | 0 | |
| | | | | | | |
| | | | | | | |

FIG. 56

| ID | STATUS | PRIORITY | I/F | JOB | FINAL PAGE | INTR JOB ID |
|----|--------|----------|------|------|------------|-------------|
| 26 | WAIT | LEVEL 2 | BMEM | BJP | 2 | |
| 28 | RUN | LEVEL 0 | CNTR | PDLP | 0 | |
| | | | | | | |
| | | | | | | |
| | | | | | | |

| ID | STATUS | PRIORITY | I/F | JOB | FINAL PAGE | INTR JOB ID |
|----|--------|----------|------|------|------------|-------------|
| 28 | RUN | LEVEL 0 | CNTR | PDLP | 0 | |
| | | | | | | |
| | | | | | | |
| | | | | | | |
| | | | | | | |

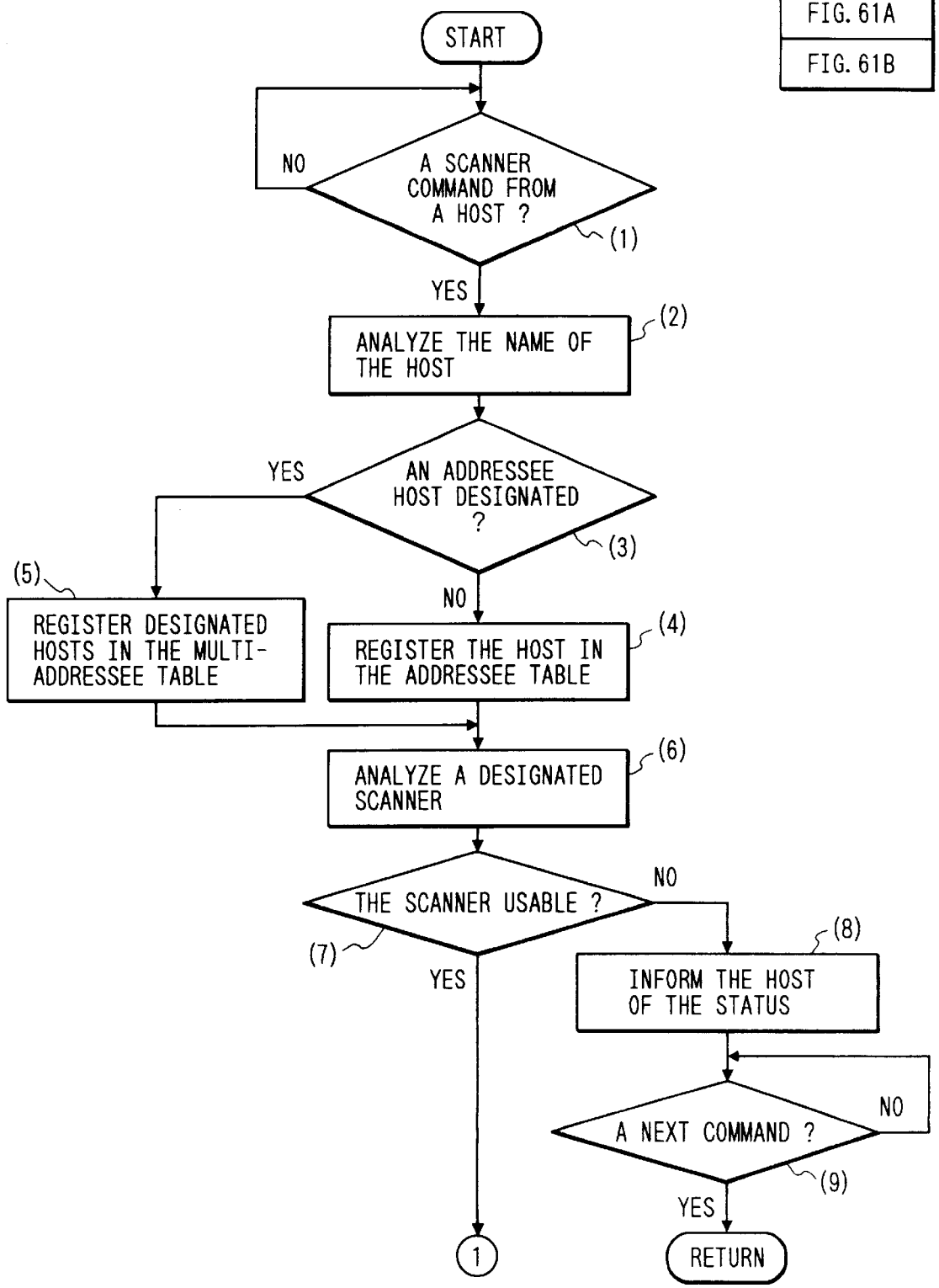

FIG. 82

COLOR DESIGNATION COMMAND (LINE)
| COMMAND NO. 1 | R | G | B | 2601

COLOR DESIGNATION COMMAND (SURFACE)
| COMMAND NO. 2 | R | G | B | 2602

COLOR DESIGNATION COMMAND (CHR)
| COMMAND NO. 3 | R | G | B | 2603

LINE TYPE DESIGNATION COMMAND
| COMMAND NO. 4 | NO. | 2604

LINE WIDTH DESIGNATION COMMAND
| COMMAND NO. 5 | WIDTH | 2605

SURFACE TYPE DESIGNATION COMMAND
| COMMAND NO. 6 | NO. | 2606

FIG. 83

CHR SIZE DESIGNATION COMMAND
| COMMAND NO. 7 | NO. | 3701

CHR STYLE DESIGNATION COMMAND
| COMMAND NO. 8 | NO. | 3702

CHR TYPE DESIGNATION COMMAND
| COMMAND NO. 9 | NO. | 3703

COLOR DRAWING COMMAND
| COMMAND NO. 10 | R | X | Y | 3704

RECTANGLE DRAWING COMMAND
| COMMAND NO. 11 | Xs | Ys | Xe | Ye | 3705

CHR DRAWING COMMAND
| COMMAND NO. 12 | X | Y | NUM | CODE | CODE | CODE | 3706

FIG. 85

| 1 | 255 | 0 | 0 | ~2901 |

| 2 | 0 | 0 | 255 | ~2902 |

| 4 | 1 | ~2903 |

| 5 | 2.5 | ~2904 |

| 6 | 5 | ~2905 |

| 10 | 15 | 40 | 45 | ~2906 |

| 1 | 0 | 0 | 0 | ~2907 |

| 2 | 255 | 255 | 0 | ~2908 |

| 4 | 1 | ~2909 |

| 5 | 3 | ~2910 |

| 6 | 7 | ~2911 |

| 11 | 65 | 50 | 105 | 85 | ~2912 |

| 3 | 0 | 255 | 0 | ~2913 |

| 7 | 20 | ~2914 |

| 8 | 1 | ~2915 |

| 9 | 5 | ~2916 |

| 12 | 38 | 107 | 5 | 0×53 | 0×54 | 0×52 | 0×49 |
| 0×4e | 0×47 | ~2917 |

| SB | EB | COM |
|----|----|-----|
| 1  | 2  | CIRCLE |
| 2  | 4  | RECTANGLE |
| 4  | 5  | STRING |

2922:

| TNUM | LCOLOR | FCOLOR | LT | LW | FT | DR | DX | DY |
|------|--------|--------|----|----|----|----|----|-----|
| 1 | 255,0,0 | 0,0,255 | 1 | 40 | 5 | 240 | 640 | 720 |

2923:

| TNUM | LCOLOR | FCOLOR | LT | LW | FT | DSX | DSY | DEX | DEY |
|------|--------|--------|----|----|----|-----|-----|-----|-----|
| 1 | 0,0,0 | 255,255,0 | 1 | 48 | 7 | 1048 | 800 | 1680 | 1360 |

2924:

| TNUM | TCOLOR | DTX | DTY | ADR |
|------|--------|-----|-----|-----|
| 1 | 0,0,255 | 608 | 1712 | 0×100000 |

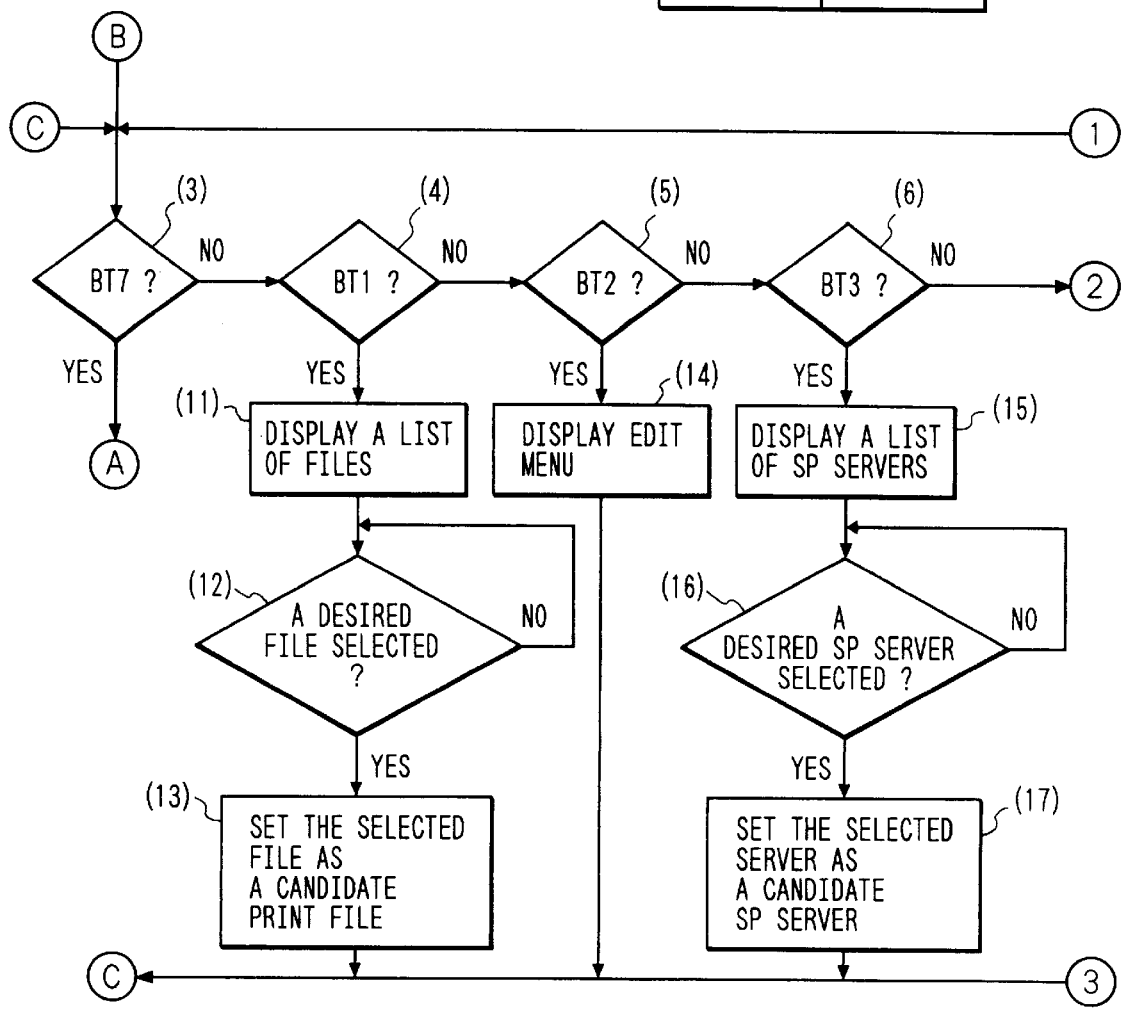

INFORMATION INPUT/OUTPUT CONTROL APPARATUS AND METHOD FOR INDICATING WHICH OF AT LEAST ONE INFORMATION TERMINAL DEVICE IS ABLE TO EXECUTE A FUNCTIONAL OPERATION BASED ON ENVIRONMENTAL INFORMATION

This application is a conitinuation of application Ser. No. 08/182,600 filed Jan. 18, 1994, now abandoned.

BACKGROUND OF THE INVENTION

1. Field of the Invention

The present invention relates to an information input/output control device and a method therefor which displays a list of identification information indicating an information terminal device with which a functional operation can be executed in a network environment under which plural kinds of information terminals are available to be used.

2. Related Background Art

There has been conventionally no method for using a network scanner with which scanning operations are performed by a remote host device connected to a network.

Accordingly, the host device requesting a scanning operation must be fed a video image signal from a scanner connected to the host device. Alternatively, the video image signal was transferred to the host device through the network.

When the video image fed by the scanner is printed out together with the other information, such as characters, drawings etc., the scanned video image and the other information are usually synthesized in the host device requesting the printing operation and output to a printer connected to the network.

There have been the following kinds of data processing methods in a conventional server device.

(1) The video image data expanded into a bit image format in the host is transferred from the host to the printer through an exclusive use interface. The host takes care of all the interface operations with the network. This method has been mainly utilized in an intelligent host, such as a work station.

(2) The host transmits only a page description language. The printer incorporating an interpreter function converts it into a bit image format, which is so called as a network printer.

(3) The device, which converts a page description language transmitted from the host into an exclusive use bit image, further transmits the image data to a printer through an exclusive use interface.

In a printer which forms a video image, with an output video image information being generated from the input data written in page description language, in particular, in a full colour printer which can form a colour video image based on colour video image data such as RGB, red (R), green (G) and blue (B) data corresponding to each input picture element are input and converted into yellow (Y), magenta (M), cyanic (C) and black (B) data, thereby being printed with ink or developer corresponding to each colour in order to output a full colour video image.

However, in order to satisfy a video image input/output request of host computers each of which is supervised by its own different operation system (OS), a plurality of interpreters are necessitated for executing data communication processing which meets each OS so that be data processing load will become heavier on a server device, which causes an increase cost of the device.

Further, when a plurality of host computers which are connected to the network control a plurality of terminal devices, video image input/output requests created by each host computer occur irregularly and sometimes concurrently with each other. In this moment, when a preceding or waiting print or scan job exists, the succeeding print or scan job cannot precede, thereby aggravating a problem in the speed of video input/output processing.

In addition, colour terminals utilized in these kinds of networks are relatively expensive in price in comparison with monocolour terminals and interface devices utilized to interface with the host are extremely expensive in price in comparison with the monocolour devices. A main reason for this is that an enormous amount of video image data is created when a colour video image is processed. Further, data must be abstracted in transmission of a colour video image.

That is, an encoding, a coding and a vectorizing are required for video image data, character data and graphic data, respectively.

These procedures can realize the data to be described in a form independent of the output terminal device by abstracting document and video image data as much as possible, thereby eliminating the data amount. On the other hand, in the receiving side which receives the data described above, the interface device utilized for converting the above described data into bit image data most suitable for each receiving device will become complicated and expensive in price.

However, under the circumstance that the colour terminal devices are utilized, it is feared that the whole device will become very expensive if each host computer employs both of a colour interface device and a colour terminal device.

On the contrary, if a supply access to a single scanner/printer which is connected to the network by a plurality of machines is non-restrictively permitted, the request of group users cannot be satisfied who are willing to use restrictively the scanners/printers connected to the network so that an access request to the scanners/printers by the specific group users will be kept waiting for a considerably long time.

The conventional video image terminal into which a communication function is incorporated executes the scanning and printing functions in accordance with an access input order from each host. While a scanner/printer server device incorporating a memory means for storing video image input/output instructions from a plurality of users is waiting, without executing input/output procedures, with stored therein an instruction designating a specific printer or a video image input device (scanner), it happens that the designated printer or scanner becomes inoperable due to, for example, a paper feed jam of a printer or a break down of an exposure lamp.

Even though, in this case, operable terminals are available, waiting and usable, they cannot start input/output processings until the first designated terminal is recovered, because they have not been designated, which reduces remarkably efficiency of the terminal devices.

Further, terminal devices, particularly printers, have not necessarily provided high quality printing because they simply execute video image output processing in accordance with input data, such as a page description language or the like. For example, in a printer which compresses image data created by a video image generator, stores its one page of data into a video image memory, and then expands it for printing so as to cope with a high speed of the printer, it has sometimes compressed with a compression rate higher than necessary because the memory in which the compressed image data is stored is limited in capacity, which results in a quality aggravation of the video image. In other words, when the compression is performed with an adequate compression rate so as to store the compressed data in the memory in full, the aggravation can be minimized. However, in the JPEG (Joint Photographic Expert Group) compression, which is a standard compression method for a colour video image, it is difficult to predict a post-compressed data amount prior to compression if information about the colour video image which is to be compressed is not available.

As the result, the compression has been performed with a higher compression rate than necessary to securely store the compressed data, which has caused an aggravation of the video image.

Furthermore, high speed and high quality printing has not necessarily been available in printing out from a binary printer by digitizing the video image information created by a video image generator.

In digitizing, for example, it is better to use an error diffusion method with which a relatively clear-cut line can be achieved for a document having much area for characters and drawings whereas it is better to use a dither method with which a relatively short processing time for digitizing can be achieved for a document having almost all its area for images.

However, in a conventional device, since the video image processor simply forms image data, a printer has been printing using only a single digitizing method regardless of the video image.

Further in a printer in which a video image created by the video image generator is colour-converted by the video image output circuit, a high quality printing has not necessarily been achieved.

In general, it is suitable to employ a colour conversion with much more black ink to make the black colour clear in a document containing many characters and drawings therein whereas it is suitable to employ a colour conversion with less black ink to make the image naturalized in a document containing many images therein.

However, in a conventional device, since the video image output circuit simply forms image data, a printer has been printing using only a single digitizing method regardless of the video image, thereby high quality printing having not necessarily been available.

The data processing format which is described by the host varies on company by company and the Quick Draw (commercial name) type, GDI (commercial name) type and the like have been available (later will be described in detail).

There are various types of page description languages (PDL) to control a printer environment, that is, a printer, such as Post Script (commercial name), ESC/P (commercial name), LIPS (commercial name), CaPSL (commercial name) and the like.

The host executes an output information with a data format which depends on an activatable application program.

Accordingly, if the data format of the output device to be connected thereto is mismatched with that depending on the above application program, the application program must be amended in order to output the data through the output device, whereby the selection range of the output device to be connected will be narrowed.

Further, in the case of amending each application program, the developing cost for each application will become heavier, thereby decreasing the customer's interest in purchasing the application programs.

SUMMARY OF THE INVENTION

The present invention is made to overcome the foregoing problems. Therefore, it is an object of the present invention to provide an information input/output control device and a method therefor which displays a list of identification informations indicating an information terminal device with which a functional operation can be executed in response to an acquired environmental information of the information terminal device and in accordance with an input of an indication information which instruct to execute the functional operation.

BRIEF DESCRIPTION OF THE DRAWINGS

FIG. 1 is a system block diagram illustrating a schematic view of a server device of the first embodiment in accordance with the present invention;

FIG. 2 is comprised of FIGS. 2A and 2B showing system block diagrams illustrating a schematic view of a network system to which the server device shown in FIG. 1 is applied;

FIG. 3 is a view illustrating a network structure between a server device according to the present invention and its host device;

FIG. 27 is a view illustrating a main portion of a code system applied with necessary modifications to a page description language in a server device according to the present invention;

FIG. 28 is a view illustrating a substitutional procedure into an intermediate code conducted by a layouter in a server device according to the present invention;

FIG. 48 is a table illustrating a content of a job table in response to a job processing in a server device according to the present invention;

FIG. 49 is a table illustrating a content of a job table in response to a job processing in a server device according to the present invention;

FIG. 50 is a table illustrating a content of a job table in response to a job processing in a server device according to the present invention;

FIG. 51 is a table illustrating a content of a job table in response to a job processing in a server device according to the present invention;

FIG. 52 is a table illustrating a content of a job table in response to a job processing in a server device according to the present invention;

FIG. 53 is a table illustrating a content of a job table in response to a job processing in a server device according to the present invention;

FIG. 54 is a table illustrating a content of a job table in response to a job processing in a server device according to the present invention;

FIG. 55 is a table illustrating a content of a job table in response to a job processing in a server device according to the present invention;

FIG. 56 is a table illustrating a content of a job table in response to a job processing in a server device according to the present invention;

FIG. 82 is a view illustrating a structure of a page description command transmitted from each host computer shown in FIGS. 2A and 2B;

FIG. 83 is an explanatory view illustrating a structure of a page description command transmitted from each host computer shown in FIGS. 2A and 2B;

FIG. 85 is an explanatory view illustrating a page description command transmitted from each host computer shown in FIGS. 2A and 2B;

FIG. 86 is an explanatory view illustrating a page description command transmitted from each host computer shown in FIGS. 2A and 2B;

DETAILED DESCRIPTION OF THE PREFERRED EMBODIMENT

Figure 4:
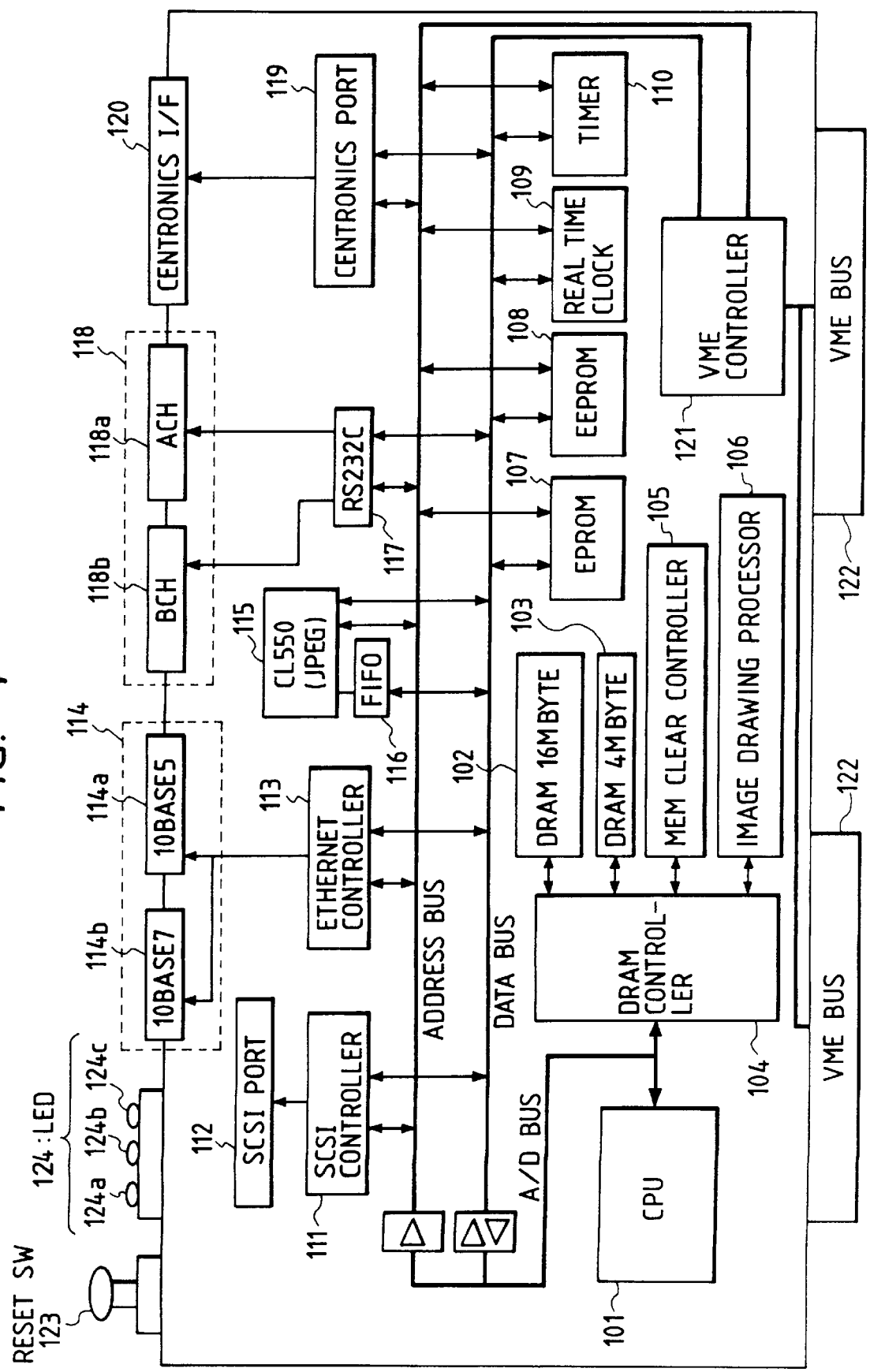
FIG. 4 is a circuit diagram illustrating a detailed structure of a main CPU board circuit shown in FIG. 1.

A detailed description of the preferred embodiment will be made hereinafter referring to a server device to as an example of an information processing device according to the present invention to which a plurality of terminal devices executing scanning and printing functions are connected through a predetermined interface and is communicably connected to a plurality of host devices through a predetermined network.

Although the description will be further made referring to a data transmission procedure between the host computer communicably connected to the server device and its application, the present invention can be, needless to say, applicable to a host computer communicably connected to the server device which is further communicably connected to a plurality of host computers through a predetermined network and also connected to a plurality of output terminal devices executing the printing function through a predetermined interface.

FIG. 1 is a system block diagram schematically illustrating a server device according to the first embodiment of the invention. A detailed system block diagram will be explained later.

A scanner/printer (SP) server not shown in FIG. 1 will be explained later. This system briefly comprises a main CPU circuit 1, an Ethernet circuit 2, JPEG compression/expansion (hereinafter as called "compansion") circuit 3 and a scanner/printer interface circuit 4.

When plural scanners and printers are necessary to be connected to the scanner/printer (SP) server, the necessary number of scanner/printer interface circuits 4 have to be installed. To facilitate increase or decrease the number, the scanner/printer interface circuit 4 is constituted on an independent board and connected to its main body through a VME bus 16 which will be described later. The remaining three circuits 1, 2 and 3 are constituted on a single board and coupled each other through a local bus.

The reference numeral 4-1 denotes a first scanner/printer interface circuit (hereinafter called as the first SP interface circuit) and serves as an interface between a digital color copier 100 (laser beam color copier), for example, "CLC-500" (product name) and the VME bus 16.

The reference numeral 4-2 denotes a second scanner/printer interface circuit (the second SP interface circuit) and serves as an interface between a digital color copier 200 (thermal jet color copier), for example, "Piccel Jet" (product name) and the VME bus 16.

The main CPU circuit 1 is constituted of a CPU 5, for example, R3000 (product name) and a memory 6, which constitutes an operating system "OS." For example, under the control of VxWorks (product name), all programs are executed. A hard disk 7 is provided as an auxiliary device for the memory 6. The numeral 8 denotes a SCSI interface. The Ethernet circuit 2 comprises an Ethernet transceiver 9 and a DMA controller 10 which transfers data to the memory 6 in a DMA mode.

The Ethernet transceiver 9 is connected to an "Ethernet Local Area Network" (product name: LAN) 11.

The JPEG compansion circuit 3 comprises a JPEG compression, expansion controller 12 and an FIFO memory 13. A local bus, which couples the main CPU circuit 1, Ethernet circuit 2 and the JPEG compansion circuit 3 interrelatedly, is connected to the VME bus 16 through a VME bus transceiver 15-1.

The first SP interface circuit 4-1 comprises a page memory 17 and a first control circuit 18. Although the page memory 19 requires one page size memory area, this is because when the digital color copier 100 initiates printing or scanning functions, the flow control cannot be possible any more. The memory 17 is constituted as a compression memory because its price is very expensive.

An ADCT compression technique, which can achieve non-reversible, high compression rate compression, is employed on the memory 17 in view of the fact that the data stored in the memory 17 is only those rasterized by the memory 6. An ADCT compression chip not shown in FIG. 1 can be used with the same chip used in the JPEG compansion controller 12.

The compression data stored in the page memory 17 by using the ADCP compression technique is only used in a closed circuit herein and is not output herefrom so that no normalization is necessary. In fact, an improved JPEG is utilized as an effective method.

The first control circuit 18 is constituted of a CPU, for example, "Z-80" (product name) and used to send and receive control signals other than video signals to/from the copier 100.

A control command is serially transmitted in order to reduce a number of the interface.

The first SP interface circuit 4-1 is connected through the VME bus transceiver 15-2 to the VME bus 16.

The second SP interface circuit 4-2 which comprises a data direction converter 19, a buffer memory 20, a video processing circuit 21 and a second controller 22, is connected to the VME bus 16 through the bus transceiver 15-3. The data direction converter 19 converts a video data format into a vertical direction relative to the scanning direction in printing and converts a video data format which is a vertical direction relative to the scanning direction into the scanning direction, for which the buffer memory 20 is utilized.

The video processing circuit 21 is employed to supplement a video processing function which is lacked on the copier 200. The second controller 22, which provides the same functions as those of the first controller 18, is constituted of a CPU, for example, "Z-80" (product name).

Hereinafter, operations will be explained. The first example is how to execute a network printing.

A page description language i.e., "CaPSL" (product name) input from LAN 10 through the Ethernet transceiver 9 is stored directly into a specific region (receiving buffer) of the memory 6 by the DMA controller 10, and converted into a raster image by a page description language interpreter program, which will be described later.

Although the JPEG compression video image signal can be expanded by the page description language (hereinafter called as PDL), the JPEG compansion circuit 3 is utilized for expanding in a high speed.

Figure 60A:
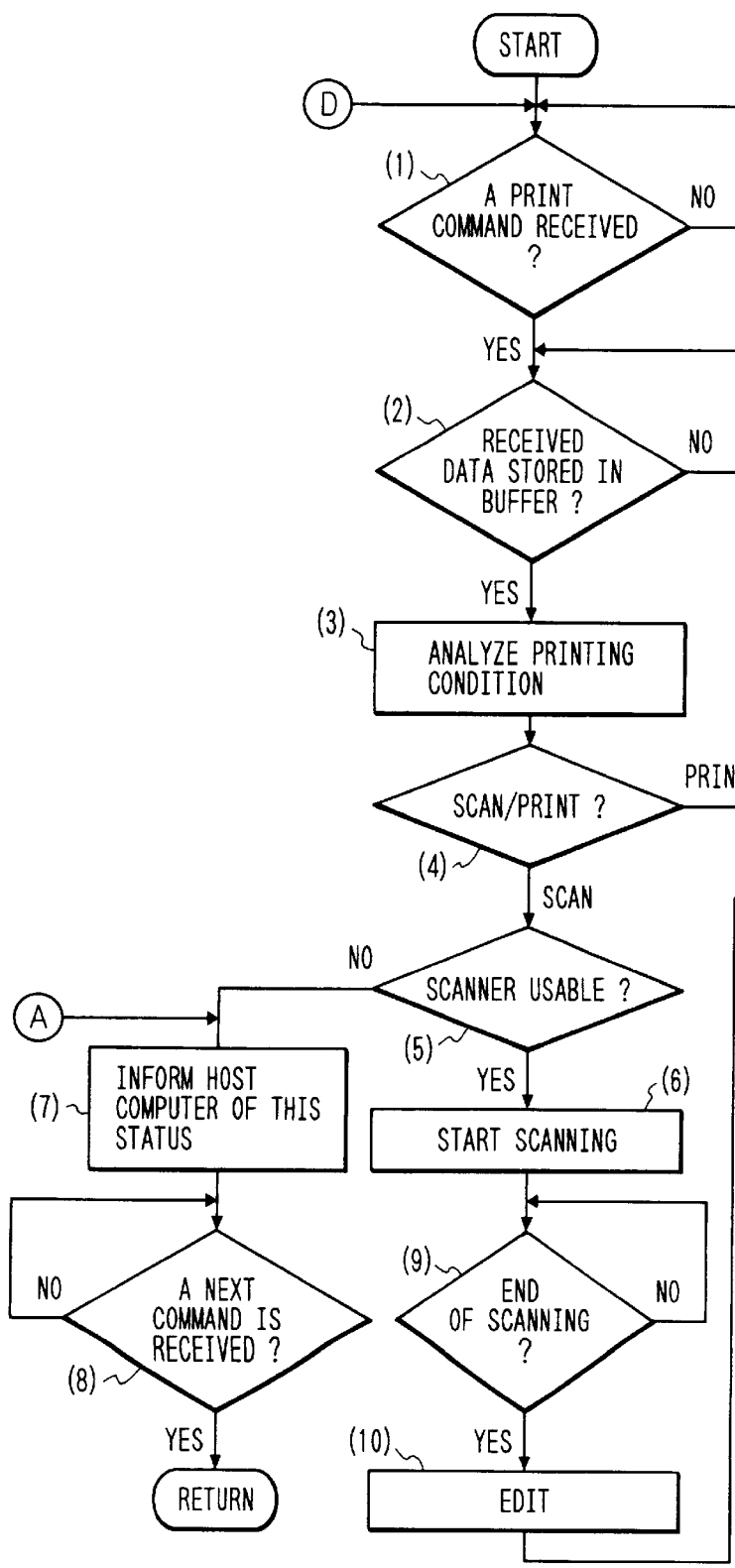
FIG. 60 is comprised of FIGS. 60A and 60B showing flow charts illustrating an example of the first input/output control procedure in a server device according to the present invention.
Figure 60:

In the first server device constituted above, the first video output control circuit (i.e., main CPU circuit 1) controls outputs, to the respective terminal devices, of the first video information signal input from the respective host through the network, the second video information signal read from the respective terminal devices (copier 100, 200) in accordance with instructions from the respective hosts and the third video information signal combined the first video information with the second one in accordance with instructions of the respective hosts, in accordance with flow charts shown in FIGS. 60 and 61. Accordingly, either of the first to third video information signals can be directly produced and directly output from the respective terminal devices in accordance with instructions of the respective hosts.

Further, since the second video output control circuit controls the second video information signal being output to the first host which requests the information or to the second host which is designated by the first host, the second video information fed from the respective terminal devices in response to instructions from the hosts can be directly transferred to the other host including its own host.

Since the memory 6 does not have enough capacity due to economical reasons to store one page data created by rasterizing a video plane, is employed a bunding method which executes partially the PDL, for example CaPSL for one time and proceeds multiple times in total. The rasterized data is transferred to either the first SP interface circuit 4-1 or the second interface circuit 4-2 and then output to the respective printers. A network scanning procedure will be described later.

FIGS. 2A and 2B are system block diagrams schematically illustrating a network system in which the server device shown in FIG. 1 is incorporated.

The network system in the embodiment is so constructed that a small number of scanners or printers connected thereto through the network can be commonly utilized from application softwares of the commercialized host computers, such as Macintosh (product name), IBM-PC (product name), SUN (product name), etc.

The network system shown in FIGS. 2A and 2B is divided into four blocks, namely from the left, Macintosh work station ST1, IBM-PC work station ST2, SUN work station ST3 and a color SP server SP1. Three work stations ST1–ST3 are commercialized host computers and the color SP server SP1 is an interface unit designed by the inventors of the present invention.

These blocks are mutually connected through a local area network 96, for example, Ethernet (product name). Numerals 94 and 95 denote a first color scanner/printer and a second color scanner/printer, respectively.

Macintosh work station ST1, IBM-PC work station ST2, SUN work station ST3 and the color SP server SP1 employ a common communication interface for mutual communication.

Numerals 51, 61, 71, and 81 denote Ethernet transceivers which are used for communication with the local area network (LAN) 96. Numerals 52, 62, 72, and 82 denote communication programs TCP/IP (product name) which are constructed on the LAN 96 and standards of U.S. Department of Defense.

The TCP/IP program provides an error-free data communication service (function) in End-to-End. Numerals 53, 63, 73, and 83 denote communication programs which provides services (functions) for special purposes to be utilized commonly from either Macintosh work station ST1, IBM-PC work station ST2 or SUN work station ST3. Numerals 53 and 63 denote communication programs to provide a client type service as an S/P client program and numeral 83 denotes a communication program to provide a server type service as an S/P server program.

Now, an Explanation will be made how to print on the first color scanner/printer 94 from Macintosh station ST1. In order to print the document produced by a commercialized application program 56, the "OS" called as Printing Manager 55 undertakes partially the control and initiates the control for printing.

The data format is standardized as "Quick Draw" (product name) in case of Macintosh.

Printing Manager 55 calls image drawing function groups of the conversion program 54 in a manner as they are written in the document.

The conversion program 54 consecutively converts Quick Draw into, for example, CaPSL (Canon Printing System Language) codes in the call and stores them into an unshown memory.

The communication program 53 transfers the obtained CaPSL codes to the color SP server SP1 in accordance with TCP/IP program 52 through Ethernet transceiver 51, LAN 96, Ethernet transceiver 81, TCP/IP program 82 and the communication program 83. The conversion programs 54, 64, 74, the communication programs 53, 63, 73, the scanner interface programs 57, 67, TCP/IP programs 52, 62, 72 can be supplied to the host computers either in a form of a floppy disk or an Ethernet transceiver, for example, a board circuit.

The whole operations of the color SP server (S/P server device) SP1 are controlled by a system control program 93. A receipt of the CaPSL codes is also informed to the system control program 93. The system control program 93 requests a PDL interpreter program 84, which will be described later, to rasterize the CaPSL coded document into a bit map video image.

The video image data rasterized into the bit map video image is transferred to a device driver 86 and further transferred to the first color scanner/printer 94 from the video interface Video I/F through, for example, the first printer control board 91 to be printed.

Although similar data flow is made when printed by using IBM-PC station ST2, a data format of the printed document is standardized as "GDI" (product name). The conversion program 64 mainly serves as GDI/CaPSL conversion program.

When printed by using SUN work station ST3, since the functions corresponding to the conversion programs 54, 64 are not standardized, communications are directly made by the application program 75 through the communication program 73.

In order to print by using a commercialized application program, for example, "Frame Maker" (product name), the conversion program 74 for MIF/CaPSL conversion is provided therebetween.

In case of scanning (reading) by using, for example, Macintosh station ST1, a scan request is issued by the scanner application program 58 through the scanner interface program 57. Then, the communication program 53 keeps an End-to-End communication route to the communication program 83 through Ethernet transceiver 51, LAN 96, Ethernet transceiver 81 and TCP/IP program 82. The scan instruction is also transferred to the system control program 93 and the system control program 93 requests the scanner control program to scan the first color scanner/printer 94.

The video image data of the scanned document is reversely transmitted from the first control board 91, through the device driver 86, the communication program 83. TCP/IP program 82, Ethernet transceiver 81, LAN 96. Ethernet transceiver 51, TCP/IP program 52, the communication program 53, the device driver 57, to the application program 58.

When scanned by using IBM-PC station ST2, a similar function will be made.

However, when scanned in SUN work station ST3, since the functions corresponding to the device driver 57 and the scanner interface program 67 are not standardized, communications are directly made by the scanner application program 76 through the communication program 73.

The scanner interface programs 57, 67 perform data control between the scanner application and the communication program.

The color SP server SP1 is connected to another scanner/printer, the second color scanner/printer 95, which controls the second color scanner/printer 95 as well through the second control board 92.

All programs including the system control program 93 of the color server SP1 work under control of the operating system "OS", for example, VxWorks (commercial name).

In order to receive requests from the UNIX work stations in which no such special programs such as the communication program 73 and the conversion program 74 are installed, there is installed a quasi-standard lpr/lpd communication program 90 in parallel with the communication program 83.

FIG. 3 is a view illustrating a network structure between a server device according to the invention and its host computers.

In the drawing, either Macintosh (commercial name), IBM-PC (commercial name) or SUN (commercial name)

computer each "OS" of which controls its own data processing can be used as each of host computers HOST 1-N.

Each of the host computers HOST 1-N respectively incorporates an Ethernet interface board 97, a video image compansion (ADCP) board 98, and a CPU board 99 to communicate with LAN 96.

ADCT board 98 can be replaced by a software which realizes the same function on a memory.

In case of not using a compression/expansion technique at the time of input/output of the video image data, there is unnecessary to provide the ADCP board 98. Although the embodiment employs "Ethernet" as the LAN 96, the other alternative "Apple talk" (commercial name), or "Taken Ring" (commercial name) can be also utilized.

This invention is also applicable to a system employing OS1 or IPX (both commercial names) instead of the communication program TCP/IP program.

FIG. 4 is a circuit block diagram illustrating a detailed structure of a board circuit constituted of the main CPU circuit 1, the Ethernet circuit 2 and the JPEG compression circuit 3 shown in FIG. 1.

In the drawing, a CPU 101 which is constituted of, for example, IDT 79R3051 (commercial name) controls whole operations of the board circuit. A real time OS is incorporated on the board circuit.

The CPU 101 activates the communication program 83, the system control program 93, the scanner control program 85, and PDL interpreter program 84, all of which have been activated under the above OS's and controls all operations in multi-processes.

A main memory 102 serves as a work memory of the CPU 101. When the system turns on, the programs stored in an EPROM 107, in an auxiliary memory device such as a hard disk connected to a SCSI port 112, or in a host computer in the network are down loaded and arranged into the memory 102. Therefore, the program itself of each processes is located on the main memory 102 and works there.

A band memory 103 can store a few lines of video image data in use of a raster method. The band memory 103 expands the PDL data into a bit map data. Although PDL usually delivers one page bit map data to a printer engine, this system employs a method that one page is divided into a few bands and expanded into a bit map data.

This can be realized in that the PDL interpreter program 84 rearranges the PDL data. The bit map data expanded into the band memory 103 is delivered to a printer. Then, the next band is expanded and delivered again to a printer.

One page printing can be accomplished by repetition of the above operations.

The video image data read from the scanner, is also temporarily stored in the band memory. The CPU 101, or a block transfer function of a direct memory access (DMA) which is not described in the system, can read the video image data from the band memory 103 and delivers it to the host computer through a hard disk connected to the SCSI port 112 or the network connected to the Ethernet port 114. When one band data is delivered, next band scan data is input and repeated in the same way described above.

A memory access controller 104 controls access and refresh functions of the main memory 102 and a DRAM constituting the band memory 103.

Though there are usually several kinds of methods for accessing DRAMs; a method for accessing word (8, 16, 32, . . . bits) by word; a method for accessing serially with a predetermined bit length (page READ, Write); and an interleave method in which divided DRAM banks are alternatively accessed and addresses are generated in advance, all the above methods can be applied so as to speed up the memory access. When the main memory 102 and the band memory 103 are constituted of SRAMs, it is not required to refresh. A memory clear controller 105 clears the data in the band memory 103 in a high speed.

Figure 5:
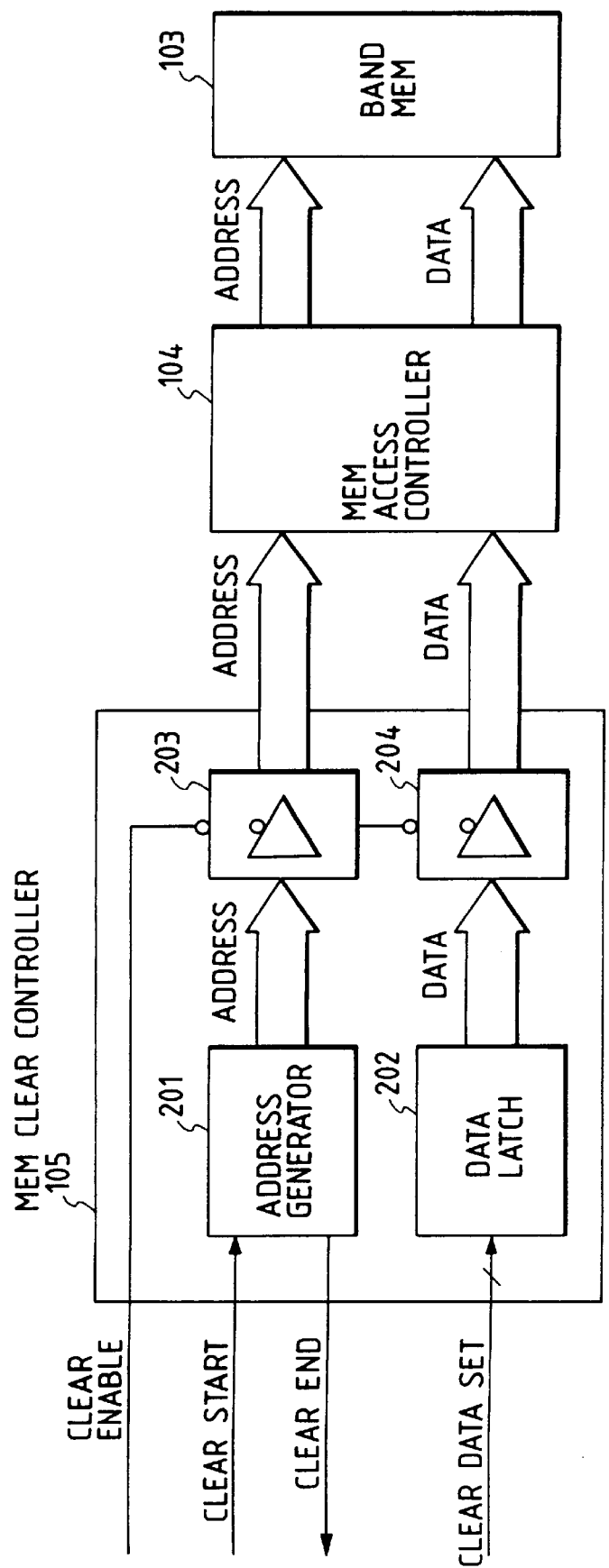
FIG. 5 is a block diagram illustrating a detailed structure of a memory clear controller shown in FIG. 4.

FIG. 5 is a block diagram illustrating a detailed structure of the memory clear controller 105 shown in FIG. 4.

In the drawing, an address generator 201 outputs addresses to be cleared at an address buffer 203 in response to a clear start signal. A data latch 202 outputs the clear data at a data buffer 204.

In the board circuit constituted of the main CPU circuit 1, the Ethernet circuit 2 and the JPEG compression circuit 3, when the CPU 101 confirms that the data of the band memory 103 is transferred to the other memory or interfaces, the address buffer 203 and the data buffer 204 are enabled, whereas the other access means to the band memory 103 are disabled. System initializing data, for example, "00" have been set in the data latch 202. The CPU 101 delivers a clear start signal to an address generator 201. In response to that, the address generator 201 generates consecutive addresses and the data latched at the data latch 202 is written in the band memory 103 through the memory access controller 104. After completion of writing into the whole memories, the address generator 201 sends a clear end signal to the CPU 101 and the clear operations are terminated.

A clear operation will be made after the video image data of the band memory 103 is delivered to a printer device. The video image data of the next band is expanded by the PDL interpreter program 84. On this moment, the PDL interpreter program 84 expands only the necessary portion into a bit map.

Figure 6:
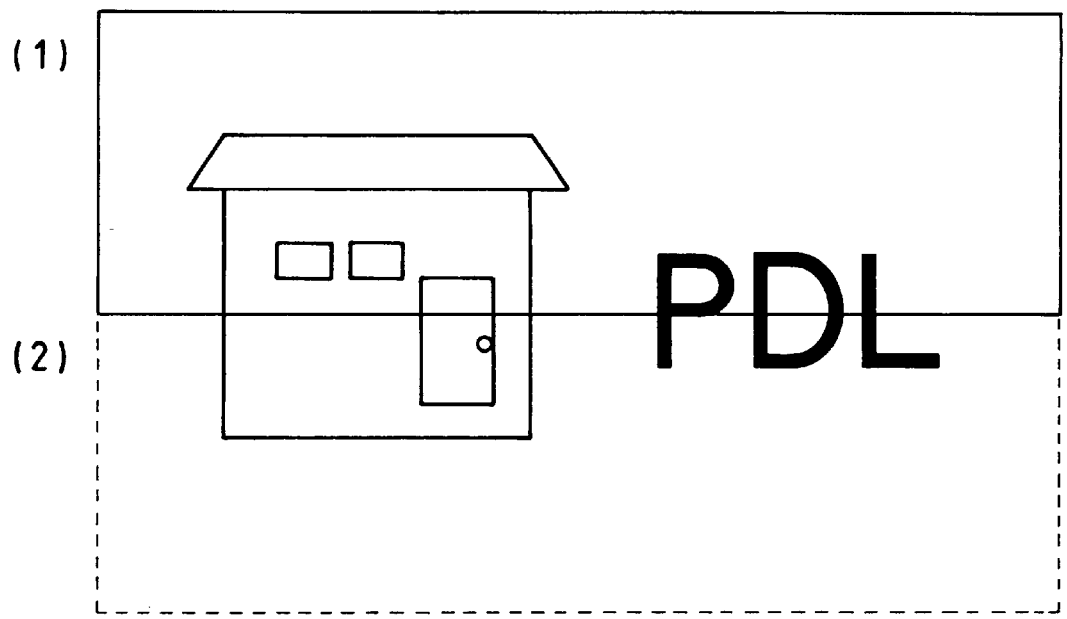
FIG. 6 is an explanatory view illustrating a band expansion process of video image information to a band memory shown in FIG. 5.

For example, as to the band expansion shown in FIG. 6 (1), (2), only the video image belonging to the area (2) is written. Accordingly, the video image data already transferred in FIG. 6, (1) remains as an unnecessary data.

If not cleared on the memory, the video image data mixing the area (1) and the area (2) stays in the band memory 103.

For that reason, the memory clear procedure is necessary. The memory clear controller 105 is constituted of hardware to proceed the memory clear procedure so that a high speed procedure can be realized.

The image drawing processor 106 is constructed in order to support with hardware drawing functions of the PDL interpreter program 84. The PDL interpreter program 84 requires relatively much time to draw lines and paint drawings.

Figure 7:
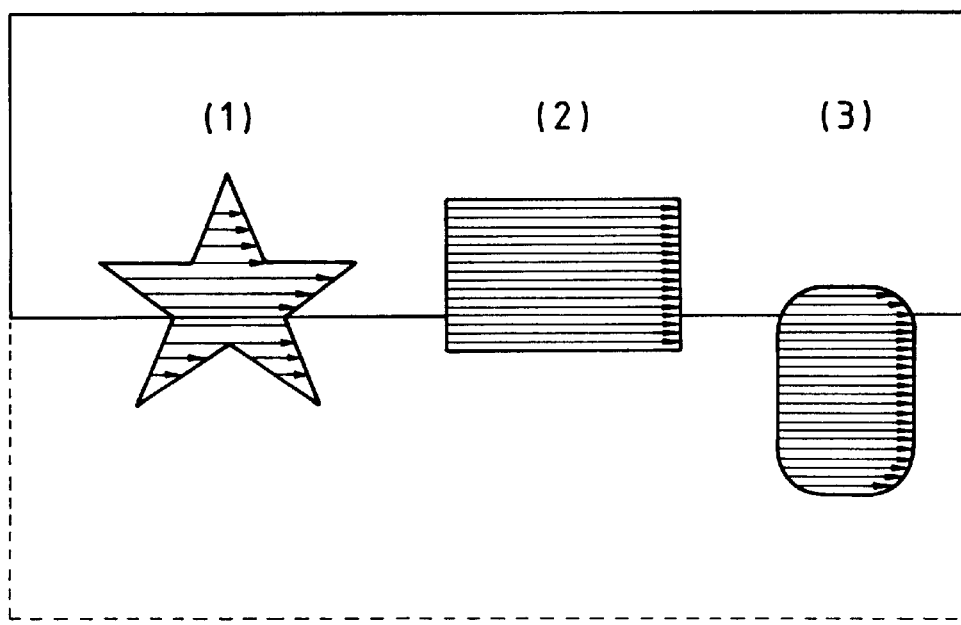
FIG. 7 is an explanatory view illustrating a band expansion process of video image information to a band memory shown in FIG. 5.

In order to paint, for example, the area enclosed with drawings (1) to (3) shown in FIG. 7, the painting procedure is performed in a direction shown as arrows in FIG. 7.

Figure 8:
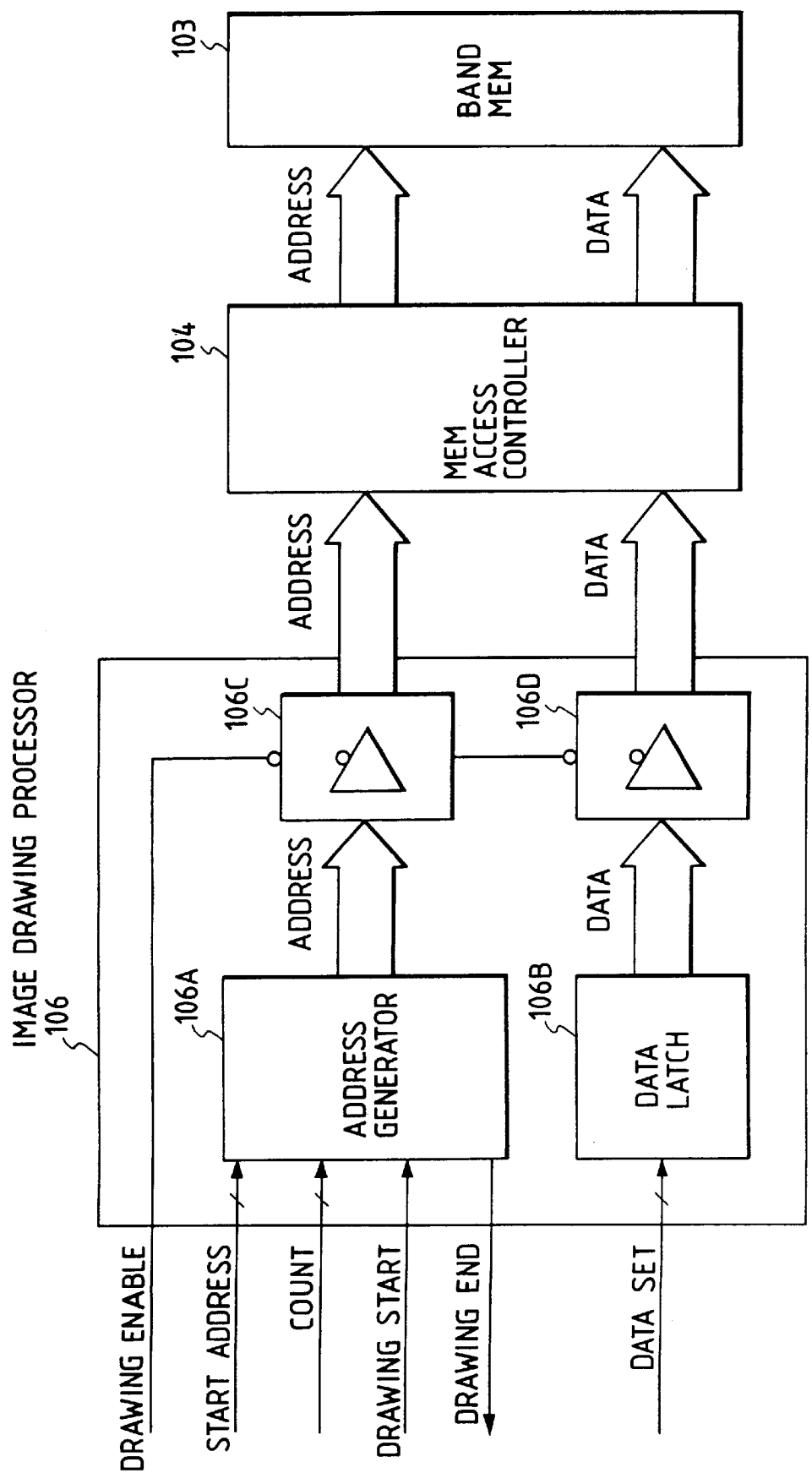
FIG. 8 is a block diagram illustrating a detailed structure of an image drawing processor circuit shown in FIG. 5.

FIG. 8 is a block diagram illustrating a detailed structure of the image drawing processor 106 shown in FIG. 5.

In the drawing, an address generator 106A delivers an address to be cleared to an address buffer 106C in response to a drawing start signal. A data latch 106B delivers a drawing data to a data buffer 106D.

In the board circuit constructed above, the CPU 101 instructs the image drawing processor 106 in view of the executed result by the PDL interprogram 84 when there exists drawing of lines or painting of drawings in the present band width.

The drawing data is firstly latched in the data latch 106B. Then, a start address and a count number (one line drawing volume) are set on the address generator 106A. The count number may be replaced by an end address. Next, the address buffer 106C and the data buffer 106D are enabled. In the contrary, the other access means to the band memory 103 are disabled. The CPU 101 delivers the drawing start signal to the address generator 106A. In response to that, the address generator 106A generates a series of sequential addresses from the start address value and the data latch 106B delivers its storing data to the band memory 103 through the memory controller 104.

When the counted number reaches to the predetermined number (end address), memory writing stops and the drawing end signal is delivered.

The memory writing will be restarted after the next start address and count number are determined and repeated up until the band is completely drawn.

The drawing operations are speeded up by employing hardware as the clearing operations are as well. Other structures can be employed wherein the specialized LSI undertakes the drawing procedure so that the supplemental operation of the CPU 101 is reduced.

In FIG. 4, the EPROM 107 in which above mentioned various programs for controlling the system are stored is firstly accessed by the CPU 101 when the power turns on.

There can be two methods for memorizing into the EPROM 107. The first method is to memorize in a manner that the programs can be executed as they are, whereas the second method is to compress and memorize the whole programs reversibly and to rearrange in the main memory 102 by expanding them when the power turns on.

The first method can save the main memory 102 then the method rearranging on the main memory 102 because the EPROM 107 can be executed without further ado. However, the first method has the shortcomings, that is, it requires much memory size of the EPROM 107 and an access time of the EPROM is relatively slow.

The second method can store a lot of programs in the EPROM 107 so that the memory size of the EPROM 107 can be reduced. And, since rearrangement is made on the main memory, an access time becomes relatively faster. However, it requires much memory size of the main memory 102.

In this embodiment, the second method is employed.

An EEPROM 108 is a device which does not loose the stored data even if the power turns off and can be rewritten data when the power turns on. Accordingly, it is well utilized for memorizing addresses on the network and for memorizing setting parameters of scanners and printers.

A time adjustable clock circuit (RTC) 109 is employed and time progresses even when the power turns off because it contains an internal battery, whereby real time can be known and utilized an information for scanning and printing. A timer 110 is an interval timer. Programs of the system are operated with a multi-program mode and its control is made by a real time OS.

The timer 110 informs the CPU 101 of interval time with a few milliseconds.

Each programs are assigned to the CPU 101 in accordance with the timer 110 and a priority order scheduler.

A SCSI controller 111 controls a SCSI which is a standard for a peripheral device interface. A SCSI port 112 is a parallel input/output I/F port for connecting a peripheral device.

An Ethernet controller 113 connects the system with LAN 96, which is one of the network systems, and functions as a controller for data communications.

The Ethernet controller 113, in which a small buffer memory is incorporated, takes time matching between the nonsynchronous CPU and the synchronous network.

The data transferred from the network is stored in the buffer memory and the data to be transferred to the network is also delivered from the buffer memory.

The Ethernet controller 113 performs a control of electric timings and a control of data transmission and receipt. TCP/IP communication program 82 is controlled by the CPU 101 by utilizing the Ethernet controller 113.

The Ethernet 114 is made of a thick coaxial cable 114a, the interface I/F of which is constituted of a connector having 15 pins. The twist pain type port 114b is made of four line medium, the interface I/F of which is constituted of a modular jack having 8 pins. These ports are utilized for connection with the Ethernetwork. An ADCT compression/expansion circuit 115 compresses or expands intermediate tone data (each color has 8 bit length) which are constituted of RGB (RED, GREEN, BLUE) by employing a JPEG algorithm standardized in CCITT.

In case of compression of color intermediate tone data read from a scanner, real video image data read from the scanner is compressed by the ADCT compression/expansion circuit 115 to reduce the memory size.

Accordingly, speed up of network transfer and reduction of stored memories can be realized.

The compressed video image data transferred through the network is expanded by the ADCT compression/expansion circuit 115 into color intermediate tone data and stored in the band memory 103. Then, they are transferred to a printer interface I/F to be printed by a printer device.

An FIFO memory 116 is used for transmitting or receiving compressed video image data to/from the ADCT compression/expansion circuit 115. The FIFO memory 116 is used for absorbing a data transfer timing gap due to data volume difference between compressed data and expanded data (real video image data) in compression and expansion operations.

An RS232C controller 117 controls a standard serial interface I/F. An RS232C port having two ports, A channel 118a and B channel 118b, has one port used for connecting terminal devices to display or to input data from a key board. Another port is used for connecting with a device having a serial interface, to which a character printer, like a laser beam printer, or a simple type scanner can be connected.

In this system, A channel is used for terminal devices and is used to receive command inputs or to change parameters. This system also employs a quasi terminal function in which a similar function of A channel can be achieved by making r-login from a host computer in the network.

Centronics I/F controller 119 performs an I/F control for connecting a printer with a modified Centronics type I/F.

If, in fact, outputs 8 bits data after confirming the status (BUSY/non) of a device to be connected. By repeating the above operation, data is delivered. The controller 119 performs other signal controls based on the modified Centronics I/F. Centronics I/F port 120 is electrically connected to a printer with a cable.

A VME controller 121 controls the CPU 101 of the system to access the other board having a modified VME bus standard. The VME bus standard permits address buses A16, A24, A32 and data buses D8, D16, D24, D32 be accessed. A bus usage right is given in accordance with an arbitration method. The circuit further realizes a control suitable for the VME bus standard.

A VME bus port 122 is electrically connected to a double height VME bus. The VME bus port 122 is constituted of two connector having 6 pins, among which an address bus and a data bus are disposed.

A reset switch 123 is finally depressed to restart the system when a system error occurred. Although the reset switch 123 is constituted of a hardware switch mechanism in this embodiment, a program RESET (warm RESET) can be employed which resets by using programs from a terminal connected to the above mentioned RS232C port 118 or a quasi terminal r-logged-in from the network.

An LED 124 is constituted of an LED 124*a* which indicates power ON, an LED 124*b* which indicates the CPU 101 is executing and an LED 124*c* which can be turned on by each program. An operator can visually confirm that the system is turned on when the LED 124*a* is turned on. An operator can also visually confirm that the CPU 101 is executing when the LED 124*b* is turned on and that the CPU 101 is waiting when the LED 124*b* is turned off.

When the LED 124*c* turns on frequently, an operator can visually confirm that any procedure is currently executing. An operator can identify the program with which the LED is turned on by watching a duration time, a turning on interval and a turning on number.

A detailed description of a data flow will be made hereinafter under a process of a request for printing issued by a host computer in the network.

When the network, that is, the host computer connected with LAN 96 desires to print data, it transmits to a SP server system information designating the data and an output destination.

In this instance, when a hard disk is connected to the SCSI port, the data is temporarily stored (spooled) in the hard disk. When a hard disk is not connected, the data is temporarily stored in the main memory 102. Transferred data formats are shown hereunder as (1) to (3). (1) data with a PDL format, (2) data revealing a real video image and (3) data revealing a compressed video image.

In case of (1) the data with a PDL format, the PDL interpreter program 84 is activated and each band is expanded into a bit map which is written in the band memory 103. When the band memory fills the data, it transmits them to the printer and next band is expanded into a bit map.

In case of (2) the data revealing a real video image, the band memory 103 stores the data of each band width and transfers them to a designated printer. Then, the data of next band width is prepared. Since the data revealing a real video image contains much data volume, the host computer does not transfer all the data in the lump but transfers with being divided.

Accordingly, a job receiving the data from the network has been proceeded during the time of printing.

Further, in case of (3) the data revealing a compressed video image, the compressed video image data is stored in the FIFO memory 116 and converted by the ADCT expansion circuit 115 into a real video image data. The expanded data of each band width is stored in the band memory 103 and transferred to a designated printer. Hereinafter, the similar procedure will be repeated.

In some cases, the data format of video image data happens to be not a single format but a complexed format combining the above described data formats. In case of (1) data format and (2) data format or (1) data format and (3) data format both in combination the above described procedures are applied.

There are three cases in using an interface I/F of a printer device which transfers a video image data. The first case is to be connected through an interface board construct on the VME bus 122.

The second case is to be connected with the RS232C port 118. The third case is to be connected with the Centronics I/F port 120. The host computer determines its destination depending on which interface I/F connected to printers is used for printing.

Whenever the data of each band width in the band memory 103 is transferred the band clear controller 105 clears the memory. After that, the PDL expansion is again performed, with making the band width uniform, so that the data is transferred to an interface circuit designated by a printer and output at the printer under a control of an interface circuit (control board) by the device driver 86. The above procedures are repeated.

When a video image data is desired to be input from a scanner, the system receives from the host computer a designated information to activate the scanner and starts a video image input. There are two cases in using an interface I/F of a scanner device, one of which is to be connected through an I/F board constructed on the VME bus 122 and the other of which is to be connected with the RS232C port 118.

The above designation will be made by the host computer.

The video image data of each band width delivered from the scanner is stored in the band memory 103. In case that the video image data from the scanner is transferred to the designated host computer, the following two processings will be made depending on the scanner control program 85.

The first processing is to form a real video image data supplemented with a tag recording a video image information, and the second processing is to form a compressed video image data.

In case of the first processing, there are two methods; one of which is to transfer the data in the band memory 103 to a designated host computer consecutively through the network; the other of which to store the data temporarily in a hard disk connected with the SCSI port 112.

Either of both methods is chosen by the designated information from the host computer.

When a tag recording a video image information is supplemented, the data is transferred together with the tag.

In case of the second processing, the data in the band memory 103 is delivered to the ADCT compression circuit 115 so as to be compressed and the compressed data is written in the FIFO memory 116. Whenever the data is read out from the FIFO memory 116, it is transferred to the host computer and the next band data is processed repeatedly to obtain a compressed video image data. In case of using a hard disk, almost the same procedure, except temporarily storing the data in the hard disk, will be conducted.

Hereinafter, referring to a circuit block diagram shown in FIG. 9, a detailed structure will be explained of the first SP interface circuit 4-1 shown in FIG. 1.

Figure 9:
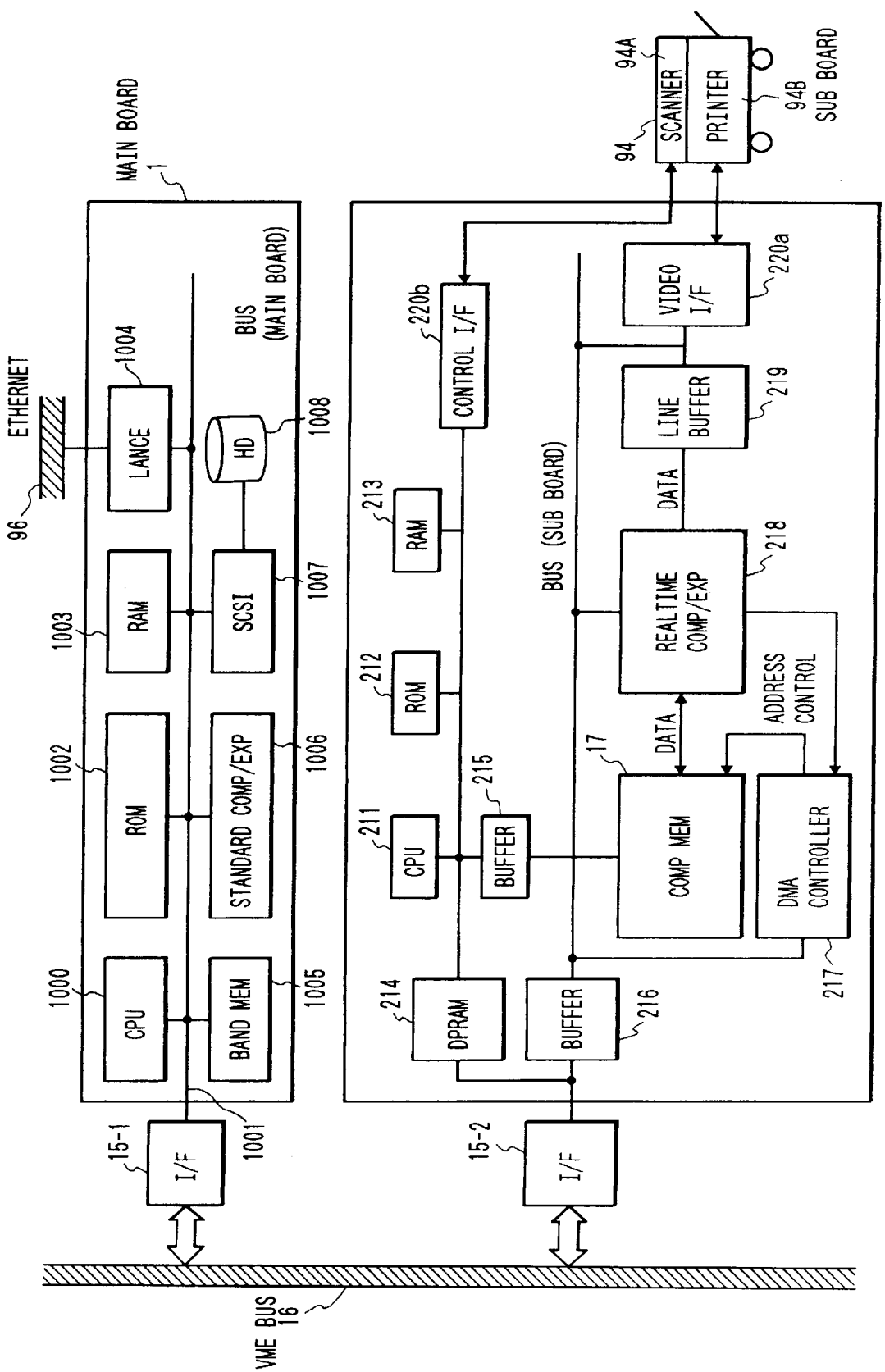
FIG. 9 is a block diagram illustrating an internal structure of the first interface circuit shown in FIG. 1.

FIG. 9 is a block diagram illustrating an internal structure of the first SP interface circuit 4-1 shown in FIG. 1. Identical elements shown in FIG. 1 bear the same reference numerals.

In the drawing, a CPU 1000 controls each device connected to an internal bus 1001 of the board circuit in response to the above mentioned various control programs stored in a ROM 1002. A RAM 10003 functions as, for example, a work memory of the CPU 1000. A network controller 1004 controls an access to a station connected to the LAN 96.

A band memory 1005 stores data of each band width. A standard COMP/EXP 1006 compresses and expands a video image data. A SCSI controller 1007 is connected with a hard disk 1008.

A CPU 211 which generally controls the first SP interface circuit 4-1 control each device connected to the board internal bus in response to control programs (supplemental programs for the device driver 86) stored in the ROM 212, makes initial setting of the necessary portions of the device and transacts commands with scanners and printers. A RAM 213 functions as, for example, a work memory of the CPU 211. A DPRAM 214 which transacts commands between the first SP interface circuit 4-1 and the board circuit is constructed such that both the CPU 211 and the CPU 1000 in the board circuit are mutually and independently accessed with each other through the VME bus 16.

Buffer memories 215, 216 are provided to avoid collision between the CPU 211 and the CPU 100d.

A real time COMP/EXP 218 is provided to compress and expand a multi-value video image data in real time.

Real time means to proceed with the same speed, for example, approximately 15 MHz (32 bits) with which a video image data is transacted, i.e., inputted through the video interface 220.

A COMP memory 17 stores data compressed by the real time COMP/EXP 218. A line buffer 219 is provided to preserve eight line data of a raster direction. The line buffer 219 can be randomly accessed by the real time COMP/EXP 218 applying with 8×8 matrix correspondingly to ADCT compression.

A DMA controller 217 transfers data between the COMP memory 17 and the real time COMP/EXP 218 without passing through the CPU 211.

A video interface 220a is provided to have an interface with a scanner 94A and a printer 94B. A reference numeral 220b denotes a control interface.

The first to the fourth mode procedures in response to the designated information from the host computer will be hereunder described in reference to FIG. 9.

Each mode procedure is performed by executing the control program 85 for image input device stored in the ROM 1002 and the device driver 86 stored in the ROM 212.

[The first mode procedure]

In the first mode procedure (video image print mode procedure) a real video image data stored in the band memory 1005 of the main CPU circuit 1 is received through the VME bus, compressed by the real time COMP/EXP 218, and stored temporarily in the COMP memory 17 as a form of compressed video image. This operation is performed with one page. When one page (one picture) is compressed, the printer 94B is actuated. The DMA controller 217 reads out the compressed video image data temporarily stored in the COMP memory 17 as a compressed video image and delivers it to the real time COMP/EXP 218. On this moment, it is restored into an unprocessed image data by the expansion circuit. The expanded unprocessed image data is consecutively transferred from the video interface 220 to the printer 94B. The video image expansion is performed in an ultra high speed synchronized with a data processing speed of the printer 94B.

In some cases, data is transferred to the printer 94B after the video image processing to perform the printer processing.

[The second mode procedure]

In the second mode procedure (video image scan mode procedure), a video image data received from the scanner 94A through the video interface 220a is compressed by the real time COMP/EXP 218 in an ultra high speed synchronized with its speed and the output compressed video image data is temporarily stored in the COMP memory 17. After the scan of one picture is completed, the CPU 1000 of the board circuit has the compressed video image data stored in the COMP memory 17 expanded again by using the expansion circuit of the real time COMP/EXP 218 to achieve the real video image data. The real video image data is transferred to the board circuit through the VME bus 16.

The board circuit transfers the real imge data as it is to a designated host computer if the host computer is requesting it, and transfers the compressed video image data, which is achieved by compressing the real video image data, to the host computer if it is requested by the host computer.

[The third mode procedure]

In the third mode procedure (standard compressed video image print mode procedure), when the board circuit receives the compressed video image data from the host computer in the network, it transfers the compressed video image data as it is to a designated first SP interface circuit 4-1 without expanding. The first SP interface circuit 4-1 stores the compressed video image data in the COMP memory 17, activates the designated printer 94B, and expands the compressed video image data in synchronization with a printing speed of the printer 94B by using the real time COMP/EXP 218 in order to be printed.

[The fourth mode procedure]

In the fourth mode procedure (standard compressed video image scan mode procedure), a real video image data is compressed by the real time COMP/EXP 218 in an ultra high speed synchronized with a scanning speed of the scanner 94A and stored temporarily In the COMP memory 17. After the scan of one picture is completed, the CPU 1000 of the board circuit retrieves the compressed video image data as it is through the VME bus 16.

In the first and second mode procedures, since the first SP interface circuit 4-1 is interfaced with a real video image data, the standard compression/expression procedure which is necessary for video image communication is not always needed in the first SP interface circuit 4-1 so that an independent compression/expansion procedure can be employed in accordance with a high speed demand or the other purposes.

In the second and fourth mode procedures, although the data read from the scanner 94A is directly compressed, it is not restricted for the real time COMP/EXP 218 to compress the data achieved by applying video image processing such as a line density conversion, a color space conversion, etc. to the data read from the scanner.

The video image processing means may be disposed between the video image COMP/EXP and the scanner 94A/printer 94B. The video image COMP/EXP may also be disposed in the scanner 94A/printer 94B.

The structure and the function of the real time COMP/EXP 218 will be explained hereunder referring to a block diagram shown in FIG. 10.

Figure 10:
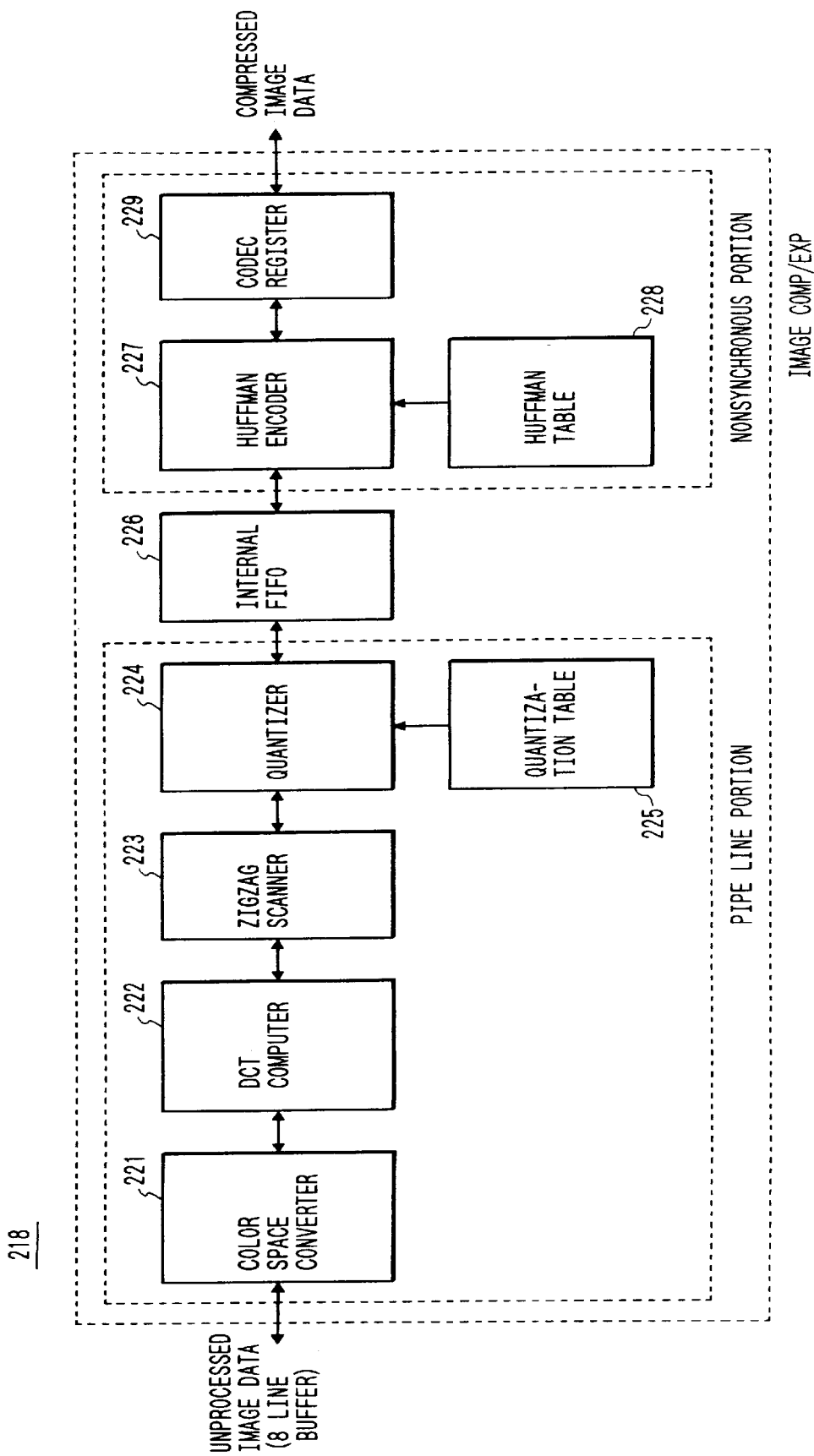
FIG. 10 is a block diagram illustrating an example of a detailed structure of a real time Compression/Expansion circuit shown in FIG. 9.

FIG. 10 is a block diagram illustrating a detailed construction of the real time COMP/EXP 218 shown in FIG. 9. An ADCT method is, in particular, employed as a compression/expansion method in the embodiment.

Figure 11:
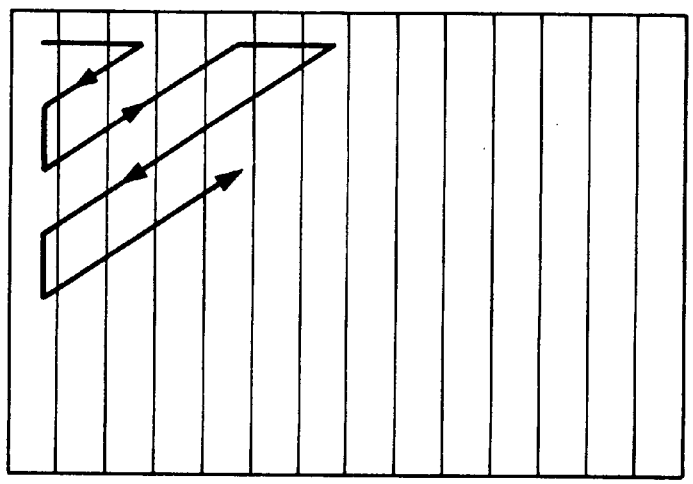
FIG. 11 is a view illustrating an example of a zigzag scan path made by a zigzag scanner shown in FIG. 10.

In a data compression, a real video image data is firstly stored in an external line buffer 219 and transferred to a color space converter 221 in which RGB data is converted into a color space data having Y, Cr, Cb data. In some cases, Cr, Cb data is sub-sampled as color difference components to discard the redundancy of the video image. Each of 8×8 picture elements is converted on a frequency space by a DCT computer 222. Then, as shown in FIG. 11, a DCT coefficient is scanned by a zigzag scanner 223 and quantized by a quantizer 224.

On this moment, a quantization coefficient which corresponds to 8×8 DCT coefficient has been stored in a quantization table 225. The compressed video image data, which is made by codifying data temporarily stored in an internal FIFO memory 226 in a predeterming timing referring to a Huffman table 228 by a Huffman encoder 227, is stored in a CODEC register 229 which can be accessed by an external host computer.

The color space converter 221, the DCT computer 222, the zigzag scanner 223, the quantizer 224 and the quantization table 225 constitute a pipe line operational block operable at a high speed in synchronization with a timing clock. The Huffman encoder 227, the Huffman table 228 and the CODEC register 229 constitute a non-synchronous operational block operable at a not high but compatible speed with those of CPU and DMA in synchronization with a speed at which the external CPU accessed the CODEC register 229. The pipe line operational block is constructed in such a manner to be able to operate at a high speed so that it can follow a video image transfer clock of the scanner 94A/printer 94B.

Accordingly, the internal FIFO memory 226 serves an operational speed buffer between the synchronous pipe line operational block and the non-synchronous operational block.

If the compression ratio is reduced to improve the image quality, compressed data will increase, the amount of data to be processed by the nonsynchronous operating part will increase and the operating speed of the nonsynchronous operating part will be insufficient for processing. However, in processed image data interface of the color space connecter 221 can be connected to the portions other than the scanner 94A and the printer 94B and a nonsynchronous access from the CPU or the like can be received by a FIFO memory which is externally provided. In this case, the pipeline operating part can be operated at a low speed or temporarily stopped. Therefore, there will be no problem in the operating speed of the nonsynchronous operating part.

In this embodiment, a plurality of image compression/expansion parts (for example, two parts) are provided to divide unprocessed image data into a plurality of data blocks and supply these data blocks to the image compression/expansion parts, respectively, thus enabling connection to the scanner and the printer which operate at high speeds. As in compression of a plurality of image data divided as described above, the problem of the operating speed can be similarly solved.

Operation for expansion is basically a reverse process to compression and, when compressed image data is transferred to the CODEC register, the image data is reversely Huffman-coded or decoded in the Huffman encoding part 227 while referring to the Huffman table 228. The values obtained are inversely quantized in the quantizer 224 after having been speed-controlled in the FIFO memory 226. Inverse quantization is carried out by multiplying the values by a quantizing coefficient 8×8 of the quantizing table 225. Image data is zigzag-scanned by the zigzag scanner 223 and transferred DCT coefficient to the DCT computer 222. Then the image data is returned from Y, Cr, Cb and the like which are compressed color spaces to original RGB space or the like in the color space converter 221.

The DCT computer 222 processes DCT computation and inverse DCT computation in the same circuit only by changing parameters. Also in the color space converter 221, linear transformation can be similarly carried out by converting parameters.

In addition, the quantizer 224 carries out division for quantization and multiplication for reverse quantization. In this case, division is a kind of multiplication if the quantizing coefficient for division serves as a reciprocal and therefore compression and expansion can be done in the same circuit. The following describes in detail the operations of respective modes of the first SP interface circuit 4-1 as an example while referring to FIGS. 12 to 15.

Figure 12:
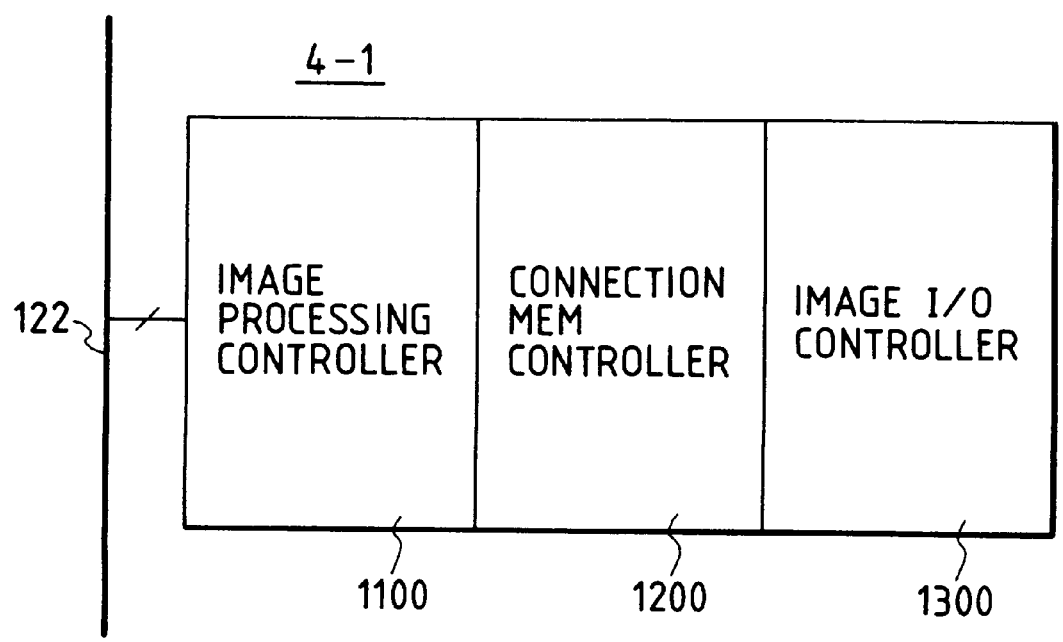
FIG. 12 is a block diagram illustrating a partial schematic structure of the first SP interface circuit shown in FIG. 1.
Figure 13B:
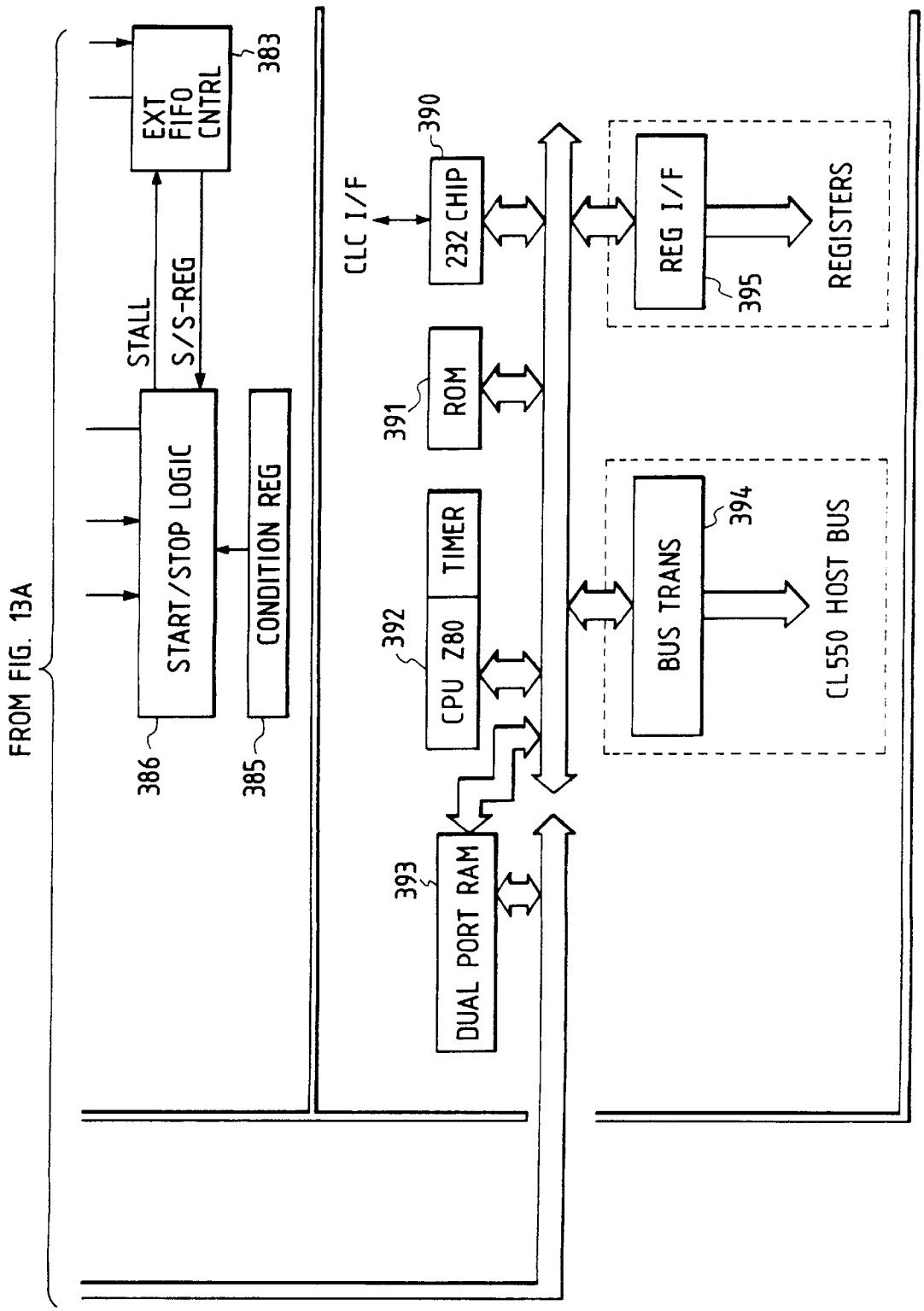
FIG. 13 is comprised of FIGS. 13A and 13B showing circuit diagrams illustrating a detailed internal structure of the first SP interface circuit shown in FIG. 1.
Figure 14:
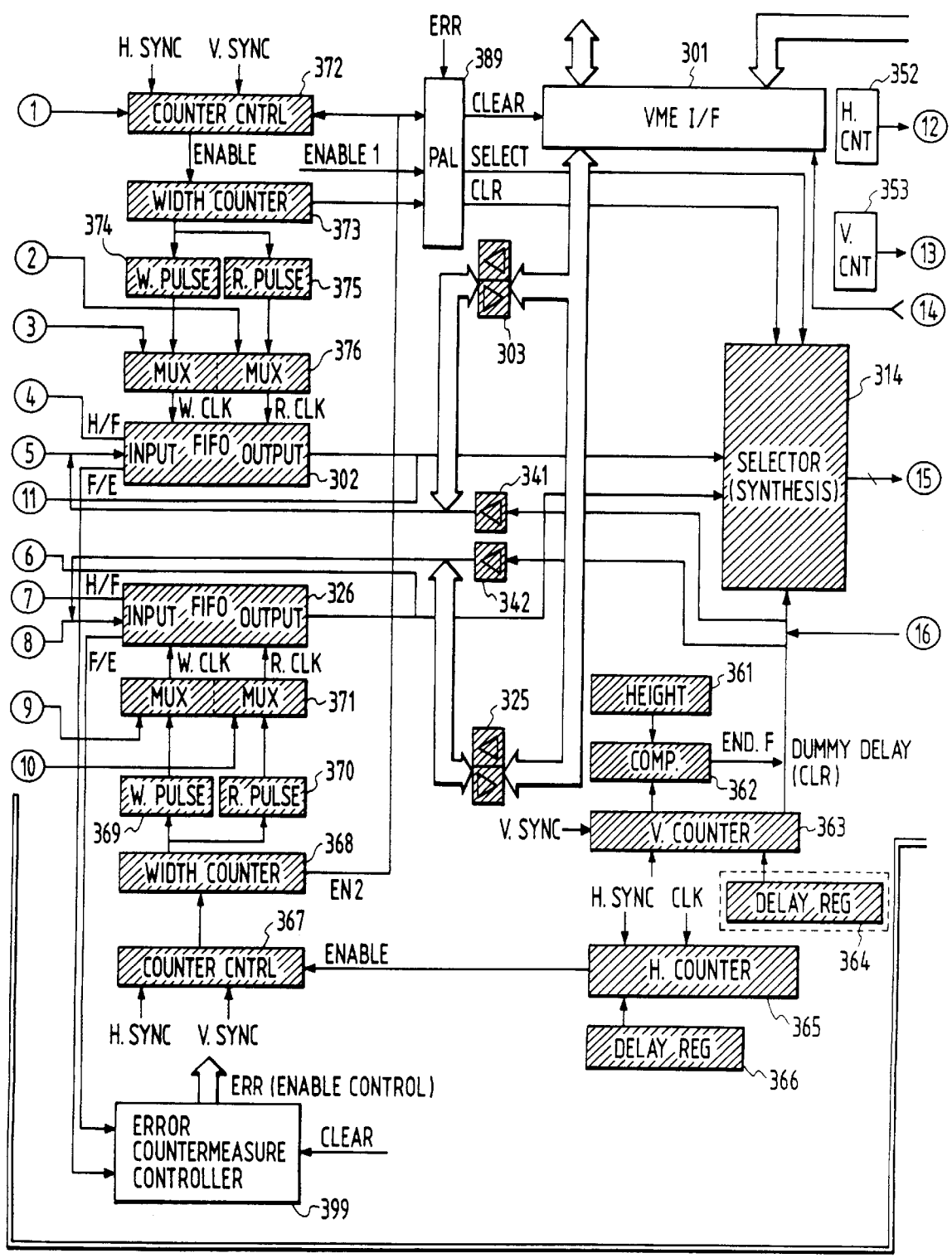
FIG. 14 is a circuit diagram illustrating a detailed internal structure of the first SP interface circuit shown in FIG. 1.
Figure 15:
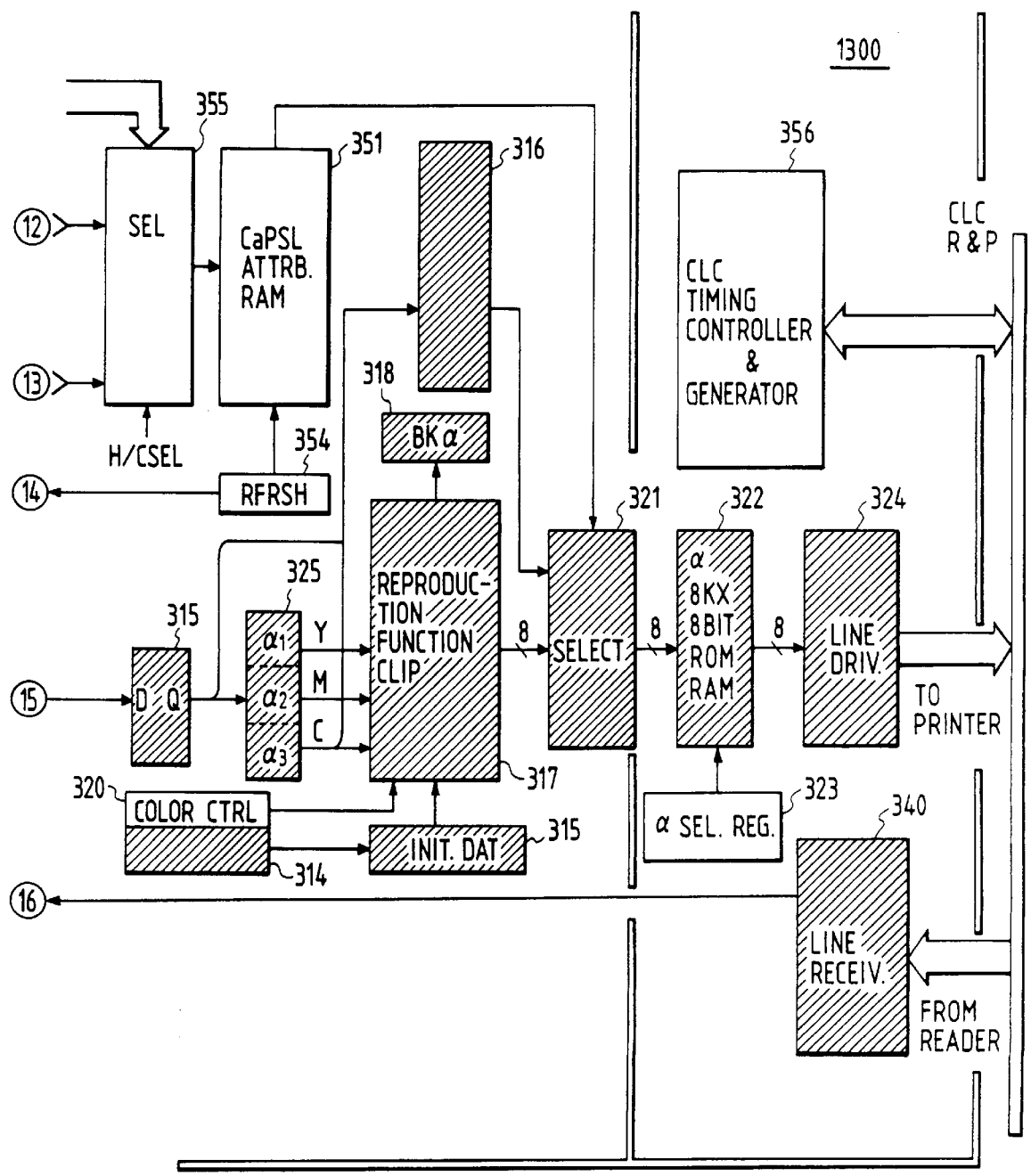
FIG. 15 is a circuit diagram illustrating a detailed internal structure of the first SP interface circuit shown in FIG. 1.

FIG. 12 is a block diagram illustrating an outline of the partial configuration of the first SP interface circuit 4-1.

In FIG. 12, 1100 is an image processing controller which comprises a VME bus interface, image compression/expansion part and a CPU circuit. The details are shown later in FIGS. 13A and 13B. 1200 is a connection memory controller whose details are shown later in FIG. 14. 1300 is an image I/O controller which controls I/O operation to/from the scanner, the color laser copier (CLC) provided with a printer, scanner and the thermal jet color copier (BJC) with a printer. The details are shown later in FIG. 15.

FIGS. 13A to 15 are respectively a block circuit diagram illustrating the detailed interval configuration of the first SP interface circuit 4-1 shown in FIG. 1 and the same components as in FIG. 1 are given the same reference numbers.

In processing of the right-side data frame of a two-divided image from the CPU 1000 of the board circuit shown in FIG. 9, image data is written from the VME interface 301 into the FIFO memory 302 through the buffer 303. Image data is temporarily stored from the FIFO memory 302 into the RAM 305 through the buffer 304. The SRAM 305 operates synchronized with the pipe line part of the image compression/expansion part. When the data as much as 8 lines in the vertical direction of the image are stored in the RAM 305, the image compression/expansion part 306 reads every horizontal and vertical 8×8 units from the SRAM 305 and the compressed data obtained are sequentially written into the DRAM 308 through the DMA controller 307. At this time, the DMA controller 307 operates the address counter 309 to generate an address or counts up the address to give it to the DRAM 308 through the selector 310. In the third mode, the CPU 1000 of the board circuit issues the address through the VME interface 301 and the selector 310 and updates the data in conjunction with the DRAM 308 through the interface converter 312. Accordingly, the compressed data can be directly sent to the DRAM 308 and standard compressed data for which the image is not divided into two portions can be processed. However, such processing is unsuitable for those data of a low compression ratio.

The DRAM 308 is always refreshed by the refresh circuit 313 and the data is maintained. The following describes the operation for outputting the data of the DRAM 308 to the printer 94B. When data is read out from the DRAM 308 to the compression/expansion part 306 in the same control as in the write operation by the DMA controller 307, unprocessed data from the buffer 304 and output data from the FIFO memory are supplied to the latch 315 since one of right and left frames of the image is s elected by the selector.

Next, the image data is gamma-converted or LOG-converted by the gamma converter. Then, masking for CG is carried out by the masking circuit 316 and masking for a natural image is carried out by the masking circuit 317, and one of these masked images is selected by the selector 321 in accordance with the nature of the image. Finally, the image is converted by the output gamma controller 322 and outputted to the printer 94B through the line driver. In this case, the output gamma controller 322 is controlled by the gamma setting register 323. The masking circuit 316 comprises a ROM and the masking circuit 317 is a logic circuit to which a black table for generating the black color is connected and a timing controller 320 is connected to its periphery so that a value of the initial data ROM 319 may be initially loaded. If the printer 94B is for the plane sequential system, expansion is carried out as many times as the number of planes and the masking circuits 316 and 317 perform masking in response to the output color.

The above describes the processing flow for the right side frame of a frame which is divided into two parts and the same processing flow is carried out for the left-side frame. In other words, 8-line image data stored in the SRAM 328 through the buffer 325, FIFO memory 302 and the buffer 327 is compressed in the image expansion part 329 and controlled by the DMA controller 331, address controller 335 and selector 334 and written as compressed data in the DRAM 332. As a matter of course, the CPU 1000 of the board circuit can directly write compressed data through the VME interface 311 to the selector 334 and the interface converter 330. A refresh circuit 333 refreshes and maintains the data of the DRAM 332. In printing an image, the data read out from the DRAM 332 is controlled by the control 331 of the DMA controller 331, expanded by the image compression/expansion part 339, supplied to the selector 314 through the SRAM 328, buffer 327 and FIFO memory 326 and outputted after having been processed as described above. The processing of mode 1 is carried out as described above.

The following describes the processing of the second mode below.

Image data which are transmitted from the scanner 94A after various image processings are received by the line receiver, and the right-side frame of the image is stored through the buffer 341 and the left-side frame, through the buffer 342 into FIFO memories 303 and 326 in sequence. Subsequent operations are the same as in the first mode. In other words, the processing of the right-side frame is such that, of image data written into the FIFO memory 302, those image data as much as eight lines are read out and stored in the SRAM 305 through the buffer 304, then compressed data is generated in the DRAM 308 by the compression/expansion part 306.

On the other hand, in the fourth mode, the CPU 1000 of the board circuit is able to directly read compressed image data through the VME interface 311, interface converter 312 and selector 310. In the second mode, however, compressed data of the DRAM 308 is expanded and transferred to the CPU 1000 of the board circuit. Compressed image data from the DRAM 308, which have been controlled through the interface converter 312 DMA controller 307, address counter 309 and selector 310 and read out in the sequence of write, are expanded in the image compression, expansion part 306, written into the SRAM 305 in terms of 8×8 unit, continuously read out in the horizontal direction through the buffer 304 at a timing when all data for eight lines are written and stored in the FIFO memory 302. Image data of the FIFO memory 302 is read out as unprocessed image data to the CPU 1000 of the board circuit through the buffer 303 and the VME interface 301 in accordance with the timing of the CPU 1000 of the board circuit.

The selector 321 is controlled to select one of two masking circuits 316 and 317 according to the data which is obtained by generating the addresses of positions of pixels to be processed by a horizontal direction counter 352 and a vertical direction counter 353 in response to the attribute of the image as to the CG image or the natural image which is stored in the RAM 351, stored in the RAM 351 through the selector 355 and read out for such selection. Therefore, the attribute of the image is stored in advance on the RAM 351. The interface between the scanner 94A and the printer 94B is controlled by the S/P timing controller 356.

The following describes the changeover of the right and left-side frames of the image.

A vertical direction counter 363 is for transmitting effective image signals of an effective portion of an image in the vertical direction and a delay register 364 is for setting a margin portion of the top end of the image. A length register 361 is used to set an effective length of the image and sends effective image signals to respective corresponding portions if the length of the image is within the effective length in a comparator 362. A delay register 366 is for setting a margin length in the horizontal direction in addition to the effective image range in the vertical direction is connected to generate an effective signal after the left end of the image is counted. The counter controller 367 starts a horizontal left width counter 368 when the above effective signal is received. This horizontal left width counter 368 functions as a down counter to count the width of the image and generates an enable signal of the left-side image during counting. When the counting of the left-side image is finished, the counter 368 generates an enable signal to the counter controller 372, which counts the width of the right-side image at its width counter 373 and gives the information of completion to the controller 389. The controller 389 informs the selector 314 of the end of the effective image width and clears the output. The width counter 368 causes the light pulse generator 369 to generate the signal of the effective width of the left-side image in compression, writes the scanner data of the left-side image in the FIFO memory 326 through the multiplexer 371, and supplies the read pulse of the compression/expansion part 329 through the gate 381 and the multiplexer 371.

For expansion of image data, the read pulse generator 370 receives the effective signal of the left-side image from the width counter 368 and outputs from the FIFO memory 326 to the printer 94B through the multiplexer 371.

On the other hand, a write pulse of the image compression/expansion part 329 is supplied to the multiplexer 371 through the write pulse gate 381 and expanded data is written.

For the right-side image, of course, the write pulse generator 374, read pulse generator 375, multiplexer 376 and gate 382 similarly operate as described above. In the image compression/expansion part 329, the status of the interval FIFO memory 302 is given to a start/stop logic 386 and the status of a register 385 for detecting the peripheral status is given to the start/stop logic 386. In addition, the status of the external FIFO memory 326 is given to the start/stop logic 386 through the FIFO memory controller 383 to enable to control the internal FIFO memory 302 and the external FIFO memory 326 so that an overflow or underflow does not occur therefrom and stop or start the pipe line 329 of the image compression/expansion in accordance with the situation.

Similarly, the pipeline of the compression/expansion part 306 is controlled to start or stop by the status register 387, start/stop logic 386 and FIFO controller 384. In start/stop operations, the internal FIFO memory 302 may overflow due to excessively high transmission rate of the pipeline at the time of compression, the internal FIFO memory 302 may underflow due to excessively high transmission rate of the pipeline at the time of expansion, the external FIFO memory 326 may underflow due to excessively high processing speed of the image compression/expansion part at the time of compression, and the external FIFO memory 326 may overflow due to excessively high processing speed of the image compression/expansion part at the time of expansion.

Since the external FIFO memory 326 and the internal FIFO memory 302 overflow or underflow when the processing speed of the image compression expansion part 306 delays due to excessively high operating speed of the scanner 94A and the printer 94B, the counter error controller 399 temporarily stops video signals (video=image) at the scanner 94A and the printer 94B. Simple error processing is carried out so that video signals in the unit of one line are abandoned from the scanner 94A and margin data in the unit of one line is outputted from the printer 94B to prevent of the flow of video signals from destruction due to the overflow or underflow from the FIFO memory. Accordingly, when the counter error controller transfers error information to the controller 388, the controller 389 checks a margin of one line and effective parts of left-side image and right-side image and outputs an error cancel signal at the delimitation of one line, while the controller 389 indicates other related parts to clear input/output data of the scanner 94A and the printer 94B and enables the image compression/expansion part 306 to carry out compression or expansion up to the delimiting point of one horizontal line despite that the image compression/expansion part 306 operates behind the processing of the scanner 94A and the printer 94B during processing of the error. This permits error resetting again at the delimitation of one line. However, for compression, the white line is compressed during error processing to accelerate the compression speed and, for expansion, image data is abandoned because it cannot be sent in time to the printer 94B.

Though the above description states that the CPU 1000 of the board circuit carries out almost all controls, the first SP interface circuit 4-1 according to this embodiment is provided with an internal CPU 392 which is capable of sharing the processing which can be handled in the first SP interface circuit 4-1. The first SP interface circuit 4-1 is also provided with a dual-part RAM 393 both parts of which are connected to the CPU 1000 of the board circuit through the XEM bus interface 311 and the internal CPU 392 through the internal CPU bus. Information is thus communicated to the CPU 1000 of the board circuit and the internal CPU 392 through this dual-port RAM 393.

Therefore the accesses from these CPU 1000 and CPU 392 to the VME bus in the first SP interface circuit 4-1 will not come in collision. In this case, the image compression/expansion parts 306 and 329 are interfaced by a bus convertor 394 connected to the internal bus of the CPU 392. The bus converter 394 has the same functions as the interface converters 312 and 330 to interface with the registers in the board through a register interface 395 and has also the function as the interface for the VEM bus.

In addition, the internal CPU bus has a ROM 391 for storing the programs of the CPU 392 and a serial communication part 390. A command for controlling the operation in conjunction with the scanner 94A and the printer 94B is sent to the serial communication part 390. Accordingly this embodiment is adapted so that the CPU 1000 of the board circuit shown in FIG. 9 controls the scanner 94A and the printer 94B through the internal CPU 392 shown in FIGS. 13A and 13B or directly controls the scanner 94A and the printer 94B. Control commands for the CPU 1000 include an activation command for the scanner 94A and the printer 94B as well as a status detection command and a status setting command as execution commands. The status detection commands are intended to detect the presence of print sheet, presence and size of the cassette, remaining amount of toner, and jamming of print sheet as well as current operation mode, that is, distinction of monochrome, three colors or four colors, resolution, and other parameters for image processing as to the printer 94B. These commands are almost identical to the scanner 94A, enabling to know the presence of the original on the original rest plate and wire break of a lamp.

On the other hand, the status setting command are intended to set the parameters for the image processing system such as selection of a cassette size, selection of an upper or lower stage of the cassette, operation mode, the number of print sheets and so on.

For the scanner 94A, the status setting commands similarly cover, for example, setting of the variation and magnification, setting of binary 1 multi-valued system, standard color space conversion, specific color space conversion, precision (resolution conversion), setting of area designation, and setting of gamma conversion.

In this embodiment, the scanner 94A has many image processing functions and therefore the image data is not processed on the first SP interface circuit 4-1 and is compressed. In addition, RGB data is received from the scanner 94A.

On the other hand, the input to the printer 94B is CMYK input, and masking, gamma conversion, LOG conversion and CMYK generation are processed on the first SP interface circuit 4-1 since the printer section is not provided with so many functions for image processing.

Figure 16:
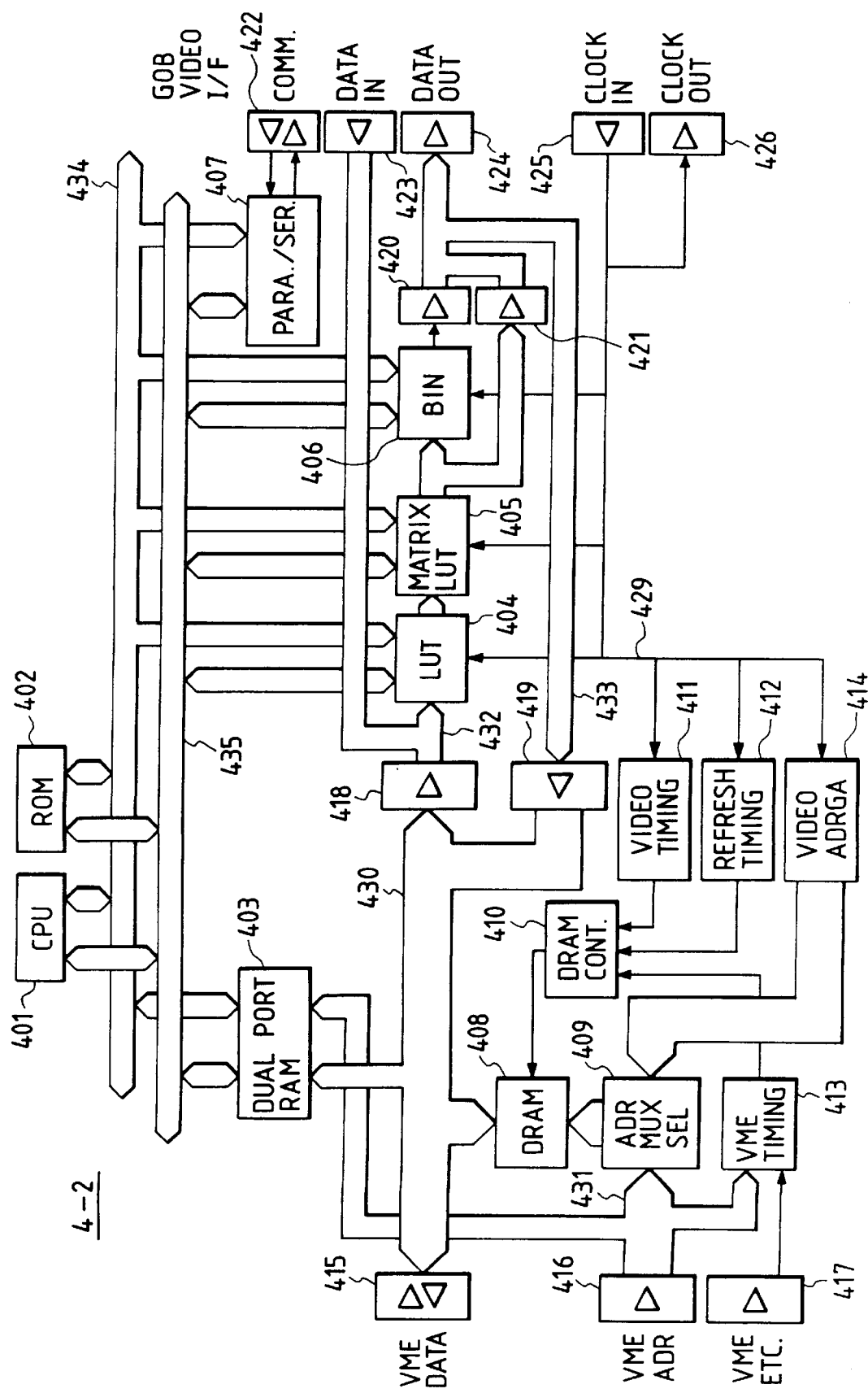
FIG. 16 is a circuit diagram illustrating a detailed internal structure of the second SP interface circuit shown in FIG. 1.

FIG. 16 is a block diagram illustrating a detailed configuration of the second SP interface circuit 4-2 shown in FIG. 1 and this second SP interface circuit 4-2 interfaces a thermal jet type scanner printer 95 (printer 95B and scanner 95A) and an S/P server unit SPI. The second SP interface circuit 4-2 is formed as an integrated interface board.

In FIG. 16, a CPU 401 receives a command from the board circuit connected to the VEM bus through the dual port RAM 403, interprets the command and internally controls the second SP interface circuit 4-2. The CPU 401 generates an interrupt of every 2 m seconds from the built-in interval timer and communicates a command to the thermal jet type printer 95B and the scanner 95A. The CPU 401 initializes and changes various parameters for image processing circuits 404, 405 and 406.

A ROM 402 for programming stores a control program (a program which supplements the device driver 86) to be executed by the CPU 401 and the initial values and the preset values of image processing circuits 404, 405 and 406.

A dual port RAM 403 functions as a work area for the CPU 401 and accesses to both the CPU 1000 of the board circuit and the CPU 401 to execute communications between these CPUS.

The image processing circuit 404 is formed as an image processing ASIC to carry out graduation conversion according to the lookup table. For example, the image processing part 404 performs LOG conversion when converting RGB data to CMYK DATA. This can be implemented by providing in advance a conversion table in the ROM 402 and transferring it to the RAM in the image processing circuit 404.

The image processing circuit 405 is formed as an image processing ASIC and carries out graduation conversion according to 4×5 matrix operation and a lookup table. This circuit 405 carries out NTSC-RGB color space conversion as the RGB spaces and the standard color space of the characteristics of the sensor of the scanner 95A, or conversion (referred to as masking) from CMY(K) after conversion by the image processing circuit 404 to CMYK adjusted to the characteristics of the printer 95B through this matrix operation. In addition, color balance can be adjusted by the lookup table. These processings are set by preparing various tables, storing these tables in the ROM and selecting the tables in accordance with the application as in the case of the image processing circuit 404.

The image processing circuit 406 is formed as an image processing ASIC to carry out a binary-coding processing. The binary coding algorithm used in this embodiment is an average density preserving method. A serial/parallel converter 407 converts 8-bit parallel data from the CPU 401 to serial data for communications to the scanner 95A and the printer 95B.

A DRAM 408 for images is an image memory adapted to the type of band adjusted to the number of pixels of the head of the printer 95. In the scanner 95A or the printer 95B, data flows according to the clock signals for images during one scanning and the operation cannot be stopped and therefore a buffering for the size of one band is requires. Therefore, the image data as much as are band to be scanned by the scanner 95A and printed by the printer 95B are buffered.

A scanning system is converted between a raster type access from the VME bus side and a vertical access from the printer 95B.

An address selector 409 for the DRAM which serves as a multiplexer changes over the address for the access from the VEM bus to the DRAM 408 and the access from the scanner 95A and the printer 95B to the DRAM 408. The address to the DRAM 408 is supplied as being divided to a ROW address and a COLUMN address and the. DRAM 408 carries out this multiplexing.

A timing controller 410 for the DRAM generates the signals for controlling DRAM such as RAS, CAS, WE and OE and carries out arbitration with refresh signals.

A timing circuit 411 generates a timing signal for accessing of the scanner 95A and the printer 95B. This circuit serves to generate the access timing based on a image clock and a sync signal from the scanner 95A and the printer 95B.

A refresh timing controller 412 generates a timing signal for a refresh signal to the DRAM 408. This controller utilizes an interval between the accesses by the scanner 95A and the printer 95B and controls to avoid collision of accesses of the scanner 95A and the printer 95B.

A VME timing controller 413 processes the control signals for accessing from the VME bus, including decoding of AM codes and high order addresses and interrupts.

An access address generator 414 for the scanner 95A and the printer 95B generates an address for specific access for the scanner 95A and the printer 95B to the memory contents written in the raster system for accessing from the VME bus since the accesses of the scanner 95A and the printer 95B differ from an ordinary raster system. The scanning direction is reversed in accordance with the size of band.

A VME bus interface buffer 415 accesses image data in a 32-bit width and commands in a 8-bit width.

A VME bus interface address buffer 416 accesses image data in a 24-bit address space and commands in a 16-bit address space.

A buffer 417 serves as a buffer for the parts other than the data and addresses of the VME bus interface.

A buffer 418 for an entry port to the image processing part carries out accessing from the VME bus and accessing to the DRAM in a 32-bit width. In the image processing part, processing is carried out in a 8-bit width. Therefore, 32-bit R, G, B and X data is serially converted to 8-bit data in order.

A buffer 419 for an exit of the image processing part, contrary to the buffer 418, carries out conversion of the data line of 8-bit width which varies in the sequence of colors to 32-bit wide data of four colors totally.

A buffer 420 for use after binary coding processing functions to expand one-bit data which is binary-coded by the image processing circuit 406 to 8-bit data, that is "0" to "0×00" and "1" to "0×FF".

A buffer 421 is used for bypassing binary coding processing by the image processing circuit 406, and one of outputs of the buffer 420 and the buffer 421 is selected to change over binary-coded data to multi-valued data.

A buffer 422 of the communications part is for interfacing the scanner 95A and the printer 95B.

A buffer 423 for input data is for interfacing the scanner 95A and the printer 95B.

A buffer 424 for output data is for interfacing the scanner 95A and the printer 95B.

An input buffer 425 for clock and control signals is for interfacing the scanner 95A and the printer 95B.

An output buffer 426 for clock and control signals is for interfacing the scanner 95A and the printer 95B. 429 is a clock input line.

430 is a 32-bit image data bus, 431 is a 24-bit address bus, 432 is a 8-bit image data bus, 433 is a 8-bit image data bus, 434 is a 16-bit local address bus, and 435 is a 8-bit local data bus. The following describes the operation of the printer 95B.

[Operation for Printing]

When various parameters for printing are written into the dual-port RAM 403 from the board circuit through the VME bus, the CPU 401 reads out the data and interprets and control it. For example, for printing RGB data, the CPU 401 sets a table with a through-operating characteristic which does not cause LUT data of the image processing circuit 404 to change, sets the coefficients for conversion from NTSC-RGB to 13J-RGB in the coefficient table for the matrix of the image processing circuit 405, and controls the gates of buffers 420 and 421 so as to pass through the binary coding processing of the image processing circuit 406.

In addition, parameters for data sizes are set. Parameters such as data sizes are sent to the printer 95B through the parallel/serial converter 407. Then, image data as much as one band is transferred from the board circuit to the memory 408 through the VME bus. At this time, image data from the VME bus is stored in the RGBX data format by 32-bit accessing. R, G and B are respectively image data for color components of red, green and blue, and X is control data including information of block characters. Next, a command for printing operation is transferred through the dual-port RAM 403. The CPU 401 transmits a start command for printing operation. When the start signal returns from the printer controller of the printer 95B, a timing pulse generator 411 starts accessing to the memory 408. In this case, the data is read out in a direction along the BJ head of the printer 95B and therefore the data is read out according to an address generated by the address generator 414. Data read out from the memory 408 is converted to 8-bit data in the order of R, G, B and X in the buffer 418 and entered into the image processing part. The image is processed in accordance with the predetermined parameters, and NTSC-RGB data is converted to RGB color spaces to be internally used in the printer 95B and transferred to the printer 95B through the buffer 421 and the interface 424. When the processing of one-band data is finished, next band data is received through the VME bus and the above described operation is repeated. Processing of one page data is completed after the predetermined number of times of processing. The following describes reading operation of the original by the scanner 95A according to a control program stored in the ROM 402.

[Operation in Scanning]

Various parameters for scanning operation are written from the board circuit into the dual-port RAM 403 through the VME bus. The read and interprets the data and carries out the control. For example, when binary-coded RGB data is scanned in the size of 1024×1024 at the position of 512×512, the CPU 401 sets a table with a through-operating characteristic in the LUT of the image processing circuit 404 and the coefficients for conversion from BJ-RGB to NTSC-RGB in the matrix coefficient table of the image processing circuit 406 and controls the gates of buffers 420 and 421 so as to pass through binary coding processing of the image processing circuit 406. In addition, a size of the image to be scanned is set to 1024×1024 and the scan start position is set to 512×512. These parameters are transferred to the scanner 95A through the parallel/serial converter 407. Then the CPU 401 transmits a scan start command to the scanner 95A. Image data entered from the reader part of the scanner 95A is entered into image processing circuits 404, 405 and 406 through the interface 423. Here image processing is carried out according to the predetermined parameters and 32-bit format RGBX data is stored in the memory 408 through the buffer 419. At this time, the memory 408 stores RGBX data as described above. In this example, the scanner 95A is set to scan binary-coded RGB image data and therefore X is meaning less data. Though R, G and B color components are binary-coded data. One byte is assigned to one pixel. In this case, the board circuit carrier out a processing for which data is processed in a common format requested for binary-coded image data, for example, by packing bytes to arrange RGB data in the order of raster lines. Image data stored in the memory 408 is transferred to the board circuit through the VME bus interface 415. One scanning operation is completed by repeating the above processing as many times as the number of bands.

The following describes image data processing by the scanner 94A and the printer 95B shown in FIG. 1.

In this embodiment, the color image copier is formed integral with the scanner 94A and the printer 94B and therefore only one system for image processing function is provided. If the scanner 94A and the printer 94B are separated, the system configuration includes only one of them for each processing. In addition, the scanner is provided with almost all image processing functions, and the printer 94B mainly has those functions such as variation of magnification, designation of area, color space conversion, gamma conversion, and color masking processing.

Since the scanner 94A is provided with the color space converter and the color masking processor, standard RGB (RGB for NTSC, etc.) is prepared as the mouth of the video interface and RGB data can be obtained in point sequential or parallel simultaneous scanning. Accordingly, the image data should be given as C, M, Y and K data to the printer 94B because the printer is not provided with the image processing part. Image data should be transmitted to the video interface after such image processing as conversion to C, M and Y, black color generation (K), color masking, resolution conversion and trimming have been externally finished as required. Moreover, in this case, image data should be transmitted by repeating the processing four times for C, M, Y and K colors in plane sequential scanning. In addition, both the scanner 94A and the printer 94B cannot be stopped during processing.

On the other hand, the video interface includes the horizontal sync signal, vertical sync signal and video clock signal for synchronization with video data. Moreover, status information such as ON/OFF of the power supply for the scanner and the printer are provided to enable to externally check the status. A function for command interface in serial communications is provided to permit detection and setting of the status of the scanner 94A and the printer 94B and generation of execution commands such as for activating the scanner and the printer.

Figure 17:
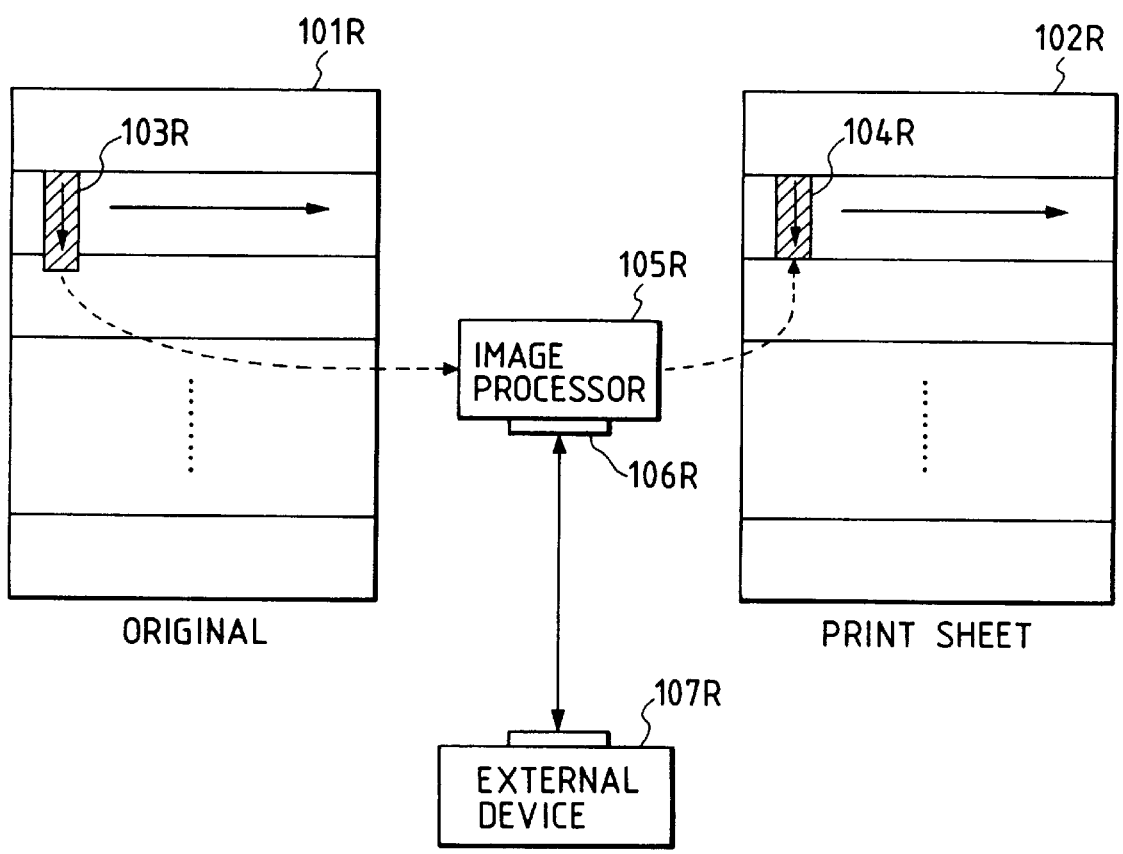
FIG. 17 is an explanatory view illustrating an image recording process of a scanner/printer shown in FIGS. 2A and 2B.

The following further describes the operation of the scanner 95A and the printer 95B, referring to FIGS. 17 and 18.

FIG. 17 is a typical diagram illustrating the image recording process of the scanner/printer 95 shown in FIGS. 2A and 2B.

In FIG. 17, 101R denotes an original to be scanned and 102R denotes a print sheet for printing. These original and the print sheet are of the A4 size. 103R denotes the sensor head of the scanner and 104R denotes the print head of the printer. The print head 104R of the printer is provided with an array of nozzles from which ink is injected by the bubble jet system and comprises, for example, nozzles 108.

On the other hand, the sensor can output data of, for example, 144 pixels so that more pixels than 128 can be scanned. For colors, the sensor head of the scanner has the scanning segments for three colors R, G and B and the printer head has the printing segments for four colors C, M, Y and K. 105R denotes the image processing part which processes RGB signals entered from the scanner sensor and transmits them as binary-coded CMYK signals with the characteristics adapted to the printer head.

The image processing part 105R can transfer 8-bit RGB color data from the interface 106R on the way of the image processing system to external sources. In the scanner/printer 95, the sensor of the scanner 95A and the printer head of the printer 95B operates in synchronization, and the image processing part 105R has a pipeline arrangement to make it possible to carry out processing without requiring a large capacity image memory. Therefore, the scanning method for data to be transferred through the interface 105R is of a specific type. 107R denotes external equipment.

Figure 18A:
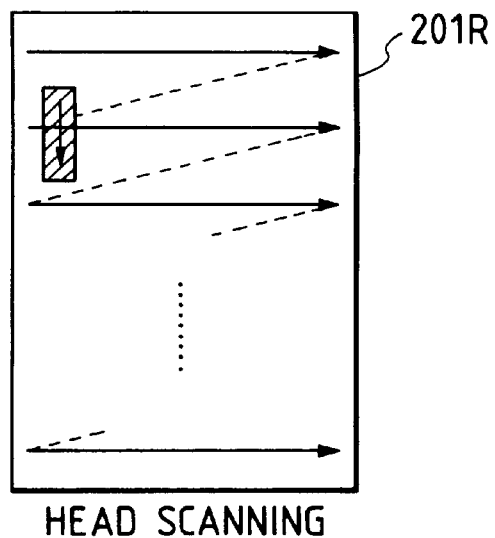
FIGS. 18A to 18C are explanatory views illustrating a document scanning operation of a scanner/printer shown in FIGS. 2A and 2B.
Figure 18B:
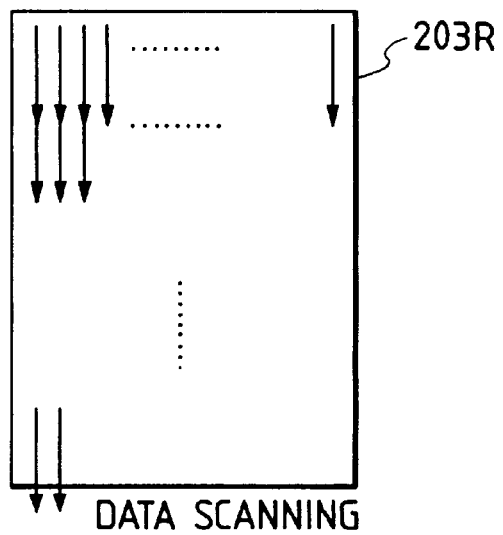
Figure 18C:
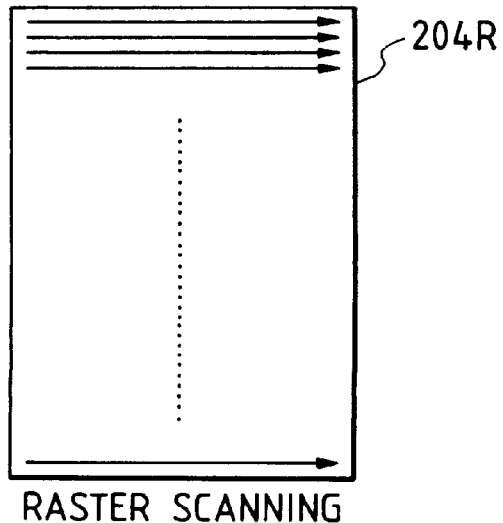

FIGS. 18A to 18C are typical diagrams illustrating the scanning status of the original by the scanner 95A of the scanner/printer 95 shown in FIGS. 2A and 2B.

In FIGS. 18A to 18C, 201R shows a motion of the sensor head of the scanner. The sensor head itself moves in a transversal direction main scanning direction) as shown for the original (print sheet) and the pixel segments of the sensor are arranged at right angles to this direction. Therefore data 203R is aligned to 201R. On the other hand, data is aligned as data 204R in general raster scanning systems.

Figures 19, 20:
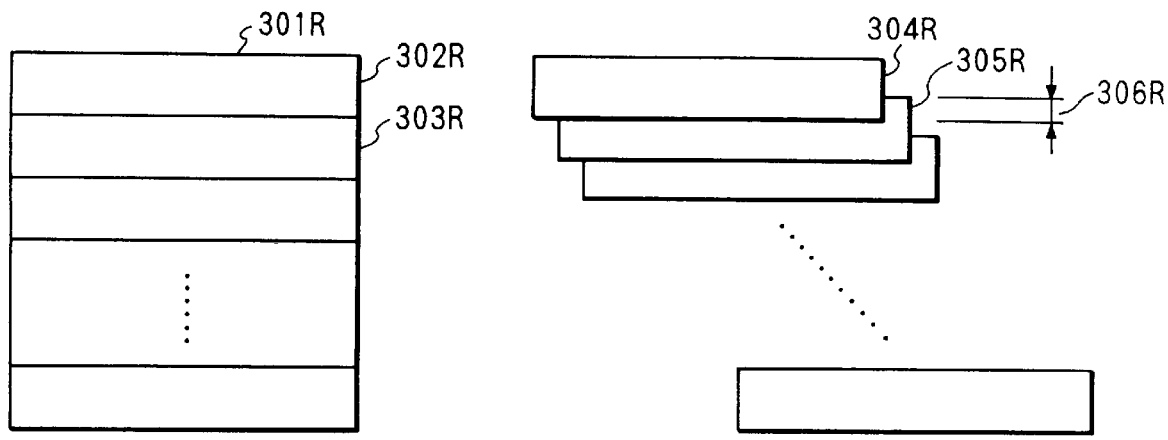
FIG. 19 is an explanatory view illustrating a band document scanning operation of a scanner/printer shown in FIGS. 2A and 2B.
FIG. 20 is a view illustrating an example of an interface signal between a server device according to the present invention and a printer.

FIG. 19 is a typical diagram illustrating the status of scanning of a band original by the scanner 95A of the scanner/printer 95 shown in FIGS. 2A and 2B.

In FIG. 19, 301R denotes one page, 302R denotes the first segment and the 303R denotes the second segment. In the case of the image data which is outputted from the scanner sensor and will be binary-coded through the image processing system, the segment 304R scans a larger image than for the segment 305R and the image as far as 306R is doubly scanned.

The following describes an example of the printer capable of using the Centronics interface software which can be controlled by the S/P server unit shown in this embodiment. The Centronics interface is the standard software for transfer of data from a computer to a printer developed by Centronics, Inc. in the United States, permitting inexpensive and high speed data transfer. Almost all printers are standardized according to this Centronics system.

Data transfer according to the Centronics software is carried out through three control lines for DATASTROBE signal, ACKNOWLEDGE (ACK) signal and BUSY signal and the DATA line as shown in FIG. 20.

The DATASTROBE signal indicates that data is outputted to the DATA line. The BUSY signal indicates that the printer is currently operating and the data cannot be received or that the data buffer is fully occupied.

The ACK signal indicates that reading of data is correctly completed.

Though the above three control lines are basically sufficient, the signal line for warning NO PRINT SHEET is also defined for proper control of the printer. In FIG. 20, the signal name, input/output and remarks are shown. Since the pin number varies as 36 pins, 25 pins and 14 pins, depending on the types of connectors and the definitions differ with manufacturers or deleted in some cases, the pin numbers are omitted.

Figure 21:
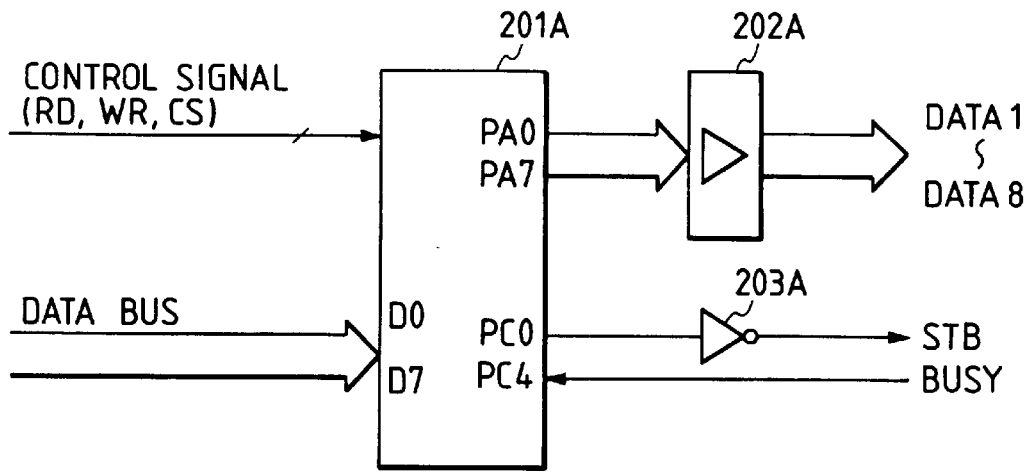
FIG. 21 is a circuit diagram illustrating an example of an interface between a server device according to the present invention and a printer.

FIG. 21 is a block diagram showing an example of the Centronics I/F control circuit.

Figure 22:
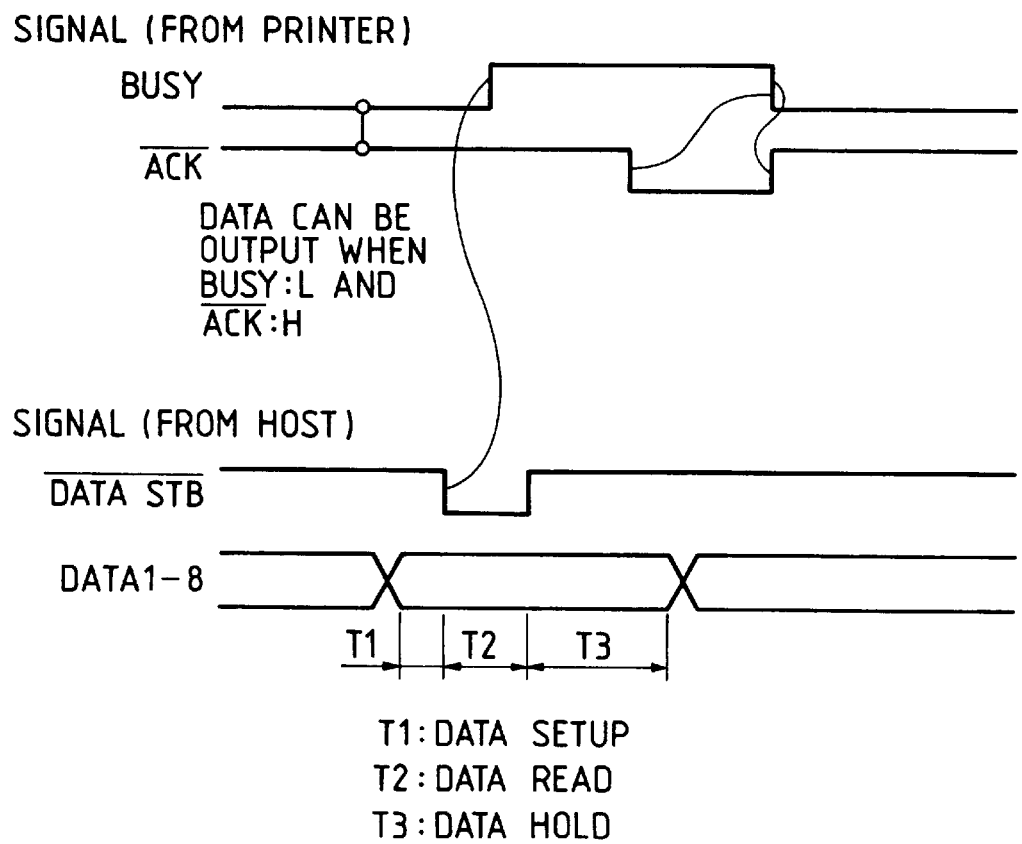
FIG. 22 is a timing chart illustrating an operation of the circuit shown in FIG. 21.

In FIG. 21, a Centronics I/F control circuit 201 is provided with the data buffer 202A and the control line buffer 203A, and data is processed according to the timing chart shown in FIG. 22.

Figure 23:
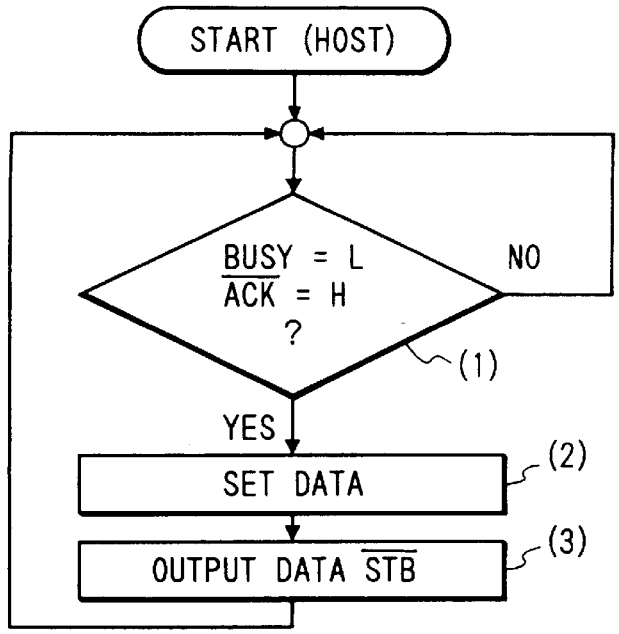
FIG. 23 is a flowchart illustrating an example of a signal processing procedure in a host of a Centronics I/F circuit shown in FIG. 21.

FIG. 23 is a flow chart showing an example of signal processing procedure between the host computer and the printer by the Centronics I/F control circuit shown in FIG. 21. (1)–(3) denote the steps of the procedure, particularly corresponding to the processing in the host computer.

When the BUSY signal is "L" and the ACK signal is "H" (1), data is set (2), the DATASTROBE signal is outputted (3) and the operation is returned to step (1).

Figure 24:
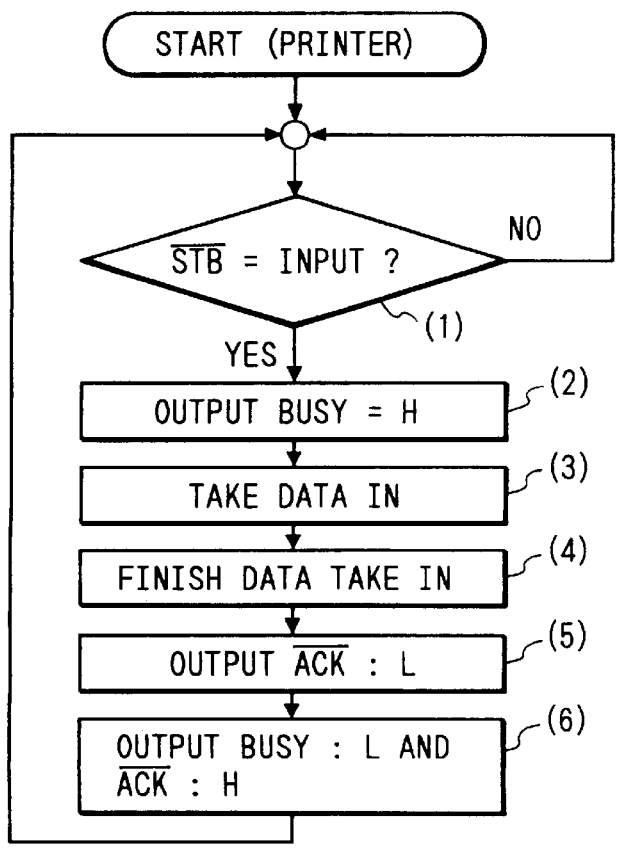
FIG. 24 is a flowchart illustrating an example of a signal processing procedure in a printer of a Centronics I/F circuit shown in FIG. 21.

FIG. 24 is a flow chart showing an example of signal processing procedure between the host computer and the printer by the Centronics I/F control circuit shown in FIG. 21. (1)–(6) denote the steps of the procedure, particularly corresponding to the processing in the printer adapted to the Centronics standard.

The BUSY signal is "L" (1), then the BUSY signal is set to "H" (2), and data fetching from the data bus is started (3). Subsequently, data fetching is finished (4), the ACK signal is set to "L" (5), the BUSY signal is set to "L" and the ACK signal to "H" (6), and the operation returns to step (1). Data transfer is carried out as described above.

In most cases, the Centronics printer is controlled by a method for which "ESC" (0×1B) is affixed to the top of a command and data. For example, for transferring data to a printer, a command is sent as ESC (A COUNT COLOR DATA, (1B 28 41 COUNT COLOR DATA).

In this case, "ESC (A" is a control code. "COUNT" is the number of data. "COLOR" defines the color spaces such as RGB and CMY. "DATA" is color image data. The printer performs printing by continuously transmitting such data commands as described above. The control codes and configuration differ with the printer manufacturers. However, the control methods using "ESC" are relatively identical.

This system allows to use various Centronics printers by connecting the Centronics printer to the Centronics port and supporting the control codes with a software program.

Figure 25:
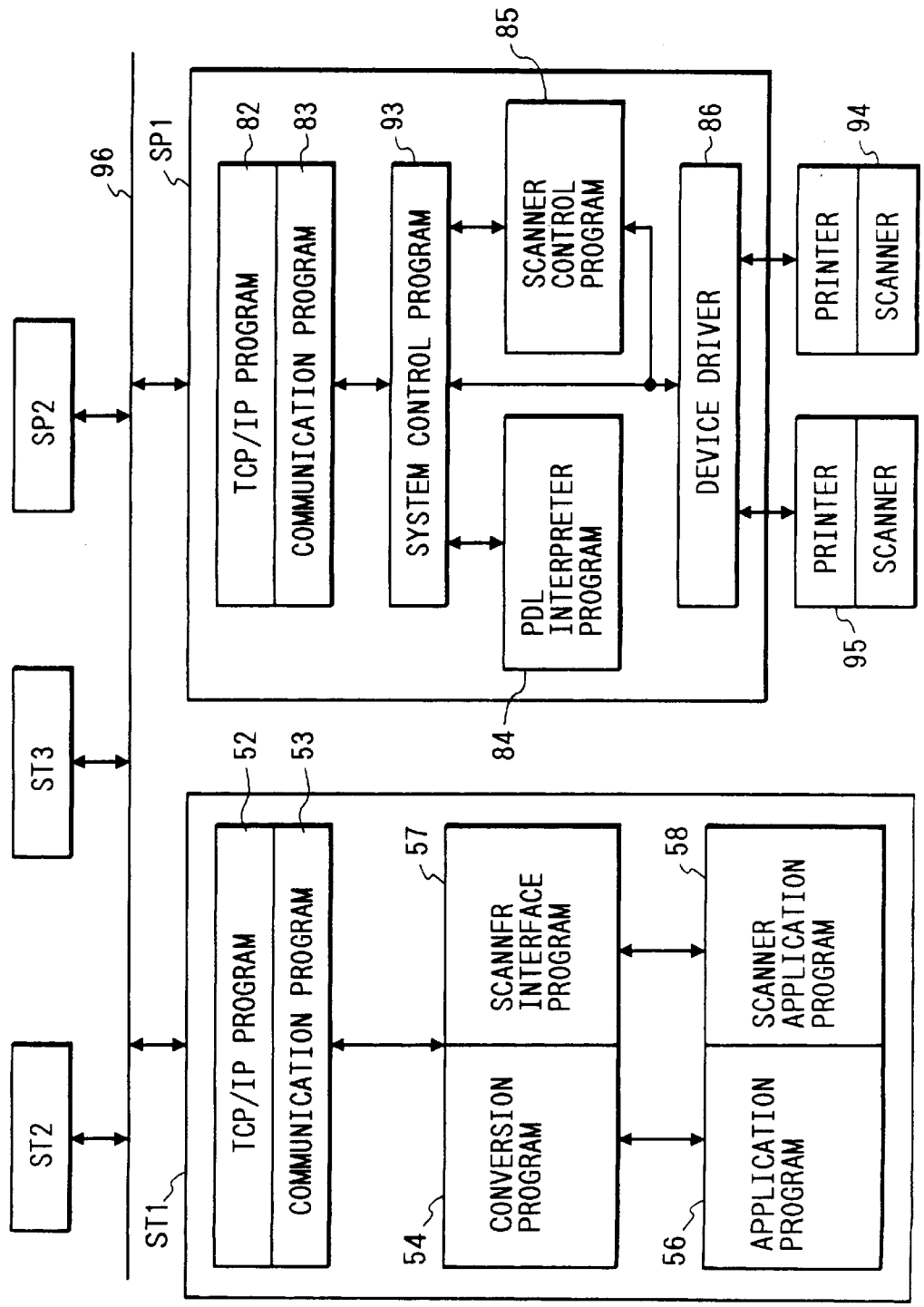
FIG. 25 is a view illustrating a program structure between a server device according to the present invention and a host computer.

FIG. 25 illustrates a program structure of the scanner printer server (network server) SP1 and the host computer in accordance with the present invention. The following briefly describes the overall flow of the system. The same components as in FIGS. 2A and 2B are given the same reference numbers and symbols. The host computer as an example shown in FIG. 25 is the Macintosh station ST1 and can be the station ST2 or ST3 or others.

When the operator for the host computer (station) selects and designates a desired scanner printer network server, printer, size of print sheet, and data format to be transferred to print the print data prepared by using the application program 56, the application program 56 transmits the data (including instructive information) to the conversion program 54. The conversion program 54 converts the data sent by the application program 56 to a data structure which can be accepted by the selected network server SP1 and transmits it to the communications program 53 and the TCP/IP program 52. For example, the Macintosh station ST1 converts QuickDraw data to CaPSL data and the IBM station ST2 converts GDI data to CaPSL data.

The communications program 53 transmits the data transferred from the conversion program 54 to the network server SP1 through the TCP/IP program, and the communications program 83 of the network server SP1 receives the data through the TCP/IP program 82 and transmits it to the overall system control program 93. The overall system control program 93 analyzes the data transferred and carries out the following processing according to the status of the network server at that time and the data transferred.

The overall system control program 93 sends print data to the PDL interpreter program 84. The PDL interpreter program 84 receives print data and converts it to data which can be accepted by the designated printer (for example, the printer of the scanner/printer 95). For example, the data is converted from PDL data such as Postscript (trade name) and CaPSL to the image data. The overall system control program 93 transfers the data converted by the PDL interpreter program 84 to the device driver 86 which serves as the image I/O unit control program and the device driver 86 transfers the data to the designated printer for printing.

When the operator for the host computer ST1 selects and designates a desired scanner printer network server, scanner, image area, resolution, multi-color or mono-color, type of compression for entry of image data by using the scanner application program 58, the scanner application program 58 transmits data to the communications program 53 through the scanner interface program 57. The communications program 53 transmits the data transferred through the scanner interface program 57 to the network server SP1 designated through the TCP/IP program, the communications program 83 of the network server SP1 receives the data through the TCP/IP program 82 and transmits the data to the overall system control program 93. The overall system control program 93 sends the entered selection and designation commands (image input commands) to the scanner control program 85, the scanner control program 85 sends the commands to the device driver 86 which serves as the image I/O unit control program according to the commands, and the device driver activates the designated scanner (for example, the scanner of the scanner printer 95) and transfers the image data to the scanner control program 85. The scanner control program 85 transfers the image data to the overall system control program 93, the overall system control program 93 transfers the image data to the communications program 83, the communications program 83 of the network server SP1 transfers the image data to the communications program (for example, the communications program 53) of the host computer designated through the TCP/IP program 82. The image data received by the communications programs 53 through the TCP/IP program 52 is further transferred to the scanner application program 58.

When an inquiry command as to the status of the scanner printer server is sent to the scanner printer server (for example, the scanner printer server SP1) designated by the work station ST1, the overall system control program 93 obtains the status (for example, the type of the scanner printer connected to the network server SP1, resolution, size of print sheet, color processing ability, etc.) of the network server SP1 and the communications program 83 transmits the data obtained to a host computer (for example, the work station ST1) through the TCP/IP program 82.

When an error occurs in the scanner printer 94, 95 serving as the image I/O unit or the network server SP1, the overall system control program 93 controls the actualities of error and the communications program 83 transmits the information to the host computer (for example, the host computer SP1) designated through the TCP/IP program 82.

With the program structure as described above, in this embodiment, the printer designated by the host computer can carry out printing according to the application program (for example, a DTP software) of the host computer. Furthermore, the image data can be entered from the scanner designated by the host computer according to the scanner application program (for example, a DTP software) of the host computer, and the image data entered from the designated scanner can be transferred to the other host computer. In addition, the status (status of the scanner printer to be connected) of the designated network server SP1 can be recognized.

In FIG. 25, no matter how many host computers and scanner printer servers are connected to the LAN 96, the application of the present invention will not be hampered.

The following describes network processing of the host computer and between the host computer and the network server SP1.

Processing for printing in the host computer is primarily divided into the first to third processing; the first processing for preparation of data according to the application program (for example, a DTP software), the second processing for conversion of prepared data to the CaPSL codes according to the application program, and the third processing for transfer of the CaPSL codes to the network server SP1.

Data prepared in the first processing depends on the type of a machine to be used and an application program. When, for example, the Frame Maker (trade name), a DTP program of Frame Technology, Inc., is used in the SUN work station, the data is outputted as an MIF (trade name) file or an IPL (trade name) file. When an application program adapted to the Windows (trade name) is used in an IBM personal computer, GDI functions are invoked.

Conversion of the data prepared according to the application program to the CaPSL codes in the first processing depends on the type of machine to be used and the file format to be applied. When, for example, the above described Frame Maker is used in the SUN work station, a program for converting the MIF file or the IPL file to the CaPSL codes is used. When an application program adapted to the Windows (trade name) is used in an IBM personal computer, conversion from GDI functions to the CaPSL codes is carried out according to a conversion program. In addition, when an Apple's Macintosh (trade name) computer is used, conversion of QuickDraw functions to the CaPSL codes is carried out according to a conversion program.

In addition, the transfer of CaPSL codes to the network server SP1 in the third processing depends on a program to be used in transmission. For example, the communications program 83 shown in FIGS. 2A and 2B is used, and a host computer which uses UNIX as the OS uses the lpq/lpd program 90.

When a scanner process is to be carried out in the host computer, the first and second processing is carried out.

First, image data is received from the network server SP1. Second, the image data is displayed and stored according to a scanner application program.

Image data received in the first processing is stored in the image format which can be processed by the scanner application program to be used in the second processing. The communication program 83 shown in FIGS. 2A and 2B is used as a program to be used to receive the image data from the network server SP1.

In the second processing, the image data format which can be used depending on the use of the scanner application program is determined. And the image data format which can be used for input and output is determined. For example, the bit map and the TIFF format are permitted as input. The TIFF format is used for storing as files. The bit map can be used for display.

A plurality of programs are used to connect the host computer and the network server SP1 with a network. The main program is the communications program 83 shown in FIGS. 2A and 2B.

The communications program 53 shown, for example, in FIG. 25 and the communications program 83 for the network server SP1 are available. The communications program for the host computer mainly performs the first to third processing.

The first processing is linked with the network server SP1 through a lower layer. In the second processing, the CaPSL data is transferred to the network server SP1. In the third processing, image data is received from the network server SP1 and transferred to a higher layer.

On the other hand, the network server SP1 mainly carries out the first and second processing. In the first processing, the CaPSL data received by the communications program 83 through the TCP/IP program 82 is transferred to the overall system control program 93. In the second processing, the image data received from the overall system control program 93 is transferred to the communications program 83.

Printing and scanning are started when a print request and a scan request from the upper layer of the host computer are received by the communications program 53. The communications program 53 forms a linkage using the lower layer. When the host computer is connected through, for example, the Ethernet, the TCP/IP program 52 uses for data transmission and reception. After the circuit is linked, the communications program 53 transfers the specific data for printing and scanning and sets the printer and the scanner to an adaptive condition. The CaPSL data is transmitted from the a client to a server for printing after the settings of the printer and the scanner have been completed, and the image data is transmitted from the server to the client for scanning after the setting of the scanner has been completed. As a program, the lpd program shown in FIGS. 2A and 2B can be used. When a UNIX machine is used as the host computer, printing is enabled by using lpr which is the standard print command for the UNIX. This lpd program 90 (see FIGS. 2A and 2B) is used only for printing. Even when there is no spool disk at the server side, the output by default setting is possible.

Basic operations of the overall system control program 93 are to carry out processing in response to an event to be entered, inquire a status of the input/output unit which has fallen in an error, and resume a job which has been interrupted due to the error and has restored from the error.

Figure 26:
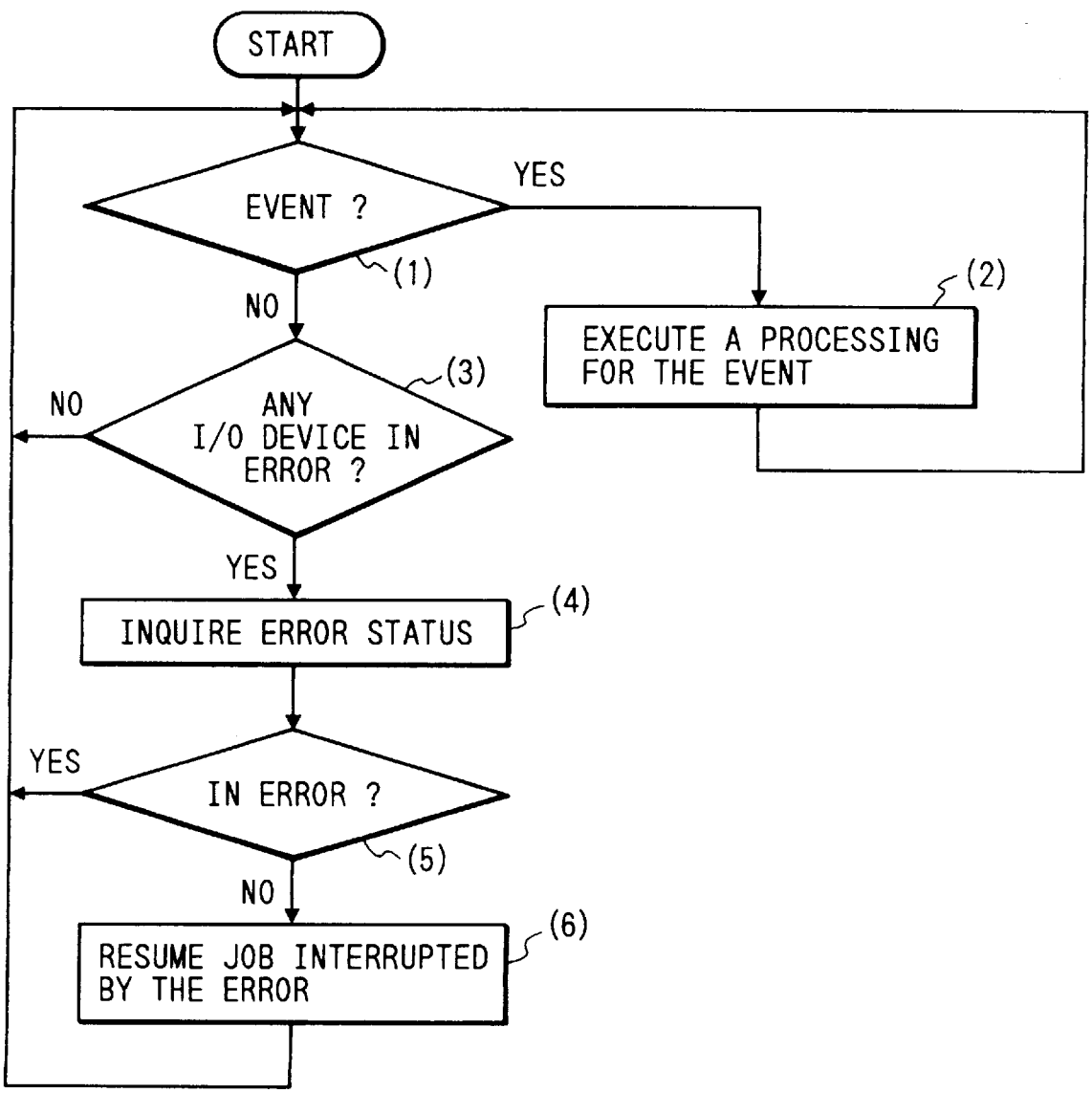
FIG. 26 is a flow chart illustrating an example of a total control procedure in a server device according to the preset invention.

The following describes the overall control operation in accordance with the present invention, referring to the flow chart shown in FIG. 26.

FIG. 26 is a flow chart showing an example of the overall control procedure in the server unit in accordance with the present invention. (1)–(6) respectively denote the steps of the procedure.

In step (1), it is determined whether there is an event (1), a processing in response to the event is carried out in step (2) and, if it is determined that there is no event, it is checked in step (3) whether there is an input/output unit suffering from the error. If it is checked that there is an input/output unit suffering from the error, it is inquired in step (4) whether the unit is suffering from the error and it is determined in step (5) whether the unit is suffering from the error. If the unit is recovered from the error, a job which has been interrupted due to the error is resumed in step (6). The overall system control program 93 can communicate with the TCP/IP program 82, communications program 83, PDL interpreter program 84, scanner control program 85 and device driver 86 in the network server SP1 and receives various events. Those events sent from the communications program 83 include an arrival of a job and an end of data transfer, those events sent from the PDL interpreter program 84 include an end of processing of data received, end of page drawing and end of print job, and those events sent from the scanner control program 85 include an image data transfer request, end of page print, occurrence of error and normal status.

In the overall system control program 93, the operations for respective events are specified. For example, when a job arrival signal is sent from the communications program 83, the contents of the job are analyzed, the data of a print job is transferred to the PDL interpreter program 84 and the data of an image input job is transferred to the scanner control program 85.

In addition, error sent to be from the device driver 86 include no paper, no ink, paper jam and power off.

In this embodiment, the network server SP1 uses the CaPSL as the page descriptive language for the printer. The following describes the function and processing of the CaPSL. However, the page descriptive language for the printer is not limited to the CaPSL.

The function of the CaPSL is a task for producing an image in a drawing area referred to as a band memory of the network server SP1 by entering the control codes which denote a figure, character and image.

The overall system control program 93 maintains direct communication with the PDL interpreter program 84. The communication includes the first and second communications described below.

The first communication is transferred to the CaPSL by the overall system control program 93 and its contents are a file name of a file which stores the CaPSL codes, a leading address and size of a memory which stores the CaPSL codes, possibility of drawing of the band memory, etc.

The second communication is transferred to the overall system control program 93 by the PDL interpreter program 84 and its contents are an end of band memory drawing, end of page drawing, end of document drawing, band memory drawing area and information of the unoccupied band memory.

In this case, the following processing is carried out in the PDL interpreter program 84.

The network server SP1 has a memory called the band memory which has a certain width and the PDL interpreter program 84 should partially develop an image as much as the band width. The PDL interpreter program 84 enters a control command as shown in FIG. 27. The CaPSL code is replaced with an intermediate code shown in FIG. 28 in the PDL interpreter program 84 according to a program referred to as the layouter (not shown). In this embodiment, the intermediate code is a practical expression of an abstractive expression of a figure. If the intermediate codes as many as one page are prepared, a raster image is developed in the band memory while referring to the intermediate codes according to a program (not shown) referred to as a painter.

Figure 29:
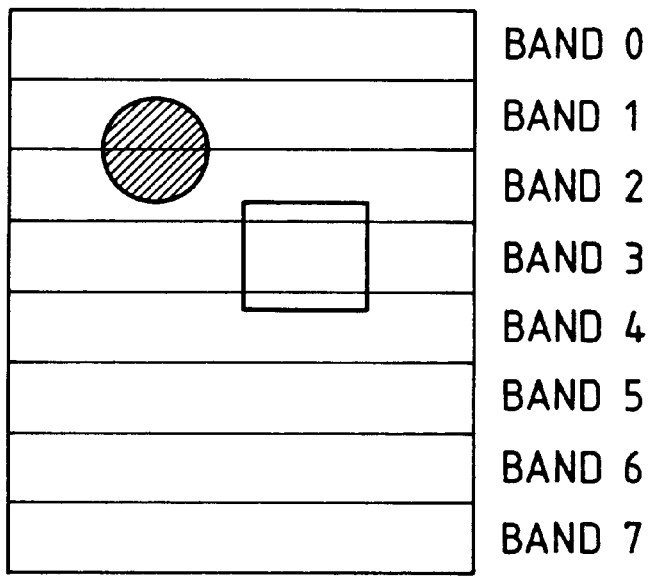
FIG. 29 is an explanatory view illustrating an expanding procedure of a graphic information to a band memory in a server device according to the present invention.

When the layouter receives, for example, a CaPSL code for drawing a figure as shown in FIG. 29, the layouter replaces the CaPSL code with an intermediate code shown in FIG. 28 which depends on the device. Then the layouter computes the numbers of bands in which the figure is drawn in accordance with the size of the figure and registers the result of computation in the intermediate code. In an example shown in FIG. 29, a circle is drawn in 1–2 bands and a rectangle is drawn in 2–4 bands. The numerals after the numbers of bands denote the position of the figure in the device coordinates and the diameter of the figure.

The painter (a program for actually drawing a figure on the memory) develops a figure as shown in FIG. 29 and draws it on the band memory while referring to the intermediate codes. Actually, the memory has a capacity as large as the band width and therefore, when a band is drawn, the data is sent to the printer, the memory is cleared and the next band is drawn. When the intermediate code is referred to draw the zeroth band, it is known that the zeroth band does not contain the data to be drawn and the painter starts the operation of the next band. Then the painter searches the data to be drawn in the first band, detects a circle and draws the circle as much as one band. Shifting to the second band, the painter knows that the circle and the rectangle be drawn and draws the continuing portion of the circle and the rectangle as much as one band. Thus, the painter draws the data as much as one page.

Figure 30:
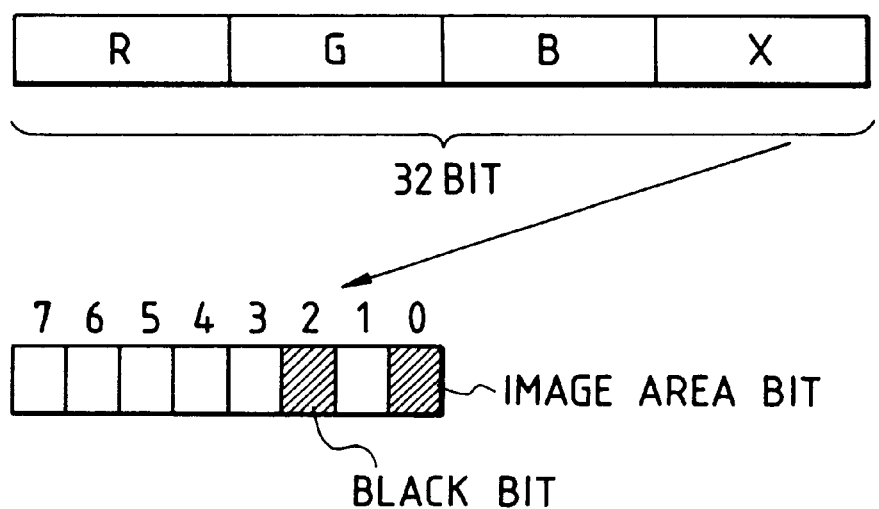
FIG. 30 is an explanatory view illustrating a structure of a single picture element expanded with a page description language in a server device according to the present invention.

A structure of one pixel of data to be developed by the CaPSL codes is composed of 32 RGBX bits as shown in FIG. 30. These bits include RGB 24 bits for color data and 8-bit additional information X for additional information. In this case, Bit 0 in the additional information X is the image area determining bit and, when an image is drawn on the band memory according to the CaPSL codes, this bit is turned on. Bit 2 is a black information bit and, when the color of a figure or character developed by the CaPSL codes is 0 for RGB, this bit 2 is turned on. These information are analyzed for printing out through the first interface circuit 4-1 and contribute to improvement of the image quality.

Next, with reference to a data process chart shown in FIG. 31, operations of scanners 94A and 95A will be described. For simplicity, the same portions as FIG. 25 are denoted by the same reference numerals.

Figure 31:
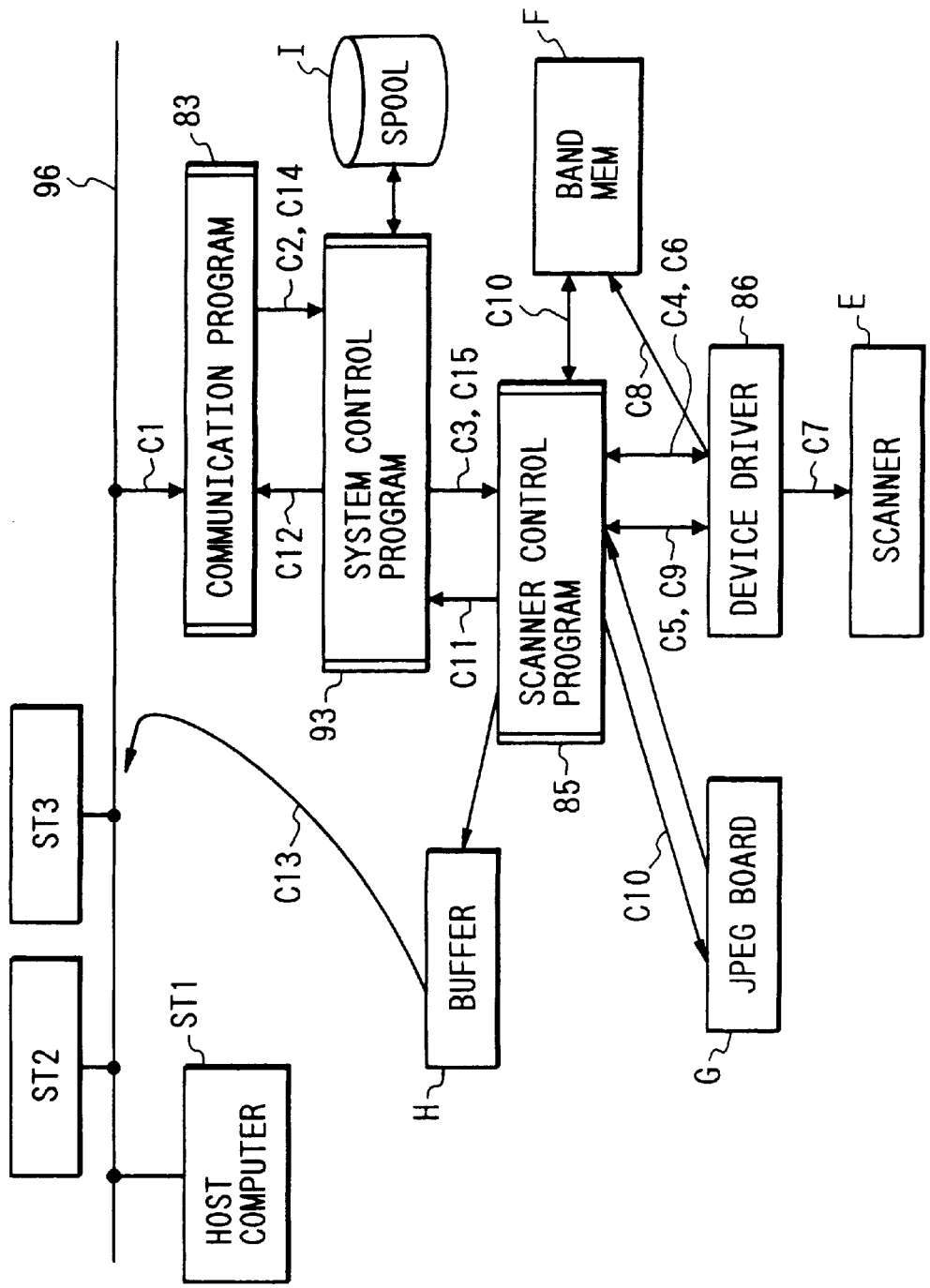
FIG. 31 is a view illustrating a data processing path for explaining an operation of a scanner shown in FIGS. 2A and 2B.

FIG. 31 is a data process chart for explaining the operations of scanners 94A and 95A shown in FIGS. 2A and 2B. Since the operation of a scanner that scans an image as divided bands is slightly different from the operation of a scanner that scans an entire image at a time, their tasks will be separately described.

In the case of the scanner that scans an image as divided bands, when receiving a scan command C1 from a host computer ST1 that is a client machine through a TCP/IP program 83, the communication program 83 sends a scan program C2 to a system overall control program 93.

When the apparatus has a spool I, the system overall control program 93 creates a spool file corresponding to the scan command C2, which has been received, and stores the spool file. The system overall control program 93 sends a file name C3 to a scanner control program 85. When the apparatus does not have the spool I, the system overall control program 93 sends the scanner command C3 directly to the scanner control program 85.

The scanner control program 85 interprets the scanner command C3 and sends a scanner condition setting command C4 to a device driver 86 so as to activate a designated scanner. The scanner condition setting command C4 contains for example resolution. The device driver 86 is a function corresponding to the scanner control program 85.

The device driver 86 that has set scanner conditions sends a return value C5 to the scanner control program 85. When receiving the return value C5, the scanner control program 85 sends a scan start command C6 to the device driver 86 so as to activate the designated scanner. The device driver 86 activates a scanner E so as to read image data and stores the image data in a band memory F. After having written one band of image data in the band memory F, the device driver 86 sends a scan completion return value C9 to the scanner control program 85. When receiving the return value C9, the scanner control program 85 performs image process for image data stored in the band memory F (namely, compresses the image data with for example a JPEG compressing board) and writes the compressed data in a buffer region H.

After having processed all data stored in the band memory F, the scanner control program 85 sends a transfer request C11 to the system overall control program 93. In addition, the scanner control program 85 sends a scan start command C6 to the device driver 86 so as to activate the scanner. The scanner control program 85 causes the scanner to read image data from the last end point of the preceding scanning operation.

When receiving the transfer request C11, the system overall control program 93 sends a transfer request C12 to the communication program 83. When receiving the transfer request C12, the communication program 83 sends the processed image data stored in the buffer region H to the host computer, which is a designated client machine. At this point, since the communication program 83 and the system overall control program 93 are programs different from the scanner control program 85, even if the scanner that is controlled by the device driver 86, which is a function of the scanner control program 85, is operating, the communication program 83 and the system overall control program can transfer image data.

After having transferred the image data, the communication program 83 sends a transfer completion signal C14 to the system overall control program 93 When receiving the transfer completion signal C14, the system overall control program 93 sends a transfer completion C15 to the scanner control program 85. When receiving both the return value C9 (which represents the completion of the scanning operation) from the device driver 86 and the transfer completion C15 from the system overall control program 93, the scanner control program 85 performs an image process for the image data stored in the band memory F and writes the processed data in the buffer region H. By repeating these steps, the image data is sent to the host computer ST1. When another host computer (for example, a host computer ST2 or a host computer ST3) is designated, image data can be sent to the designated host computer.

When having determined that all image data has been transferred, the scanner control program 85 informs the communication program 83 of the completion through the system overall control program 93.

On the other hand, in the case of the scanner that scans entire image at a time, when receiving a scan command C1 from for example a host computer ST1, which is a client machine, the communication program 83 sends a scan command C2 to the system overall control program.

When the apparatus has a spool I, the system overall control program 93 creates a spool file corresponding to the scan command C2 that has been received and stores this spool file. The system overall control program 93 sends a file name C3 to the scanner control program 85. When the apparatus does not have the spool I, the system overall control program 93 sends the scanner command C3 directly to the scanner control program 85.

The scanner control program 85 interprets the scanner command C3 and sends a scanner condition setting C4 (such as resolution) to the device driver 86 so as to activate a designated scanner. The device driver 86, which has set scanner conditions, sends a return value C5 to the scanner control program 85. When receiving the return value C5, the scanner control program 85 sends a scan start command C6 to the device driver 86 so as to activate a scanner E. The scanner E cannot be stopped in the middle of the reading operation thereof.

When receiving a command C10, the device driver 86 activates the scanner E so as to read all image data. In addition, the device driver 86 performs an image process or the image data being read (for example, JPEG compresses the image data with for example a JPEG board) and stores the compressed data in the buffer H.

Image data that has not been compressed may be written to the buffer H. When the buffer H becomes full, the scanner control program 85 sends a transfer request C11 to the system overall control program 93. When receiving the transfer request C11, the system overall control program 93 sends a transfer command C12 to the communication program 83. The communication program 83 transfers data stored in the buffer H to the designated host computer ST1. When another host computer (for example, a host computer ST2 or a host computer ST3) is designated, image data can be sent to another host computer.

After having transferred the data to the host computer, the communication program 83 sends a transfer completion signal C14 to the system overall control program 93. When receiving the transfer completion signal C14, the system overall control program 93 sends a transfer completion C15 to the scanner control program 85. When receiving the transfer completion C15, the scanner control program 85 performs an image process for the image data stored in the band memory and writes the processed data to the buffer H. By repeating these steps, image data can be sent to a designated host computer, which is a client machine.

When having determined that all the image data have been transferred, the scanner control program 85 informs the communication program 83 of the completion through the system overall control program 93.

Next, with reference to FIGS. 32 and 33, data flow from a host computer of the server apparatus according to the present invention to an S/P server apparatus will be described.

In the data flow from the host computer to a designated S/P server apparatus (network server) SP1, for example a host computer ST1 creates a document corresponding to a DTP application program 56 that is running. The data format of the document depends on the model of the host computer and the application program. Thus, the data of the document should be converted into a format that the designated S/P server apparatus SP1 can interpret. Reference numeral 54 is a converting program. The DTP application program 56 sends data corresponding to the system of the host computer to the converting program 54. The converting program 54 converts the received file into for example CaPSL code. The file, which has been converted into the CaPSL code, is sent-to a communication program lpd 505 or a communication program 53.

These communication programs serve to connect a host computer and an S/P server apparatus SP1 through a network so as to communicate data therebetween. In this embodiment, one of these communication programs is provided.

First, the operation of the communication program 53 will be described.

Corresponding to the communication program 53, a communication program 83 is used for the S/P server apparatus SP1. Between these communication programs, a TCP/IP program is used. When data is printed out, the communication program 53 has two functions, one of which is to link with the communication program 83 through a lower layer (TCP/IP), the other of which is to transmit CaPSL data file generated by the converting program to the S/P server apparatus SP1.

The communication program 83 links with the communication program 53 and the system overall control program 93 so as to exchange information necessary for a print process and optimally print out data. In other words, the communication program 83 receives data from the communication program 53 and informs the system overall control program 93 of the data reception. At this point, the received CaPSL data and the associated information are temporarily stored in a reception buffer. When an error took place in the S/P server apparatus SP1, the communication program 83 sends information about the error to the communication program 53.

Next, a print-out process performed by the communication program 83 will be described.

The document data created by the DTP application program 56 has been sent to the S/P server apparatus SP1. The communication program 83 sends a job arrival event to the system overall control program 93. The job is for example a print-out process of a color laser copier (CLC). The system overall control program 93 that is an event drive type program always waits for events that are sent from the communication program 83, the device driver 86, and the PDL interpreter program 84. When receiving an event, the system overall control program 93 determines the source of the event and the contents thereof and performs a corresponding process. Now assume that an event representing "a job has arrived" has been received from the communication program 83. At this point, the system overall control program 93 analyzes the event and temporarily spools document data stored in the reception buffer when the apparatus has a hard disk 51. When a plurality of jobs are queued, the system overall control program 93 optimally activates the jobs corresponding to the contents of the jobs, the conditions of the printer and scanner, and the job priority.

When the apparatus does not have the hard disk 519, since it cannot store data, the system overall control program 93 informs the PDL interpreter program 84 of an address block in which the data is stored and the size of the data so as to immediately perform the print-out process. In this embodiment, assume that the hard disk is provided. The system overall control program 93 determines the contents of the job and sends the spooled file name to the PDL interpreter program 84 so as to activate the print-out process.

Next, with reference to a block diagram shown in FIG. 33, this embodiment will be described in more detail.

Figure 33:
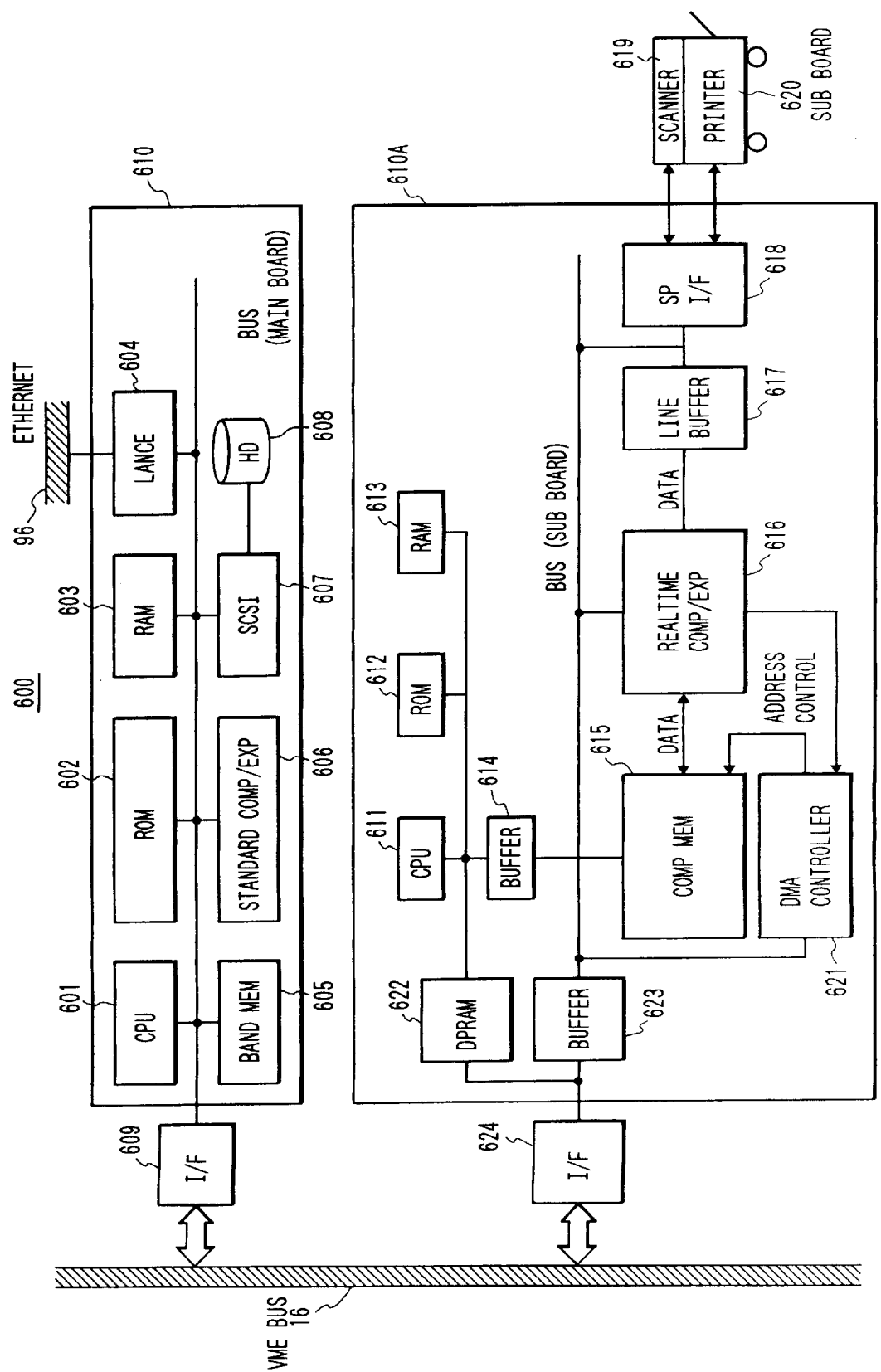
FIG. 33 is a block diagram illustrating a data processing state between a server device according to the present invention and a color laser copier.

FIG. 33 is a block diagram for explaining data processes of the S/P server apparatus SP1 according to the present invention and for example a color laser copier (CLC).

Figure 32:
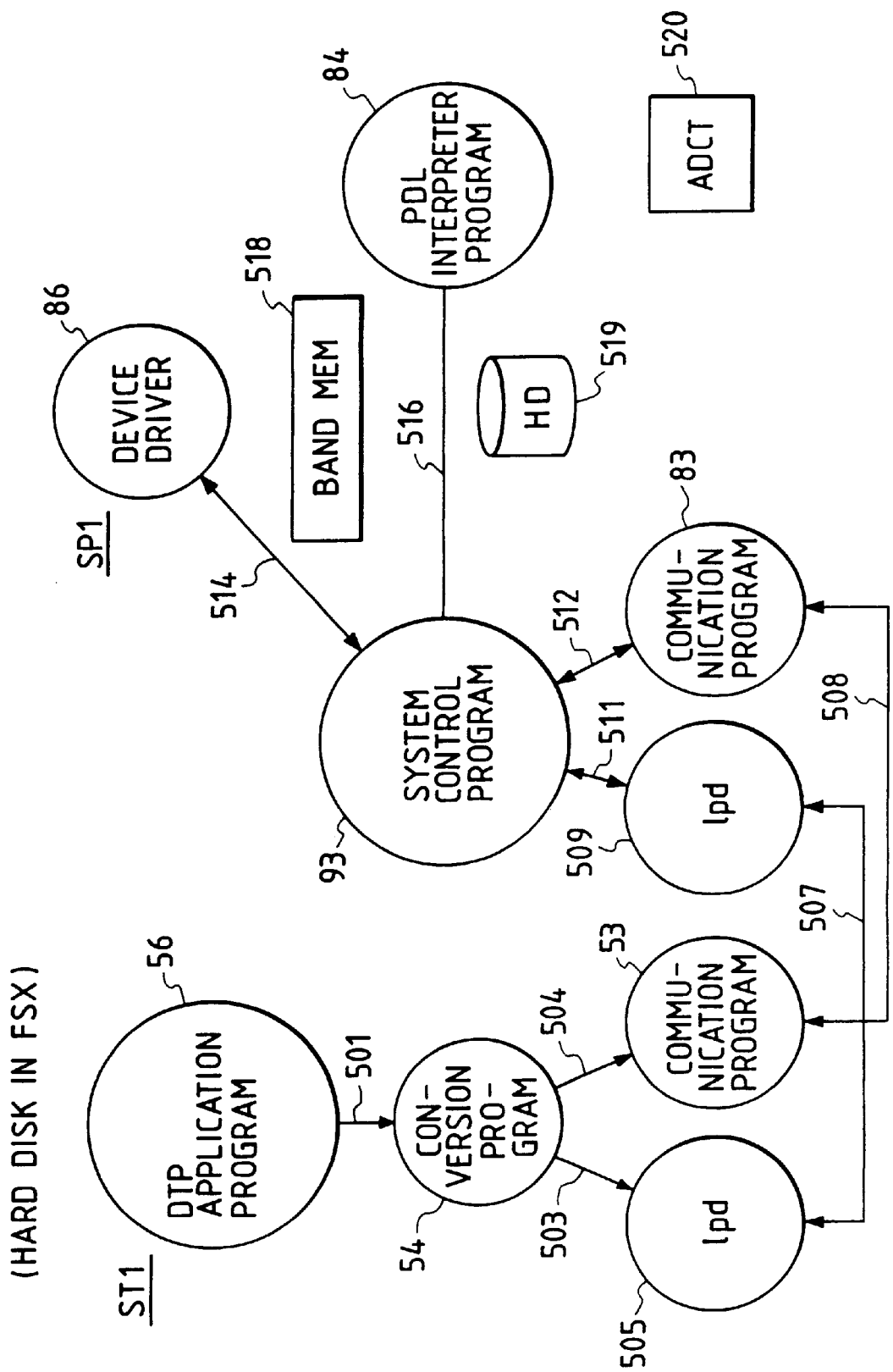
FIG. 32 is a block diagram illustrating a data processing state between a server device according to the present invention and a color laser copier.

A PDL interpreter program 84 shown in FIG. 32 reads CaPSL data from a spool file, interprets the data, and writes figures, letters, and images to a band memory 518. When the CaPSL data contains compressed and encoded image data, the PDL interpreter program 84 causes a standard compressing and decompressing portion 606 to decompress image data and store the decompressed image data in the band memory. After one band of image data has been stored in the band memory, the PDL interpreter program 84 issues a "one band write completion" event to the system overall control program 93. When receiving the event, the system overall control program 93 issues a "one band paper output" request event to the device driver 86.

Next, data flow from the band memory 605 to the compressing memory 615 will be described. First, the operation of the device driver 86 will be described.

When receiving the "one band paper output" event, the device driver 86 transfers data stored in the band memory 605 to a line buffer 617 of a sub board 610A. The data stored in the line buffer 617 is transferred to a real time compressing and decompressing portion 616, block by block. The real time compressing and decompressing portion 616 compresses image data, block by block, and stores the compressed image data in the compressing memory 615. Addresses and write signal for the compressing memory 615 are generated under the control of a DMA controller 621.

After having compressed one band of data, the device driver 86 sends a "one band paper output completion" event to the system overall control program 93. When receiving the event, the system overall control program 93 outputs a "one band write request" event to the PDL interpreter program 84. Whenever each band of data has been written, the compressing process is repeatedly performed until one page of compressed image is stored in the compressing memory 615. When the last band of data has been stored in the compressing memory 615, the PDL interpreter program 84 issues a "one page write completion" event to the system overall control program 93. When receiving the event, the system overall control program 93 issues a "one page paper output command" to the device driver 86.

When receiving the "one page paper output command", the device driver 86 performs the following process so as to print out one page of compressed image stored in the compressing memory 615.

The CPU 611 activates a DPRAM 622 and initializes the real time compressing and decompressing portion 616 and a DMA controller 621. In addition, the CPU 611 sends commands to a designated printer 620 and issues a decompression start command to the real time compressing and decompressing portion 616. The real time compressing and decompressing portion 616 accesses the DMA controller 621. The DMA controller 621 generates addresses and a read signal. The compressing memory 615 outputs the compressed data to the real time compressing and decompressing portion 616. After having decompressed the compressed data, the real time compressing and decompressing portion 616 outputs the decompressed data to the line buffer 617, block by block. The line buffer 617 converts block sequence data to raster sequence data and outputs the converted data to the printer 620 through an SP I/F 618. After one page of data has been printed out, the device driver 86 sends a "one page paper output completion" event to the system overall control program 93. The system overall control program 93 issues a "second page write command" to the PDL interpreter program 84. Thus, a plurality of pages of document are output.

After the last band of the last page of data has been written, the PDL interpreter program 84 issues a "document completion" event to the system overall control program 93. The system overall control program 93 issues a "one page paper output command" to the device driver 86. The device driver 86 performs a print process and issues a "one page paper output completion" event to the system overall control program 93. If necessary, the system overall control program 93 issues a "print completion" event to the communication program 83. The communication program 83 informs the communication program 53 in the host computer that the print process has been completed.

When an error took place (for example, a paper jamming or a paper empty took place in the printer 620), the device driver 86 sends an "error occurrence" event to the system overall control program 93. The system overall control program 93 informs the PDL interpreter program 84 and the communication program 83 that the error took place. The PDL interpreter program 84 performs an error countermeasure process (such as saving the program state). The communication program 83 sends the occurrence and type of error to the communication program 83 of the host computer. The system overall control program 93 can determine whether the apparatus has been recovered from an error in the following two methods. As the first method, the system overall control program 93 periodically asks the device driver 86 whether the apparatus has been recovered from an error. The device driver 86 informs the system overall control program 93 whether or not the apparatus has been recovered from the error.

As the second method, the system overall control program 93 always monitors an occurrence of an error and a recovery therefrom. When the apparatus has been recovered from the error, an "error recovery" event is issued to the system overall control program 93.

Next, with reference to FIGS. 32 and 34, a print data output process where the host computer outputs print data to for example a thermal jet color copier will be described.

Figure 34:
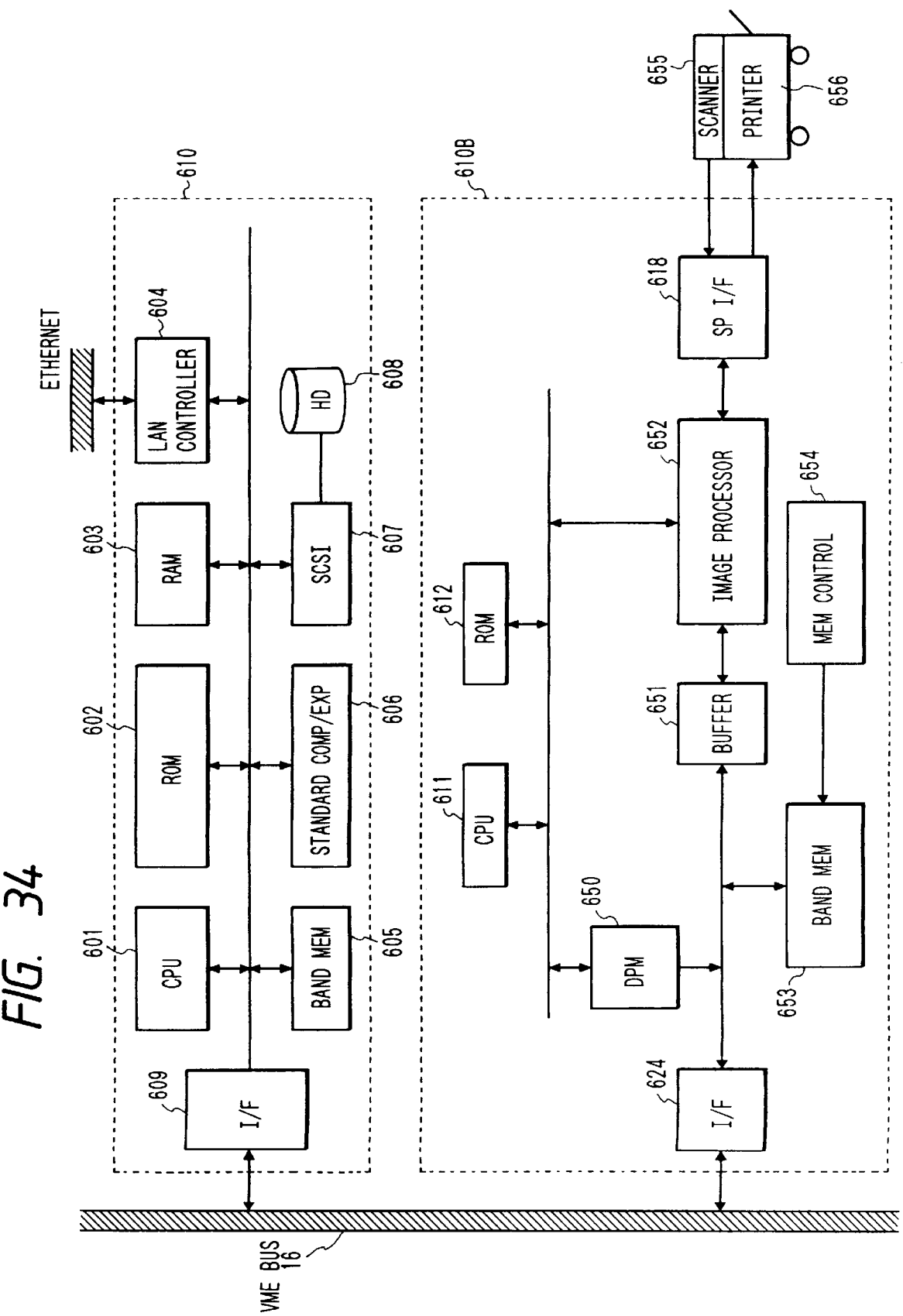
FIG. 34 is a block diagram illustrating a data processing state between a server device according to the present invention and a thermal jet color copier.

FIG. 34 is a block diagram for explaining data processes performed by the S/V server apparatus SP1 according to the present invention and for example a thermal jet color copier (BJC).

As data flow from the host computer to the S/P server apparatus SP1 shown in FIG. 32, the host computer executes a DTP application program 56 so as to create a document. The data format of the document depends on the model of the host computer and the application program. Thus, the data of the document should be converted into a format that the designated S/P server apparatus SP1 can interpret. Reference numeral 54 is a converting program. The DTP application program 56 sends data corresponding to the system of the host computer to the converting program 54. The converting program 54 converts the received file into for example CaPSL code. The file, which has been converted into the CaPSL code, is sent to a communication program lpd 505 or a communication program 53.

These communication programs serve to connect a host computer and an S/P server apparatus SP1 through a network so as to communicate data therebetween. In this embodiment, one of these communication programs is provided.

First, the operation of the communication program 53 will be described.

Corresponding to the communication program 53, a communication program 83 is used for the S/P server apparatus SP1. Between these communication programs, a TCP/IP program is used.

When data is printed out, the communication program 53 has two functions, one of which is to link with the communication program 83 through a lower layer (TCP/IP), the other of which is to transmit CaPSL data file generated by the converting program 54 to the communication program 83.

The communication program 83 links with the communication program 53 and the system overall control program so as to exchange information necessary for a print process and optimally print out data. In other words, the communication program 83 receives data from the communication program 53 and informs the system overall control program of the data reception. At this point, the received CaPSL data and the associated information are temporarily stored in a reception buffer.

When an error took place in the S/P server apparatus SP1, the communication program 83 sends information about the error to the communication program 53. When a print-out process is performed corresponding to the communication program 53 of the host computer, the document data created by the DTP application program 56 has been sent to the designated S/P server apparatus SP1. The communication program 83 sends a job arrival event to the system overall control program 93. The job is for example a print-out process of a BJ color laser copier. The system overall control program 93 that is an event drive type program always waits for events that are sent from the communication program 83, the device driver 86, and the PDL interpreter program 84. When receiving an event, the system overall control program 93 determines the source of the event and the contents thereof and performs a corresponding process.

Now assume that an event representing "a job has arrived" has been received from the communication program 83. At this point, the system overall control program 93 analyzes the event and temporarily spools document data stored in the reception buffer when the apparatus has a hard disk 51. When a plurality of jobs are queued, the system overall control program 93 optimally activates the jobs corresponding to the contents of the jobs, the conditions of the printer and scanner, and the job priority.

When the apparatus does not have the hard disk 519, since it cannot store data, the system overall control program 93 informs the PDL interpreter program 84 of an address block in which the data is stored and the size of the data so as to immediately perform the print-out process. In this embodiment, assume that the hard disk is provided. The system overall control program 93 determines the contents of the job and sends the spooled file name to the PDL interpreter program 84 so as to activate the print-out process. A PDL interpreter program 84 reads CaPSL data from a spool file, interprets the data, and writes figures, letters, and images to a band memory 518. When the CaPSL data contains compressed and encoded image data, the PDL interpreter program 84 causes a standard compressing and decompressing portion 606 to decompress image data and store the decompressed image data in the band memory. After one band of image data has been stored in the band memory, the PDL interpreter program 84 issues a "one band write completion" event to the system overall control program 93. When receiving the event, the system overall control program 93 issues a "one band paper output" request event to the device driver 86.

When data stored in the band memory 518 is printed out, the device driver 86 that has received a "one band paper output" request event controls the interface board 610B so that the designated thermal jet color printer (BJ printer) 656 prints out the data. One band of image data stored in the band memory 605 of the main CPU board 610 is transferred to the band memory 653. The data stored in the band memory 653 is read corresponding to a scanning type of a head of the BJ printer 656 and sent to an image processing portion 652 through a buffer 651. The image processing portion 652 performs a process corresponding to predetermined parameters. Normally, the image processing portion 652 converts NTSC-RGB data stored in the band memory into RGB data for the BJ printer 656. The converted data is sent to a printer engine portion of the BJ printer 656 through an interface 618. The BJ printer 656 is controlled by a CPU 611 that interprets commands received from the CPU 601. Reference numeral 650 is a dual port RAM.

After the last band of data has been written, the PDL interpreter program 84 issues a "document completion" event to the system overall control program 93 so as to complete the print process. If necessary, the system overall control program 93 issues a "print completion" event to the communication program 83. The communication program 83 informs the communication program 53 in the host computer that the print process has been completed.

When an error took place (for example, a paper jamming or a paper empty took place in the printer 656), the device driver 86 sends an "error occurrence" event to the system overall control program 93. The system overall control program 93 informs the PDL interpreter program 84 and the communication program 83 that the error took place. The PDL interpreter program 84 performs an error countermeasure process (such as saving the program state). The communication program 83 sends the occurrence and type of error to the communication program 83 of the host computer. The system overall control program 93 can determine whether the apparatus has been recovered from an error in the following two methods. As the first method, the system overall control program 93 periodically asks the device driver 86 whether the apparatus has been recovered from an error. The device driver 86 informs the system overall control program 93 whether or not the apparatus has been recovered from the error.

As the second method, the system overall control program 93 always monitors an occurrence of an error and a recovery therefrom. When the apparatus has been recovered from the error, an "error recovery" event is issued to the system overall control program 93.

When a color image is transmitted between different type apparatuses, input and output devices of these apparatuses cannot be simply connected. Since characteristics of these apparatuses differ each other, colors cannot be properly reproduced. To prevent this problem, a technique where each device employs an intrinsic color space and a communication path uses a standard color space is being studied. A color space converting process based on such a requirement will be described.

Now assume that the color space of an input device on a transmitting side is referred to as A, the color space on a communication path is referred to as B, and the color space of a receiving printer is referred to as C.

Next, YCrCb color space, which is relatively well known as a color space for a communication path, will be described. The YCrCb color space has been widely used for a color image encoding process.

Normally, the color space A on the transmitting side differs from the YCrCb color space in color regions. Both the color spaces are coupled as given by formula (1).

[Ra] [a11 a12 a13] [y]

[Ga]=[a21 a22 a23] [cr]

[Ba] [a31 a32 a33] [cb]   (1)

where Ra, Ga, and Ba are coordinates (Ra, Ga, Ba) at any point in the color space A. The coordinates of the corresponding point in the YCrCb color space are (y, cr, cb). To approximate this formula for any color space, coefficients (a11 to a33) are obtained by for example least square method. Thus, the input color space of the device is converted into the color space on the communication path corresponding to the formula (1).

On the other hand, when a standard color space on a communication path is converted into a color space on a recording side, one of several methods may be used. In this embodiment, the following method is used.

When the standard color space on the communication path is YCrCb, YCrCb data is converted into RGB data. Since the YCrCb space is linearly converted into NTSC color space, the NTSC color space will be described in this embodiment.

Although the NTSC standard color space is based on additive mixture of color stimuli, printing color space is based on subtractive mixture of color stimuli. Thus, the additive mixture of color stimuli should be converted into the subtractive mixture of color stimuli. This conversion cannot be easily performed due to very complicated construction. In this embodiment, a color space of an additive mixture of color stimuli that is close to a color space on the recording side is treated as an inner standard color space on the recording side. In this embodiment, a HDTV (High Definition TV) color space that is narrower than the NTSC color space is treated as a standard color space D on the recording side.

The relation between the inner standard color space D on the recording side and the device color space C is given by formula (2).

[Y] [A11 A12 A13] [Rh]

[M]=[A21 A22 A23] [Gh]

[C] [A31 A32 A33] [Bh]

[K] [A41 A42 A43]   (2)

where Y, M, C, and K are printing prime colors that are yellow, magenta, cyan, and black components; Rh, Gh, and Bh are standard color space components on the recording side; A11 to A43 are coefficients at a plurality of points representing the relation between printing color space and recording inner standard color space. These coefficients A11 to A43 are calculated by least square method.

The standard color space on the communication path is converted into the inner standard color space on the recording side in the following method.

For the NTSC standard color space on the communication line, representative information on three-dimensional outermost peripheral plane of colors corresponding to basic stimuli represented by NTSC system is obtained. Likewise, representative position information on the outermost peripheral plane of the HDTV inner standard color space on the recording side can be obtained.

When components (Rh, Gh, Bh) on the HDTV color space are obtained from components (Rn, Gn, Bn) on the NTSC color space, Rn, Gn, and Bn are converted into Ln, an, bn with CIEL*a*b*. Likewise, (Rh, Gh, Bh) are converted into (Lh, ah, bh) with CIEL*a*b*. When Ln is constant, the outermost peripheral approximation positions on the HDTV and NTSC color spaces that almost satisfy θ=a tan (an/bn) are obtained from the above-mentioned table. When the NTSC outermost peripheral plane position is (Lon, aon, bon) and the HDTV outermost peripheral plane position is (Lon, aoh, boh), ah and bh are given by formula (3).

*ah=(aoh/aon)*an*

*bh=(boh/bon)*bn*   (3)

where ah and bh are color space compressed positions on the HDTV color space.

Thus, any point (Rn, Gn, Bn) on the NTSC color space is converted into (Rh, Gh, Bn) on the recording standard color space. Consequently, the amounts of components Y, M, C, and K to be printed are obtained by the formula (2).

In this embodiment, a standard color space is provided on a recording side. This is because the number of standard color spaces on the communication line is not limited to one. Thus, a plurality of standard color spaces may be used. However, according to this embodiment, even if a color space on a communication path is not an NTSC color space, when the color space can be defined, it may be converted into the standard color space.

Explanation will be made below as for the abnormal countermeasure process of a peripheral device with reference to FIG. 35.

Figure 35:
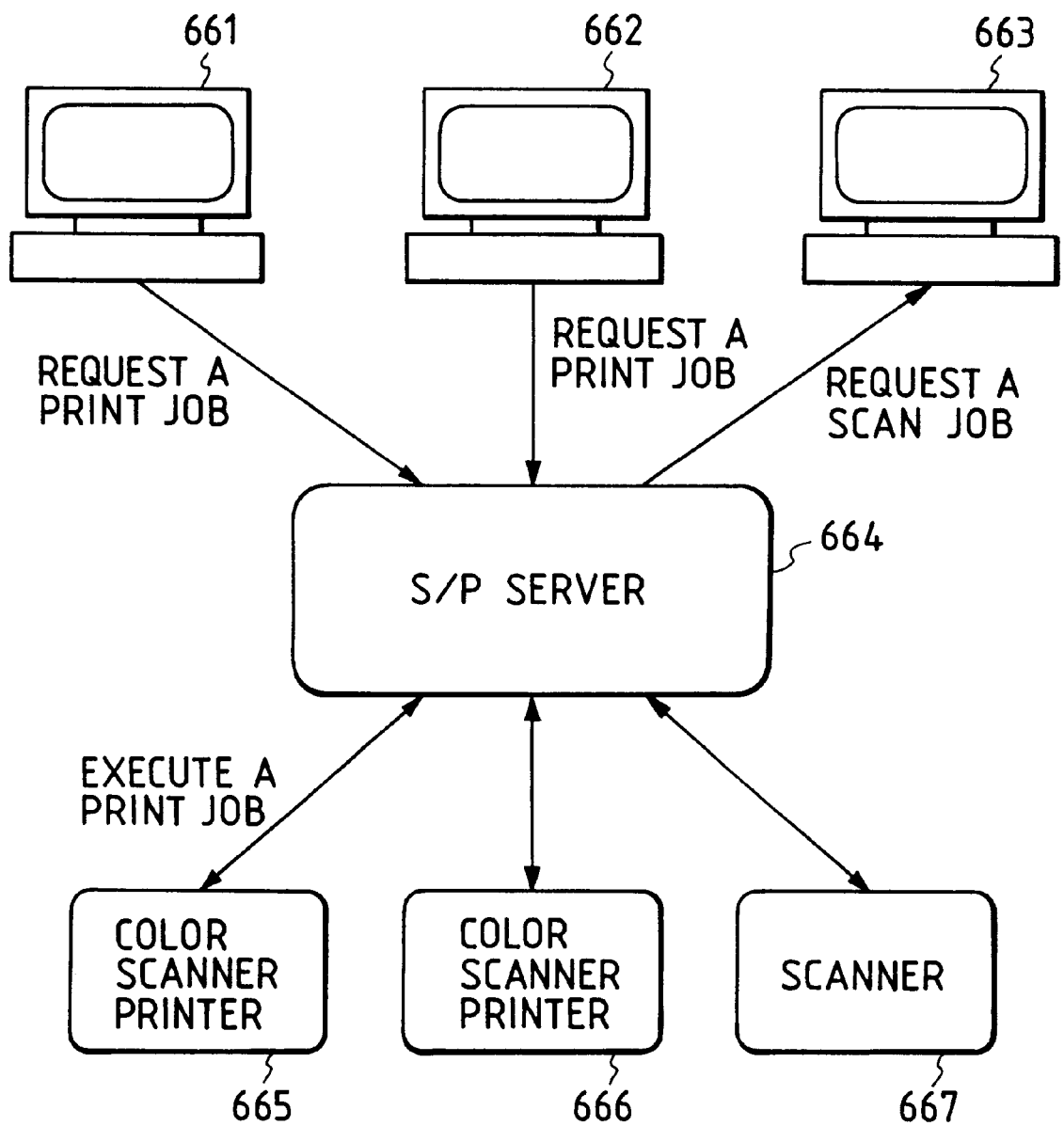
FIG. 35 is a block diagram illustrating a structure of a network system in which a server device according to the present invention is incorporated.

FIG. 35 is a block diagram used for explaining the configuration between the network system and the server device according to the present invention.

When an abnormal state occurs in a peripheral device during a job operation, the S/P server device SP1664 preferentially executes the job (to be described later) operable in the state, without waiting till the peripheral device is recovered from the trouble. The job can be resumed after a recovery of the troubled peripheral device by registering the job (hereinafter referred to an error job) in the S/P server device SP1664, the job dealing with the peripheral device in abnormal state as a process waiting job involved in an error state during an operation, after necessary information has been stored to resume the job. The registration to resume the error job depends on the degree of the abnormal state or the setting by the SP server.

An example will be explained as for the case where three computers 661 to 663, two color scanner printers 665 and 666, and a scanner 667 are connected together.

Figure 36:
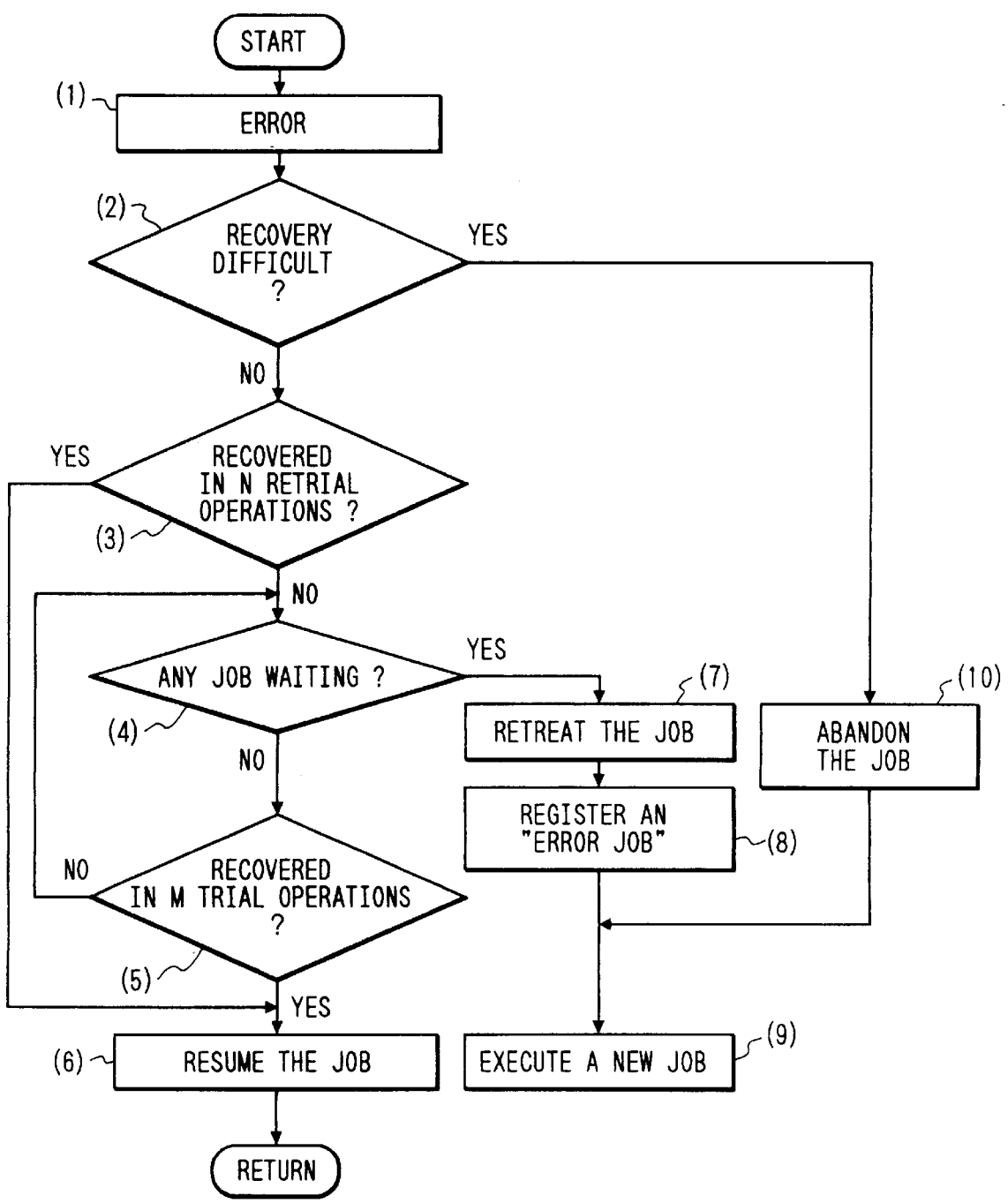
FIG. 36 is a flowchart illustrating an example of a procedure with which an abnormally generated job is processed in a server device according to the present invention.

The color scanner printers 665 and 666 can deal with printing and scanning job, respectively. Hereinafter, an abnormal occurrence job countermeasure operation will be explained with reference to the flow chart shown in FIG. 36. FIG. 36 is a flow chart showing an example of abnormal occurrence job countermeasure procedure in the server device according to the present invention. Numerals (1) to (10) represents steps.

For example, it is assumed that the host computer 661 requests the S/P server device 664 to execute a print job to the color scanner printer 665; the host computer 662 requests the entire system control program 93 to perform a print job and then is in a waiting state; and the host computer 663 requests the entire system control program 93 to perform a scan job and then is in a waiting state. If an abnormal state occurs in a printer portion of the color scanner printer 665 during printing (1), the S/P server device 664 examines whether it is difficult to recover the abnormal state (2). If the S/P server device SP1 judges that it is difficult to recover the abnormal state occurred in the color scanner printer 665, it immediately discards the error job (10) to select and execute the next operable job (9).

According to the present embodiment, an operable job represents a job except a print job done to the color scanner printer 665 in which an abnormal state occurs currently, that is, a scan job to the color scanner printer 665, a print job to the color scanner printer 666, a scan job to the color scanner printer 666, or a scan job to the color scanner printer 667. If there are plural operable jobs, the job is performed according to the following system.

If the S/P server device does not judge that the abnormal state occurring in the color scanner printer 665 is a fatal abnormal state, it executes a retrial process (refer to FIG. 37) to the color scanner printer 665.

The retrial is repeated up to N times (for example, 5 times) predetermined. When the color scanner printer 665 recovers from the abnormal state (or the retrial success) by the retrials of N times, the job is resumed (6). When the N times retrial cannot recover the abnormal state of the color scanner printer 665 (or fails), the S/P server device 664 examines whether there are other operable jobs (4). If there are no operable jobs, the S/P server device 664 executes M times (for example, once) the retrial process predetermined independently from the retrial number (5). If the retrial succeeds, the error job is resumed. If the retrial fails, it is judged again whether there are operable jobs (4). When there is operable jobs, the S/P server device 664 executes the job save of the error job (7); registers the error job as a job that an error has occurred on the way to processing (8); and executes the next operable job (9).

In the present embodiment, a job save is a process where information necessary for resuming job such as the status information of the S/P server 664 at an error job execution are stored, for example, in memory means (for example, hard disc); a memory in the S/P server device, or a program within the S/P server device.

Figure 37:
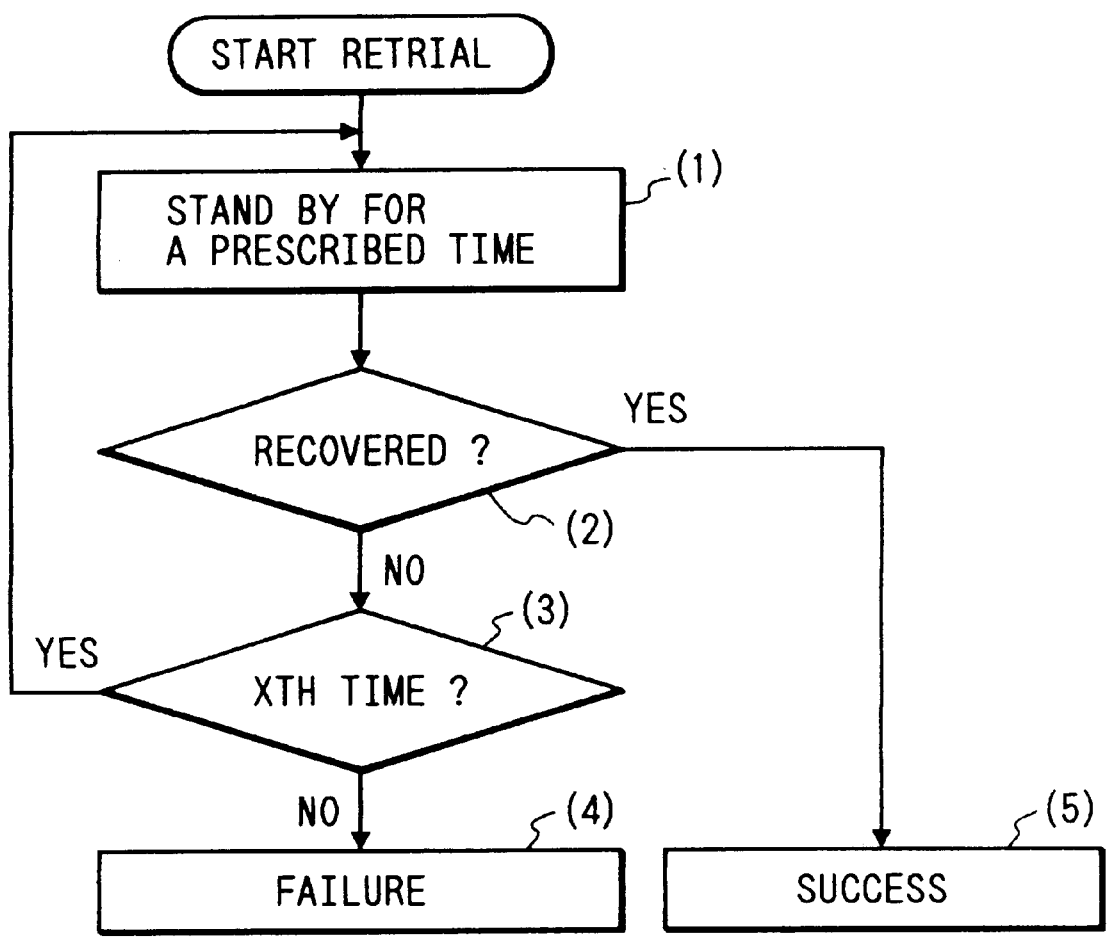
FIG. 37 is a flowchart illustrating an example of a procedure with which a retrial job is processed.

FIG. 37 is a flow chart showing an example of a retrial process procedure in the server device according to the present invention. Numerals (1) to (5) represents steps.

In the retrial process, it is examined whether the peripheral device in an abnormal state has been recovered the abnormal state (2) after waiting for a predetermined time (for example, 30 seconds) (1) and the process is repeated a predetermined times X (for example 5 times) (3). If the peripheral device is recovered from the abnormal state by the time the retrial is repeated the predetermined times, the retrial is judged to be succeeded. If the peripheral device is not recovered, it is judged that the retrial has been failed.

The multiprint control operation of the server device according to the present invention will be explained below.

The scanner/printer network server (SP network server) can be connectable to many devices including a color laser beam copying machine (CLC) constituted of a scanner and a printer,.a thermal jet color copying machine (BJC) constituted of a scanner and a printer, a bit map printer connected to a standard interface, a PDL printer (CaPSL, PS), and commercially available scanners. The host machine on a network can control the following various jobs to use freely these devices.

For example, it is assumed that a request which outputs a 10 page document from the host computer A to the color laser beam copying machine is sent to the SP network server; the host computer B produces a request which inputs a color manuscript through the scanner of a thermal jet color copying machine (BJC); and the host computer C produces a request which outputs to the PDL printer. In such a manner, the SP network server receives various requests from the host computer on the network to execute the following job control to deal with the requests (jobs). In the present embodiment, each of the print request and the scan request is called a job. For example, it is assumed that a request that outputs a three-page document described with the CaPSL code on the printer of the color laser beam copying machine (CLC) is a single job. Under the SP network server, only two jobs can be run at a time. However, running three or more jobs can be similarly controlled by expanding the control.

Explanation will be made below as for the job control operation in the server device according to the present invention with reference to FIGS. 38A to 38E.

FIGS. 38A to 38E is a timing chart used for explaining the job control state of the server device according to the present invention. The job process can be roughly classified into any one of the job controls 1 to 5 shown in FIGS. 38A to 38E by considering whether the SP network server prepares a hard disc for spool. For convenience in explanation, it is assumed that the jobs 1 and 2 a three-page print request or a three-scan request.

Job Control 1

Figure 38A:
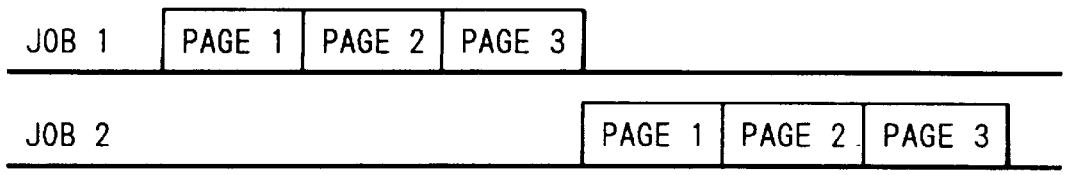
FIGS. 38A to 38E are timing charts illustrating a job control state in a server device according to the present invention.

The job control 1, as shown in FIG. 38A, executes the job previously requested and then spools the next job 2 in a hard disc, and activates the job 2 at the job completion time.

Job Control 2

Figure 38B:
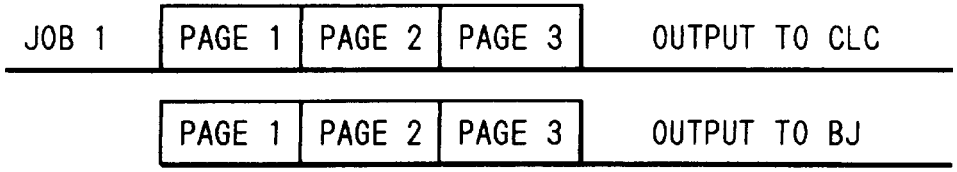

The job control 2, as shown in FIG. 38B, being a special case, corresponds to a control where two or more devices are operated with one job. For example, the situation corresponds to the image expanded in a memory output to the color laser beam copying machine (CLC) and a thermal jet color copying machine (BJC).

Job Control 3

Figure 38C:
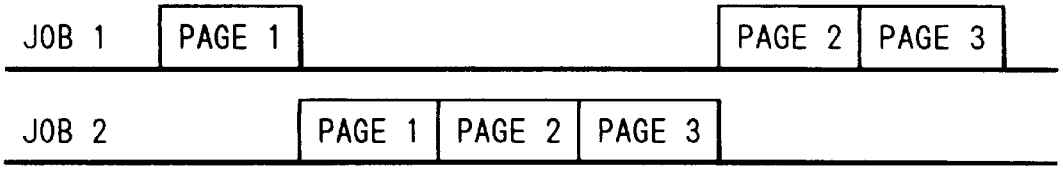

The job control 3, as shown in FIG. 38C, takes in a concept which considers page in a job. In this case, the printing is represented in a page unit of document and the scanner is represented in a scan unit of a page of manuscript. For example, when the job 2 is requested during executing the job 1, the job 1 is interrupted at a break of a page, whereby the job 2 is performed. In this case, the job 1 never run together with the job 2 at the same time.

Job Control 4

Figure 38D:
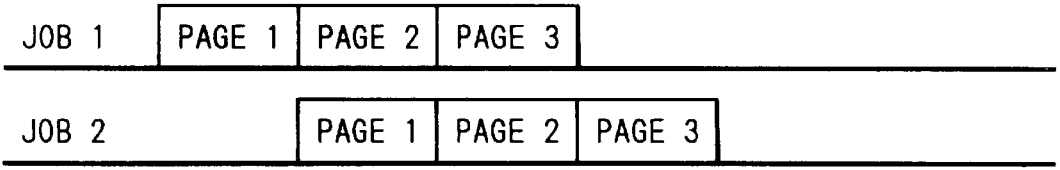

The job control 4, as shown in FIG. 38D, when being requested during executing the job 1, the job 2 is immediately executed with the job 1 operating.

Job Control 5

Figure 38E:
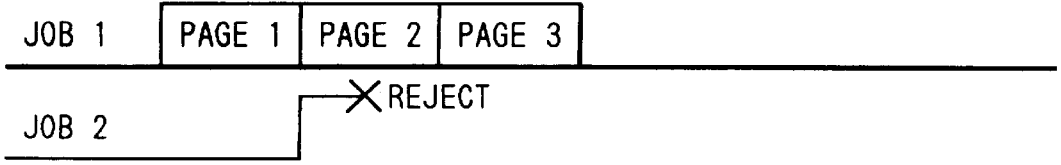

The job control 5, as shown in FIG. 38E, when being requested during executing the job 1, the job 2 is rejected.

In the case of the configuration of the server device shown in FIG. 1, the job is classified in the following items (1) to (7).

(1) Document is output to the printer of the color laser beam copying machine (CLC).
(2) A manuscript is read with a scanner of the color laser beam copying machine (CLC).
(3) Document is output to the printer of the thermal jet color copying machine (BJC).
(4) A manuscript is read with a scanner of the thermal jet color copying machine (BJC).
(5) Document is output to a printer including an interpreter of a commercially available page description language.
(6) Document is output to a commercially available bit map printer.
(7) A manuscript is read with a commercially available scanner.

The priority process of each job will be explained below.

According to the present embodiment, for example, when a scan job must be immediately performed during a printing job, three stages of the priorities 0 to 2 can be specified by interrupting the print job to execute the scanner job. The three stages includes the priority 0 representing no designation (fast-in fast-out), the priority 1 representing a priority interrupt designation in job unit, and the priority 2 representing a priority interrupt designation in page unit. Explanation will be made below as for the control operation of the SP manager in the server device according to the present invention with reference to FIG. 39.

Figure 39:
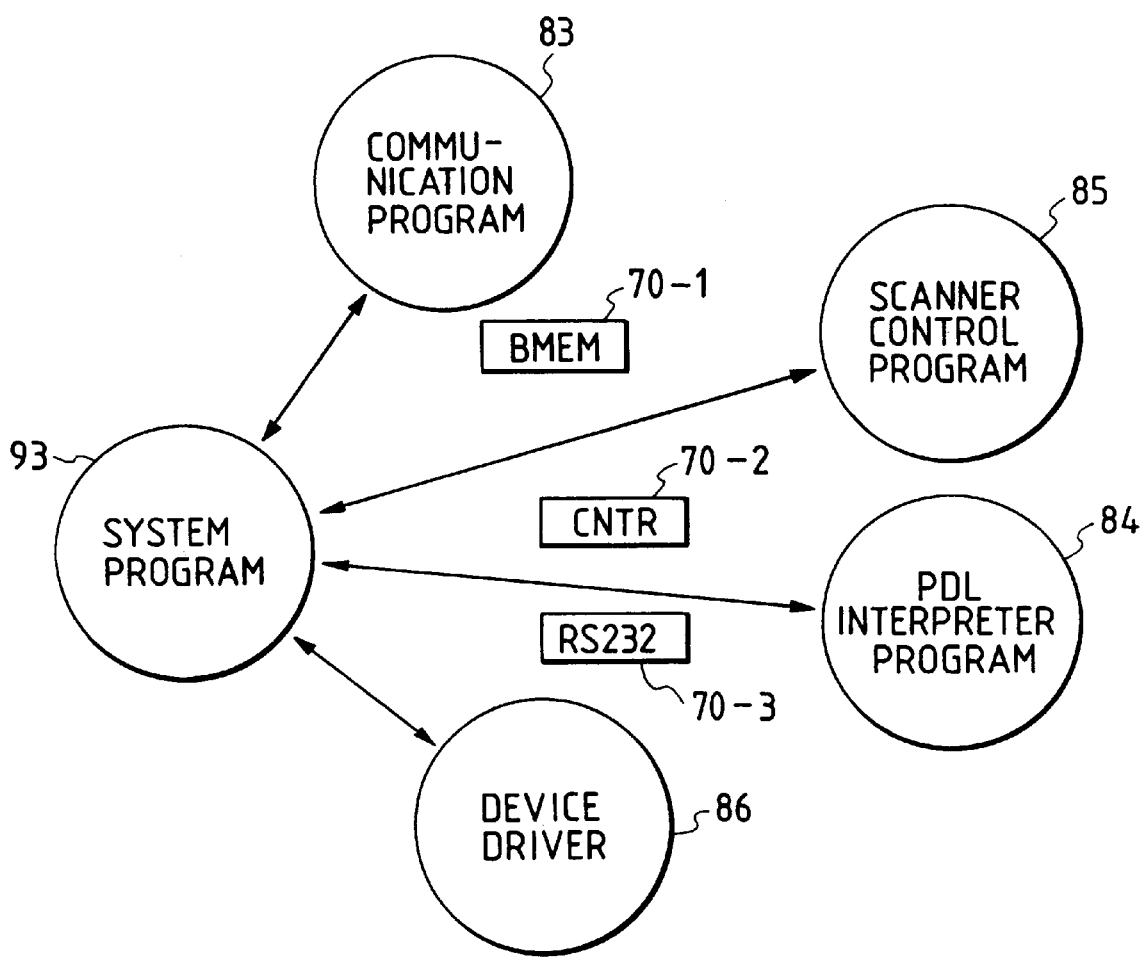
FIG. 39 is a view illustrating a processed state of a total system control program in a server device according to the present invention.

FIG. 39 is a diagram showing the control process status of the entire system control program 93 in the server device according to the present invention. In the present embodiment, the entire system control system 93 suitably controls the printer job with reference to the job priority and the job classification mainly sent from the host computer. The job management where a host computer on the network produces various requests to the SP network server will be explained below with the attached drawings.

First, the conceptual configuration of each program will be explained. As shown in FIG. 39, the program can be roughly classified into five programs including: the communication program 83 regarding communications; the entire system control program 93 controlling the entire SP network server; the scanner control program 85 controlling the scanner; the PDL interpreter program 84 regarding the print process (CaPSL interpreter); and device driver 86 actually controlling input/output devices. Moreover, there are as an actual data flowing interface the band memory (BMEM) 70-1, Centronics interface (CENTR) 70-2, and the RS232C interface (RS232) 70-3. The entire system control program 93 manages the above elements.

The entire system control program 93 basically runs based on events from four other programs. The event driven-type process is executed according to the flow chart shown in FIG. 40.

Figure 40:
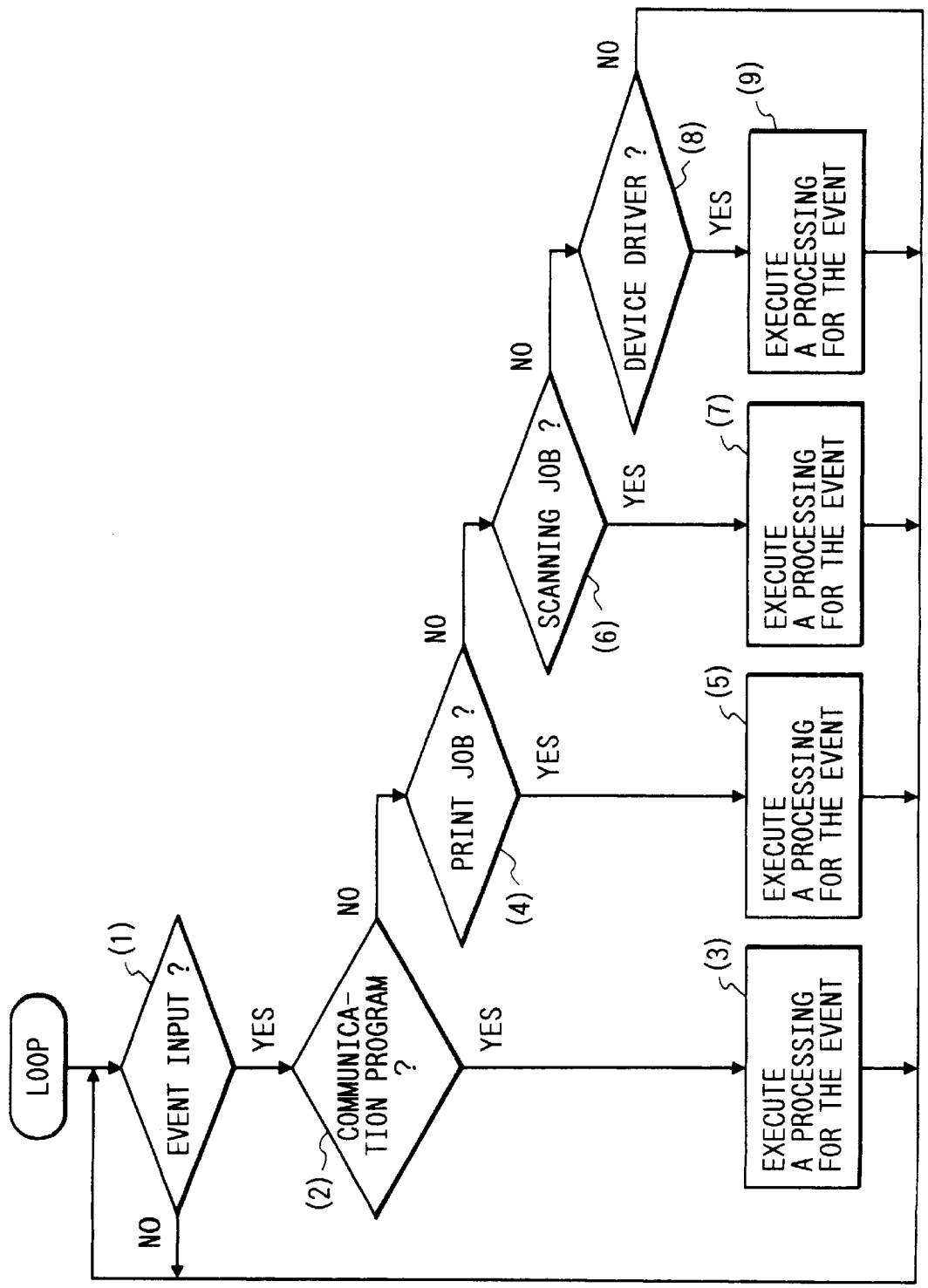
FIG. 40 is a flowchart illustrating an example of an event processing procedure performed by a total system control program shown in FIG. 39.

FIG. 40 is a flow chart showing an example of an event process procedure of the entire system control program 93 shown in FIG. 39. Numerals (1) to (9) represents steps.

First when the SP network server is powered on, the entire system control program is activated to make immediately an infinite loop in a waiting state. When the program starts to run, the situation becomes an event waiting state (1). When an event is input, the situation escapes from the loop. It is judged whether the event has come from the communication program 83 (2). If Yes, a process is performed corresponding to the event (3). Then the flow goes back to the step (1) to settle in an event waiting loop.

On the other hand, the judgment of the step (2) is No, it is judged whether the event issuance destination is the print job of the PDL interpreter program 84 (4). If Yes, a process is performed corresponding to the event (5).

On the other hand, the judgment of the step (4) is No, it is judged whether the event issuance destination is the scanner job of the scanner control program 85 (6). If Yes, a process is performed corresponding to the event (7).

On the other hand, if the judgment of the step (6) is No, it is judged whether the event issuance destination is the device driver 86 (8). If No, the process returns to the step (1). If Yes, a process is performed corresponding to the event (9) to return to the step (1).

The communication program 83 irregularly transmits various jobs including a job regarding the print of the color laser copying machine (CLC), a job regarding the scanner of the thermal jet color copying machine, and the like to the entire system control program 93. These plural jobs must be suitably distributed so far as the resources permit. The algorithm will be explained below with reference to FIG. 41.

Figures 41, 42:
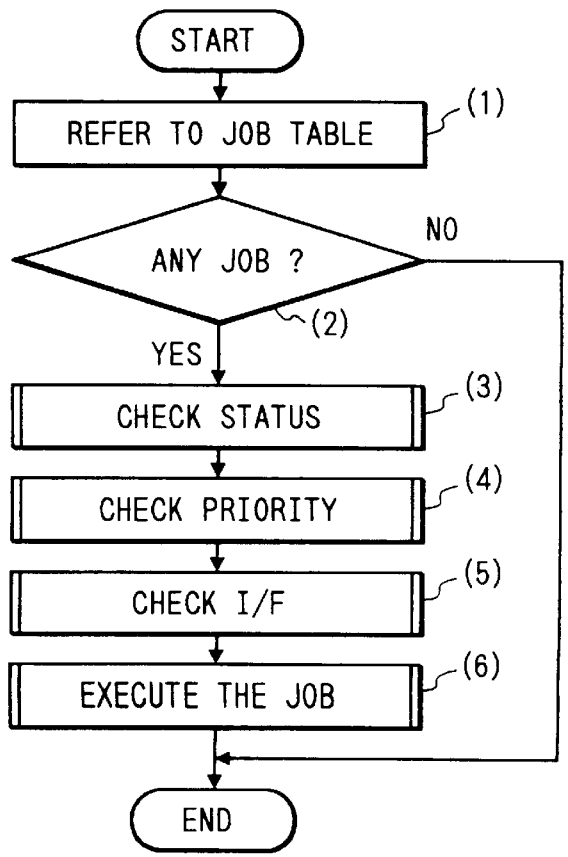
FIG. 41 is a view illustrating a job administration state in a server device according to the present invention.
FIG. 42 is a flowchart illustrating an example of a job execution procedure in a server device according to the present invention.

FIG. 41 is a diagram showing the job management status of the server device according to the present invention.

As shown in FIG. 41, a job table is used for the job management. The job table includes an ID to identify a job, a status showing a job state, a priority order to execute a job, a job kind, an end page, and an interrupt job ID.

ID represents a serial number or a job request accepting order. The status includes RUN indicating an execution, WAIT indicating a process waiting state, STOP indicating a stop state due to interruption, and ESTOP indicating a recovery waiting state after an error occurrence. The priority order includes LEVELs 0 to 2 including 0 usually indicating "no designation", 1 indicating "preferential interrupt in job unit" preferentially processed when some jobs are in a waiting state, and 3 indicating "interruption in page unit" processing the LEVEL 2 by interrupting the current job when there is a break in a page.

The interface, as shown in FIG. 39, indicating a hardware that the job uses, is arranged such that jobs can exclusively utilize the hardware. The job is CLCP for outputting document from the printer of the color laser copying machine (CLC), CLCS for reading a manuscript using a scanner of the color laser copying machine (CLC), BJP for delivering a manuscript using a printer of the thermal jet color printer, BJS for delivering a manuscript using a scanner of the thermal jet color printer, PDLP for delivering document to a printer included in a commercially available page description language interpreter, BITP for delivering document to a commercially available bit map printer, or a job for reading a manuscript using a commercially available scanner. The number of the page on which the job has completed is recorded on the end page. If an error occurs, the record is used to judge that from what page the process is resumed after an error recovery. The final interrupt job ID is used to judge whether the interrupt job has been terminated. If the job has been terminated, the job during STP is resumed.

Referring to the job table storing in the above information, the entire system control program 93 judges suitably whether any one of the following jobs is activated.

The job execution process operation of the server device according to the present invention will be explained below with reference to the flow chart shown in FIG. 42.

FIG. 42 is a flow chart showing an example of the job execution process procedure in the server according to the present invention. Numerals (1) to (6) represent steps.

The timing when the control is shifted to the flow is described next. (1) The control shifts to the flow at fixed intervals in an idle state while an event does not enter the entire system control program 93. If the job table does not include any job, the situation returns to an idle state. (2) There is an event from the communication program 83. (3) There is an event of page termination or an event of a document termination from the PDL interpreter program 84 and the scanner control program 85. (4) There is an event of error from the device driver 86.

First the job table shown in FIG. 41 is referred in the step (1). Next, in the step (2), it is judged whether there is a job. When there is no job to be executed, the flow returns to the step (7). Then the entire system control program 93 become an idle state. When there is a job to be executed, some operable job candidates are selected in the step (3). In the step (4), a single job is finally selected in consideration with the priority order of the job candidates. Furthermore, it is judged whether the interface to be used for the job finally selected in the step (5) is empty. In the step (6), the job is actually performed and then the process is terminated.

The operation of the status check process in the server device according to the present invention will be explained below, with reference to the flow chart shown in FIG. 43.

Figure 43:
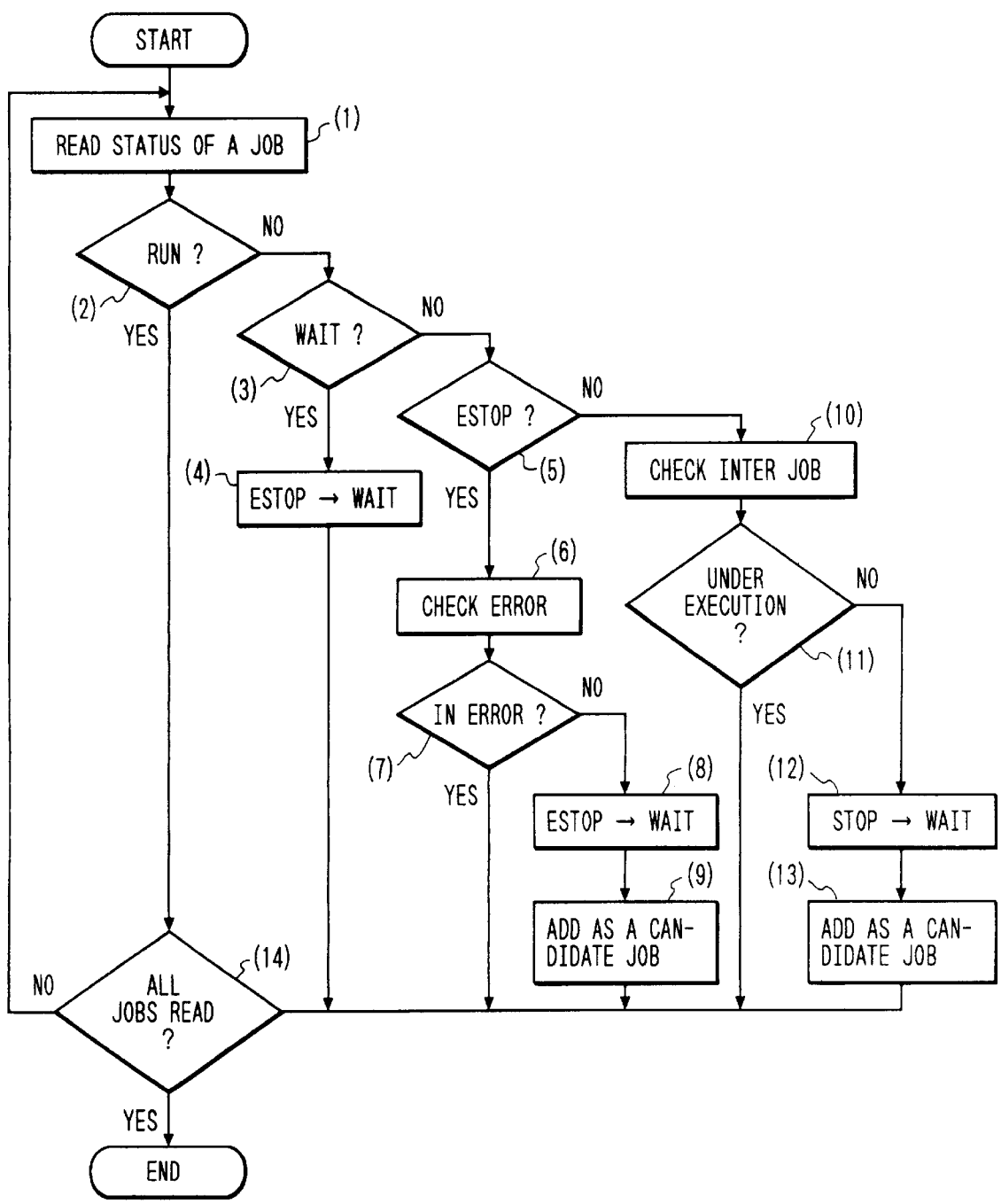
FIG. 43 is a flowchart illustrating an example of a status check procedure in a server device according to the present invention.

FIG. 43 is a flow chart showing an example of the status check process procedure in the server device according to the present invention. Numerals (1) to (14) represent steps.

First, in the step (1), a job status is read out of the job table. In the step (2), it is judged whether the job status is RUN. If RUN, the flow is shifted to the step (14) to judge whether all jobs in the job table have been read up. If some jobs remain unprocessed, the flow goes to the step (1) to read the next job status. If not RUN, the flow goes back to the step (3). In the step (3), it is judged whether the job status is WAIT. If WAIT, it is picked up as an operable job candidate in the step (14) and then the flow goes to the step (14). If not WAIT, it is judged whether the job status is ESOP. If the job status is ESOP, the job is interrupted due to an error occurrence. Hence, it is judged whether the error causing the job interruption is removed in the step (6). The step (7) is a branch for judging whether the job is in an erroneous state. If the job is still in the erroneous state, the flow goes to the step (14) without picking up an operable job candidate. When the error is removed, the status of the job in the job table is rewritten from ESTOP to WAIT. In the step (9), the written job is picked up as an operable job candidate. When the status is not ESTOP in the step (5), the status of the job which interrupts in the step (10) is checked because the flow is in STOP state being interrupted by another job. In the-step (11), it is judged whether the interrupting job is in execution. If the job is being executed, the flow goes to the step (14) without picking up the operable job candidate. If the job is not being executed, the flow goes to the step (12) to rewrite the job in the table from STOP to WAIT. Thus the job is picked up as a job candidate operable in the step (13). Finally when all jobs have been read (14), the status checking is completed. In such a manner, plural operable job candidates are selected.

Explanation will be made below as for the priority checking operation in the server device according to the present invention with reference to the flow chart shown in FIG. 44.

Figure 44:
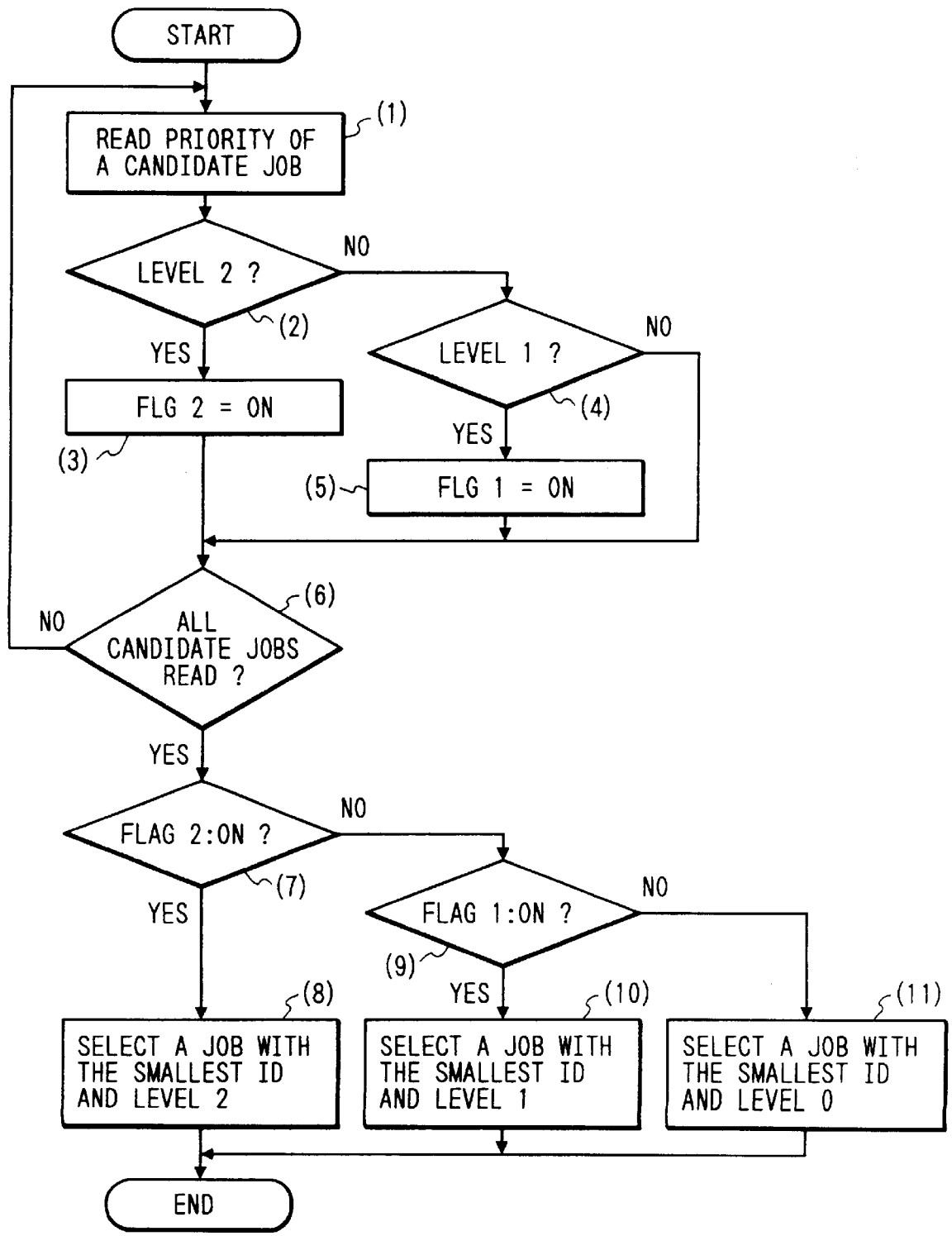
FIG. 44 is a flowchart illustrating an example of a status check procedure with a top priority order in a server device according to the present invention.

FIG. 44 is a flow chart showing an example of the priority checking procedure in the server device according to the present invention. Numerals (1) to (11) represent steps. In the present embodiment, only one job is finally selected in consideration of the priority of the job candidates.

In the step (1), the priority is read to one of the plural operable job candidates. In the step (2), it is judged whether the priority is the LEVEL 2. If LEVEL 2, the flow goes to the step (3) to set a flag FLG2 representing whether the job of the LEVEL2 exists. If not LEVEL2, the flow goes to the step (4) to judge whether the priority is LEVEL1. If LEVEL1, the flow goes to the step (5) to set a flag FLG1 representing whether the job of the LEVEL1 exists. If the priority is not LEVEL1, it becomes LEVEL0. That is, when neither or the FLG2 and FLG1 are set, the priority becomes the LEVEL0.

When the priority of one job has been completely judged, the flow goes to the step (6) to judge whether all job candidates have been checked. If the checking has not been completed, the flow goes to the step (1) to judge the next job. If the checking has been completed, the flow goes to the step (7). When the flag FLG2 is set, the flow goes to the step (8) to select a job with a priority of LEVEL2 and a small ID (accepted at earlier job request).

In the similar manner, a job with a priority LEVEL1 and a small ID is selected in the steps (9) and (10). In the step (11), a job with a priority LEVEL0 and a small ID is selected. Then the priority checking is finished.

As described above, only one next operable job can be selected. Even if an operable job is determined, the relationship between the job and the interface must be examined because the status of the interface determines the actual activation.

The interface checking operation in the server device according to the present invention will be explained below with reference to the flow chart shown in FIG. 45.

Figure 45:
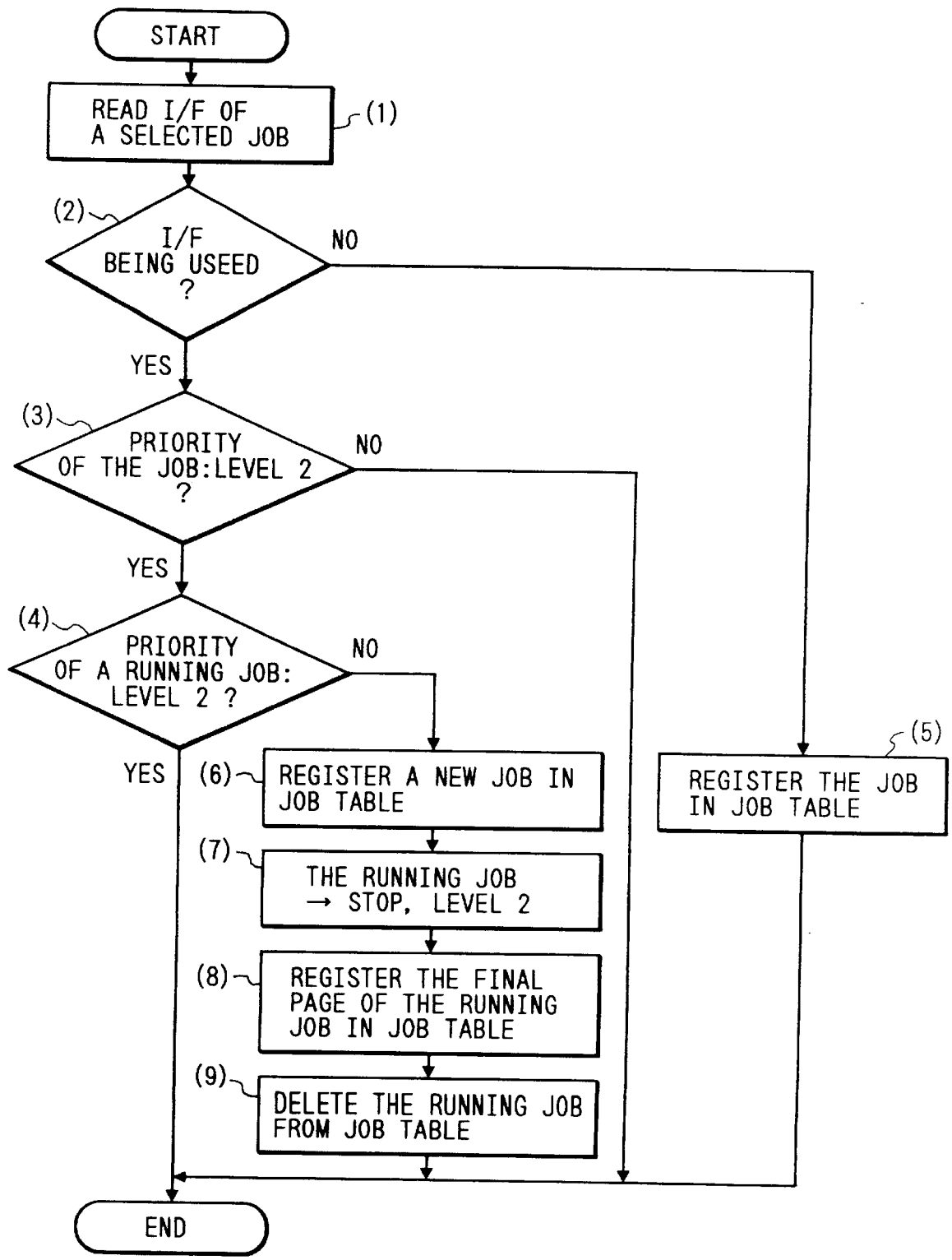
FIG. 45 is a flowchart illustrating an example of a interface check procedure in a server device according to the present invention.

FIG. 45 is a flow chart showing an example of the interface checking procedure in the server device according to the present invention shown in FIG. 45. Numerals (1) to (9) represent steps.

In the step (1), the interface of the job finally selected is read from the job table. The status of the interface is checked in the step (2). If the interface is not in use, the flow goes to the step (5) to register the job in the execution job table. The execution job table being a table representing an actually activated job can be run with a multi-job mode to register plural jobs.

The job process in the step (6) is activated with reference to the execution job table.

When the interface is in use, the flow goes to the step (3) to check the job priority. If the priority is not LEVEL2, the current job cannot be interrupted so that the process is ended without registering the execution job table. When the priority is LEVEL2 in the step (3), the step (4) judges whether the job of the current status RUN is LEVEL2. Since the job of RUN in LEVEL2 cannot interrupt the current job, the process is terminated without registering the selected job on the execution job table.

On the other hand, when the priority of the current job (status RUN) is LEVEL1 or LEVEL2, the current job is interrupted to activate a newly selected job. In this case, the flow goes to the step (6) to register the job selected in the step (4) in the execution job table. In the step (7), the current job is set to the status of STOP and the priority of LEVEL2 to execute preferentially when the job is recovered.

In the step (8), the number of end page is written in the job table to record that how many pages the current job has processed. Moreover, in the step (9), the current job is deleted from the execution job table. The current job is not activated while the status becomes STOP to wait for re-activating the job. Thus the interface checking is terminated.

Explanation will be made below regarding the job activation process operation in the server device according to the present invention with reference to the flow chart shown in FIG. 46.

Figure 46:
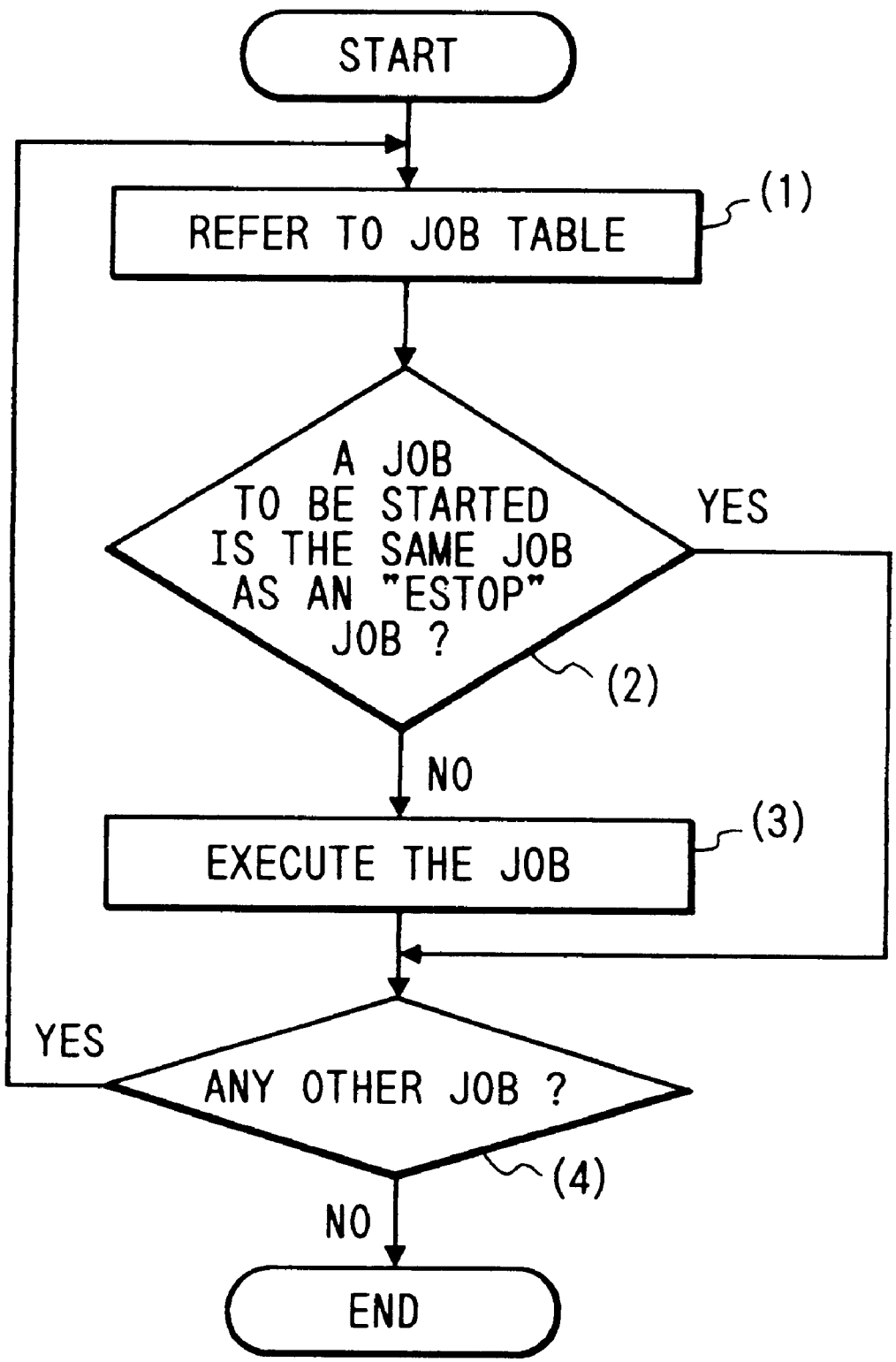
FIG. 46 is a flowchart illustrating an example of a job initiation procedure in a server device according to the present invention.

FIG. 46 is a flow chart showing an example of the job activation process procedure in the server device according to the present invention shown in FIG. 46. Numerals (1) to (4) represents steps.

In the step (1), the job to be activated is first read with reference to the execution job table. In the step (2), it is judged whether the job to be activated later resembles the job being in an error stop in the status ESTOP. Since the job being of the same kind cannot be activated, the flow goes to the step (4) to judge whether the execution job table have been completely read. If not so, the flow goes to the step (1) to activate the next job. If the job in an error stop is of a different kind, the flow goes to the step (3) to activate the job. When an actual job is activated, the status is changed from WAIT to RUN to ensure the interface. On contrary, when an error stop or an interruption stops the process, the interface is released.

It is judged whether a job is left in the execution job table in the step (4). If there is no job to be activated, the job activation process is ended.

A job process operation in the server device according to the present invention will be explained in concrete with reference to FIGS. 47 to 57.

Figure 47:
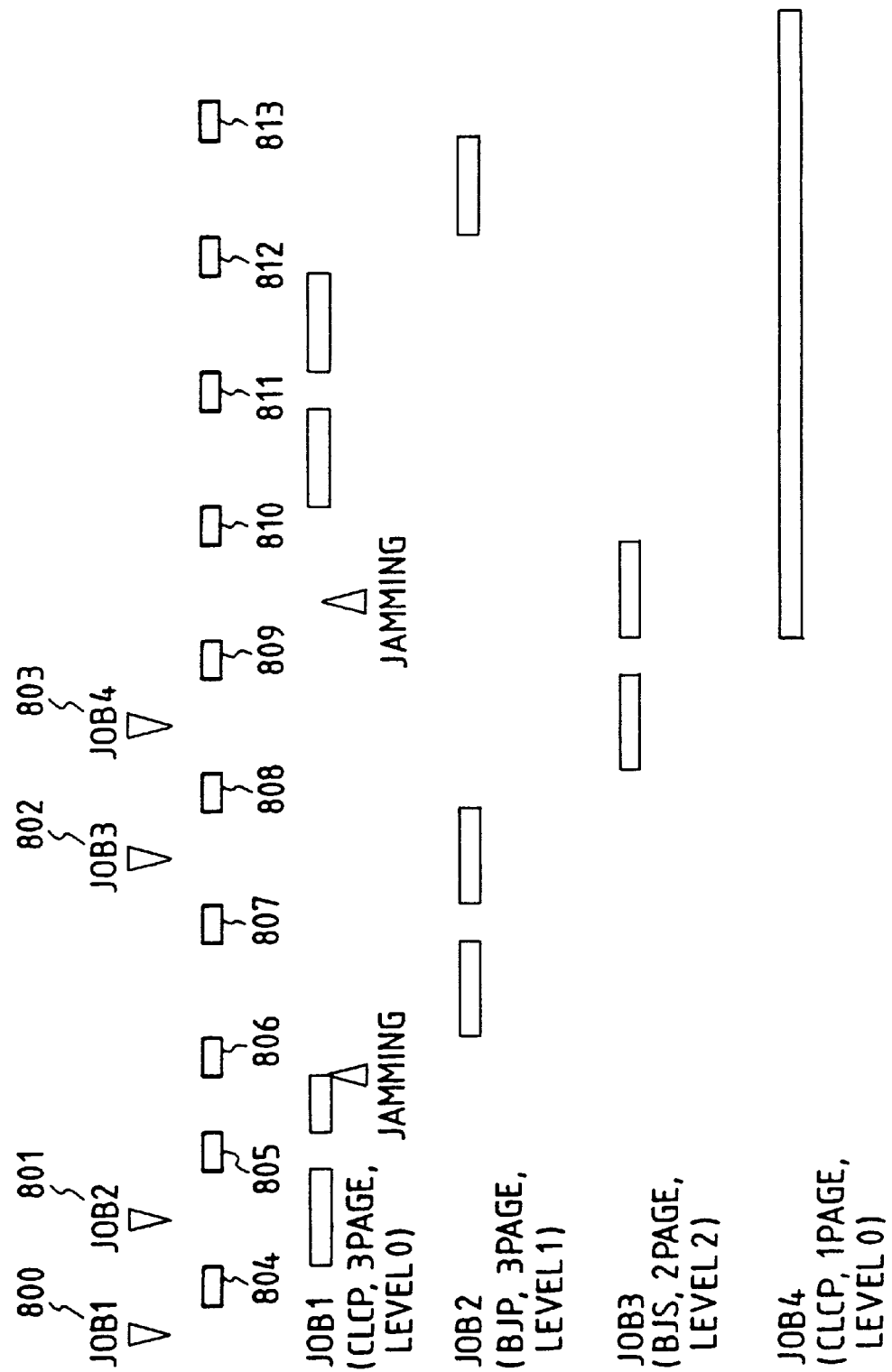
FIG. 47 is a timing chart illustrating a job processing transfer state in a server device according to the present invention.

FIG. 47 is a timing chart showing the changes of the job process status in the server device according to the present invention. In the figure, it is assumed that time passes in the right direction along the axis of abscissa.

In FIG. 47, numerals 801 to 813 represents a job table checking timing. The timings 800 to 803 respectively represent a timing that a job event enters from the communication program 83 to the entire system control program 93. The timings 804 to 813 respectively correspond to a job table checking timing.

Figures 57, 58:
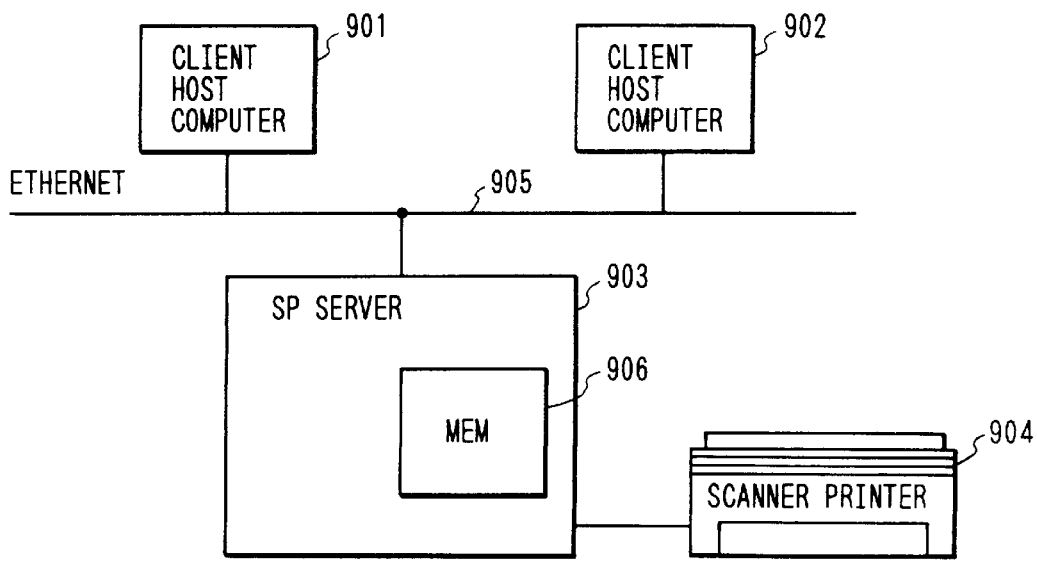
FIG. 57 is a table illustrating a content of a job table in response to a job processing in a server device according to the present invention.
FIG. 58 is a block diagram illustrating a structure of a server device of the second embodiment according to the present invention.

FIGS. 48 to 57 respectively are a diagram showing the content of the job table accompanying the job process in the server device according to the present invention. FIGS. 48 and 57 respectively correspond to the job table at the timings 804 to 813. The job table shows the content immediately before checking. The job is CLCP for delivering document from the printer of a color laser copying machine (CLC), CLCS for reading a manuscript through the scanner of a color laser copying machine (CLC), BJP for delivering document to the printer of the thermal jet color copying machine, BJS for reading a manuscript through the scanner of the thermal jet color copying machine, PDLP for delivering document to the printer including a commercially available page description language interpreter, BITP for delivering document to a commercially available bit map printer, or a job reading a manuscript through a commercially available scanner.

A job event enters at the timing 800. The content is a job 1 (the content of CLCP) which outputs document to the printer of the color laser copying machine (CLC) and includes an output page number of 3 pages, a priority of LEVEL0, and an interface BMEM. In the job table JOBT, the ID "25" shown in FIG. 48 is allocated, the status is WAIT, and the end page is 0 page because of no process.

In the job table checking at the timing 804, ID25 job is selected and activated. Then the status of the ID25 job is changed to RUN. A new job enters at the timing 801. When one page processing in the ID25 job has been completed, the entire system control program 93 examines again the job table. FIG. 49 is the corresponding job table JOBT, showing the status where the job of ID25 waits for processing the next page after a complete delivery of one page. The end page changes from 0 page to 1 page. A newly entered job is allocated with the ID26. The status is WAIT with the priority of LEVEL1. The interface is BMEM and the job is BJP. The entire system control program 93 judges with reference to the job table JOBT to activate to process 2 page of the ID25 job.

At this time, it is assumed that the ID25 job cannot be continued because a paper jam occurs in the printer on the way to printing the 2 page. The entire system control program 93 searches the next job to be activated with reference to the job table JOBT shown in FIG. 50. The status of ID25 is ESTOP. The priority is LEVEL2 to execute preferentially at a recovery time. The end page remains to be 1 page. Then the entire system control program 93 activates the job of ID26. When the ID26 job terminates the process of 1 page, the entire system control program 93 goes to the check 807 of the job table JOBT. This situation is shown in FIG. 51. The ID25 job is not activated because the error has not been recovered after the error checking. Then the entire system control program 93 requests the PDL interpreter program 84 to process the 2 page of the ID26 job.

While the job of ID26 is processing 2 page, a new job event enters the entire system control program. The content means reading the manuscript of 2 page by means of the scanner of the thermal jet color copying machine. When the job of ID26 has completely processed 2 page, the entire system control program 93 checks the job table JOBT, as shown in FIG. 52.

ID25 remains as it is because of no error recovery. When the job of ID26 has completed the 2 page processing, the end page changes to 2. Moreover a new job is allocated to ID27. Since the ID27 job has a priority of LEVEL2, the entire system control program 93 interrupts the ID26 job during currently operating to activate the ID27 job. In the ID26 job, the status becomes STOP and the priority becomes LEVEL2.

While the scanner control program 85 read a manuscript of 1 page, a new job event enters the entire system control program 93 at the timing 803. When the 1 page reading has completed, the entire system control program 93 checks the job table shown in FIG. 53 at the timing 809. The ID25 job remains ESTOP because the error state is not recovered. The ID26 has a status of STOP and an interrupt job ID of 27. Therefore, when the ID27 job is checked, the status cannot be resumed as it is in a RUN state. Thus ID28 is allocated to a newly entered job. The ID28, which a job where data enters a commercially available printer through a centronics interface, can be simultaneously run together with the currently activated job. The entire system control program 93 simultaneously activates the jobs which scan the second pages of the ID27 and ID28.

Next the entire system control program 93 goes to the job table JOBT checking (timing 810). The job table JOBT is shown in FIG. 54. Since the error of the job ID25 is removed prior to the job table JOBT checking (timing 810), the status returns to WAIT after error checking.

Since the interrupted ID27 job has completed, the status of the ID26 job returns to WAIT. However the ID28 job remains to be in RUN state. The entire system control program 93 activates the job of the ID25 or ID26 because the interface BMEM is empty. Since either job has a status of WAIT as well as a priority of LEVEL2, the precedently accepted job of ID25 is activated. In this case, since the end page is 1 page, the ID25 job must deliver a request to the PDL interpreter program 84 to start the process from the second page.

The job table JOBT checking (timing 811) follows the table shown in FIG. 55. In the ID25 job as well as the ID28 job, the status is RUN. In the ID26 job, the status is WAIT. The ID26 job has a priority of LEVEL2 and can interrupt to the currently activating job. However, since the ID25 is activated with LEVEL2, the ID26 cannot perform an interruption.

The process goes to the job table JOBT checking (timing 812) shown in FIG. 56. The ID25 job, already completed, is deleted from the job table JOBT. The entire system control program 93 activates from the third page of the ID26 job.

In the job table JOBT checking (timing 813), since the ID 28 job, as shown in FIG. 57, is running, the entire system control program 93 does not activate a new job.

As described above, the entire system control program 93 executes a suitable job management with reference to the job table JOBT.

In the above embodiment, after the host computer edits letters, drawings, and images, a print request communicated via the network is processed on the server device which drives a scanner/printer to deliver the result from the printer. However, as shown in FIG. 58, in the system where the SP server device 903, which drives the client host computers 901 and 902 and the scanner printer 904, is connected via the network 905, the SP server device 903 may synthetically edit various information such as letters and drawings transferred from the client host computers 901 and 902 to deliver the combined output.

FIG. 58 is a block diagram used for explaining the configuration of the server device showing the second embodiment of the present invention.

In FIG. 58, the memory device 906 in arranged within the SP server 903 to store various information such as letters and drawings transferred from the client host computers 901 and 902.

In the server device with such a structure, the processing load to the image information output from each host computer can be released and the stored image information can be effectively re-utilized because the memory means (memory device 906) arranged on the main body or the network stores the first image information delivered from the image processor or the second image information delivered from each host computer connected to a predetermined network.

Since the image synthesis means synthesizes the first and second image information stored in the memory means (memory device 906) to deliver the resultant output (the scanner printer 904 in the present embodiment), the image editing load on each host computer can be released.

In the present embodiment, an operator produces letter information and drawing information on the client host computers 901 and 902, for example, with a word processor or based on the graphic software. The information (first image information) regarding produced letters, drawings, or the like is transmitted to the SP server device 903 via the network 905. The information regarding letters and drawings received in the SP server device 903 is stored in the memory device 903 within the SP server device 906.

Figure 59:
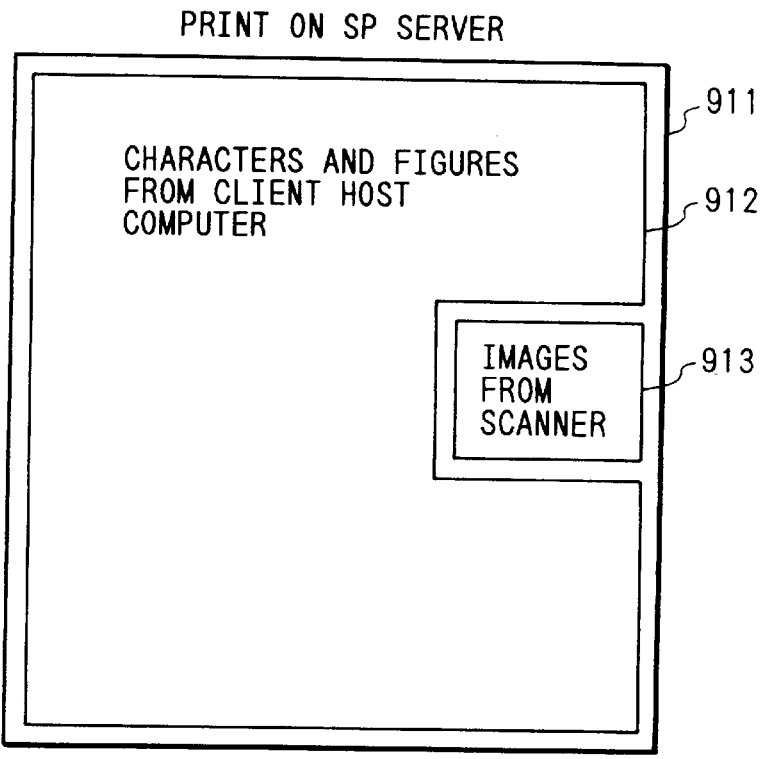
FIG. 59 is an explanatory view illustrating a printed layout synthesized by an SP server device shown in FIG. 58.

The image information (second image information) scanned with the scanner printer 904 is stored in the memory within the SP server device 903. As shown in FIG. 59, using the page description language operating on the SP server device, the information regarding letters, drawings and images (image data) are synthesized in the memory device 906 within the SP server device 903.

FIG. 59 is a model diagram showing a print layout synthesized using the SP server device, as shown in FIG. 58.

In figure, numeral 911 represents a one page region. The transfer information 911 regarding letters, drawings transferred from the client host computers 901 and 902 via the network 905, or the like, as well as image information 913 scanned by the scanner printer 904 controlled by the SP server 903 are allocated in the region 911 according to the layout information. The synthesized information can be output from the printer of the SP server device 903.

The scanner printer 904 controlled by the SP server device 903 may be constructed as a discrete configuration independent of the scanner and the printer. In order to perform a printing, the memory device 906 in the SP server device 903 successively reads in the image information read using the scanner in the scanner printer 904 to synthesize with the information letters and drawing sent from the client host computers 901 and 902. Instead, when another memory device with large memory capacity, or a magnetic optical disc device, is connected to the SP server 903, an image database can be constructed by sequentially memorizing scan images in the large memory device so that the image can be arbitrarily read out of the large memory device printed to print the image by synthesizing the letters and drawing information. Furthermore, when the large memory device is arranged independently of the memory device 906 of the SP server device 903, it is not necessary to directly connect the large memory device to the SP server device 903. The client host computers 901 and 902 may have a different configuration to transfer information to the SP server device 903.

In the following, there will be described I/O control operation in a server (information I/O controller) according to the present invention with reference to FIGS. 60A to 61B.

Figure 60B:
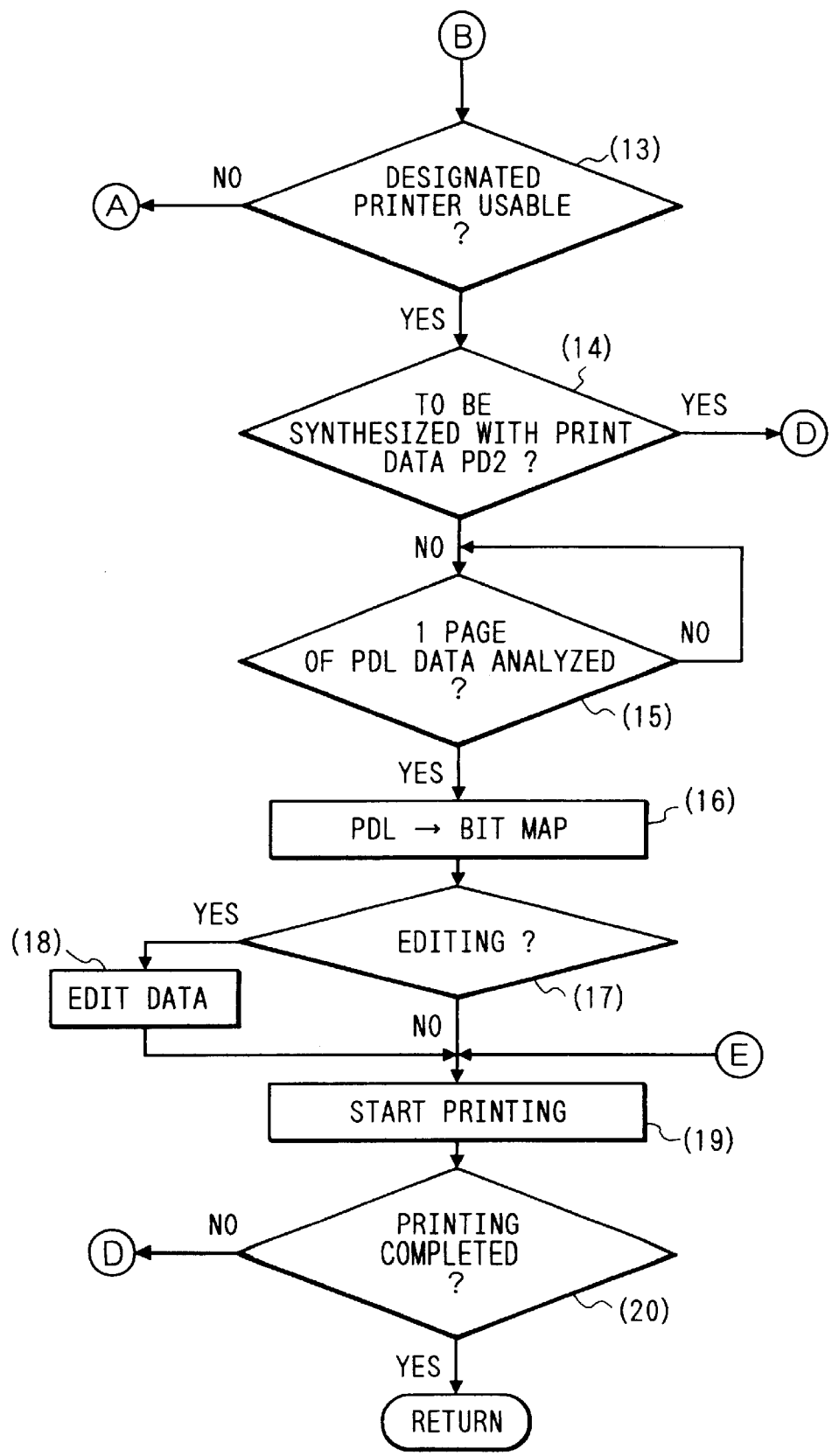

Referring to FIGS. 60A and 60B, there is depicted a flowchart exemplarily illustrating a first I/O control procedure in the server according to the present invention. Designated at (1) to (20) are respective steps of the procedure, each of which corresponds to a case where PDL data from each host computer is outputted from a designated printer, and is executed by the control of the CPU 1000 illustrated in FIG. 9 on the basis of a program stored in the ROM 1002 which will be described later.

The CPU 1000, as receiving a printing command from any host computer connected with a LAN 96 in step (1), temporarily stores the received PDL data in the buffer memory 1005 in step (2), and analyzes printing conditions following the stored PDL data in step (3). The CPU 1000 judges whether a printing object is only the PDL data from the host computer or is synthesized data of the PDL data and image data incorporated from the scanner in step (4), and in the case of the synthesis with the scanner data judges whether or not the scanner reading, through an interface with the connected scanner in step (5), and if it is no, then the CPU 1000 informs the host computer of that fact in step (7), and the CPU 1000, after receiving the subsequent information in step (8), returns. If it is yes, then the CPU 1000 starts scanning in step (6), and the CPU 1000 after completing the reading of the original in step (9), applying, if editing is designated, trimming masking, and color conversion for example to the read original in step (10). As the editing is completed in step (11), the CPU 1000 judges whether or not it is designated to synthesize the original with printing data inputted through the host computer in step (12). If it is no, then the CPU 1000 advances to step (19), where the CPU 1000 starts a printing processing with a designated printer in step (19), and the CPU 1000, after the printing is completed, judges whether or not all the printing processing is completed in step (20). If it is yes, then the CPU 1000 returns, while it is no, then the CPU 1000 returns to step (1) for repeating the respective processings.

In contrast, if it is no in the judgement of step (12), then the CPU 1000 judges whether or not the designated printer is useable in step (13), and if it is no, then the CPU 1000 returns to step (7) to inform the host computer of the status of the printer, while if it is yes, then the CPU 1000 judges whether or not it is designated to synthesize the original with the printing data PD2 from another host computer in step (14). If it is yes, then the CPU 1000 returns to step (1) while if it is no, then the CPU 1000 waits until the PDL analysis corresponding to one page is completed in step (15), and thereafter the CPU 1000 converts the PDL to a bit map (in the unit of a band for example) in step (16) and judges whether or not the editing is designated in step (17). If it is yes, then the CPU 1000 edits already read scanning data SD and the printing data PD in step (18) and starts printing with a designated printer in step (19), and the CPU 1000 judges whether or not the printing data PD corresponding to one page has been completed to be outputted in step (20). If it is no, then the CPU 1000 returns to step (1), while if it is no, then the CPU 1000 returns.

Although in the above-described embodiment the description was done for the control of the case where either the scanner data SD incorporated from the scanner or the printing data PD received from the host computer, or combined data thereof (scanner data SD+printing data PD) is outputted from a designated printer, provided a plurality of scanners and printers are available, further combined output data (for example, scanner data SD1+scanner data SD", printing data PD1+printing data PD2, scanner data SD1 printing data PD1+printing data PD2, and so on) is inputted with ease from a designated printer.

Figure 61B:
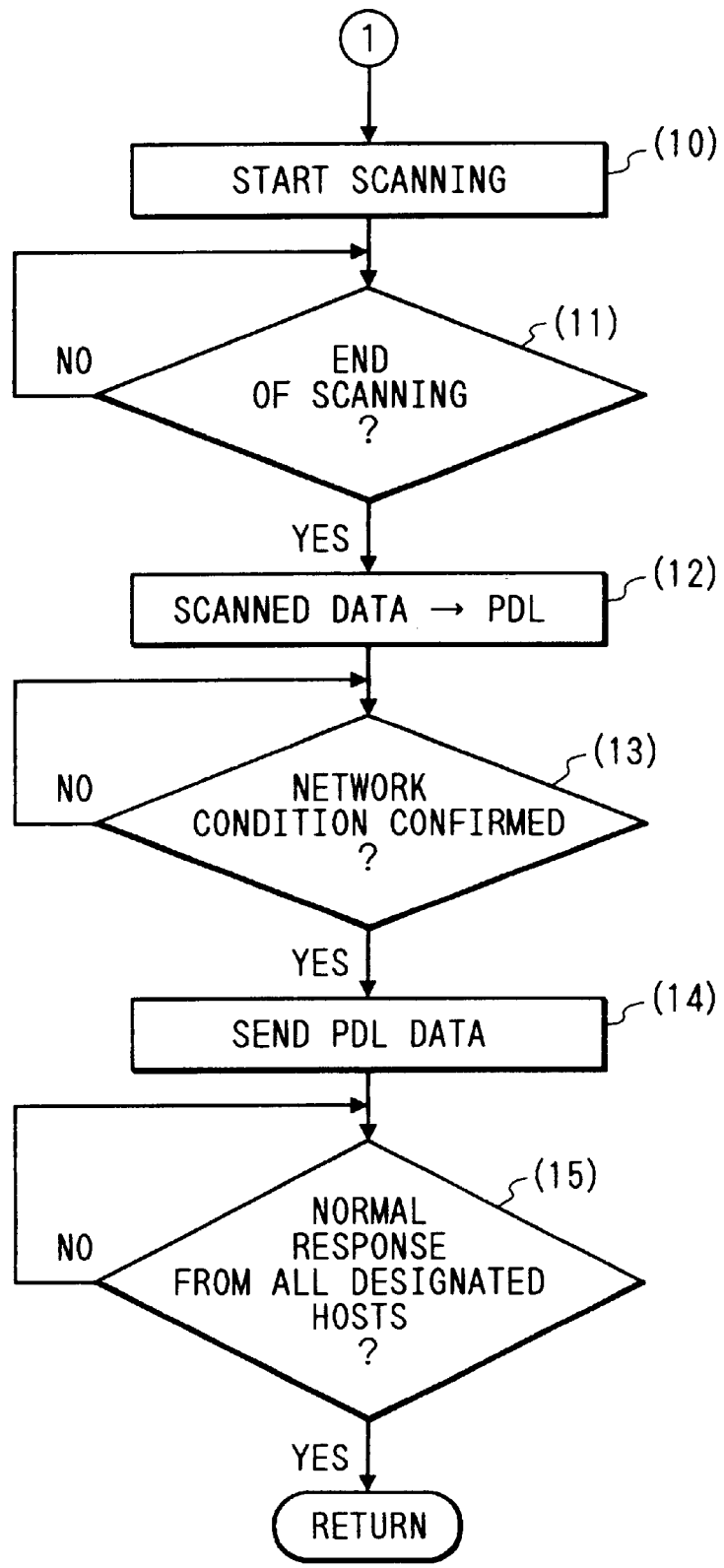
FIG. 61 is comprised of FIGS. 61A and 61B showing flow charts illustrating an example of the second input/output control procedure in a server device according to the present invention.

Referring to FIGS. 61A and 61B, there is depicted a flowchart exemplarily illustrating the second I/O control procedure in the server according to the present invention. Designated at (1) to (15) are respective steps of the procedure, which correspond to the case where image information (scanner data SD) incorporated from a designated scanner following a designation from each host computer is outputted from a designated host computer, and which are executed by the control of the CPU 1000 illustrated in FIG. 9 on the basis of each program stored in the ROM 1002 which program will be described later.

The CPU 1000, as receiving a scanner command from any host computer connected with the LAN 96 in step (1), analyzes the name of the host computer in step (2), and judges whether or not an answer host computer has been designated in step (3). If it is yes, then the CPU 1000 registers the names of a plurality of host computers (including the host computer which inputs the scanner command, i.e., the name of the self-host computer designated in a multiple answer host computer name table in step (5), and if it is no, then the CPU 1000 registers the name of the self-host computer in the answer host computer name table in step (4). The CPU 1000 successively analyzes scanner designation destination in step (5) to investigate through an interface whether or not a designated scanner is enabled in step (7). If the designated scanner is disabled (because of a power supply being not inputted, and other reasons), then the CPU 1000 informs the host computer of the status of the scanner in step (8), and waits a subsequent instruction input in step (9), and returns after the instruction is inputted.

In contrast, if the designated scanner is enables in the judgement of step (7), then the CPU 1000 starts scanning of an original in step (10), and after the scanning is completed in step (11), the CPU 1000 converts the scanning data to the PDL in step (12). Further, the CPU 1000, after confirming the statuses of networks connected with the host computers, refers to each table in which the names of the host computers have been registered in step (4) and (5) to transmit the completed data through the LAN96 in step (14) and wait until the CPU 1000 is informed of a normal answer from the designated host computer in step (15), and threafter complete the processing.

Although in the above-described embodiment the description was done for the case where it is premised on the assumption that the host computer designated as the transfer destination of the scanner data SD is enabled for communication, another modifications may be contemplated wherein provided a network board (its specifications are different for each host computer not shown) mounted on a designated host computer is in an environment capable of driving an external memory device, the external memory device is constructed for spooling to inform a user of the presence of reception of the scanner data upon the host computer being build up or wherein the scanner data SD is temporarily stored in a hard disk connected with the side of a CPU board until communication with the designated host computer is enabled, and at the time the communication with the host computer is enabled, the CPU 1000 transfers the incorporated scanner data SD to the designated host computer with reference to the aforementioned tables. Otherwise, in the case where a plurality of scanners are controlled as the scanner data SD to be transferred, scanner data SD1, SD2, . . . , SDN from the respective scanners may be transferred to designated host computers. Hereby, in the case where the processing is with image information (color image information for example) which can not be processed with an application on a host computer which issues a scanner request, or in the case where although such image information can be processed, a processing speed is very low, transfer destination is freely changeable and the processing is facilitated with various applications included in available host computers.

Figure 62:
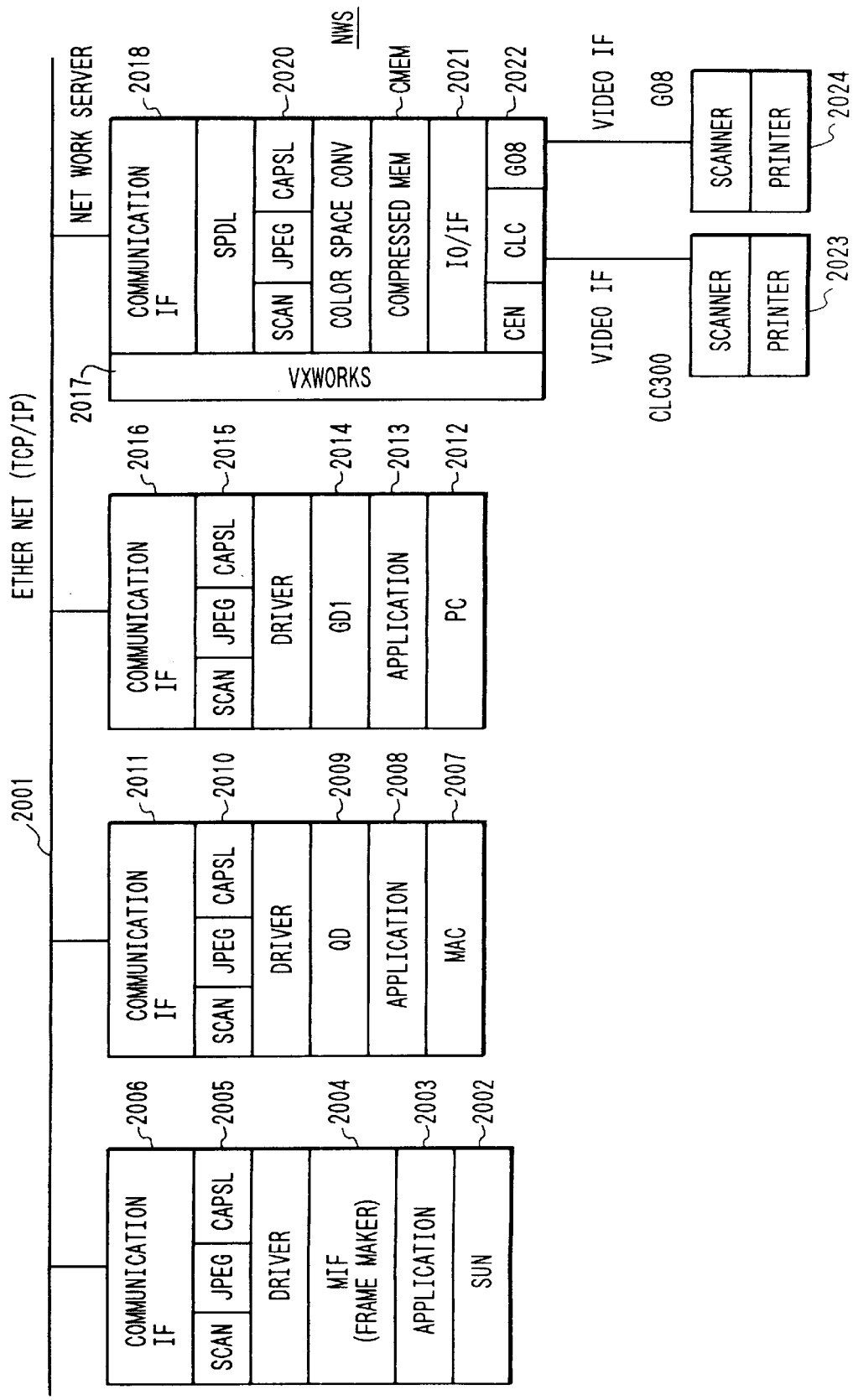
FIG. 62 is a block diagram illustrating a communication control structure between a video image terminal and a server device according to the embodiment of the present invention.

Referring to FIG. 62, there is depicted a block diagram illustrating the construction of communication control between the server (image I/O controller) and the image I/O apparatus which demonstrate an embodiment of the present invention. There may be connected as the image I/O apparatus a plurality of color printers or color scanners or a plurality of color scanner/printer apparatuses each of which is constructed integrally with a color scanner and a color printer. The image I/O controller may be an integrated I/O apparatus in a network environment composed of a copying machine, a FAX, and a printer, etc.

In the same figure, numeral 2001 is a network, with which work stations 2002 (SUN work station), 2007 (MAC station), and 2012 (IBMPC) are controlled by different OSs, and with which a server (color scanner/printer server) NWS controlled by a real time OS (e.g., VcWORKS) with which server a color laser copying apparatus 2023 and a color ink-jet copying apparatus 2024 are connected through a predetermined interface as a scanner/printer apparatus. For the interface, Centronics and RS232C, etc., may be provided or a two-way interface may be provided.

Numeral 2003 is an application program (a frame maker in the present embodiment) started on the work station 2002, numeral 2004 is a peripheral interface supported by the application program 2003, numeral 2005 is a conversion program which serves to substitute second color image information (the aforementioned page descriptor language CaPSL in the present embodiment) for characters and graphics (first color image information) from a standard interface outputted from the peripheral interface 2004, and JPEG-encode an image data fraction. More specifically, data of the frame maker is basically converted to data which takes the page descriptor language CaPSL as a base, and is transmitted. Numeral 2006 is a communication program for a communication processing between the network 2001 and the second color image information. Hereby, for the data flowing through the network 2001 the character fraction and the graphic fraction are transmitted with the code of the page descriptor language CaPSL while the image fraction is transmitted with the JPEG code.

In contrast, when the work station 2007 is used as the host computer, for the first color image information outputted at a quicked low 2009 as a standard interface from an ordinary application program 2008 to peripherals, the second color image information (the aforementioned page descriptor language CaPSL in the present embodiment) is substituted for the character and graphic fractions in data where a conversion program 2010 is of a quicked low format in the same fashion as the above description, and the image data fraction is JPEG-encoded. Numeral 2011 designates a communication program for a communication program between the network 2001 and the second color image information. Accordingly, for the data flowing through the network 2001, the character fraction and the graphic fraction are transmitted with the code of the page descriptor language CaPSL and the image fraction is transmitted with the JPEG code.

In contrast, when the work station 2012 used as the host computer, for the first color image information outputted in GDI 2014 as a standard interface from an ordinary application program 2013 (Windows 3.0 and subsequent versions for example) to peripherals, the character and graphic fractions in data where a conversion program 2015 is of a GDI format in the same fashion as the above description are substituted for the second color image information (the aforementioned page descriptor language CaPSL) and the image data fraction is JPEG-encoded. Numeral 2016 designates a communication program for a communication program between the network 2001 and the second color image information. Accordingly, for the data flowing through the network 2001 the character fraction and the graphic fraction are transmitted in the code of the page descriptor language CaPSL, and the image fraction is transmitted in the JPEG code. In accordance with the second server image processing method of the present invention, as described above, the first color image information edited or read out following an image I/O instruction from each host computer is converted to the second color image information obeying a predetermined page descriptor command, and the converted second color image information is communicated mutually between each image I/O apparatus and each host computer through a predetermined network, and further the second color image information received through the communication is analyzed and converted in matching to the peculiar first color image information obeying each image I/O apparatus or each host computer. Thus, even if color image processing formats of respective host computers and a data formats of respective image I/O apparatuses are different from each other, one PDL interpreter program 84 ensures a common processing.

Even if the work stations 2002, 2007, 2011 which have different OSs are connected with the network 2001, the data formats communicated on the network 2001 are unified, so that they are interpreted in a united manner by the color network server NWS (information I/O controller) on the reception side. Thus, there can be constructed inexpensively a united environment capable of common access to the color network server NWS from work stations of different OS environments. In the following, there will be described the operation of an image processing on the side of the color network server NWS.

As illustrated in FIG. 62, numeral 2017 is a read time OS as a program of controlling the entire of the color network server NWS (information I/O controller), numeral 2018 is a communication program of communication with the aforementioned network 2001 whereby data on the network 2001 is transmitted and received. Numeral 2020 is a conversion program of visualizing the received second color image information (code data or compressed image data) which converts coded data to dotted visualized data and convert image data incorporated from a scanner (first image information) to color image information for communication.

To reduce the amount of the visualized image data when the data is outputted to a recorder executing an electrophotographic process, the data is rendered to a JPEG compression processing and is stored in a compressed memory CMEM. For image recording with electrophotography, the compressed data is expanded and recorded using an electrophotographic process (upon execution of a recording processing with a color laser copying apparatus 2023 for example).

In contrast, with a recording apparatus such as a color ink jet copying apparatus 2024, the apparatus is relatively low in a recording processing speed compared with recording apparatuses for executing an electrophotographic process to result in variable recording, so that there are eliminated the needs of a large capacity buffer memory and of a JPEG compression processing. When the color ink jet copying apparatus 2024 is designated, recording image data is therefore stored in the compressed memory CMEM in a non-compression status.

Numeral 2021 is an I/O interface switching section for switching an interface 2022. It is noted that the present embodiment is adapted such that a standard color printer is controlled through a Centronics, and a color laser copying apparatus 2023 is controlled through a private CLC interface, and further the color ink jet copying apparatus 2024 is controlled through a private G08 interface.

In contrast, in the case where an image is incorporated from a color scanner of the color ink jet copying apparatus 2024 or the color laser copying apparatus 2023 and is transferred to respective work stations, a scanning range is designated from each work station and the scanner is started to be operated. The read image data is converted to standard JPEG compressed data and is transmitted to the work station through the communication program 2018 and the network 2001.

In the present embodiment, as described above, the peculiar first color image information is converted to the second color image information obeying a predetermined page descriptor command common to the conversion programs 2005, 2010, 2015, and 2020 in the work stations 2001, 2007, 2012, and in the color network server NWS, and the converted second color image information is communicated mutually between the color network server NWS and each host computer through a predetermined network, and further the second color image information received through the communication is analyzed using the conversion programs 2005, 2010, 2015, 2020 and is converted in matching to the peculiar first color image information obeying the respective each image I/O apparatus or the respective work stations 2001, 2007, 2012. Accordingly, even if there are different the work stations 2001, 2007, 2012 in color image processing formats and there are different the image I/O apparatuses (color ink jet copying apparatus 2024 and color laser copying apparatus 2023) in data formats, the respective host computers and the color network server successfully process associated data commonly only with one interpreter.

As illustrated in FIGS. 38A to 38E the entire of the color network server NWS in the present embodiment is controlled in the communication and image processings thereof through the real time OS 2017, so that a plurality of scanning or printing jobs from a plurality of work stations are simultaneously designated and the designated jobs are concurrently processed in control the color ink jet copying apparatus 2024 and the color printer for example and to ensure multiple printing operation with the color laser copying apparatus 2023 through a private CLC interface.

In accordance with the third server image processing method of the present invention, as described above, the concurrent processing order of printing jobs or scanner jobs of the respective image I/O apparatuses are controlled based upon the priority of the inputs following image I/O instructions from different type host computers (respective work stations 2001, 2007, 2012), so that the order of image information I/O processings from the host computers are freely satisfactorily controlled.

Figure 63:
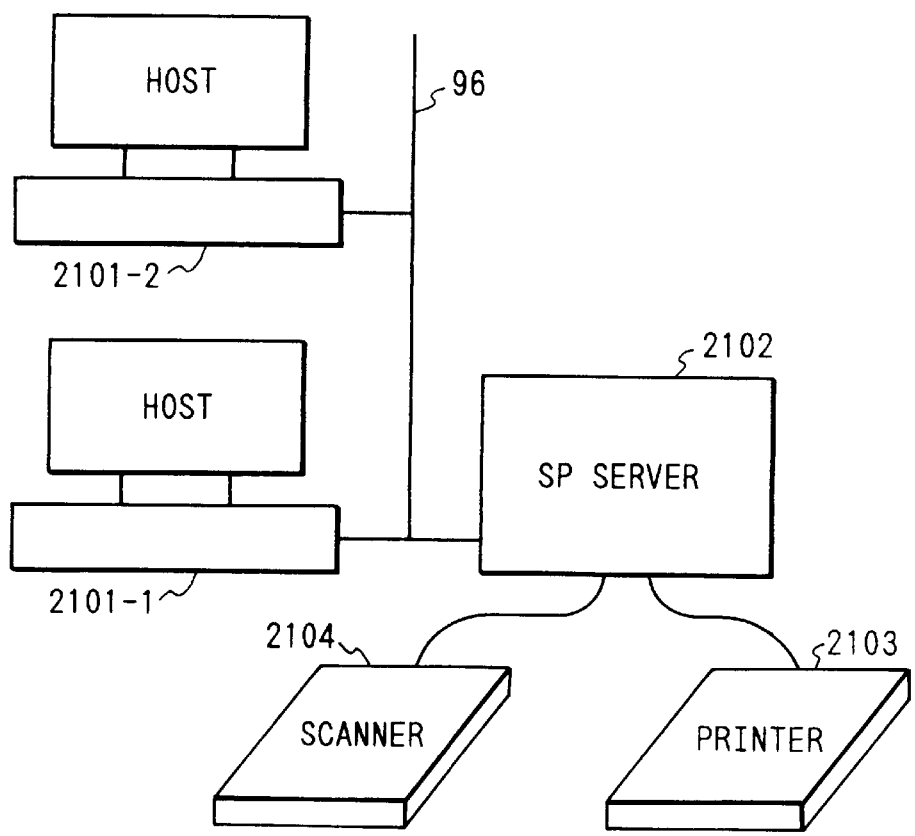
FIG. 63 is a view illustrating a network connection structure of a server device according to the embodiment of the present invention.

Referring to FIG. 63, there is depicted a view illustrating the status of connection of a network of the server (information I/O controller) which demonstrates an embodiment of the present invention.

In the same figure, numerals 2101-1, 2101-2 are host computers each for executing an image processing application program. Numeral 2102 is a scanner/server (information I/O controller) which controls the drive of the color printer 2103 and the color scanner 2104 responsibly to an image output request/an image request from the host computers 2101-1, 2101-2 connected with the network 96 such as an Ethernet (trade mark of Zerox company). The scanner/printer server 2102 includes the board circuit 1 illustrated in FIG. 9, in which a network controller has previously registered in the hard disk 1008 a user name permitting the utilization of the scanner/printer server 2102 and a password for the user. The scanner/printer server 2102 adds, alters, and corrects the use environment of usable machines, i.e., the color printer 2103 and the color scanner 2104 connected with the scanner/printer server 2102 for each password provided to the user.

In accordance with the second server constructed as described above, the previously registered first password and the second password inputted from each host computer connected with the network are compared and collated, and the executions of the scanner function processing and the printing function processing in the image I/O apparatus required from each host computer are prohibited or allowed. Accordingly, it is possible to preferentially execute a scanner function processing and a printing function processing from a specific group.

In the following, there will be described the operation of authorized use control of the color printer 2103 and the color scanner 2104 using a password associated with the scanner/printer server (information I/O controller).

As the host computer 2101-1 transmits a printer request to the S/P server 2102 upon the host computer 2101-1 preparing and outputting image data using a DTP software (application program), the S/P server 2102 which is requesting printing a password through the network 96. A user transmits back the password to the S/P server 2102 from an illustrated keyboard of the host computer 2101-1. In response thereto, the S/P server 2102 judges whether or not the transmitted password is coincident with that in a password table registered in the hard disk 1008. If it is not coincident, then the S/P server 2102 transmits an error signal to the host computer 2101-1. Hereby, users, whose passwords are not registered as a specific group, are limited in the use of the color printer 2103.

In contrast, when the password transmitted back from the host computer 2101-1 is coincident with a password registered in the password table registered in the hard disk 1008, the S/P server 2102 transmits printer information including the name of a printer printable by the present user to the host computer 2101-1. As the user selects the color printer 2103 for example and issues a printing start instruction through the host computer 2101-1, the S/P server 2102 analyzes a printing command sent from the initial setting of the designated color printer 2103.

Simultaneously, as the host computer 2101-1 transmits a scanning request to the S/P server upon the host computer 2101-1 incorporating an image using the scanner software (application program), the SP server 2102 inquires of the host computer 2101-1 which is requesting scanning a password through the network 96. A user transmits back a password to the S/P server 2102 from the keyboard of the host computer 2101-1. In response thereto, the S/P server 2102 judges whether or not the transmitted password is coincident with that registered in the password table registered in the hard disk 1008. If it is not coincident, then the S/P server 2102 transmits back an error signal to the host computer 2101-1. Hereby, users, whose passwords are not registered as a specific group, are limited in the use of the color scanner 2104.

In contrast, if the password transmitted back from the host computer 2101-1 is coincident with a password registered in the password table registered in the hard disk 1008, the S/P server 2102 transmits back scanner information including the name if a scanner capable of being scanned by the user to the host computer 2101-1. As the use of the host computer 2101-1 selects the color scanner 2104 and issues a scanning start instruction, the S/P server 2102 analyzes the scanning command transmitted from the host computer 2101-1 and effects initial setting of the designated color scanner 2104 for incorporation of an image.

In the case where the host machine is a machine of the type which is logged in by inputting a user name and a password of a work station for example, the S/P server 2102 could be operated in an identical manner to the case of the aforementioned password registration by registering a user name in the S/P server 2102, so that the embodiment may be modified to specify a user group which reduces an input operation of passwords upon the use of the S/P server 2102. The case will be described in detail in what follows.

As upon preparing image data using the DIP software (application program) for example in the host computers 2101-1, 2101-2 and outputting the image data the host computer 2101-1 between the host computers 2101-1, 2102-2 transmits a printing request to the S/P server 2102, the S/P server 2102 inquires the host computer 2101-1 which is requiring printing of the name of a user who has used the host machine, through the network 96. The host computer 2010-1, upon its being logged in, transmits back each inputted user name to the S/P server 2102. The S/P server 2102, when a user name which has not been registered is transmitted, transmits back an error signal to the host computer 2101-1, and hereby the user fails to use the S/P server 2102.

In contrast, the S/P server 2102, when a user name which has been registered is transmitted, transmits back the name of a printer capable of printing with the user to the host computer 2101-1. As the user selects the color printer 2103 through the host computer 2101 and issues a printing instruction, the S/P server 2102 analyzes the printing command sent from the host computer 2101 and effects the initial setting of the designated color printer 2103.

As the host computer 2101-1 transmits a scanning request to the S/P server 2102 when an image is incorporated through the host computer 2101-1 using a scanner software (scanner application program) for example, the S/P server 2102 inquires the host computer 2101-1 which is requiring scanning of the name of a user who is logged in through the network 96. For this, the host computer 2101-1 transmits back an inputted user name to the S/P server 2102 upon the user name being logged in.

When the S/P server 2102 judges the user name transmitted back not to be registered, the S/P server 2102 transmits back an error signal to the host computer 2101 whereby the use of the S/P server 2102 by the user is limited. In contrast, when the S/P server judges the user name transmitted back to be registered, the S/P server 2102 transmits back the name of a scanner which is capable of scanning with the present user to the host computer 2101-1.

As the user selects the color scanner 2104 through the host computer 2101-1 and issues a scanning instruction, the S/P server 2102 analyzes the scanning command sent from the host computer 2101-1 and effects the initial setting of the designated color scanner 2104 for incorporation of an image.

Although in the above-described embodiment the description was done for the case where a user name is inputted manually and for the case where a user names are automatically sent in a logging-in processing and are individually judged to be registered users, another modification may be contemplated where these user name inputting processings are concurrently performed.

Figure 64:
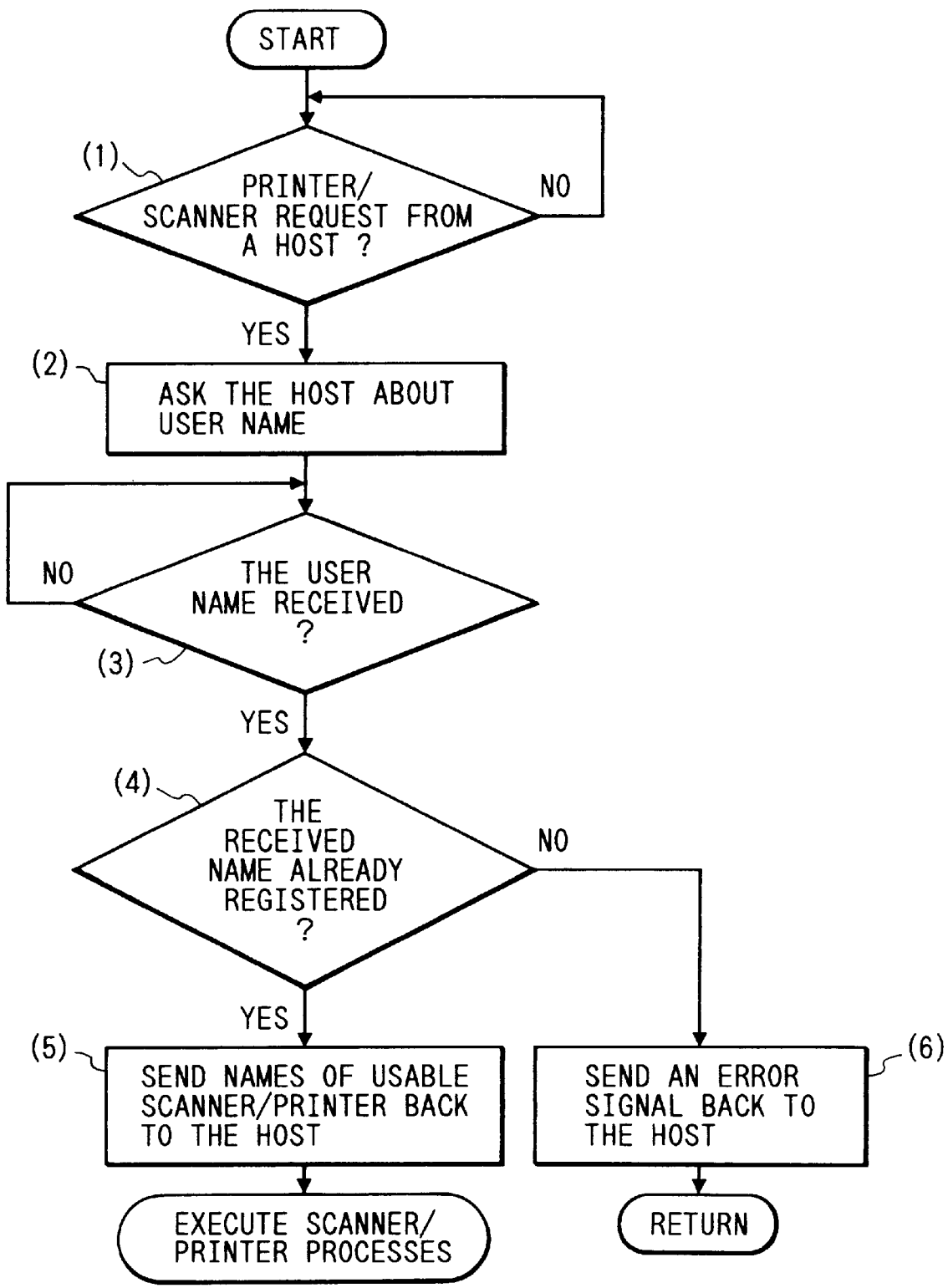
FIG. 64 is a flow chart illustrating an example of a user identification processing step in a server device according to the embodiment of the present invention.

Referring to FIG. 64, there is depicted a flowchart exemplarily illustrating a user identifying processing procedure in the server which demonstrates an embodiment of the present invention. Designated at (1) to (6) are respective steps of the procedure, each operation of which the CPU 1000 illustrated in FIG. 9 for example executes following respective programs.

The CPU 1000 waits until a printing request command a scanning request command is inputted from a host computer through the network 96 in step (1), and answers with the inquiry of an inputted user name to the host computer in step (2). The CPU 1000 then waits until the answered user name is transmitted back in step (3), and judges whether or not the answered use name has previously been registered in step (4), and if it is yes, then answers with a usable scanner name and a usable printer name to the host computer, and advances to the aforementioned scanner/printer processing.

In contrast, if it is no in the judgement of step (4), then the CPU 1000 answers to the host computer with an error signal in step (6) and prohibits the use of the scanner or printer.

Figure 65:
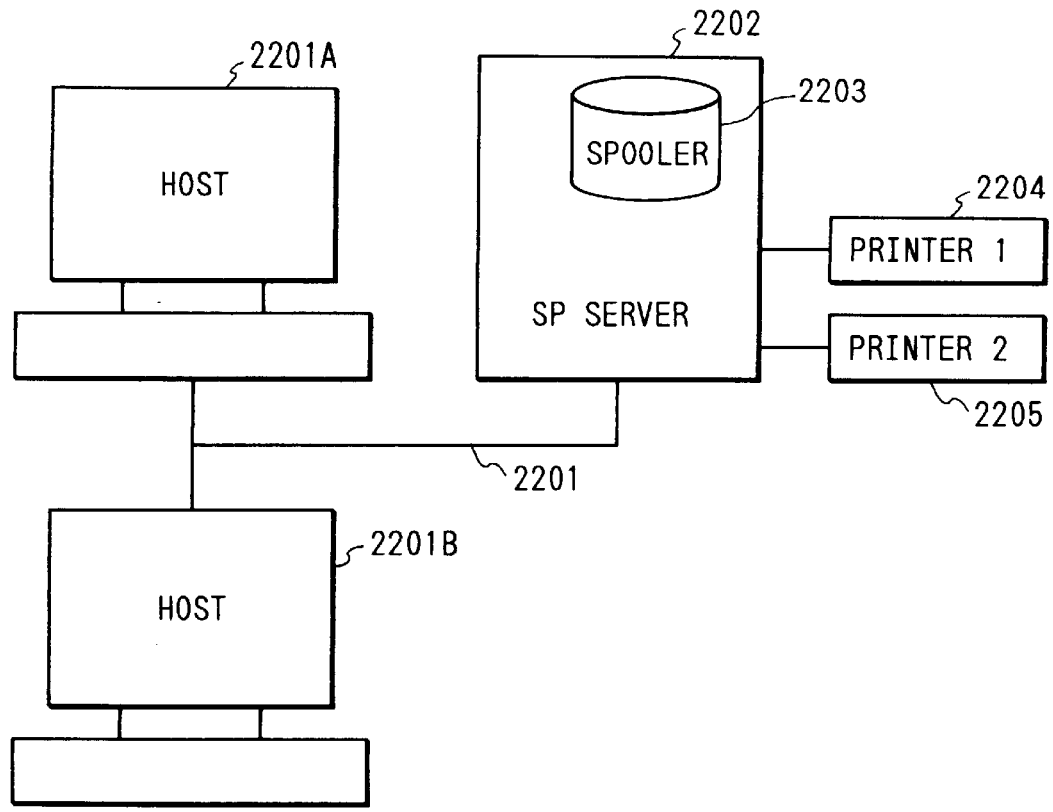
FIG. 65 is a block diagram illustrating a communication control structure between a video image terminal and a server device according to another embodiment of the present invention.

Referring to FIG. 65, there is depicted a block diagram illustrating the construction of communication control between the server (information I/O controller) and an image I/O apparatus which demonstrates an embodiment of the present invention.

In the same figure, numerals 2201A, 2201B designate host computers each of which outputs printer data corresponding to a specific language to the server 2202 through the network 2201. Numeral 2203 designates a spooler which stores the printer data received through the network 2201 following control data in a spooler 2203 described later. Numeral 2204 designates a first color printer which outputs spooled printing data communicating with the server 2202. Numeral 2205 designates a first color printer which outputs spooled printing data communicating with the server 2202. The image I/O apparatus may include a plurality of color printers or a plurality of color scanners or a plurality of color scanner/printer apparatuses composed of integrally color printers or color scanners all connected thereto. The image I/O apparatus may be an integrated I/O apparatus in a network environment constructed with a copying machine, a FAX, and a printer, etc.

Figure 66:
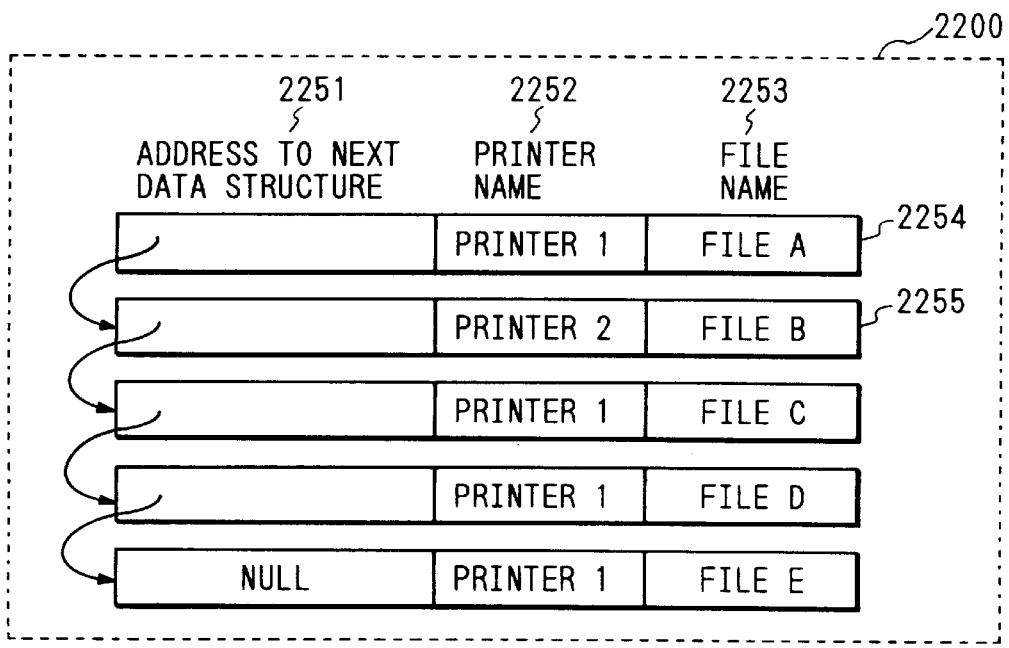
FIG. 66 is a view illustrating a structural example of a control data of a spooler shown in FIG. 65.

Referring to FIG. 66, there is depicted a view exemplarily illustrating the structure of control data of the spooler 2203 illustrated in FIG. 65.

In the same figure, numeral 2200 designates a data structure which comprises an address 2251 to the next structure, a printer name 2252, and a file name 2253, in which printing tasks 2254, 2255 comprising printing information (comprising control data (designated printer destination, control command), a printing file and the like) received by the server 2202 in the order of data reception.

In the third server constructed as described above, data received from each host computer (2201A, 2201B) is stored in data storage means (spooler 2203) for each image I/O apparatus destination, and in this situation when an image I/O apparatus alteration instruction transmitted back from each host computer is inputted upon each host computer being informed of the status of a scanner function processing or a printing function processing of each image I/O apparatus (first color printer 2204, second color printer 2205 in the present embodiment) designated through the communication program of the server 2202, a program in the server 2202 analyzes the image I/O apparatus alteration instruction transmitted back from each host computer to alter the image I/O apparatus destination designated by each host and stored in the storage means to a desired image I/O apparatus destination. Further, when for the data received from each host computer the status of the designated image I/O apparatus is detected and any error is found therein, the present image I/O apparatus destination may automatically be altered to another image I/O apparatus destination where no error is produced. In this case, an I/O processing which designates the failure image I/O apparatus can be compensated for with a data processing apparatus.

To be concrete, each printing task has been an inputted printing instruction, and with reference to the address 2251 the contents of a subsequent printing task can be read out. This corresponds for example to a case where the file name 2253 is received from the host computer 2201A by the first color printer 2204 following an output instruction of "file A", and the file 2253 is received by the second printer 2205 following an output instruction of "file B", and further the file name 2253 is received by the first color printer 2204 following an output instruction an output instruction of "files C, D, E", in a successive manner. For instructions stored in the spooler 2203 the printer tasks read out them from the upper thereof.

In the following, there will be described the operation of the printing task processing in the server (information I/O controller) according to the present invention with reference to a flowchart illustrated in FIG. 67.

Figure 67:
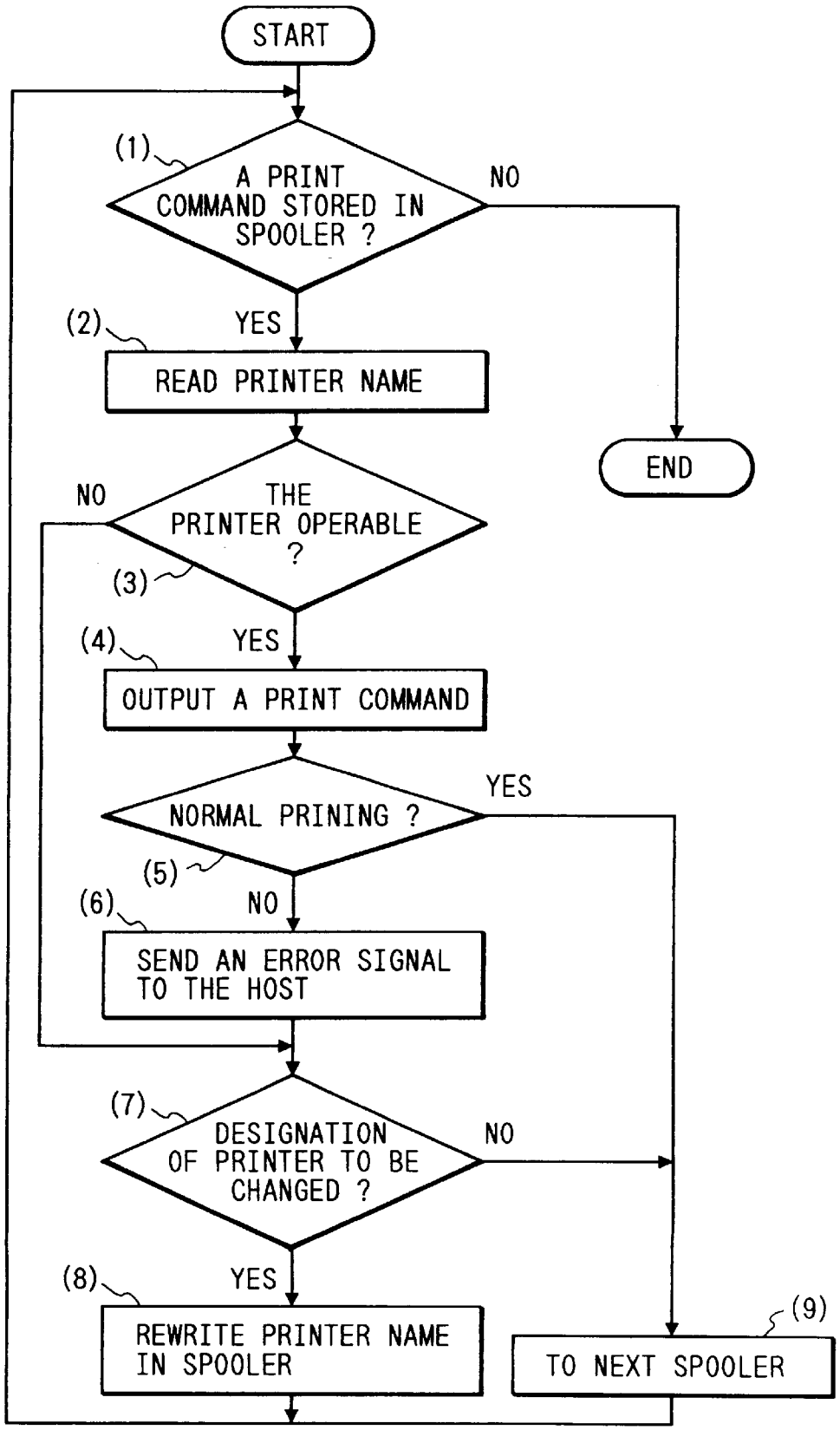
FIG. 67 is a flow chart illustrating an example of a print task processing step in a server device according to the present invention.

Referring to FIG. 67, there is depicted a flowchart exemplarily illustrating a printing task processing procedure in the server associated with the present invention. Designated at (1) to (9) are respective steps of the procedure, each operation of which the CPU 1000 illustrated in FIG. 9 executes on the basis of the respective programs.

The server 2202, as receiving a printing instruction sent from each host computer, prepares the data structure 2200 illustrated in FIGS. 61A and 61B in the spooler 2203. As the data structure 2200 is prepared in such a manner, the CPU 1000 judges whether or not a file referred to for printing out has been stored in the spooler 2203 in step (1), and if the file is not stored in the spooler 2203, then the CPU 1000 completes the processing while if the file has been stored in the spooler 2203, then the CPU 1000 reads in the printer name 2252 outputted from the data structure 2200 referred to by the spooler 2203 in step (2), and further the CPU 1000 checks a flag indicative of the operation status of the designated printer to judge whether or not normal printing operation is possible in step (3). If a flag indicative of the status of printing being disabled is set, then the CPU 1000 advances to step (7) and subsequent steps, while if it is with a printing enable status, then the CPU 1000 outputs a printing instruction outputted from a printer designated by a file of the referenced structure in step (4). Successively, the CPU 1000 judges whether or not a normal completion signal is received from the printer in step (5), and if an abnormality signal is received, then the CPU 1000 answers with an error signal to the host computer which outputted the printing instruction in step (6) for the inquiry of alteration of a printer designation destination. Further, the CPU 1000 judges whether or not there is issued an instruction to alter the setting of the printer designation destination from the host computer in step (7), and if it is yes, then the CPU 1000 rewrites the printer name for the printing task stored in the spooler 2203 to the name of a printer capable of being normarily operable in step (8), and returns to step (1).

In contrast, if the judgement in step (5) is yes, and the judgement of step (7) is no, then the CPU 1000 advances a pointer for referring to the data structure 2200 to the subsequent printing task of a successively linked data structure, i.e., advances the pointer to the next spool in step (9), and further clears the outputted printing task and returns to step (11).

Although in the above-described embodiment the description was done for the case where a printing task is taken as an example and a printer normarily operable is investigated only on the basis of an alteration instruction inputted from a host computer as a printer designation destination, and a printer name for the printing task is automatically altered to a printer name operable in normal printing, another modification may be contemplated where in the case where an instruction from the host computer is an image inputting instruction for example, and a trouble is produced where any of a plurality of scanner apparatuses is inoperable in the course of execution of image inputting from one scanner apparatus (failure of a scanning motor, failure of image read means, broken wire of an exposing lamp) even though with a case where the aforementioned scanner apparatuses are connected with the server 2202 as the image I/O apparatuses, the present invention is applicable even if a plurality of scanner apparatuses are connected in the server 2202 as the image I/O apparatuses, say, in the case where when there is produced a trouble one scanner apparatus becomes inoperable in the course of execution of image inputting therefrom (a trouble of a scanning motor, a trouble of image read means, wire breaking of an exposure lamp) when an instruction from the host computer is of an image inputting instruction for example, provided status information is the host computer is answered with the status information of the scanner apparatus and on the basis of the status information an alteration instruction to alter the scanner designation destination from the host computer, the server 2202 alters the scanner designation destination to a desired scanner (image I/O apparatus) to compensate for the subsequent image inputting processings.

Further, in the case where printer tasks are existent in respective printer, they may be controlled such that in the order of the printer tasks being registered in the spooler 2203 instructions having printer names corresponding to the respective printer tasks are executed. In the case where the first color printer 2204 undergoes paper jamming when a printer task exclusive for the first color printer 2204 outputs "file A" of the file name 2253 and a printer task exclusive for the second color printer 2205 outputs "file B" of the file name 2253, for example, the printing task of the first color printer 2204 answers with an error signal to the host computer. When the host computer designates the second color printer 2205 to output the file A, the server 2202 alters the printer name in the printing instruction 2254 of the file A to the second color printer 2205 and links it with the last of the data structure 2200 by a pointer. When the printing task exclusive for the second color printer 2205 is outputting the file B, the processing may be controlled such that the processing moves to the outputting processing of the file A just after the file B has been completed.

Further, the construction may be modified such that the priority of outputting the file A which is rewritten in the printer name is capable of being designated.

Figure 68:
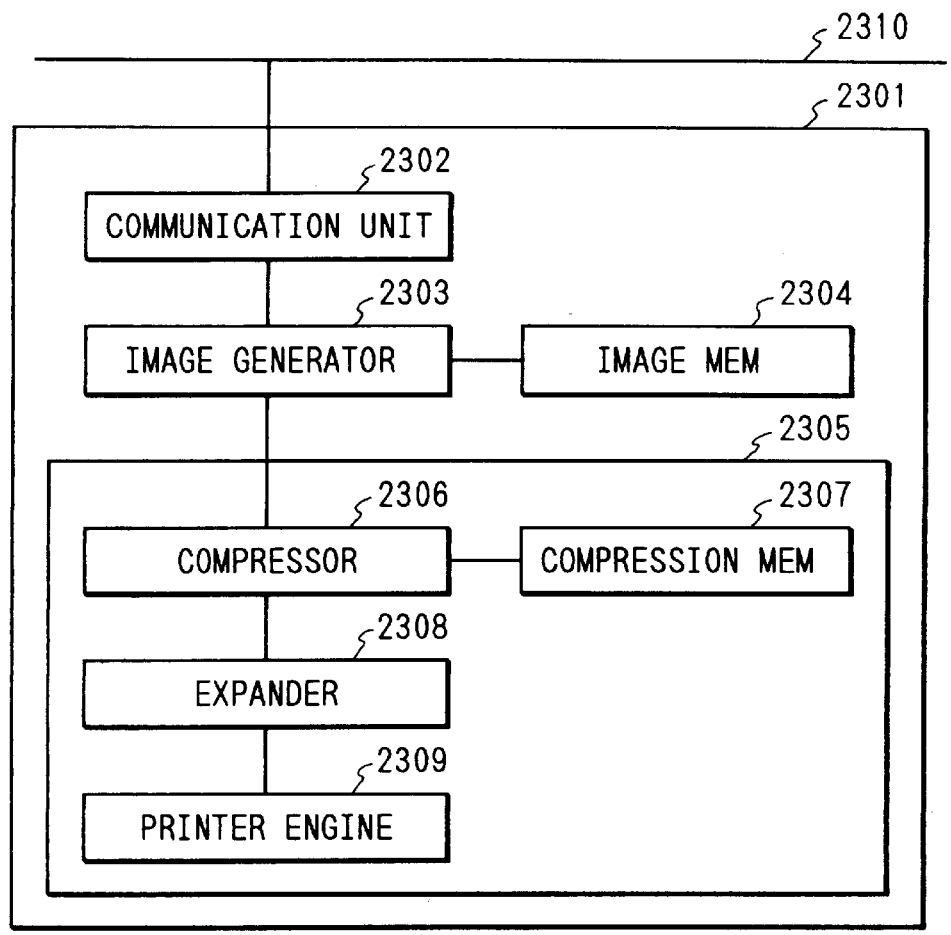
FIG. 68 is a block diagram illustrating a communication control structure between a video image terminal device and a server device according to the other embodiment of the present invention.

Referring to FIG. 68, there is designated a block diagram illustrating the construction of communication control between the server (image I/O controller) and the image I/O apparatus which demonstrates an embodiment of the present invention.

In the same figure, numeral 2301 designates an image I/O controller (server) in which a communication unit 2302 is connected with a communication line 2310 and is connected with a plurality of host computers started by different OSs (not shown). Numeral 2303 designates an image generator which analyzes printing data received by the communication unit 2302 and stores generated image data in an image memory 2304. Numeral 2305 designates an image output unit which comprises a compression unit 2306, a compressed memory 2307, an expansion unit 2308, and a printer engine 2309. In the present embodiment, the server 2301 communicates with another host computer through the communication line 2310.

In the fourth server constructed as described above, the server analyzes image data and additional information outputted from the image generator 2308 and the compression unit 2306, and outputs an image to a recording medium based upon the processed data outputted from the image I/O apparatus. Accordingly, image data can be generated which makes satisfactory an output result from each image I/O apparatus, say, a printer engine 2309.

In the following, the operation will be described.

As the communication unit 2302 receives a page descriptor language printing data communicated from another host computer through the communication line 2310, the printing data is transmitted to the image generator 2303. The printing data is described with a page descriptor language as described above, and the image generator 2303 analyzes the printing data to draw image data in the image memory 2304. Since in the image generator 2303 there is known an area of an image in each region in the case of dividing one page into light sections in the analyses of the page descriptor language, that information is transmitted to the compression unit 2306. The image memory 2304 is a memory in which the image generator 2303 draws an image and is a band memory capable of storing therein an image of the size 1/89 times of one page. The compression unit 2306 in the image output section 2305 determines a compression parameter based upon the area of an image in each region when one page sent from the image generator 2303 is divided into eight sections and upon the available capacity of the compression memory at that time, and compresses the image drawn in the image memory 2304 for storage thereof in the compression memory 2307. By repeating eight times image generation by the image generator 2303 and a stepped image compression processing by the compression unit 2306, an image corresponding to one page is stored in the compression memory 2307 in a compressed status. Thereafter, the expansion unit 2308 expands the compressed image stored in the compression memory 2307 and transmits the data, fitting to the movement of the printing engine 2309. The printing engine 2309 executes an image formation process based upon the expanded data outputted from the expansion unit 2308 to record the image in the recording medium.

In the following, there will be described the operation of the image forming processing in the server according to the present invention with reference to a flowchart in FIG. 69.

Figure 69:
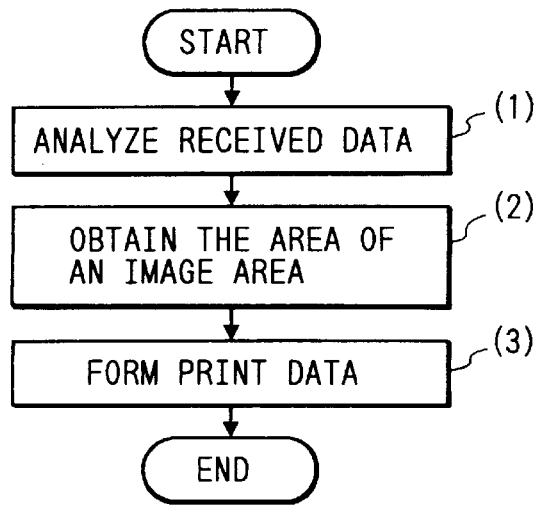
FIG. 69 is a flow chart illustrating an example of a print data generation processing step in a server device according to the present invention.

Referring to FIG. 69, there is depicted the flowchart exemplarily illustrating a printing data generating processing procedure in the server of the present invention. Designated at (1) to (3) are respective steps of the processing, each operation of which the CPU 1000 illustrated in FIG. 9 for example executes on the basis of respective programs.

The CPU 1000 analyzes printing data received through the communication line 2310 from a host computer in step (1), evaluates an area of an image region in a drawn image in step (2), and generates printing data in step (3). The area of the image region evaluated in step (2) is transmitted to the compression unit 2306.

Figure 70:
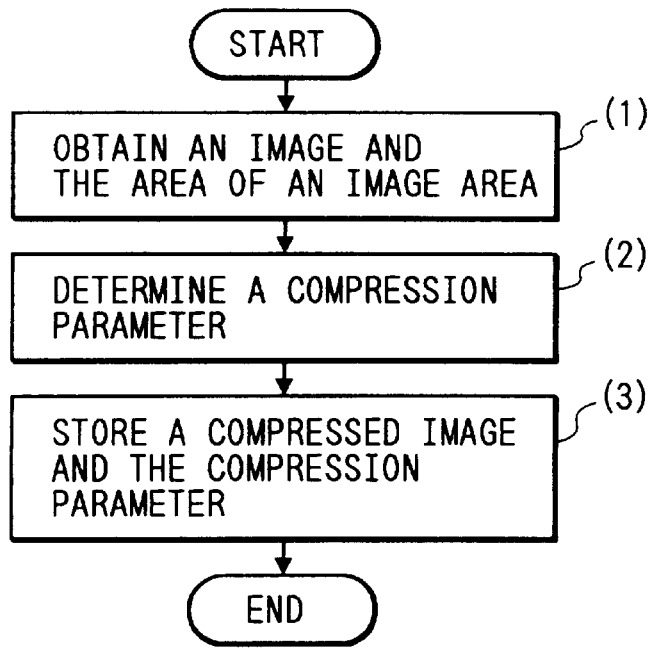
FIG. 70 is a flow chart illustrating an operational example of a compression circuit shown in FIG. 68.

Referring to FIG. 70, there is depicted a flowchart exemplarily illustrating the operation of the compression unit 2306 illustrated in FIG. 68. Designated at (1) to (3) are respective steps if the procedure, each operation of which the CPU 1000 illustrated in FIG. 9 for example executes on the basis of respective programs.

The CPU 1000 evaluates the areas of an image and an image region in step (1). Then, the CPU 1000 determines a compression parameter from the area of the image region and the available memory capacity of the compression memory 2307 in step (2). Further, the CPU 1000 stores a compressed image yielded by compressing the image and the compression parameter in the compression memory 2307 in step (3). The storage of the compression parameter is for expansion thereof by the expansion unit 2308.

In the present embodiment, the image generator 2303 not only generates the printing data but also generates the image information of the area of the image region, and the compression unit 2306 determines and compresses the proper compression parameter using the image information. Accordingly, a higher compression rate than needed is not required, and a satisfactory image with reduced deterioration is ensured from the printer engine 2309.

Although in the above-described embodiment the description was done for the case where the image generator 2303 generates area data of the image region in the printing data as image information, area data of characters and figures may be generated. In this case, the compression unit 2306 determines and compresses the compression parameter using information of the area of characters and figures and the available capacity of the compression memory 2307.

Figure 71:
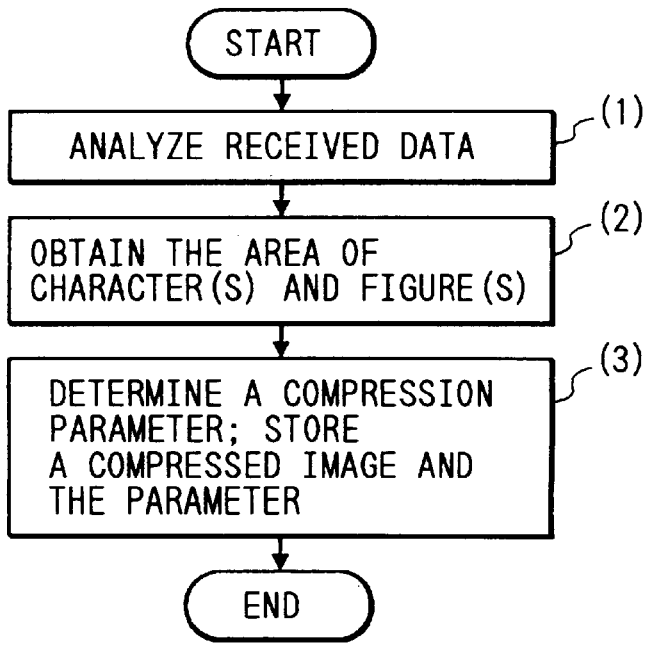
FIG. 71 is a flow chart illustrating an example of another print data generation processing step in a server device according to the present invention.

Referring to FIG. 71, there is depicted a flowchart exemplarily illustrating another printing data generating processing procedure in the server according to the present invention. Designated at (1) to (3) are respective steps of the procedure, each operation of which the CPU 1000 illustrated in FIG. 9 for example executed on the basis of respective programs.

The CPU 1000 analyzes received printing data through the communication line 2310 from the host computer in step (1), evaluates the area of characters and figures in a drawing image in step (2), and determines a compression parameter from the remaining memory capacity of the image in step (3). Then, the CPU 1000 transfers a compressed image yielded by compressing the image data and transfers to the compression unit 2306, and stores it in the compression memory 2307.

The compression unit 2306, since being hereby informed of the area of characters and figures, successfully determines the compression parameter properly and ensures satisfactory printing with reduced deterioration.

The image generator 2303 may generate both informations of the area of an image region and the area of characters and figures, and the compression unit 2306 may utilize both informations for determination of the compression parameter.

The image generator 2303 may generate the number of colors used in characters and figures as the image information. The compression unit 2306 may be replaced to other compression methods provided sufficiently less colors are used for characters and figures. For example, compression is ensured by separating an image part and a character/figure part in printing data, and effecting, for the image part, ordinary SPEG compression and converting, for the character/image part, colors used to a several bit code for description with the code. Hereby, for the character/figure part printing with reduced deterioration is ensured.

Although in the above described embodiment the image output unit 2305 employed compression and compression and expansion as the image data forming processing, another modification may be contemplated when the image generator 2303 converts a generated image to a binary printer, a binary processing is employed as the image data forming processing. Hereby, a reduced processing time and satisfactory printing are ensured by in a binary process converting image data to binary data with an error diffusion process which relatively clarifies lines for printing of a document which includes many regions of characters and figures, and converting image data with a dizer process which reduces a binary processing time for a document substantially occupied by images.

For the image data forming processing in the image output unit 2305, a color converting processing may be employed in the server 2301 wherein the image output unit 2305 color-converts an image generated by the image generator 2303 for printing. For example, satisfactory printing is ensured by rendering image data to color conversion where much black ink is used for clearly indicating black portions in a document composed of characters and figures, and rendering image data to color conversion where less black ink is used than in the case with the characters for emphasizing a natural property in a document composed of many images.

Although in the above-described embodiment the server 2301 was exemplarily employed to which one printer engine 2309 was connected, the present invention may be applied to another construction where a plurality of printer engines are connected with the server 2301 as illustrated in FIG. 1. Hereby, satisfactory printing is ensured from the respective printer engines by controlling the image processing fitting to the respective printer engines.

Although in the above-described embodiment the description was done for the case wherein a data processed image was outputted from an image I/O apparatus connected with the server (image I/O controller) on the network on the basis of the analysis result of printing data received through each host computer, the present invention may be applied to an image forming apparatus connected in 1:1 with the host computer. The image I/O apparatus may be an integrated I/O apparatus in a network environment which comprises a copying machine, a FAX, and a printer, etc.

Figure 72:
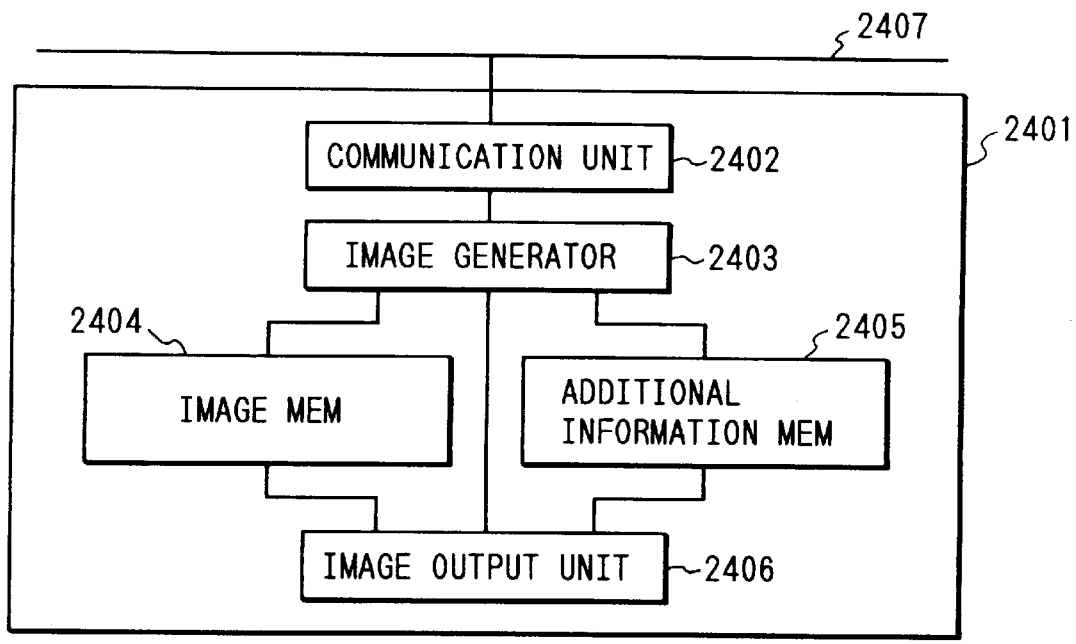
FIG. 72 is a block diagram illustrating a video image processing structure in a server device according to the embodiment of the present invention.

Referring to FIG. 72, there is depicted a block diagram illustrating the construction of an image I/O controller which demonstrates an embodiment of the present invention.

In the same figure, numeral 2401 designates a body section of the image I/O controller which includes a communication unit 2402 for performing communication with a host computer through the communication line 2407 such as an Ethernet, an image generator 2403 for generating an output image from color printing information received by the communication unit 2402, an image memory 2404 for storing for each color (yellow (Y), magenta (M), cyan (C), black (K)) an output image generated by the image generator 2403, an additional information memory 2405 for storing additional information indicative of black colored character/figure picture elements, and an image output unit 2406 for printing an output image stored in the image memory 2404 on the basis of the additional information memory 5. The image generator 2403 includes a CPU, a ROM for storing each program, and a RAM (all not shown), and controls following programs illustrated in flowcharts described later to develop an output image into the image memory 2402, and analyze color picture element information developed for each color in the image memory 2404 for setting "0" or "1" the additional information memory 2405 to "0" or "1" for the most significant bit or the least significant bit in bit data constituting one picture element for example. The image output unit 2406 in the present embodiment is constructed with a BJ printer for jetting inks of yellow, magenta, cyan, and black colors for example in a bubble jet type for color printing.

In the second server (information I/O controller) constructed as described above, the image generator 2403, as receiving color image information from a host computer through a network (communication line 2407), analyzes the color image information, and picture element data for each color generated on the basis of a result of the analysis is stored in the image memory 2404, and thereafter the image generator 2403 analyzes the stored picture element data for each color to extract black-colored portions and store additional information to the extracted black-colored portions in the additional information memory 2405, and thereafter the image output unit 2406 outputs the image with reference to the stored picture element data and the additional information to the image data. Hereby, clear printing is ensured for black-colored portions such as characters and figures in a color image.

Figure 73:
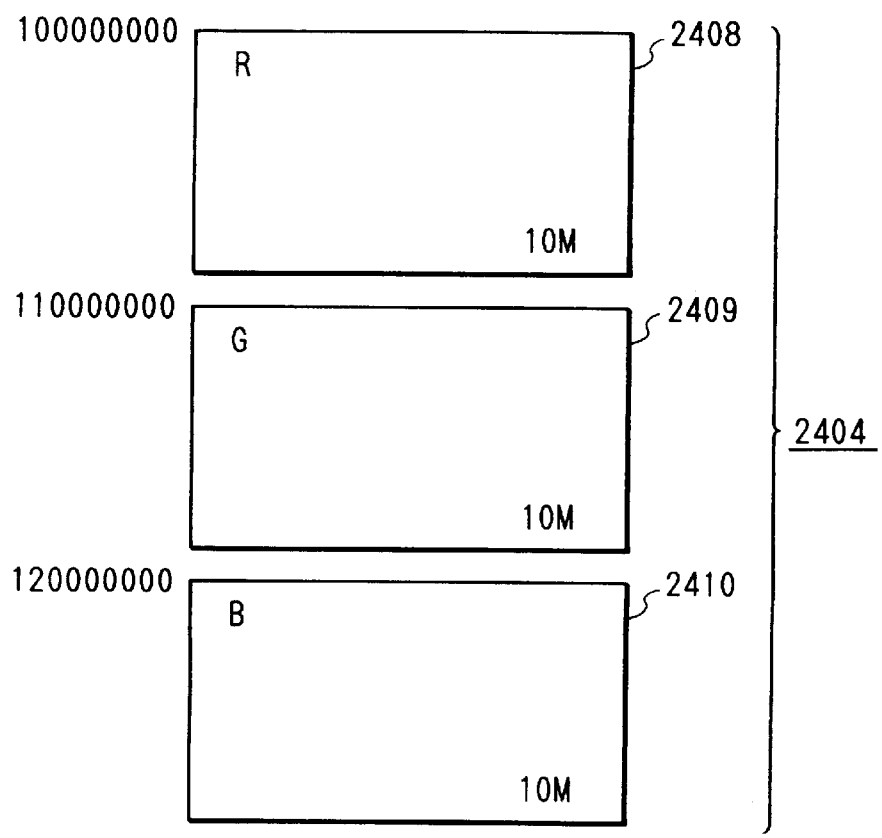
FIG. 73 is a conceptional view illustrating a structure of a video image memory shown in FIG. 72.

Referring to FIG. 73, there is depicted a conceptual view illustrating the structure of the image memory 2404 illustrated in FIG. 72.

In the same figure, numeral 2408 designates a region for storing image data for red (R) which ensures 10 Mbits from the head address "100000000" for example. Numeral 2409 designates a region for storing image data for green (G) which ensures 10 Mbits from the head address "110000000" for example. Numeral 2410 designates a region for storing image data for blue (B) which ensures 10 Mbits from the head address "120000000" for example. Picture element data is stored in the regions 2408 to 2410 ensured as such to determine final hues of the respective picture elements.

Figure 74:
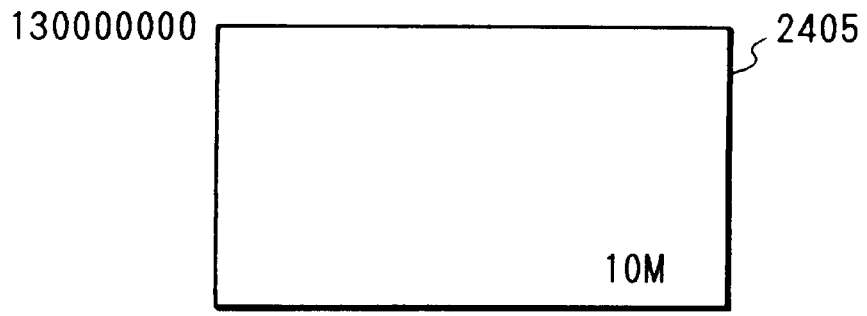
FIG. 74 is a conceptional view illustrating a structure of a supplemental information memory shown in FIG. 72.

Referring to FIG. 74, there is depicted a conceptual view illustrating the structure of the additional information memory 2405 illustrated in FIG. 72.

As illustrated in the same figure, the additional information memory 2405 secures a region corresponding to the number of picture elements for one page, say, 10 Mbits from the great address "130000000" which provides an identical storage capacity to one region among the aforementioned regions 2408 to 2409.

In the following, there will be described the drawing operation of image data into the image memory 2404 and the write operation of the additional information into the additional information memory 2405 by the image generator 2403 illustrated in FIG. 72 with reference to FIG. 75.

Figure 75:
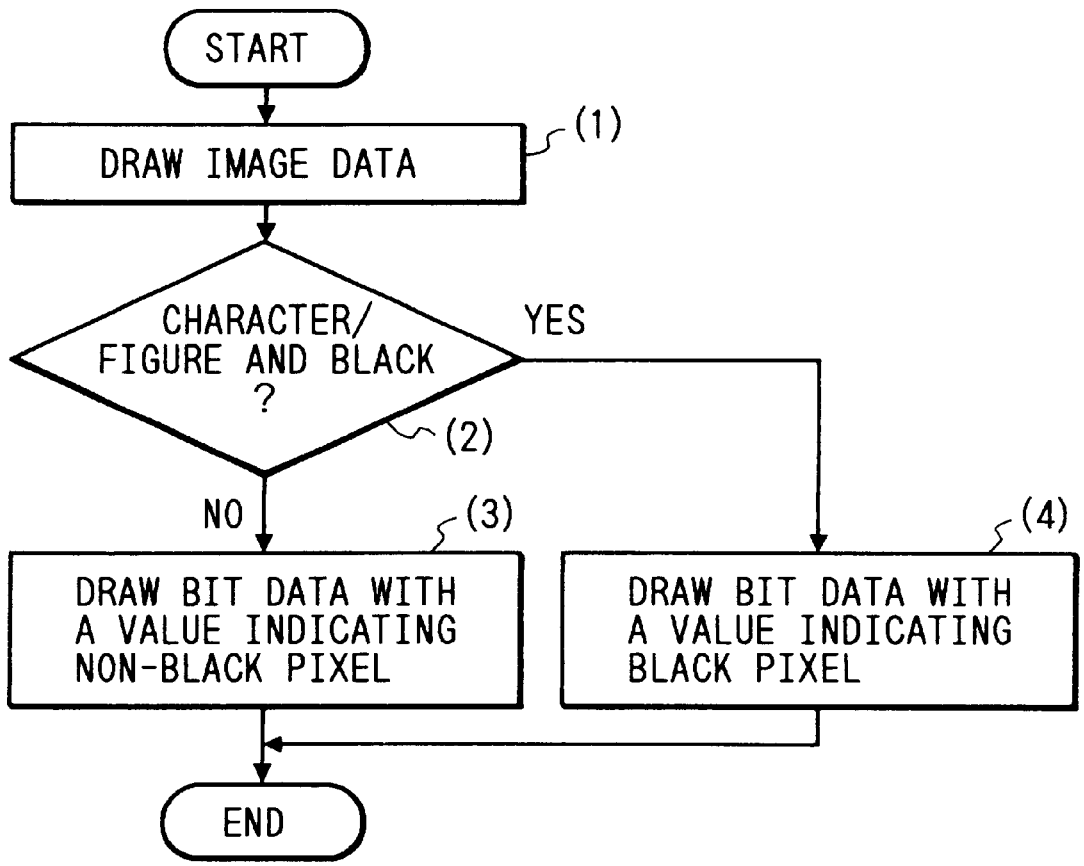
FIG. 75 is a flow chart illustrating an example of a receiving data processing step in a video image generation circuit shown in FIG. 72.

Referring to FIG. 75, there is depicted a flowchart exemplarily illustrating a received data processing procedure by the image generator 2403 illustrated in FIG. 72. Designated at (1) to (4) are respective steps of the procedure, each operation of which the CPU 1000 illustrated in FIG. 9 for example executes on the basis of respective programs.

The CPU 1000 analyzes received data and draws image data of respective colors in the respective regions 2408 to 2410 in the image memory 2404 in step (1). Then, the CPU 1000 judges whether these picture elements are characters or figures or whether or not they are black-colored on the basis of the details of the respective drawn picture elements on the respective regions 2408 to 2410 in step (2), and if it is no, then the CPU 1000 draws in the additional image memory 2405 bit data indicative of the present picture element being not black-colored and having "0" as the least significant bit for example in step (3), and completes the processing.

In contrast, if it is yes in the judgement of step (2), then the CPU 1000 draws in the additional information memory 2405 bit data indicative of the present picture element being black-colored and having "1" as the most significant bit for example in step (4), and completes the processing.

In the following, there will be described color printing operation by the image output unit 2406 illustrated in FIG. 72 with reference to a flowchart illustrated in FIG. 76.

Figure 76:
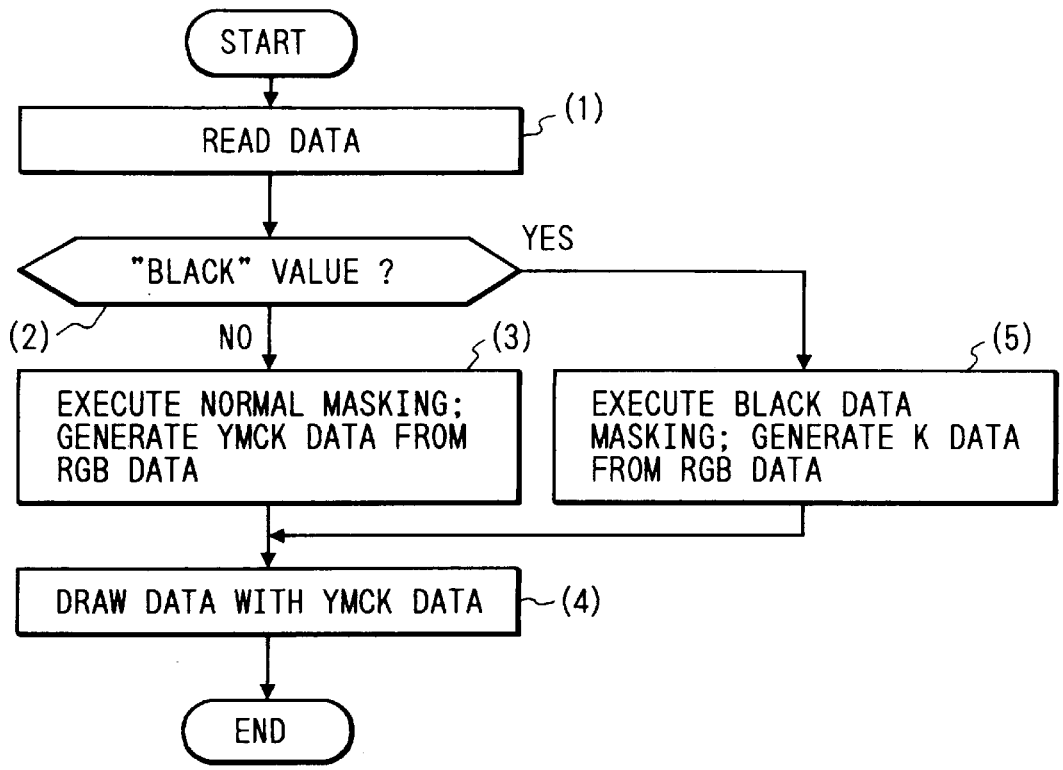
FIG. 76 is a flow chart illustrating an example of a colour printing processing step in a video image output circuit shown in FIG. 72.

Referring to FIG. 76, there is depicted a flowchart exemplarily illustrating a color printing processing procedure by the image output unit 2406 illustrated in FIG. 72. Designated at (1) to (5) are respective steps of the procedure, each operation of which the CPU 1000 illustrated in FIG. 9 for example executes on the basis of respective programs.

The image output unit 2406 reads out information of each picture element from the image memory 2404 and the additional information memory 2405 in step (1), judges whether or not the contents in the additional information memory 2405 are a value indicative of black in step (2), and if it is no, then the image output unit 2406 effects an ordinary masking processing to prepare YMSCK data from RGB data in step (3), and draws the prepared YMSCKL data in an output buffer (not shown) in step (4), and advances to a printing processing.

In contrast, if it is yes in the judgement of step (2), then the image output unit 2406 effects masking for generation of black to prepare black (K) from RGB data in each region, and takes data of yellow, magenta, cyan as "0" in step (5), and draws the prepared YMCK data in an output buffer (not shown) in step (4), and advances to a printing processing.

In the above-described embodiment the image generator 2403, additionally to the formation of RGB image data in the image memory 2404, can generate, in the case with characters or figures, which are black-colored, data indicative thereof in the additional information memory 2405 to alter the masking processing in the image output unit 2406 on the basis of the details of the data, and can print, in the case with characters or figures which are black-colored, those characters or figures in a clear status in a color image for sharp emphasis of black.

Figure 77:
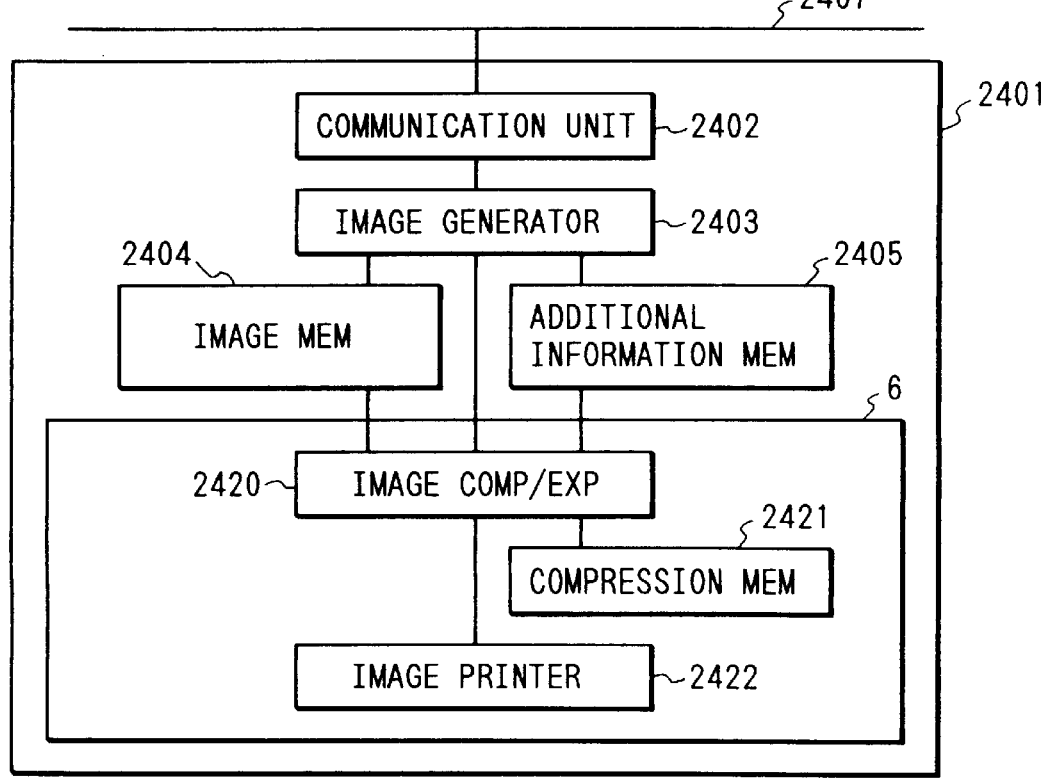
FIG. 77 is a block diagram illustrating another video image processing structure in a server device according to the embodiment of the present invention.

Referring to FIG. 77, there is depicted a block diagram illustrating the construction of an image I/O controller which demonstrates another embodiment of the present invention. Identical symbols shall be applied to those identical to the portions illustrated in FIG. 72.

In the same figure, numeral 2420 designates an image compression/expansion unit which divides image data drawn in the image memory 2404 by the image generator 2403 to 8×8 blocks for example, and compresses, when there are existent many picture elements which are characters and figures in the respective blocks, the image data using a compression method which keeps edges, while compresses, when there are existent many picture elements which are images, the image data using a compression method which is capable of realization of a high compression rate even if edges become dull, and stores the same in the compression memory 2421. After compressing image data corresponding to one page and storing it in the compression memory 2421, the image compression/expansion unit 2420 expands the present compression data and transmits it to the image printer 2422 which in turn prints the expanded image data.

Image data is generated by the image generator 2403 and is stored in the image memory 2404 and is read out and compressed, and temporarily stored in the compression memory 2421, as described above, so that the capacities of the additional information memory and the image memory 2404 are not necessarily needed to secure one page and sufficient to be about 1/16 of one page for example.

Generally, compression and expansion of image data cause edges to become dull resulting in deteriorated image quality or a low compression ratio, and provision of the compression memory 2421 for solving the difficulty instead requires many memories. Against this, there is stored information indicative of an image or a non-image in the additional information memory 2405, so that compression which keeps edges of characters and figures, and compression which ensures a high compression ratio for images even if edges thereof become dull, bring about a high compression ratio substantially without deterioration of image qualities thereof. In the present embodiment, utilizing the additional information stored in the additional memory 2405 image data is compressed and temporarily stored, whereby printing is ensured with reduced memories and substantially without deterioration of the image quality thereof.

Figure 78:
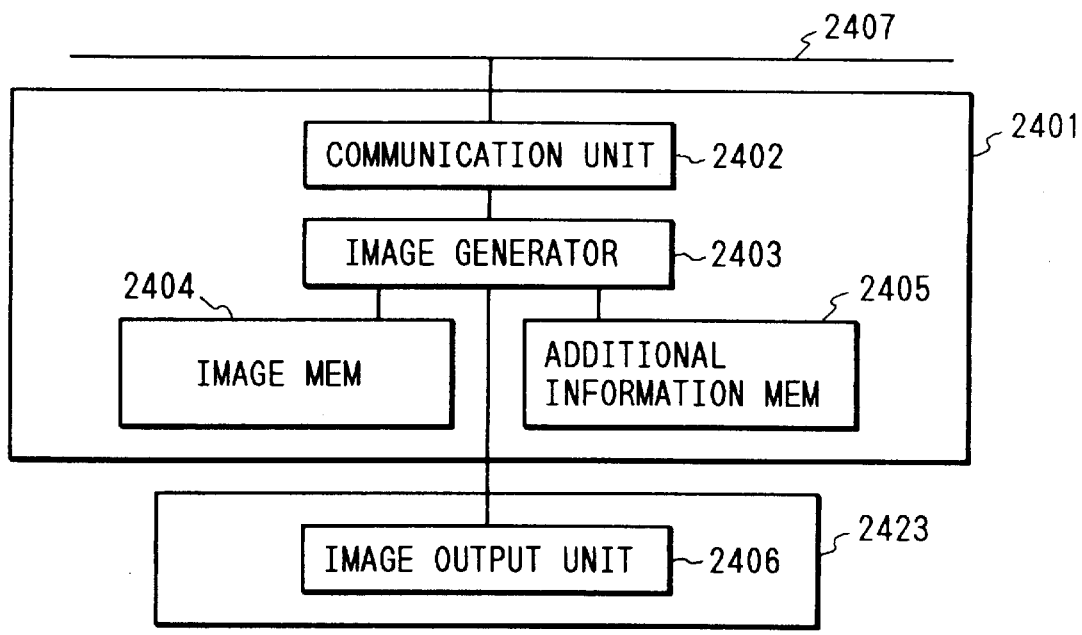
FIG. 78 is a block diagram illustrating a video image processing structure in a server device according to the embodiment of the present invention.

Referring to FIG. 78, there is depicted a block diagram illustrating the construction of an information I/O apparatus which demonstrates another embodiment of the present invention in which identical symbols shall be applied to those of the identical components illustrated in FIG. 72.

In the same figure, numeral 2423 is an image output apparatus which includes an image output unit 2406 and which is connected with the image formation apparatus body section 2401.

In the present embodiment, the image output apparatus 2423 and the image I/O controller body section 2401 through a cable, so that the image output apparatus 2423 is properly selectable and there can be connected an ink jet type printer and a heat transfer type printer, etc., with the present embodiment.

Figure 79:
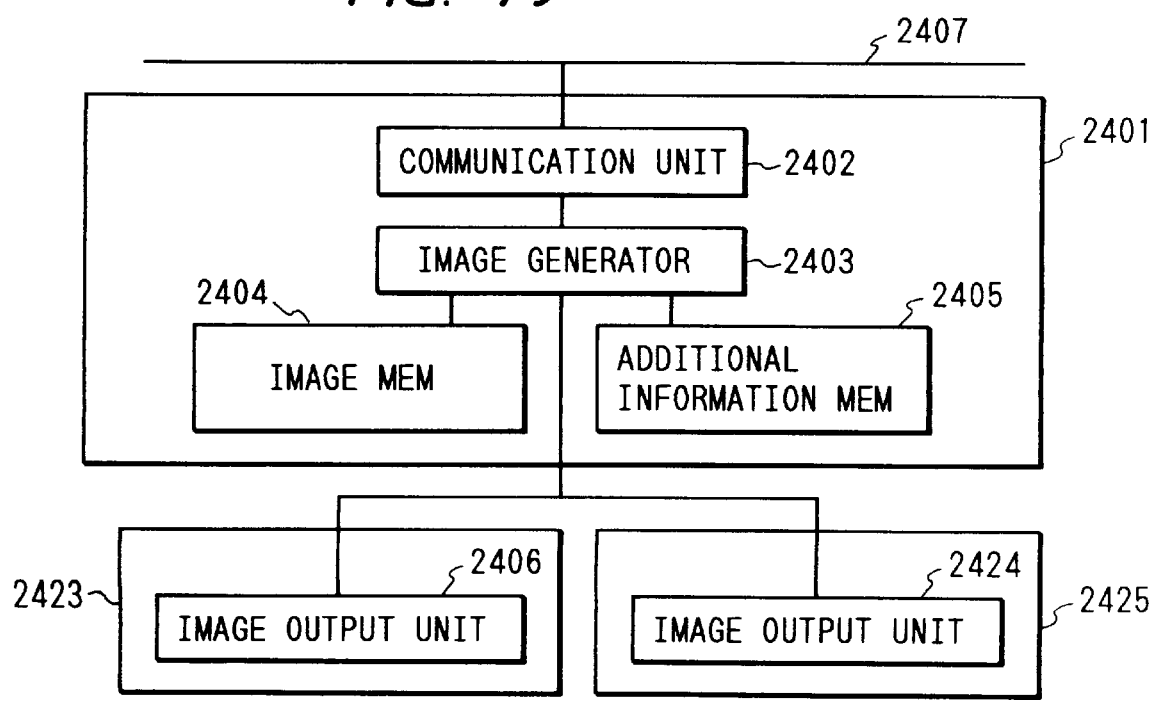
FIG. 79 is a block diagram illustrating another video image processing structure in a server device according to the embodiment of the present invention.

Referring to FIG. 79, there is depicted a block diagram illustrating the construction of an information I/O controller which demonstrates another embodiment of the present invention in which identical symbols shall be applied to those of the components illustrated in FIG. 72.

In the same figure, numeral 2425 is an image output apparatus which includes an image output unit 2424 and is connected with the image I/O controller 2401 through a cable (a two-way interface cable for example). A CPU of the image generator 2403 registers therein attributes of the image output apparatuses 2423, 2424 registered in a ROM and the like, and analyzes attribute information designated through the communication line 2407 and writes additional information in the additional information memory 2405 in response to the attributes of the designated image output apparatuses 2423, 2424.

In the present embodiment, the two image output apparatuses 2423, 2425 are connected with each other through a cable (two-way interface cable for example), so that additional information following the attribute designation from a host computer can be stored in the additional information memory 2406 and any of the image output apparatuses 2425, 2423 desired by the host computer is selectable.

Figure 80:
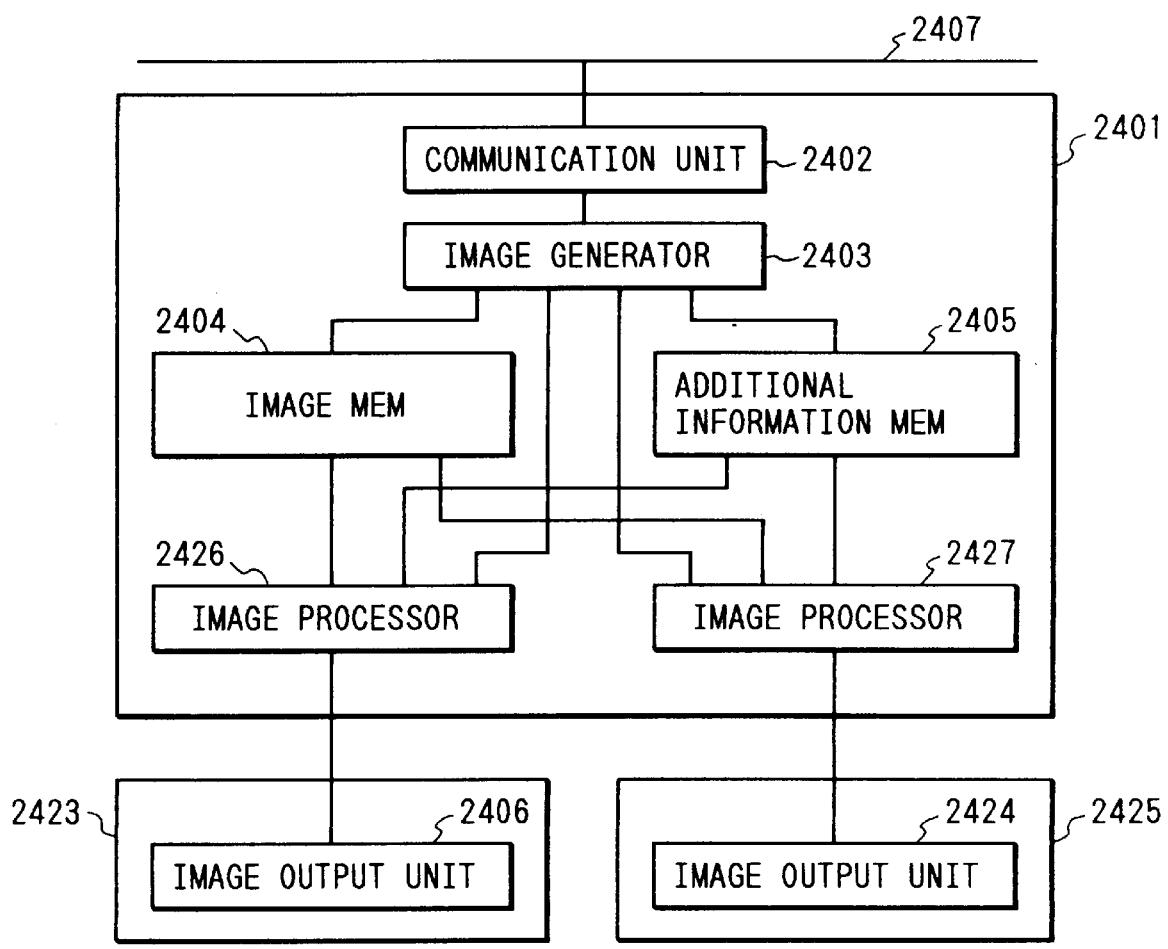
FIG. 80 is a block diagram illustrating another video image processing structure in a server device according to the embodiment of the present invention.

Referring to FIG. 80, there is depicted a block diagram illustrating the construction of an information I/O controller which demonstrates another embodiment of the present invention in which identical symbols shall be applied to those of the identical components illustrated in FIG. 72.

In the same figure, numerals 2426, 2427 designate image processors, which include a CPU, a ROM, and a RAM, etc., (not shown) and which render color image data stored in the image memory 2404 to desired image processings such for example as color conversion, scaling-up/scaling-down, movement, rotation, masking, and trimming, etc., and thereafter output final image data to the corresponding image output apparatus 2423 or 2425 through a cable.

In the present embodiment, image editing is executed on the side of the image formation apparatus body section 2401 even though the image output apparatus 2423 or 2425 does not include a higher image editing processing function, and hence a color image which is varicolored and involves clear black characters can inexpensively be outputted.

In the following, there will be described the operation of a rasterization processing to the band memory illustrated in FIG. 29 with reference to FIGS. 81 to 86.

Figure 81:
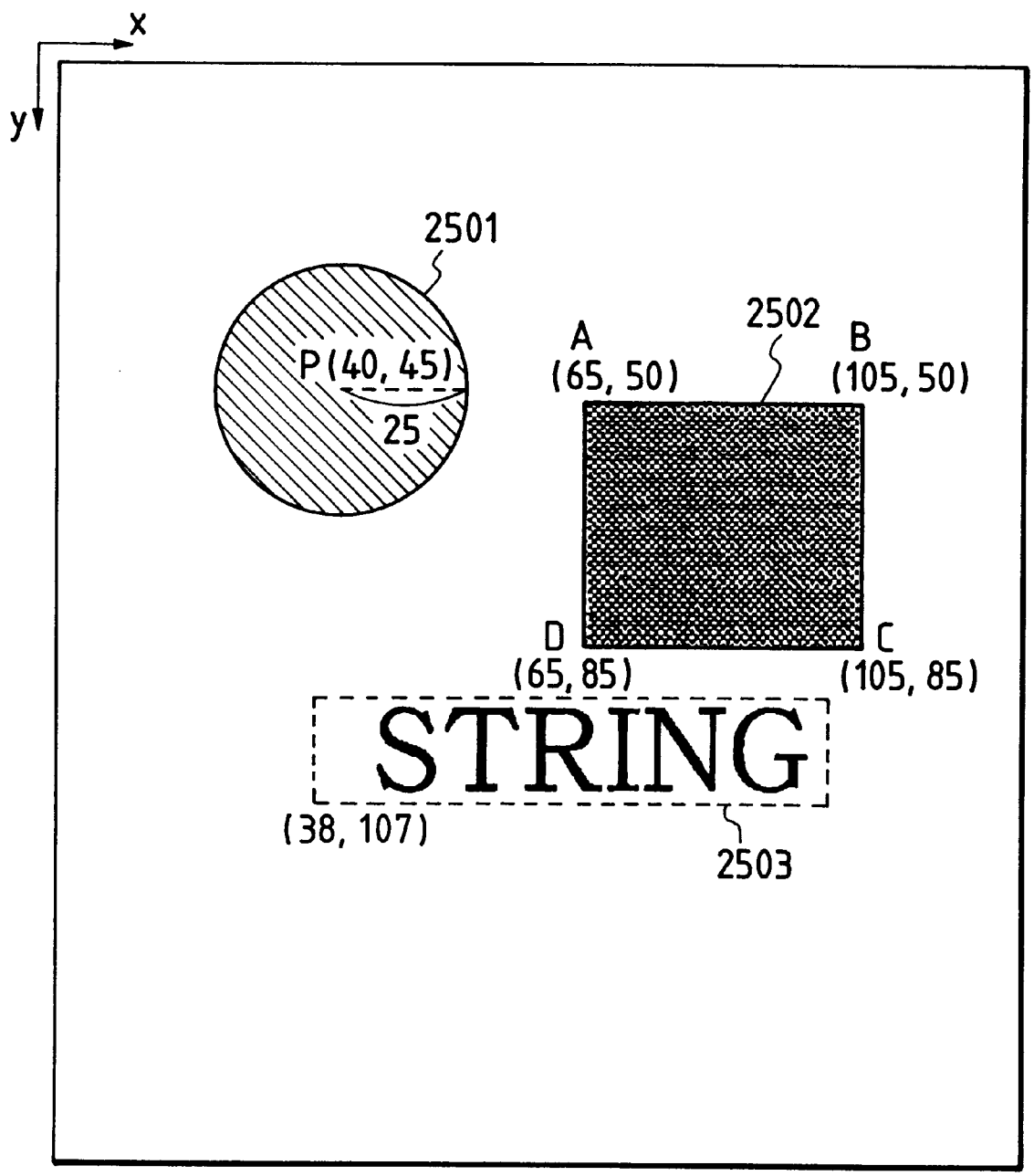
FIG. 81 is a view illustrating an example of an output video image sample in accordance with a rasterized processing into a band memory shown in FIG. 29.

Referring to FIG. 81, there is depicted a view exemplarily illustrating an output image sample based upon the rasterization processing to the band memory illustrated in FIG. 29, which sample is outputted from any of the color scanner/printer apparatuses 94, 95 illustrated in FIGS. 2A and 2B.

As illustrated in the same figure, there is a circle 2501 with the radius of 25 mm which is centered a point of 40 mm in the direction x (lateral) and of 45 mm in the direction y (longitudinal). The circle 2501 comprises a frame work line and a surface therein. Further, there is a rectangle 2502 surrounded by points A to D, which also comprises a frame work line and a surface therein. Further, a character 2503 of "SRTRING" is disposed from a location of 38 mm in the direction x and 107 mm in the direction y.

For outputting the just-mentioned image a page descriptor command where internal drawn information is converted to a CaPSL code for example is issued following a conversion program of each host computer, say, a host computer serving to control each station illustrated in FIGS. 2A and 2B for example.

Referring to FIGS. 82 and 83, there are depicted views each illustrating the structure of the page descriptor command issued from each host computer illustrated in FIGS. 2A and 2B.

In FIG. 82, numeral 2601 designates a color designation command which serves to designate the color of a line and which includes command numbers for identifying commands and R, G, B values for designates the level of a color. A command number of the command covering the color designation of a line is represented by "1".

Numerals 2602, 2603 designate commands each designating the color of a surface and the color of a character, respectively. The number of the command designating a surface color is "2", and the number of the command designating a character color is "3". A kind-of-line designator command 7604 is a command designating the kind of a line upon drawing a figure, which can designates solid lines, broken lines, and chain lines, etc. The number of that command is "4". A line width designator command 2605 is a command designating the thickness of a line which must designate such thickness in the unit of milimeter. The number of that command is "5". Further, a kind-of-surface designated command 2606 is to determine a smear-away pattern of the inside of a figure and has a command number of "6".

In FIG. 83, numerals 3701 to 3702 designate commands each designating the attribute of a character. Numeral 3701 designates a character size designation command which is to designate the size of a character. Numeral 3702 is a character style designation command which designates the bold (thick character) and italic (italic type of a character, etc. Further, numeral 3703 designates a kind-of-character designation command which can designates the kind of font. The numbers of these commands are "7", "8", "9", respectively).

Although the respective commands desired above concern the attributes of a drawn image, numerals 3704 to 3706 are commands of actually drawing figures and characters. The command 3704 is a code drawing command in which a command number "10" is first located followed by a radius, and x and y coordinates of the center. The next rectangle drawing command also locates a command number "11" first, and then the coordinates of a starting point at the coordinates of an end point diagonal to the starting point, the last character drawing command locates a command number "12" first, and then the locates of the top of a starting, and the code of a character.

Any combinator of such commands ensures parting of varieties of documents. The page descriptor command (CaPSL command) is not limited to the case designated above, not may include postscripts, LIPS(III), ESC/P, and the like.

In the following, there will be described the operation of a rasterization passing a band unit in the server according to the present invention with reference to FIG. 84.

Figure 84:
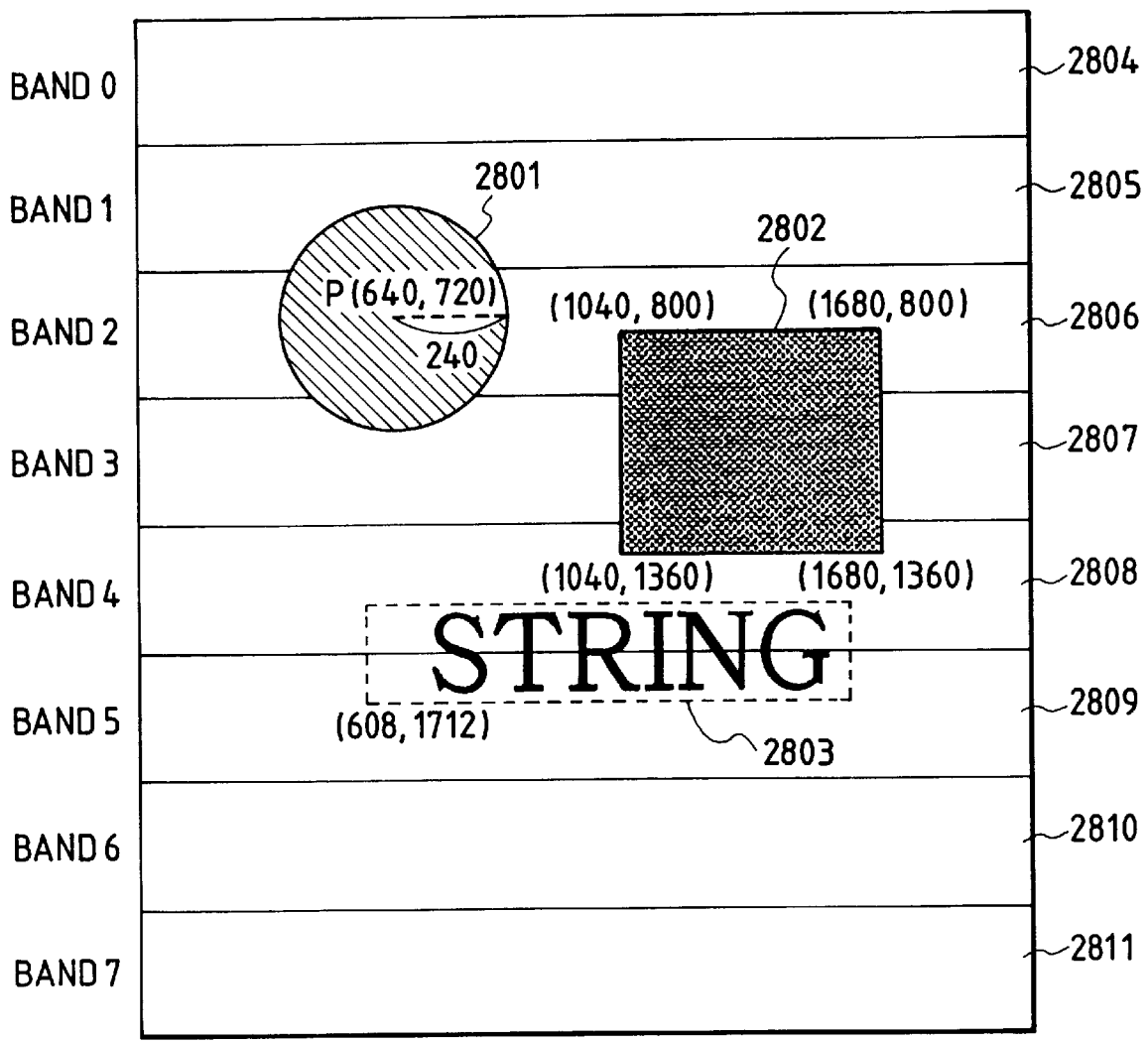
FIG. 84 is an explanatory view illustrating a band unit rasterizing procedure in a server device according to the present invention.

Referring to FIG. 84, there is depicted a schematical view illustrating the rasterization processing in a band unit in the server of the present invention, which processing the CPU 1000 illustrated in FIG. 9 for example executes on the basis of the PDL interpreter program 84 illustrated in FIGS. 2A and 2B.

To provide an image memory corresponding to one page for example the total memory capacity amounts to 1.83 megabytes with the assumption of the one page having 320 dots longitudinally and 200 dots laterally with one picture element comprising 3 bytes, construction of such a memory with a DRAM results in a large-sized memory and followed by the high cost.

To solve this, conversion of the rasterized image illustrated in FIG. 81 onto the coordinates on a physical memory provides a status illustrated in FIG. 84. Using the color scanner/printer apparatuses, 94, 95 illustrated in FIGS. 2A and 2B for example, which correspondingly have the resolution of 16 dots per 1 mm, the circle 2801 is drawn to have the center coordinates (640 dots, 720 dots) and the radius of 240 dots. Further, the rectangle 2802 has the illustrated physical coordinates.

The string 2803 is located at the coordinates (608 dots, 1722 dots). Once the physical coordinates are divided into strips (bands) in terms of the size of the memory, the image is partitioned into bands 2804 to 2811, the size of each band being 320 dots longitudinally and 2000 dots laterally, rasterization program, after completing the drawing of a band "0", transmits the contents in the memory to the color scanner/printer apparatuses 94, 95, and after completion of the transmission clears the memory, the program starts to draw a band "1". The program after completion of the drawing transmits the contents in the memory to the color scanner/printer apparatuses 94, 95. The processing is repeated from the band "0" to the band "8".

In the following, there will be described the page descriptor command serving to output the image illustrated to FIG. 81 from the color scanner/printer apparatuses 94, 95 will reform to FIGS. 85, 86.

It is assumed thus such commands is illustrated in FIG. 85 are transmittive from the host computers in the stations illustrated in FIG. 7.

In the same figure, numeral 2901 is a first numeral which is the command number "1", and hence is found to be the line color designation command. The PDL interpreter program 84 interprets the command, and determines that the subsequent three parameters are to designate colors and reads numerals. More specifically, R=255, G=0, B=0 are temporarily stored. Designation of a surface color by the next command 2902 is temporarily stored and information concerning a line and a surface associated with the commands are stored. A command 2906 is a circle drawing command, and the PPL interpreter program 84, after reading the drawing command, prepares an intermediate table 2921 and a detailing table 2922 both illustrated in FIG. 86.

The center coordinates and radius of the command 2906 is multiplied by 16 into physical pointing coordinates, the maximum and minimum coordinates in the direction y included in the figure are calculated. In the circle 2801, the width (direction y) of a band which has the minimum "479" and the maximum "959" is "320", and hence the circle 2801 is formed to be included from the band 1 to the band 2 with on the basis of the calculation.

The PDL interpreter program 84 registers "1" in an SB (start band) of the intermediate table 2921 and "2" in an EB (end band) of the same. Further, it registers circle in the COM (command) to identify the command. Further, it inputs an identification number of the detailing table into TNUM. The PDL interpreter program 84 registers detailed information concerning circle drawing in the detailing table 1. Numeral 2923 designates a detailing table concerning circle drawing, TNUM represents a detailing table number, and LCOLOR and FCOLOR represent colors of a line and a surface, respectively. LT represents a line type in which the information of a line temporarily stored is registered. In LW, there is registered the width of a line temporarily stored after being converted into a coordinate unit of a printer coordinate system. For example, a line of 2.5 mm is represented by 40 dots in the printer coordinate system. Also in FT, information concerning the kind of a surface temporarily stored is taken out and registered.

In DR, DX, DY, there are registered the radius and center coordinates of the command 2906 after calculated into the printer coordinate system. Thus, the intermediate table 2921 and the detailing table 2922 prepared by inputting the commands 2901 to 2906. Likewise, the intermediate table 2921 and the detailing table 2923 concerning the rectangle are prepared by inputting the commands 2907 to 2912. Further, the intermediate table 2921 and the detailing table 2924 concerning characters are prepared using the commands 2913 to 2917. The PDL interpreter program 84 prepares and stores in the memory character bit map data from information concerning the style, kind, size of a character of the input commands 2914 to 2916. As a result of this, the detailing table 2924 only stores therein the head address of the memory.

As the intermediate table 2921 and the detailing tables 2922 to 2924 have been prepared by inputting the commands 2901 to 2917, the PDL interpreter program 84 starts as follows a drawing processing of figures and characters on the basis of the information stored in the tables.

The PDL interpreter program 84 starts the drawing of the band 0. The program 84 receives whether or not any image is included in the band referring to the intermediate table. The program 84 finds the figure to be drawn in the 0th band referring to SB, EB of the intermediate table 2921, and hence transmits the contents in the memory intactly without effecting the drawing processing. Successively, it advances to a drawing processing of the band 1. It finds that a circle is to be drawn referring to SB, EB in the intermediate table 2921, and hence draws a circle on the memory based upon the information written in the detailing table TNUM of the identification number 1. It should be noticed that circle drawing must be done, rendering the circle to cripping processing corresponding to the size of the band. Otherwise, a region in the memory where no information is included is employed for the drawing to result in access error to the memory. The program 84 advances to the processing of the band 2, and finds that the circle 2801 and the rectangle 2802 are to be drawn, referring to the intermediate table 2921, and hence effects the rasterization processing referring to the detailing tables 2922, 2923.

In accordance with the image processing method of the first server of the present inverter, as described above, there is secured the band memory which is capable of dividing a memory region needed to draw an image corresponding to one page into a plurality of the band regions, and output band information is derived for each object, analyzing the commands in a page unit following a predetermined page descriptor language and successively received from each host computer connected with a predetermined network, and further each object is successively drawn in a corresponding band based upon the output band information. Accordingly, a complicated object can effectually be outputted even with a reduced necessary capacity.

There is repeated the processing described above for rasterization of an image corresponding to one page wherein reference is made to the intermediate table for each band to find any figure and any character to be drawn, and of such a figure as character are existent with reference is made to the detailing table in which information concerning the figure and character has been stored as drawn the figure.

In the following, there will be described the operation of a designation processing from a host computer to a scanner/printer apparatus of the server according to the present invention with reference to FIGS. 87 to 92.

Figure 87:
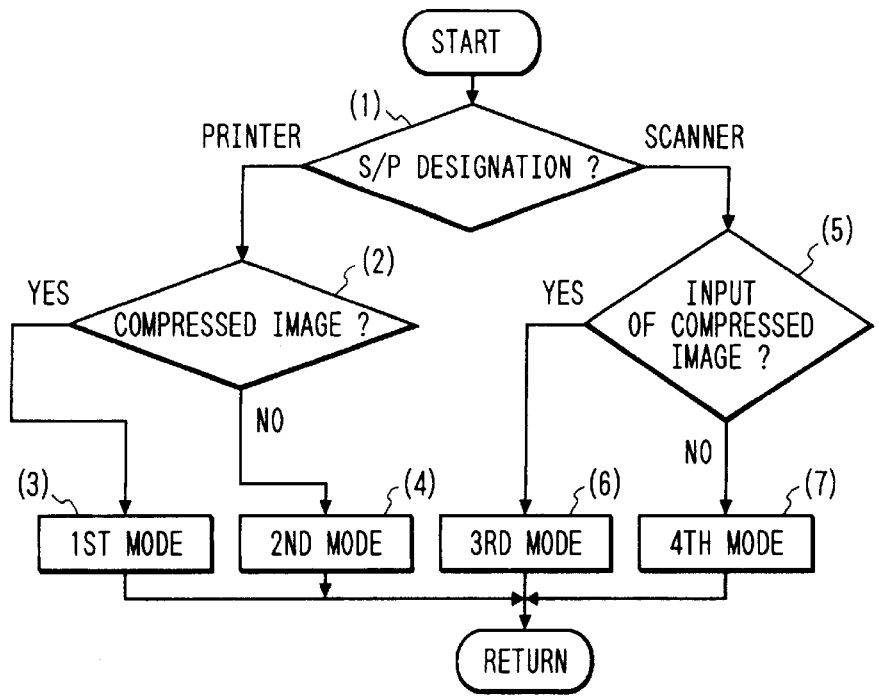
FIG. 87 is a flow chart illustrating an example of a mode designation processing step of a scanner/printer from a host computer to an SP server device according to the present invention.

Referring to FIG. 87, there is depicted a flowchart examplerily illustrating a mode designation processing procedure or a scanner/printer apparatuses from a host computer to a SP server according to the present invention. Designated at (1) to (7) are respective steps of the procedure. Although system environment including the SP server according to the present invention is as illustrated in FIGS. 2A and 2B, the present invention is applicable as matter of course to a system environment wherein a plurality of SP servers are arranged on the network and a plurality of printers and scanners are connected with each SP server. Accordingly, the present processing to one common to the respective SP servers. Provided a processing common to the respective SP servers is desired to be altered (for version-up for example) an altered program may be transferred from an installed SP server to the respective servers for setting thereof or the program may be supplied to the respective SP servers as a floppy disk.

The CPU 1000 judges scanner/printer (S/P) designation transferred from task host computer (respective stations ST1 to ST3 illustrated in FIGS. 2A and 2B) on a network in step (1), analyzes a transferred printing command in the case of designation of a printing processing to judge whether or not the present printing data is of only a compressed image in step (2), and if it is yes, then the CPU 1000 executes a data processing model (first mode) processing of the SP server to execute an expansion processing of the compressed image in step (3), and the CPU 1000 returns.

In contrast, if it is no, in the judgement of step (2), then it means the PDL and hence the CPU 1000 executes a data processing mode (second mode) processing wherein PDL data is analyzed for rasterization in step (4), and returns.

In contrast, in the case a scanner processing is designated in the judgement of step (1), the CPU 1000 analyzes a scanner command to judge whether or not a compression image is designated to be inputted in step (5), and if it is yes, then the CPU 1000 execute a data processing mode (third mode) processing of the SP server to convert read image data to a compressed image in step (6), and returns.

In contrast, if it is no, in the judgement of step (5), then the CPU 1000 execute a data processing mode (fourth mode) processing of the SP server to transfer read image data intactly, and returns.

Referring to FIGS. 88 to 91, there is depicted a view exemplarily illustrating an SP server designating window commonly used for the respective stations illustrated in FIGS. 2A and 2B. Each station is adapted to obtain statuses of an SP server (information I/O controller) and a scanner/printer apparatus (image I/O apparatus) both being connected with a bidirectional interface cable.

In these figures, SPAW desingates a scanner/printer application window which has buttons BT1 to BT7, the button BT1 serving as a file designator button. As the button BT1 is designated with a cursor K, a file table is displayed in the window.

The button BT2 serves as an editing designation button, and as the button BT2 is designated with the cursor K, an editing menu window (not shown) is displayed. The button BT3 server as an SP server designation button, and when the button BT3 is designated with the cursor K, a table of SP servers connected to the network is displayed (refer to FIG. 89). The present construction may be modified such that any SP server where any error is produced among SP servers in identifiable from the other SP servers (black/white reverse indicator for example).

Figure 90:
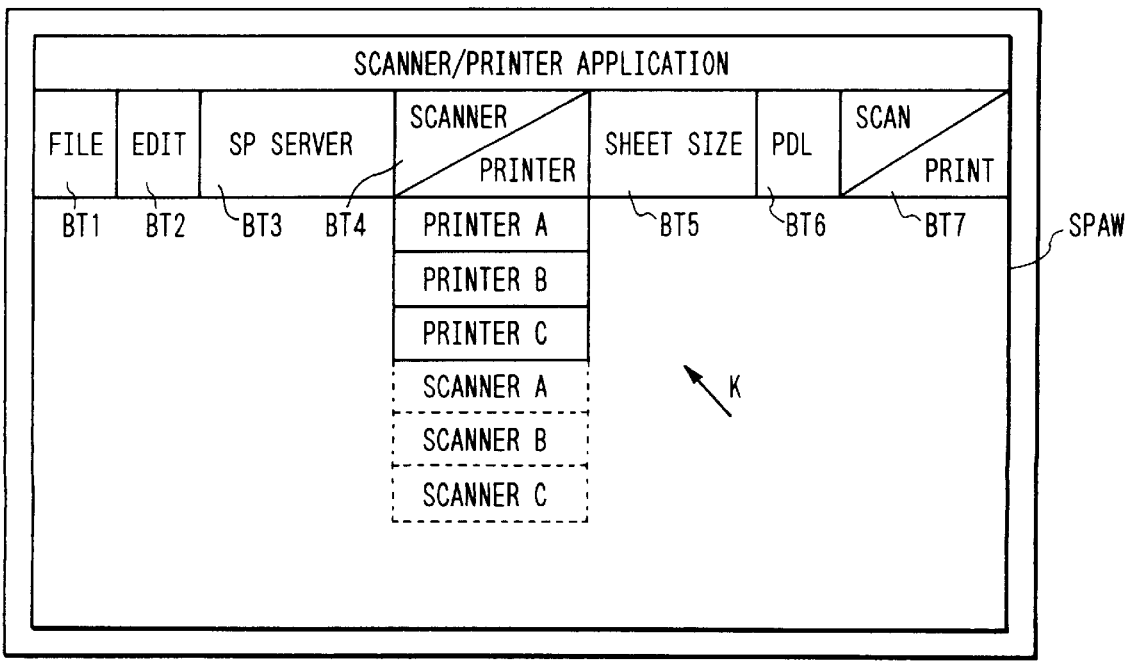
FIG. 90 is a view illustrating an example of an SP server designation window commonly viewed in each station shown in FIGS. 2A and 2B.
Figure 91:
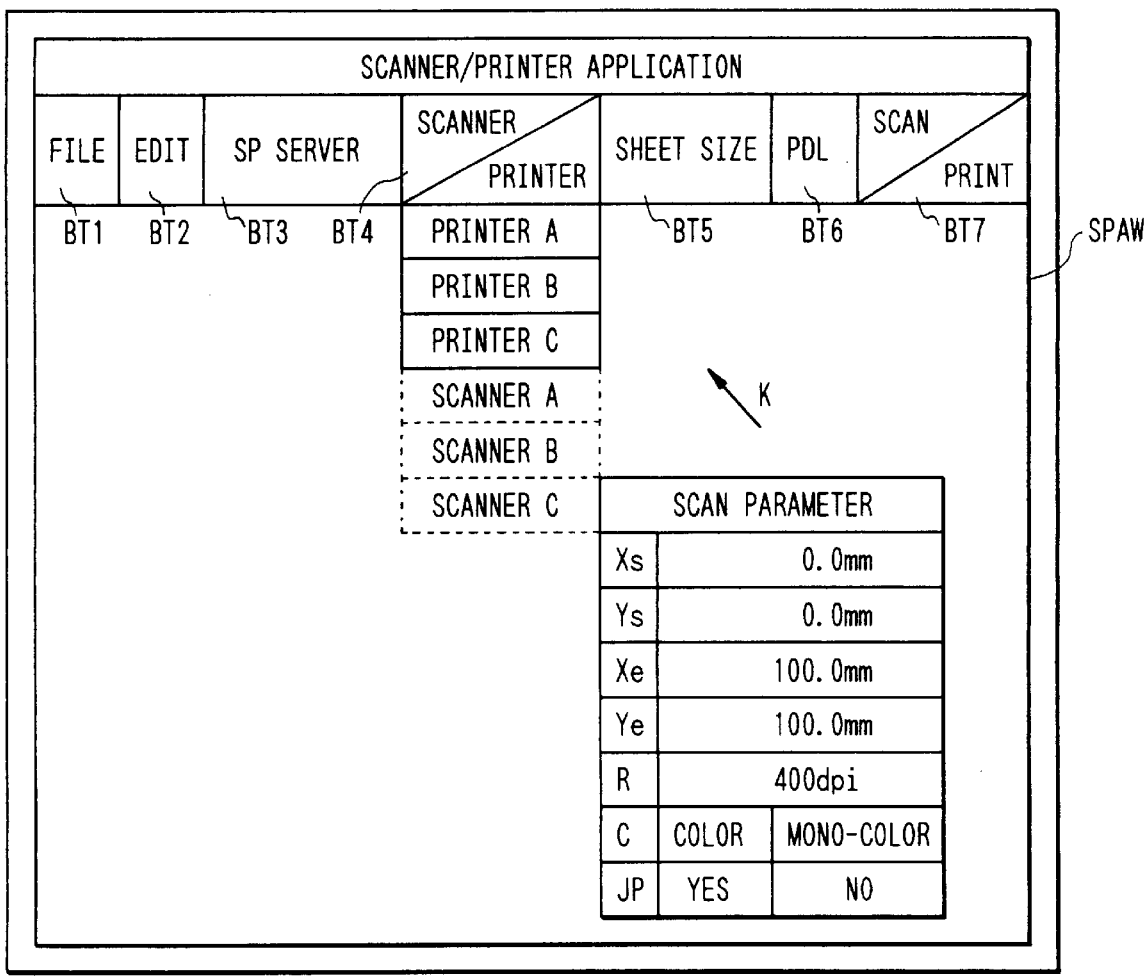
FIG. 91 is a view illustrating an example of an SP server designation window commonly viewed in each station shown in FIGS. 2A and 2B.

The button BT4 serves as a scanner/printer button, and when "scanner" or "printer" for the button BT4 is designated with the cursor K, a scanner/printer table usable in a selected S/P server is displayed (refer to FIG. 90). Once a desired scanner in the scanner/printer table is selected, a scanner parameter setting window for that scanner is displayed within the scanner/printer application window SPAN for example (refer to FIG. 91). The present construction may be modified such that a scanner/printer apparatus where any error is produced among usable scanner/printer apparatuses is identifiable from the other scanner/printer apparatuses inverted (reverse display for example).

The button BT5 serves as a paper size button, and when the button BT5 is designated with the cursor K, there is displayed a paper size selectable in a scanner/printer apparatus usable in a selected SP server. The button BT6 serves as a PDL/compressed image selection button, and when the button BT6 is designated with the cursor K, transfer conditions of printing information is got to the PDL. Data other than the PDL are transferred as compressed image data.

The button BT7 serves as a scanner/printer start button, and when the button BT7 is designated with the cursor K, a solmon on a printer in a selected SP server is started.

In the following, there will be described the operation of SP server designation control commonly used in the stations illustrated in FIGS. 2A and 2B.

Figure 92:
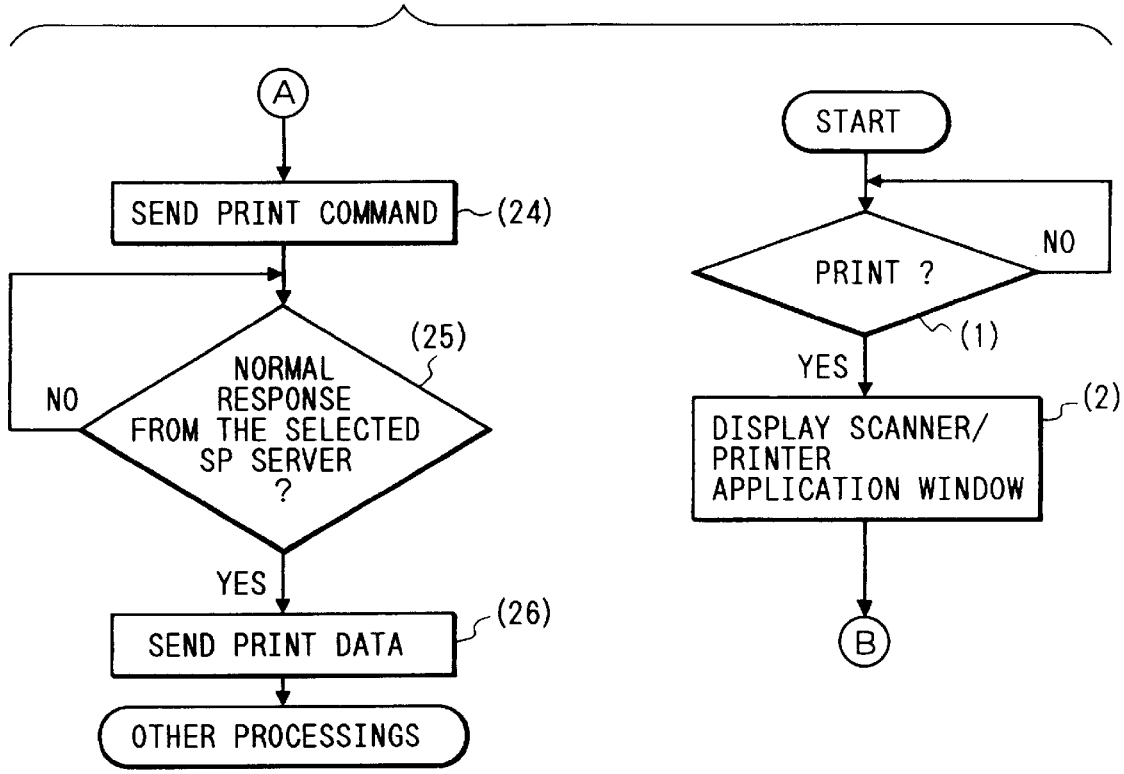
FIG. 92 is a flow chart illustrating an example of an SP server designation control step commonly utilized in each station shown in FIGS. 2A and 2B.
Figure 93B:
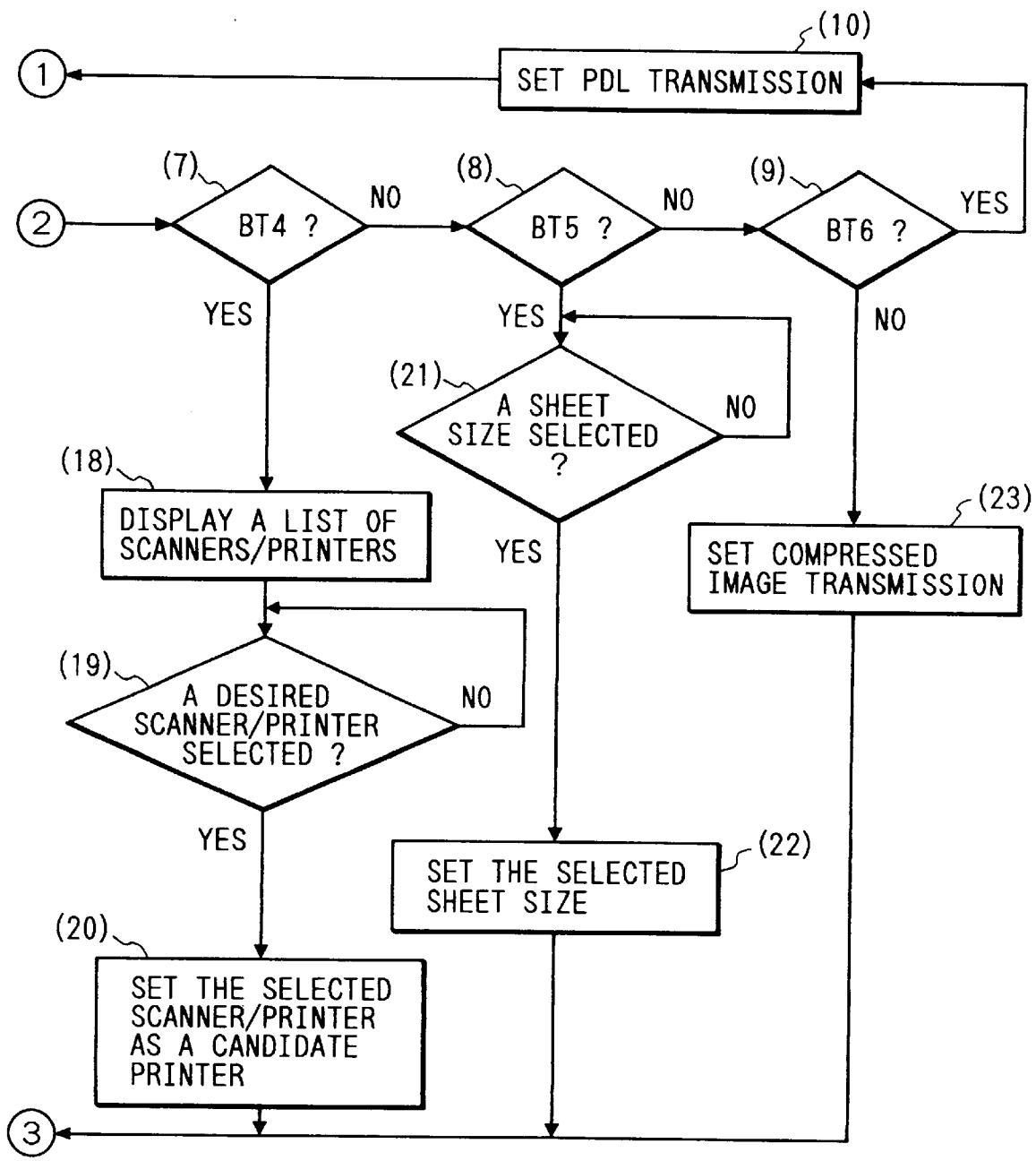
FIG. 93 is comprised of FIGS. 93A and 93B showing flow charts illustrating an example of an SP server designation control step commonly utilized in each station shown in FIGS. 2A and 2B.

Referring to FIGS. 92 to 93B, there is depicted a flowchart exemplarily illustrating an SP server designation control procedure commonly used in the respective stations illustrated in FIGS. 2A and 2B. Designated at (1) to (26) are respective steps of the procedure, each operator of which is a CPU in a station executes. Further, each step particularly corresponds to each processing upon a printing function processing in the scanner/printer being executed. It is noted that in S/P server, a scanner, a printer, a paper size, and PDL all being standardized have been defined as default.

Figure 88:
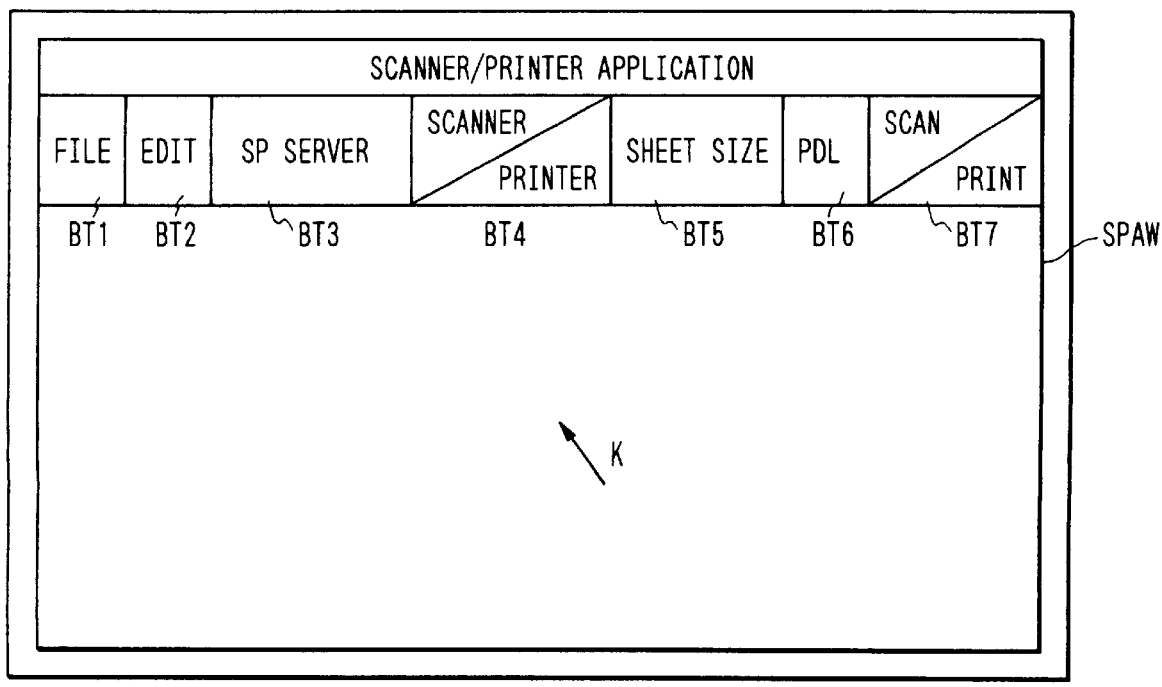
FIG. 88 is a view illustrating an example of an SP server designation window commonly viewed in each station shown in FIGS. 2A and 2B.
Figure 89:
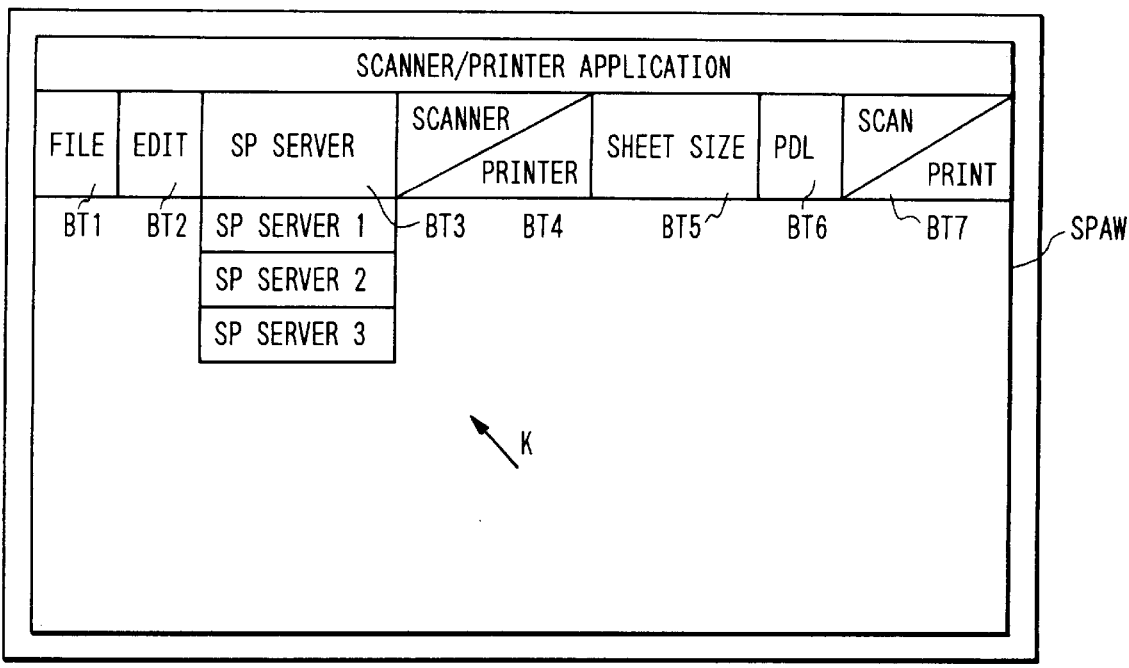
FIG. 89 is a view illustrating an example of an SP server designation window commonly viewed in each station shown in FIGS. 2A and 2B.

As the CPU selects the printing button processing in the execution of an application peculiar to each station in step (1), the CPU displays the scanner/printer application window SPAW illustrated in FIG. 88 (hereinafter, referred to as a window SPAW) in step (2). Then, the CPU judges whether or not the button BT7 in the scanner/printer application window SPAW is displayed with the cursor K in step (3), and if it is no, then the CPU judges whether or not the buttons BT1 to BT5 and designated in succession with the cursor K in steps (4) to (8), and if all are no, then the CPU judges whether or not the button BT6 is designated with the cursor K in step (9), and if it is yes, then the CPU sets PDL transmission and returns to step (3) while it is no, then the CPU sets compressed image transmission in step (25), and returns to step (3).

In contrast, if it is yes in the judgement of step (4), then the CPU displays a file table on the window SPAW in step (11), and waits until a desired file is selected from the file table with the cursor K in step (12) and defines the selected files as a printing file candidate in step (13), and returns to step (3).

In contrast, if it is yes in the judgement of step (5), then the CPU displays an editing menu on the window SPAW in step (14), and returns to step (3).

In contrast, if it is yes in the judgement of step (6), then the CPU displays an SP server table connected to the network on the window SPAW in step (15), and waits with a desired SP server is selected from the SP server table with the cursor K in step (16), and further the CPU defines the selected SP server as an SP server candidate for execution of the printing processing function processing in step (17), and returns to step (3).

In contrast, if it is yes in the judgement of step (17), then the CPU displays a printer/scanner table connected with the defined SP server or the window SPAW in step (18), and waits a desired printer/scanner apparatus is selected in the printer/scanner table with the cursor K in step (19), and if it is yes, then the CPU defines the selected printer/scanner as a printer candidate for executer of the printing processing function processing, and returns to step (3).

In contrast, if it is yes in the judgement of step (8), then the CPU waits until a paper size useable in the defined printer/scanner is selected to step (21), and if it is yes, then the CPU defines the selected paper size as a paper size for executor of the printing processing function processing in step (22), and returns to step (3).

In contrast, if it is yes in the judgement of step (3), then the CPU advances to step (24), and transmits a printing command and waits until a normal answer is transmitted back from the SP server selected as the candidate to the step (25), and the CPU transmits printing information (PDL and/or compressed image) through the network on the basis of the selected file in step (26), and starts the aforementioned printing process, and advances other processings after the printing processing is completed.

Although in the above-described embodiment description was done for the case when the scanner/printer designation processing was processed by pull-down menu selection or subwindow display into the window with the window SPAW, a user interface may of cause be a graphical interface (icon for example).

Although in the above described embodiment the disignation for the execution of the printing function processing particularly to a scanner/printer apparatus was described, a scanner function processing may also be executed in the same fashion, the more particularly upon the execution of the scanner function processing, after a scanner/printer server is defined, and after a scanner/printer used on the defined scanner/printer server is defined, the scanning is started once the button BT7 is designated with the cursor K, after for a desired scan parameter setting window or setting menu the window SPAW is displayed to determine in detail a read region, reselector, distinction of color/mono color, distinction of multi-value/binary value, designator of a compression system, a gamma value, a data formed (surface, line, point in order), and a second file name.

Although in the SP server designation control procedure of the CPU based upon the communication program in each file stations ST1 to ST3 was described, there will be described a data processing until data prepared with the application program is outputted to a designated SP server based upon a flowchart illustrated in FIG. 94.

In the case of the execution file application program, the communication program in a station executes the aforementioned SP server designation control procedure in response to the selection of the printing function processing. As the printing start button ST7 is depressed of the all are designated, a CPU (not shown) executes respective steps (1) to (4) of a flowchart illustrated in FIG. 94.

Figure 94:
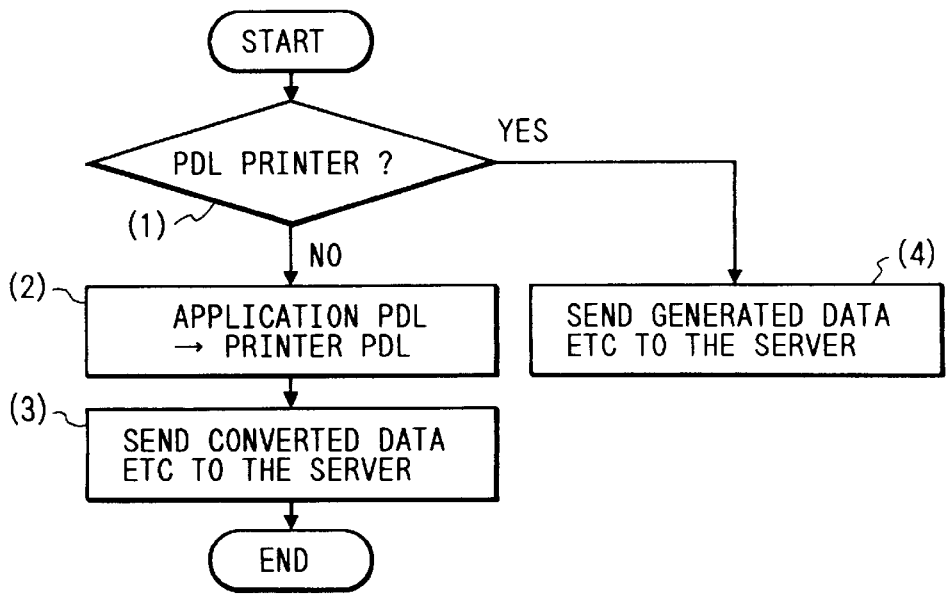
FIG. 94 is a flow chart illustrating an example of a data transfer processing step in an information processing method according to the embodiment of the present invention.

Referring to FIG. 94, there is depicted a flowchart examplarily illustrating a data transfer processing procedure in the information processing method which demonstated an embodiment of the present invention, which particularly corresponds to a data transfer procedure where the server and an application on the side of a host computer. Designated at (1) to (4) are respective steps, and each step may be constructed such that it is stored in a recording medium, for example a flopping disk is supplied to each station for execution thereof or it is previously be stored in a ROM on an Ethernet control board for execution thereof or it is transferred from a server to each station.

The aforementioned CPU judges whether or not a printer selected in step (21) in FIG. 93B corresponds to a page descriptor language (PDL) peculiar to the application program in step (1), and if it is not, then the page descriptor language peculiar to the application program is converted to a page descriptor language (CaSL for example) peculiar to a printer selecting a conversion program in the station in step (2), and the CPU outputs data after the conversion and designated information in FIGS. 93A and 93B to a server with which the designated printer is connected with the communication program and the TCP/IP program in step (3).

In contrast, if the selected printer in the judgement of step (1) corresponds to the page descriptor language (PDL) peculiar to the application program, then the CPU outputs data prepared with the application program and designated information in FIGS. 93A and 93B to a server with which the designated printer is connected through the communication program and the TCP/IP program in step (4). Although the judgement processing in step (1) is previously stored in a non-volatile memory (not shown) in the server, the processing is achieved by comparing identification information of a printer connected with the server with printer selection information selected in step (21) illustrated in FIG. 93B.

In accordance with the information processing method in the present embodiment, there are compared a data, format processed by a designated image I/O apparatus and a data format transferred to the designated I/O apparatus, and on the basis of a result of the comparison the data format transferred to the designated I/O apparatus is converted to the data format processed by the desginaged I/O apparatus. Accordingly, even though the data format based upon the application on the side of the host computer is different from the data format by the designated I/O apparatus, the data dependent upon the application can normarily be outputted from the designated I/O apparatus. Further, the kind of the page descriptor language processed by the designated I/O apparatus and the type of the page designator language of data transferred to the designated I/O apparatus are compared, and based upon a result of the comparison the kind of a page designator language of data transferred to the designated I/O apparatus is converted to the kind of the page descriptor language processed by the designated I/O apparatus. Accordingly, even if the kind of the page descriptor language of the designated I/O apparatus and the kind of the page descriptor language of data outputted to an I/O apparatus with the application program are different from each other, data from the application program can be transferred as data which is coincident with the kind of the page designator language of the I/O apparatus. Further, the I/O apparatus is made connectable with a predetermined host computer through a predetermined network, so that page designated languages transferred on the network can be integrated into one page designator language.

As illustrated in FIG. 3, the CPU of the Ethernet interface board 97 in the host computer HOST 3 for example, as the image I/O apparatuses (scanner/printer 94, 95) are designated, compares the format of transferred data with the data format of the image I/O apparatus, and if both are different from each other, then the format of the transferred data is connected to follow the data format of the I/O apparatus. Accordingly, even if the data format of the designated I/O apparatus and the format of the data outputted to the I/O apparatus following the application program are different from each other, the data from the application program can be transferred as data which is coincident with the data format of the I/O apparatus.

Further, the CPU in the CPU board 99 in the host computer HOST 3 illustrated in FIG. 3 for example, as the image I/O apparatus (scanner/printer 94, 95) is designated, compares the kind of the page descriptor language (PDL) of transferred data with kind of the page descriptor language (PDL) of the I/O apparatus, and if both are different, then the page descriptor language of the transferred data is converted so as to follow the kind of the page descriptor language of the I/O apparatus. Accordingly, even if there are different kind of the page descriptor language of the designated I/O apparatus and the kind of the page descriptor language of data outputted to the I/O apparatus following the application program, the data from the application program can be transferred as data which is coincident with the kind of the page descriptor language of the I/O apparatus.

The image I/O apparatus is made correctable with a predetermined host computer through a predetermined network (LAN96), so that page descriptor languages transferred on the network can be integrated to one page designator language.

In accordance with the first embodiment, as described above, a form of data processed by a designated image I/O apparatus and a format of data transferred to the designated I/O apparatus are compared with each other, and as a result of the comparison the format of the data transferred to the designated I/O apparatus is converted to the format of the data processed by the designated I/O apparatus, so that even if a data format based upon an application on the side of a host computer is different from the data format of the image I/O apparatus data dependent upon the application can normally be outputted from the designated I/O apparatus.

In accordance with the second embodiment, the kind of a page descriptor language processed by a designated image I/O apparatus and the kind of a page descriptor language of data transferred to the designated image I/O apparatus are compared with each other, and a result of the comparison the kind of the page descriptor language of the data transferred to the designated image I/O apparatus is transferred to the kind of the page descriptor language processed by the designated image I/O apparatus, so that even if the kind of the page descriptor language of the designated image I/O apparatus and the kind of the page descriptor language of the data outputted to the I/O apparatus following the application program, the data from the application program can be transferred as data which is coincident with the kind of the page descriptor language of the image I/O apparatus.

In accordance with the third embodiment, an image I/O apparatus is made connectable with a predetermined host computer through a predetermined network, so that page descriptor languages transferred on the network can be integrated into one page descriptor language.

In accordance with the fourth embodiment, and an image I/O apparatus is designated, a format of transferred data and a data format of one image I/O apparatus are compared with each other, and if both are different, then the data format of the transferred data is converted to follow the data format of the image I/O apparatus, so that even if a data format of the designated I/O apparatus and a data format of data outputted to the image I/O apparatus following the application program, the data from the application program can be transferred as data which is coincident with the data format of the image I/O apparatus.

In accordance with the fifth embodiment, once an image I/O apparatus is designated, the kind of a page descriptor language of transferred data and the kind of a page descriptor language processed by the image I/O apparatus are compared with each other, and if both are different, then the page descriptor language of the transferred data is converted to follow the kind of the page descriptor language, so that even if the kind of the page descriptor language of the designated image I/O apparatus is different from the kind of a page descriptor language of data outputted to the image I/O apparatus following the application program, the data from the application program can be transferred to data which is coincident with the kind of the page descriptor language of the image I/O apparatus.

In accordance with the sixth embodiment, an image I/O apparatus is made connectable with a predetermined host computer through a predetermined network, so that page descriptor languages transferred on the network can be integrated into one page descriptor language.

Thus, data following a page descriptor language peculiar to an application program are on the side of a host computer outputted following the execution with application program can be transferred as data of a page descriptor language following a page descriptor language peculiar to each image I/O apparatus without alteration of the application program to enlarge width of selection of image I/O apparatuses. Further, page descriptor languages on a network are integrated depending upon a page descriptor language on the side of an image I/O apparatus, so that interpreters for converting transferred PDL data to bit map data can be integrated into one interpreter.

Further, the aforementioned image I/O apparatus may be an integrated I/O apparatus in a network environment composed of a copying machine, a PAX, and a printer, etc. Further, an image I/O controller (server) with above described embodiments may be constructed such that a host computer or an image I/O apparatus (integrated I/O apparatus) has a function of the image I/O controller. For example, various programs in the SP1 of FIGS. 2A and 2B may be stored in a floppy disk or a hard disk and they may be attached to a host computer or the image I/O apparatus for use of, or they may previously been stored in a memory of a host computer or an image I/O apparatus for use thereof to achieve the same operations as described above.

What is claimed is:

1. An information processing apparatus connected to at least one terminal control device via a network, a plurality of terminal devices being connected to the at least one terminal control device, each terminal device executing a functional operation, said information processing apparatus comprising:

acquiring means for acquiring status information on a status of each of the plurality of terminal devices;

first input means for inputting an instruction on a desired functional operation;

second input means for inputting a selection instruction for selecting one of the at least one terminal control device; and display control means for controlling a display to display identification information of one or more of the plurality of terminal devices on the basis of the status information acquired by said acquiring means, wherein said display control means controls the display to display the identification information of one or more of the terminal devices which are connected to the one terminal control device selected through the selection instruction and which can execute the desired functional operation in response to said second input means inputting the selection information.

2. An apparatus according to claim 1, further comprising:

third input means for inputting a further selection instruction for selecting one of the terminal devices whose identification information is displayed on the display; and output means for outputting a functional operation execution command to the one terminal control device selected through the first-mentioned selection instruction in response to said third input means inputting the further selection instruction.

3. An apparatus according to claim 1, wherein the status information of each terminal device indicates whether the terminal device is operable.

4. An apparatus according to claim 1, wherein each functional operation comprises one of a printing operation and a scanning operation.

5. An apparatus according to claim 1, wherein said display control means controls the display to display the identification information of the one or more of the plurality of terminal devices distinguishably from identification information of the other terminal devices.

6. An information processing method operative in an information processing apparatus connected to at least one terminal control device via a network, a plurality of terminal devices being connected to the at least one terminal control device, each terminal device executing a functional operation, said information processing method comprising:

an acquiring step of acquiring status information on a status of each of the plurality of terminal devices;

a first input step of inputting an instruction on a desired functional operation;

a second input step of inputting a selection instruction for selecting one of the at least one terminal control device; and a display control step of controlling a display to display identification information of one or more of the plurality of terminal devices on the basis of the status information acquired in said acquiring step, wherein said display control step control the display to display the identification information of one or more of the terminal devices which are connected to the one terminal control device selected through the selection instruction and which can execute the desired functional operation in response to said second input step inputting the selection instruction.

7. A method according to claim 6, further comprising:

a third input step of inputting a further selection instruction for selecting one of the terminal devices whose identification information is displayed on the display; and an output step of outputting a functional operation execution command to the one terminal control device selected through the first-mentioned selection instruction in response to said third input step inputting the further selection instruction.

8. A method according to claim 6, wherein the status information of each terminal device indicates whether the terminal device is operable.

9. A method according to claim 6, wherein each functional operation comprises one of a printing operation and a scanning operation.

10. A method according to claim 6, wherein said display control step controls the display to display the identification information of the one or more of the plurality of terminal devices distinguishably from identification information of the other terminal devices.

11. A computer-readable storage medium storing a program for executing an information processing method operative in an information processing apparatus connected to at least one terminal control device via a network, a plurality of terminal devices being connected to the at least one terminal control device, each terminal device executing a functional operation, said information processing method comprising:

an acquiring step of acquiring status information on a status of each of the plurality of terminal devices;

a first input step of inputting an instruction on a desired functional operation;

a second input step of inputting a selection instruction for selecting one of the at least one terminal control device; and a display control step of controlling a display to display identification information of one or more of the plurality of terminal devices on the basis of the status information acquired in said acquiring step, wherein said display control step control the display to display the identification information of one or more of the terminal devices which are connected to the one terminal control device selected through the selection instruction and which can execute the desired functional operation in response to said second input step inputting the selection instruction.

12. A medium according to claim 11, said method further comprising:

a third input step of inputting a further selection instruction for selecting one of the terminal devices whose identification information is displayed on the display; and an output step of outputting a functional operation execution command to the one terminal control device selected through the first-mentioned selection instruction in response to said third input step inputting the further selection instruction.

13. A medium according to claim 11, wherein the status information of each terminal device indicates whether the terminal device is operable.

14. A medium according to claim 11, wherein each functional operation comprises one of a printing operation and a scanning operation.

15. A medium according to claim 11, wherein said display control step controls the display to display the identification information of the one or more of the plurality of terminal devices distinguishably from identification information of the other terminal devices.

\* \* \* \* \*

UNITED STATES PATENT AND TRADEMARK OFFICE
CERTIFICATE OF CORRECTION

PATENT NO.     : 5,996,029
DATED          : November 30, 1999
INVENTOR(S)    : Mitsumasa Sugiyama et al.

It is certified that error appears in the above-identified patent and that said Letters Patent is hereby corrected as shown below:

Item [30] FOREIGN APPLICATION PRIORITY DATA,
Insert: -- [30] Foreign Application Priority Data
Jan. 18, 1993    [JP]    Japan .... 5-21707 --.

Item [56] REFERENCES CITED U.S. PATENT DOCUMENTS,
"Simpkims et al." should read -- Simkins et al. --.

Item [57] ABSTRACT,
Line 3, "informations" should read -- information --.
Line 7, "an" ($2^{nd}$ occurrence) should be deleted; and "instruct" should read -- instructs --.

Column 1,
Line 60, "cyanic" should read -- cyan --.
Line 67, "be" should read -- the --.

Column 2,
Line 2, "increase" should read -- increase in --.
Line 20, "an" should be deleted; and "a" (both occurrences) should be deleted.

Column 3,
Line 37, "a" should be deleted.

Column 8,
Line 49, "to" ($2^{nd}$ occurrence) should be deleted.

Column 11,
Line 28, "provides" should read -- provide --.
Line 36, "Explanation" should read -- explanation --.

Column 15,
Line 44, "loose" should read -- lose --.

Column 18,
Line 39, "which" should read -- which is --.

Column 19,
Line 18, "CPU 100d." should read -- CPU 1000. --.
Line 55, "On" should read -- At --.

UNITED STATES PATENT AND TRADEMARK OFFICE
CERTIFICATE OF CORRECTION

PATENT NO. : 5,996,029
DATED : November 30, 1999
INVENTOR(S) : Mitsumasa Sugiyama et al.

It is certified that error appears in the above-identified patent and that said Letters Patent is hereby corrected as shown below:

Column 21,
Line 5, "On" should read -- At --.

Column 23,
Line 52, "312" should read -- 312, --.
Line 53-54, "of write" should read -- it was written --.

Column 26,
Line 54, "CPUS." should read -- CPUs. --.

Column 28,
Line 33, "control" should read -- controls --.

Column 29,
Line 7, "The read" should read -- the CPU 401 reads --.
Line 28, "meaning less" should read -- meaningless --.
Line 30, "carrier" should read -- carries --.

Column 30,
Line 15, "These" should read -- This --.
Line 34, "operates" should read -- operate --.
Line 45, "transversal" should read -- transverse --; and "main" should read -- (to main --.

Column 38,
Line 66, "sent-to" should read -- sent to --.

Column 45,
Line 4, "Bn)" should read -- Bh) --.

Column 46,
Line 29, "been recovered" should read -- been recovered from --.

Column 47,
Line 1, "is a timing chart" should read -- are timing charts --.
Line 7, "1 and 2" should read -- 1 and 2 are --.
Line 32, "run" should read -- runs --.

Column 48,
Line 36, "represents" should read -- represent --.
Line 46 and 50, "hand," should read -- hand, if --.

UNITED STATES PATENT AND TRADEMARK OFFICE
CERTIFICATE OF CORRECTION

| | |
|---|---|
| PATENT NO. | : 5,996,029 |
| DATED | : November 30, 1999 |
| INVENTOR(S) | : Mitsumasa Sugiyama et al. |

It is certified that error appears in the above-identified patent and that said Letters Patent is hereby corrected as shown below:

Column 53,
Line 12, "read" should read -- reads --.

Column 59,
Line 38, "the" should be deleted.
Line 45, "of the" should be deleted.

Column 60,
Line 8, "Zerox" should read -- Xerox --.

Column 67,
Line 14, "dizer" should read -- dither --.

Column 70,
Line 32, "through a cable" should read -- are connected through a cable --.

Column 73,
Line 1, "reads" should read -- read --.

Column 74,
Line 25, "of" should read -- if --.
Line 26, "as" should read -- and --.
Line 28, "drawn" should read -- drawn in --.
Line 33, "exam-" should read -- exem- --.
Line 44, "to" (1st occurrence) should read -- is --.

Column 75,
Line 2, "execute" should read -- executes --.
Line 15, "desingates" should read -- designates --.

Column 76
Line 6, "no," should read -- not, --.
Line 8, "no," should read -- not, --.
Line 11, "while" should read -- while if --.
Line 25, "with" should read -- while --.
Line 34, "waits" should read -- waits while --.
Line 60, "disig-" should read -- desig- --.

UNITED STATES PATENT AND TRADEMARK OFFICE
CERTIFICATE OF CORRECTION

PATENT NO. : 5,996,029
DATED : November 30, 1999
INVENTOR(S) : Mitsumasa Sugiyama et al.

It is certified that error appears in the above-identified patent and that said Letters Patent is hereby corrected as shown below:

Column 77,
Line 2, "after for" should read -- after --.
Line 23, "demonstated" should read -- demonstrated --.
Line 25, "where" should read -- for --.
Line 29, "flopping" should read -- floppy --.
Line 63, "desginated" should read -- designated --.

Column 78,
Line 42, "kind" should read -- kinds --.

Column 80,
Line 2, "been" should read -- have been --.

Column 81,
Line 3, "control" should read -- controls --.

Column 82,
Line 10, "control" should read -- controls --.

Signed and Sealed this

Twenty-third Day of October, 2001

Attest:

*Nicholas P. Godici*

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO.    : 5,996,029
DATED         : November 30, 1999
INVENTOR(S)   : Mitsumasa Sugiyama et al.

It is certified that error appears in the above-identified patent and that said Letters Patent is hereby corrected as shown below:

Item [30], Foreign Application Priority Data

Insert: -- [30] Foreign Application Priority Data
        Jan. 18, 1993 [JP] Japan . . . . 5-21707 --.

Item [56] References Cited
    U.S. PATENT DOCUMENTS
    "Simpkims et al." should read -- Simkins et al. --.

Item [57] ABSTRACT
    Line 3, "informations" should read -- information --.
    Line 7, "an" ($2^{nd}$ occurrence) should be deleted; and "instruct" should read -- instructs --.

Column 1,
Line 60, "cyanic" should read -- cyan --.
Line 67, "be" should read -- the --.

Column 2,
Line 2, "increase" should read -- increase in --.
Line 20, "an" should be deleted; and "a" (both occurrences) should be deleted.

Column 3,
Line 37, "a" should be deleted.

Column 8,
Line 49, "to" ($2^{nd}$ occurrence) should be deleted.

Column 11,
Line 28, "provides" should read -- provide --.
Line 36, "Explanation" should read -- explanation --.

Column 15,
Line 44, "loose" should read -- lose --.

Column 18,
Line 39, "which" should read -- which is --.

UNITED STATES PATENT AND TRADEMARK OFFICE
CERTIFICATE OF CORRECTION

PATENT NO. : 5,996,029
DATED : November 30, 1999
INVENTOR(S) : Mitsumasa Sugiyama et al.

It is certified that error appears in the above-identified patent and that said Letters Patent is hereby corrected as shown below:

Column 19,
Line 18, "CPU 100d." should read -- CPU 1000. --.
Line 55, "On" should read -- At --.

Column 21,
Line 5, "On" should read -- At --.

Column 23,
Line 52, "312" should read -- 312, --.
Lines 53-54, "of write" should read -- it was written --.

Column 26,
Line 54, "CPUS." should read -- CPUs. --.

Column 28,
Line 33, "control" should read -- controls --.

Column 29,
Line 7, "The read" should read -- the CPU 401 reads --.
Line 28, "meaning less" should read -- meaningless --.
Line 30, "carrier" should read -- carries --.

Column 30,
Line 15, "These" should read -- This --.
Line 34, "operates" should read -- operate --.
Line 45, "transversal" should read -- transverse --; and "main" should read -- (to main --.

Column 38,
Line 66, "sent-to" should read -- sent to --.

Column 45,
Line 4, "Bn)" should read -- Bh) --.

Column 46,
Line 29, "been recovered" should read -- been recovered from --.

UNITED STATES PATENT AND TRADEMARK OFFICE
CERTIFICATE OF CORRECTION

PATENT NO.    : 5,996,029
DATED         : November 30, 1999
INVENTOR(S)   : Mitsumasa Sugiyama et al.

It is certified that error appears in the above-identified patent and that said Letters Patent is hereby corrected as shown below:

Column 47,
Line 1, "is a timing chart" should read -- are timing charts --.
Line 7, "1 and 2" should read -- 1 and 2 are --.
Line 32, "run" should read -- runs --.

Column 48,
Line 36, "represents" should read -- represent --.
Lines 46 and 50, "hand," should read -- hand, if --.

Column 53,
Line 12, "read" should read -- reads --.

Column 59,
Line 38, "the" should be deleted.
Line 45, "of the" should be deleted.

Column 60,
Line 8, "Zerox" should read -- Xerox --.

Column 67,
Line 14, "dizer" should read -- dither --.

Column 70,
Line 32, "through a cable" should read -- are connected through a cable --.

Column 73,
Line 1, "reads" should read -- read --.

Column 74,
Line 25, "of" should read -- if --.
Line 26, "as" should read -- and --.
Line 28, "drawn" should read -- drawn in --.
Line 33, "exam-" should read -- exem- --.
Line 44, "to" (1st occurrence) should read -- is --.

Column 75,
Line 2, "execute" should read -- executes --.
Line 15, "desingates" should read -- designates --.

UNITED STATES PATENT AND TRADEMARK OFFICE
CERTIFICATE OF CORRECTION

PATENT NO. : 5,996,029
DATED : November 30, 1999
INVENTOR(S) : Mitsumasa Sugiyama et al.

It is certified that error appears in the above-identified patent and that said Letters Patent is hereby corrected as shown below:

Column 76,
Lines 6 and 8, "no," should read -- not, --.
Line 11, "while" should read -- while if --.
Line 25, "with" should read -- while --.
Line 34, "waits" should read -- waits while --.
Line 60, "disig-" should read -- desig- --.

Column 77,
Line 2, "after for" should read -- after --.
Line 23, "demonstated" should read -- demonstrated --.
Line 25, "where" should read -- for --.
Line 29, "flopping" should read -- floppy --.
Line 63, "desginated" should read -- designated --.

Column 78,
Line 42, "kind" should read -- kinds --.

Column 80,
Line 2, "been" should read -- have been --.

Column 81,
Line 3, "control" should read -- controls --.

Column 82,
Line 10, "control" should read -- controls --.

Signed and Sealed this

Fifteenth Day of January, 2002

*Attest:*

*Attesting Officer*

JAMES E. ROGAN
*Director of the United States Patent and Trademark Office*